(12) United States Patent
Ikeda

(10) Patent No.: US 12,744,842 B2
(45) Date of Patent: Sep. 22, 2026

(54) TERMINAL DEVICE

(71) Applicant: Hiroyuki Ikeda, Tokyo (JP)

(72) Inventor: Hiroyuki Ikeda, Tokyo (JP)

( * ) Notice: Subject to any disclaimer, the term of this patent is extended or adjusted under 35 U.S.C. 154(b) by 0 days.

(21) Appl. No.: 18/280,888

(22) PCT Filed: Jul. 30, 2021

(86) PCT No.: PCT/JP2021/028304
§ 371 (c)(1),
(2) Date: Sep. 7, 2023

(87) PCT Pub. No.: WO2022/190406
PCT Pub. Date: Sep. 15, 2022

(65) Prior Publication Data

US 2024/0089362 A1 Mar. 14, 2024

(30) Foreign Application Priority Data

Mar. 8, 2021 (JP) ................................ 2021-036577
Jun. 25, 2021 (JP) ................................ 2021-106022

(51) Int. Cl.
*H04M 1/72409* (2021.01)
*G06F 3/01* (2006.01)
(Continued)

(52) U.S. Cl.
CPC ....... *H04M 1/724097* (2022.02); *G06F 3/011* (2013.01); *G06F 3/017* (2013.01);
(Continued)

(58) Field of Classification Search
CPC ....... H04M 1/724097; H04M 1/72436; H04M 2201/40; H04M 2250/22; G06F 3/011;
(Continued)

(56) References Cited

U.S. PATENT DOCUMENTS

2010/0156787 A1* 6/2010 Katayama ............ G02B 27/017 345/157
2014/0152558 A1 6/2014 Salter et al.
(Continued)

FOREIGN PATENT DOCUMENTS

JP 11-98227 A 4/1999
JP 2012-78224 A 4/2012
(Continued)

OTHER PUBLICATIONS

International Search Report (PCT/ISA/210) issued in PCT Application No. PCT/JP2021/028304 dated Oct. 19, 2021 with English translation (6 pages).
(Continued)

*Primary Examiner* — Marcos L Torres
(74) *Attorney, Agent, or Firm* — Crowell & Moring LLP

(57) ABSTRACT

Provided is a terminal device that can be manufactured with a smaller number of components by simplifying the configuration thereof. This terminal device 1A comprises: glasses 10 as an object to be mounted on the head of a user; a display device 20 provided on the glasses 10; and a terminal 30 configured separately from the glasses 10 and equipped with a display part 31. The display device 20 projects, as an original screen M, an image from a projection device 21 onto a hologram sheet 23 via an optical system 22. The original screen M projected onto the hologram sheet 23 is reflected by the hologram sheet 23, and the user can see a viewing screen S corresponding to the original screen M as if the viewing screen is floating in midair. The terminal 30 is wirelessly connected to the display device 20. The terminal 30 has a function of controlling the display device 20 such that a screen displayed on the display part 31 is displayed as the original screen M on the display device 20.

22 Claims, 82 Drawing Sheets

(51) Int. Cl.
*G06F 3/0354* (2013.01)
*G06F 3/04886* (2022.01)
*H04M 1/72436* (2021.01)

(52) U.S. Cl.
CPC .... *G06F 3/04886* (2013.01); *H04M 1/72436* (2021.01); *G06F 3/03547* (2013.01); *G06F 2203/04803* (2013.01); *H04M 2201/40* (2013.01); *H04M 2250/22* (2013.01)

(58) Field of Classification Search
CPC .. G06F 3/017; G06F 3/04886; G06F 3/03547; G06F 2203/04803; G06F 3/1454; G06F 3/0488; G06F 3/167; G06F 3/0236; G02B 27/0172; G02B 2027/0138; G02B 2027/0174; G02B 2027/0178
See application file for complete search history.

(56) References Cited

U.S. PATENT DOCUMENTS

| | | | | |
|---|---|---|---|---|
| 2015/0128251 | A1 | 5/2015 | Yoon et al. | |
| 2016/0025983 | A1* | 1/2016 | Ikeda | G02B 27/0172 345/173 |
| 2019/0146222 | A1 | 5/2019 | Hiroi | |
| 2019/0278093 | A1* | 9/2019 | Osterhout | G09G 5/003 |
| 2020/0410755 | A1 | 12/2020 | Nakata | |
| 2022/0366131 | A1* | 11/2022 | Ekron | G06F 16/951 |
| 2022/0391161 | A1* | 12/2022 | Fan | G06F 3/1454 |

FOREIGN PATENT DOCUMENTS

| | | | |
|---|---|---|---|
| JP | 2014-48775 | A | 3/2014 |
| JP | 2015-536514 | A | 12/2015 |
| JP | 2016-31761 | A | 3/2016 |
| JP | 2019-82891 | A | 5/2019 |
| JP | 2021-5157 | A | 1/2021 |
| WO | WO 2020/244495 | A1 | 12/2020 |

OTHER PUBLICATIONS

Japanese-language Written Opinion (PCT/ISA/237) issued in PCT Application No. PCT/JP2021/028304 dated Oct. 6, 2021 with English translation (9 pages).

Japanese-language International Preliminary Report on Patentability (PCT/IPEA/409) issued in PCT Application No. PCT/JP2021/028304 dated Aug. 16, 2022 with English translation (10 pages).

Extended European Search Report issued in European Application No. 21929440.2 dated Aug. 26, 2024 (19 pages).

European Office Action issued in European Application No. 21 929 440.2 dated Jun. 11, 2025 (13 pages).

Schneider, D. et al.; "Towards Around-Device Interaction using Corneal Imaging", arxiv.org, Sep. 4, 2017, Cornell University, Ithaca, NY 14853, XP080818244 (7 pages).

Anonymous; "Mirror iPhone screen to Oculus Go", Meta Community Forums, Aug. 1, 2020, pp. 1-5, XP093282605 (5 pages).

* cited by examiner

FIG. 1
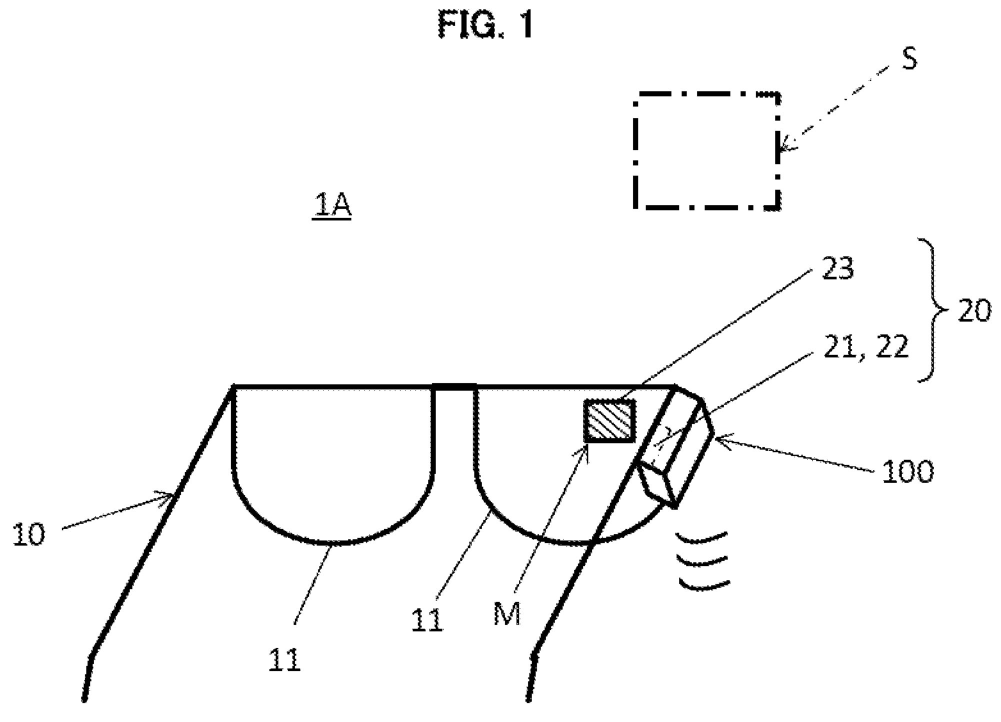
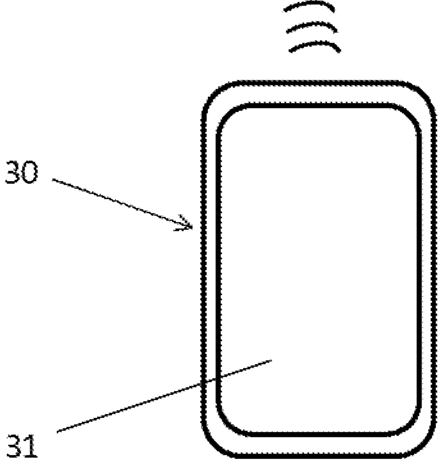

Figure 4:
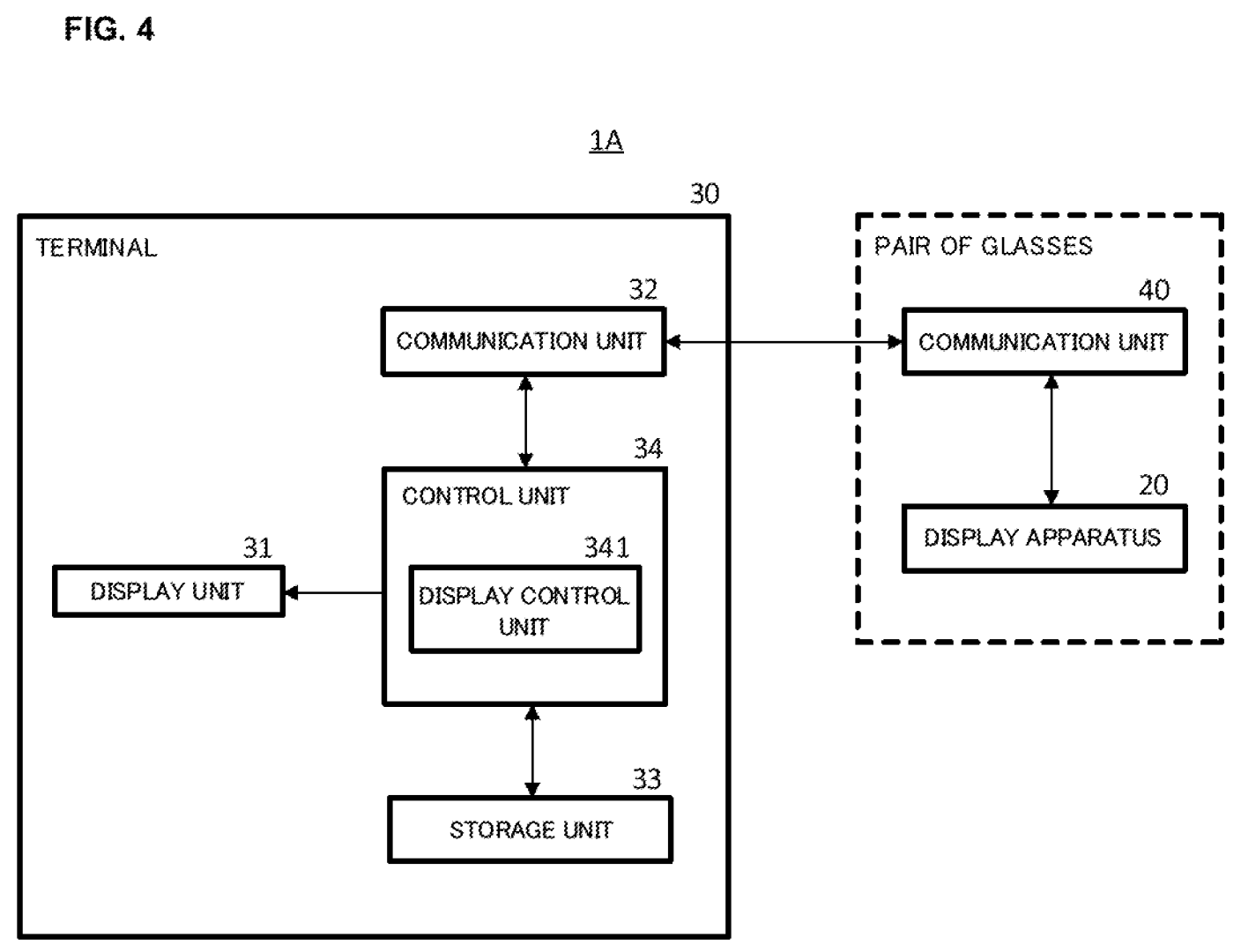

PAIR OF GLASSES
40 COMMUNICATION UNIT
20 DISPLAY APPARATUS

30 TERMINAL
32 COMMUNICATION UNIT
34 CONTROL UNIT
341 DISPLAY CONTROL UNIT
33 STORAGE UNIT
31 DISPLAY UNIT

FIG. 6
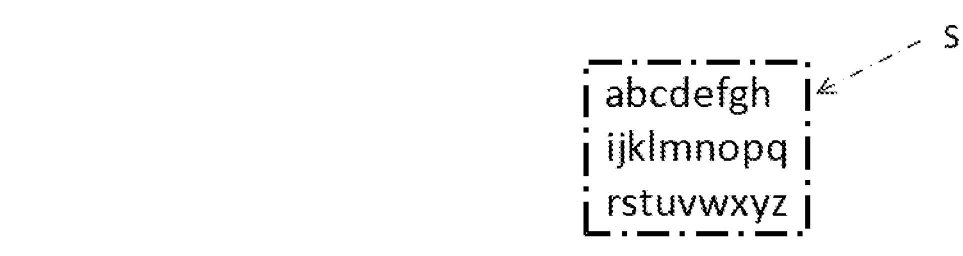
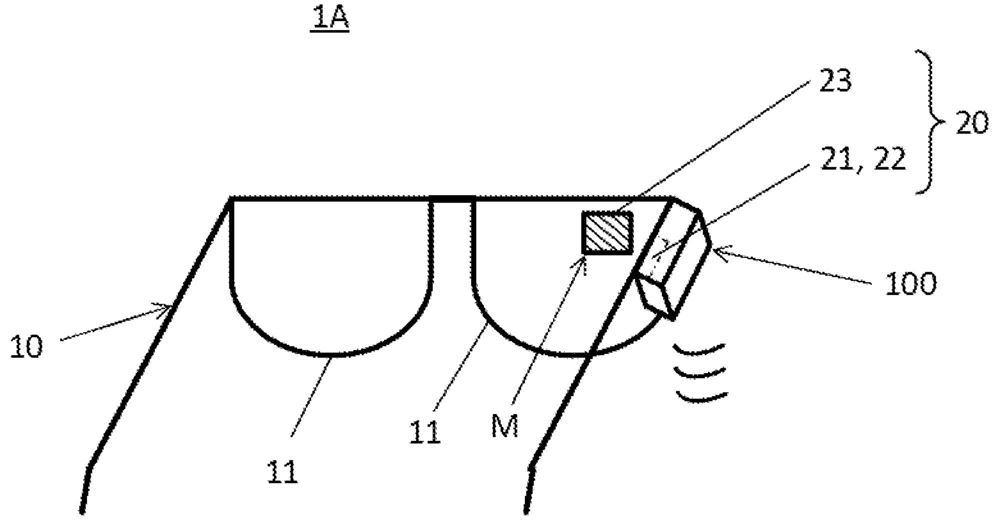
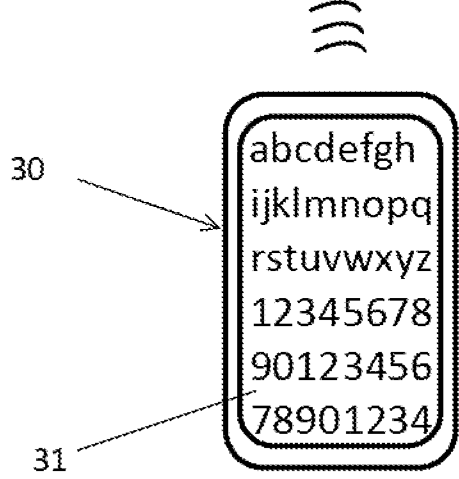

FIG. 7
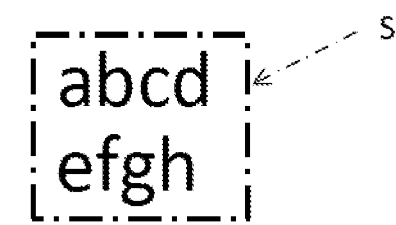
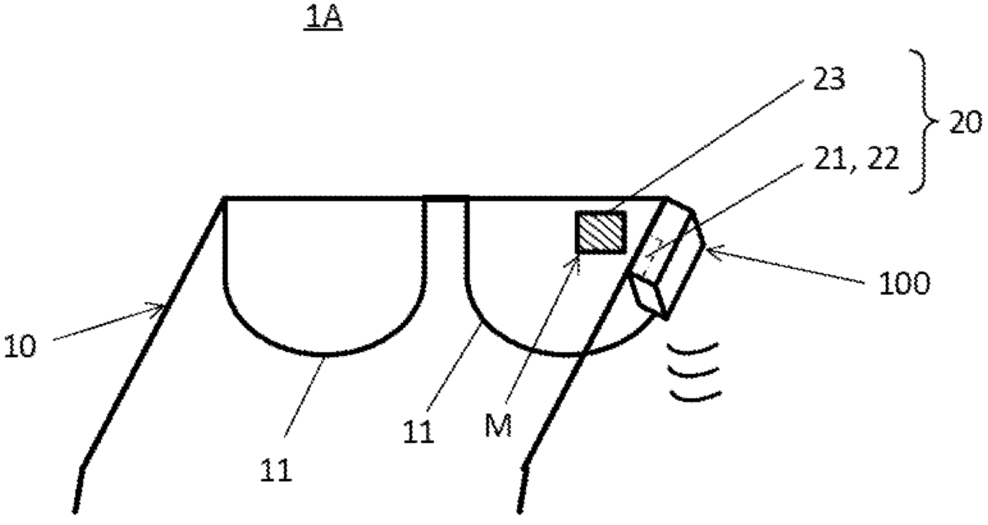
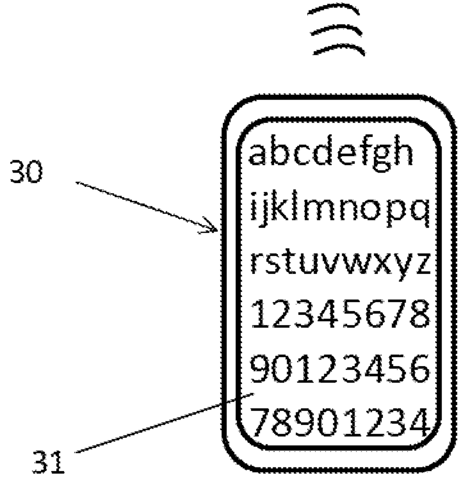

FIG. 8
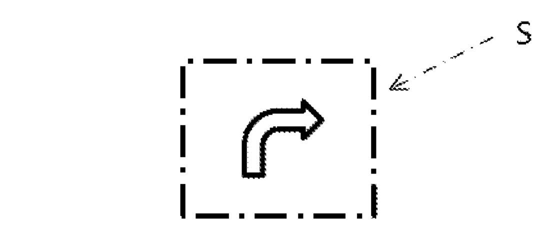
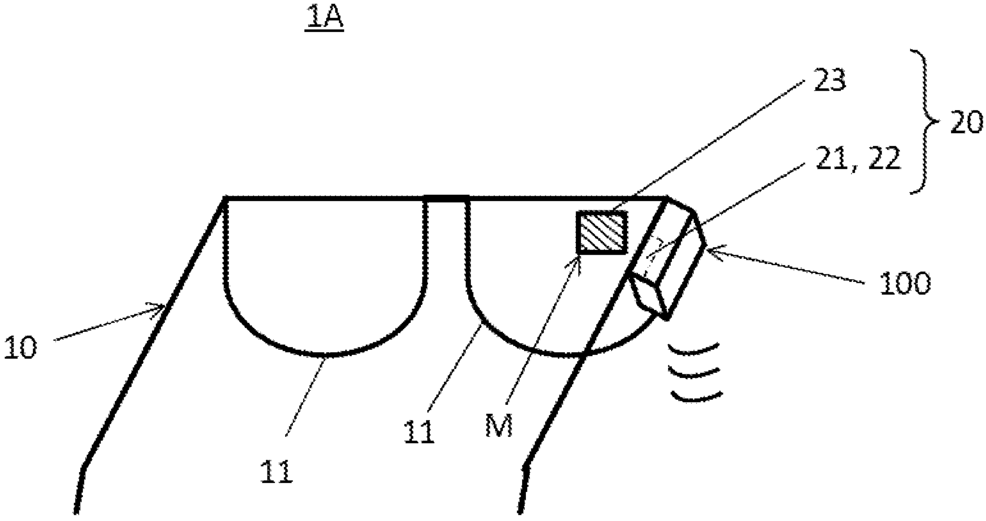
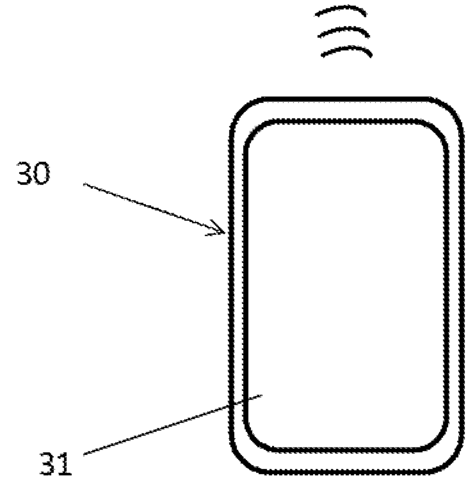

FIG. 13
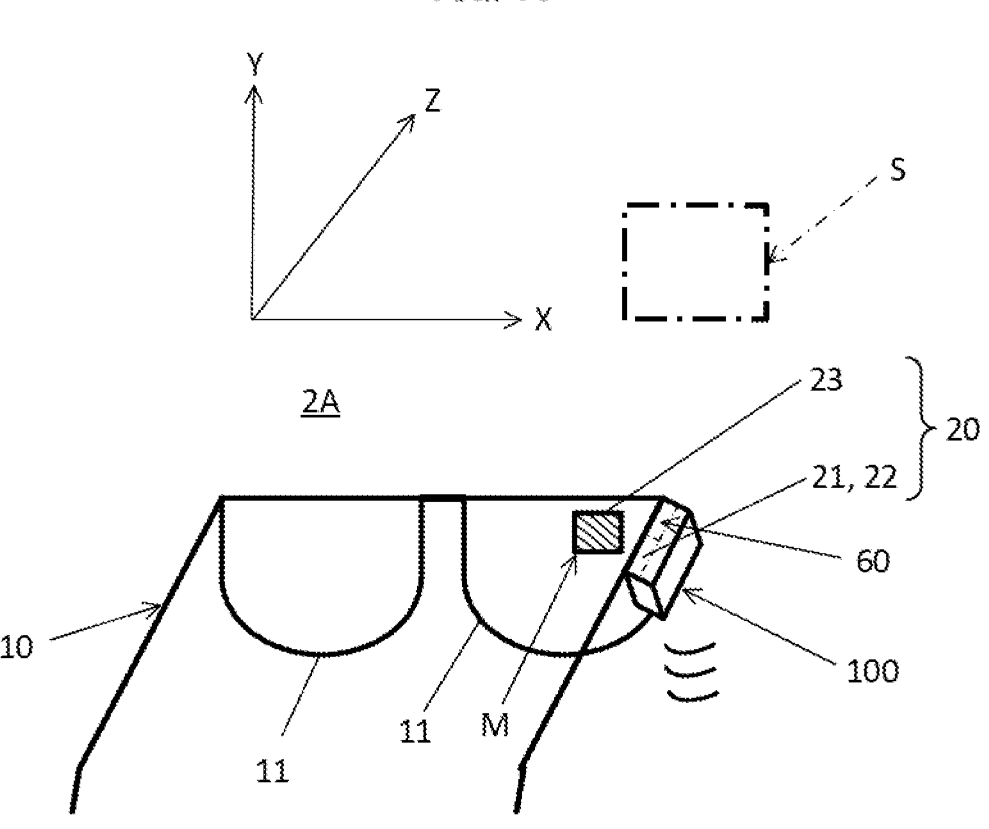
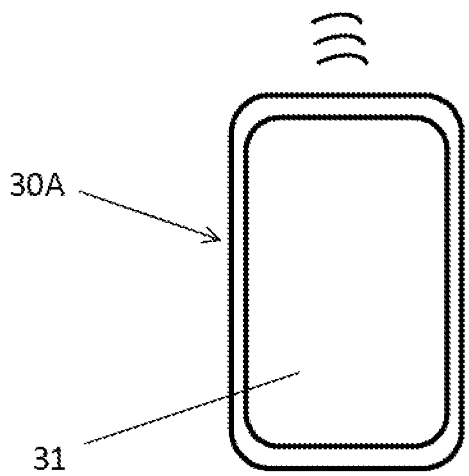

2B
TERMINAL
30A
32
COMMUNICATION UNIT
34A
CONTROL UNIT
341
DISPLAY CONTROL UNIT
342
IMAGE DATA EXTRACTION UNIT
343
OPERATION DETERMINATION UNIT
344
POSITION DATA GENERATION UNIT
345
REFERENCE DATA GENERATION UNIT
346
INPUT CONTROL UNIT
31
DISPLAY UNIT
33
STORAGE UNIT
50
50
PAIR OF GLASSES
60
IMAGE CAPTURING APPARATUS
61
CAMERA UNIT
62
IMAGE PROCESSING UNIT
63
CAMERA CONTROL UNIT
20
DISPLAY APPARATUS

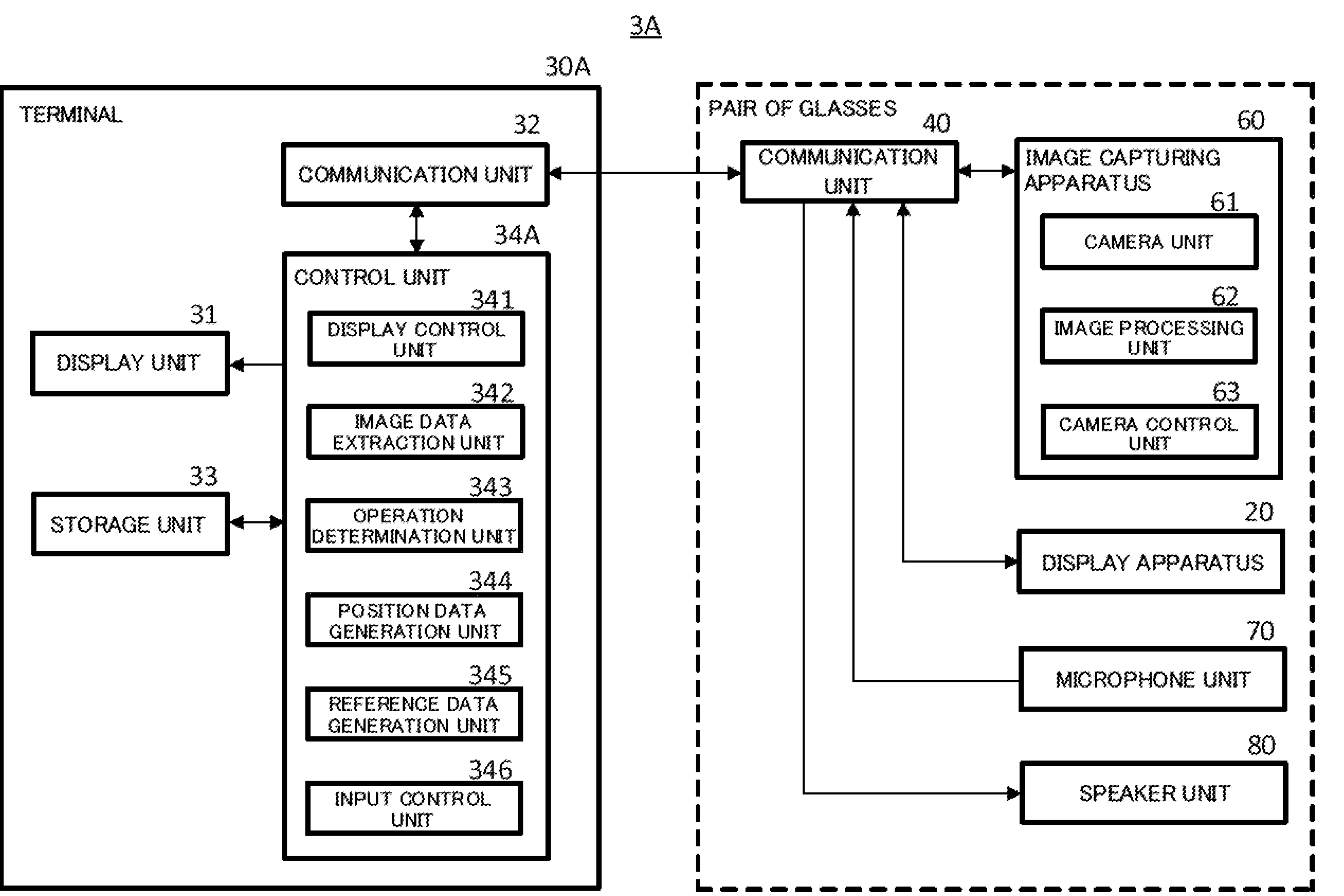
FIG. 24
3A
30A
TERMINAL
32
COMMUNICATION UNIT
34A
CONTROL UNIT
341
DISPLAY CONTROL UNIT
342
IMAGE DATA EXTRACTION UNIT
343
OPERATION DETERMINATION UNIT
344
POSITION DATA GENERATION UNIT
345
REFERENCE DATA GENERATION UNIT
346
INPUT CONTROL UNIT
31
DISPLAY UNIT
33
STORAGE UNIT
PAIR OF GLASSES
40
COMMUNICATION UNIT
60
IMAGE CAPTURING APPARATUS
61
CAMERA UNIT
62
IMAGE PROCESSING UNIT
63
CAMERA CONTROL UNIT
20
DISPLAY APPARATUS
70
MICROPHONE UNIT
80
SPEAKER UNIT

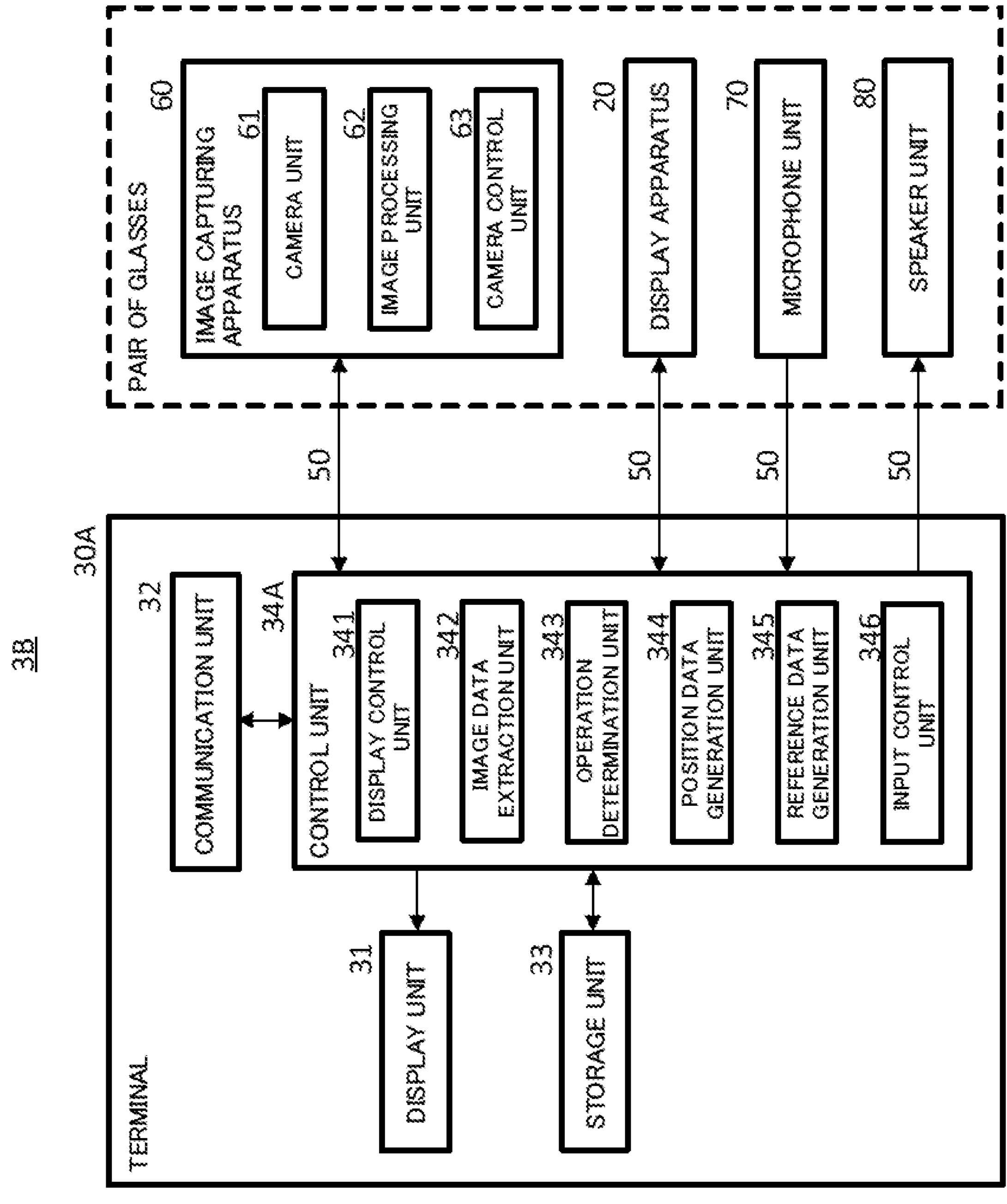
FIG. 25
3B
TERMINAL
30A
32
COMMUNICATION UNIT
34A
CONTROL UNIT
341
DISPLAY CONTROL UNIT
342
IMAGE DATA EXTRACTION UNIT
343
OPERATION DETERMINATION UNIT
344
POSITION DATA GENERATION UNIT
345
REFERENCE DATA GENERATION UNIT
346
INPUT CONTROL UNIT
31
DISPLAY UNIT
33
STORAGE UNIT
50
50
50
50
PAIR OF GLASSES
60
IMAGE CAPTURING APPARATUS
61
CAMERA UNIT
62
IMAGE PROCESSING UNIT
63
CAMERA CONTROL UNIT
20
DISPLAY APPARATUS
70
MICROPHONE UNIT
80
SPEAKER UNIT

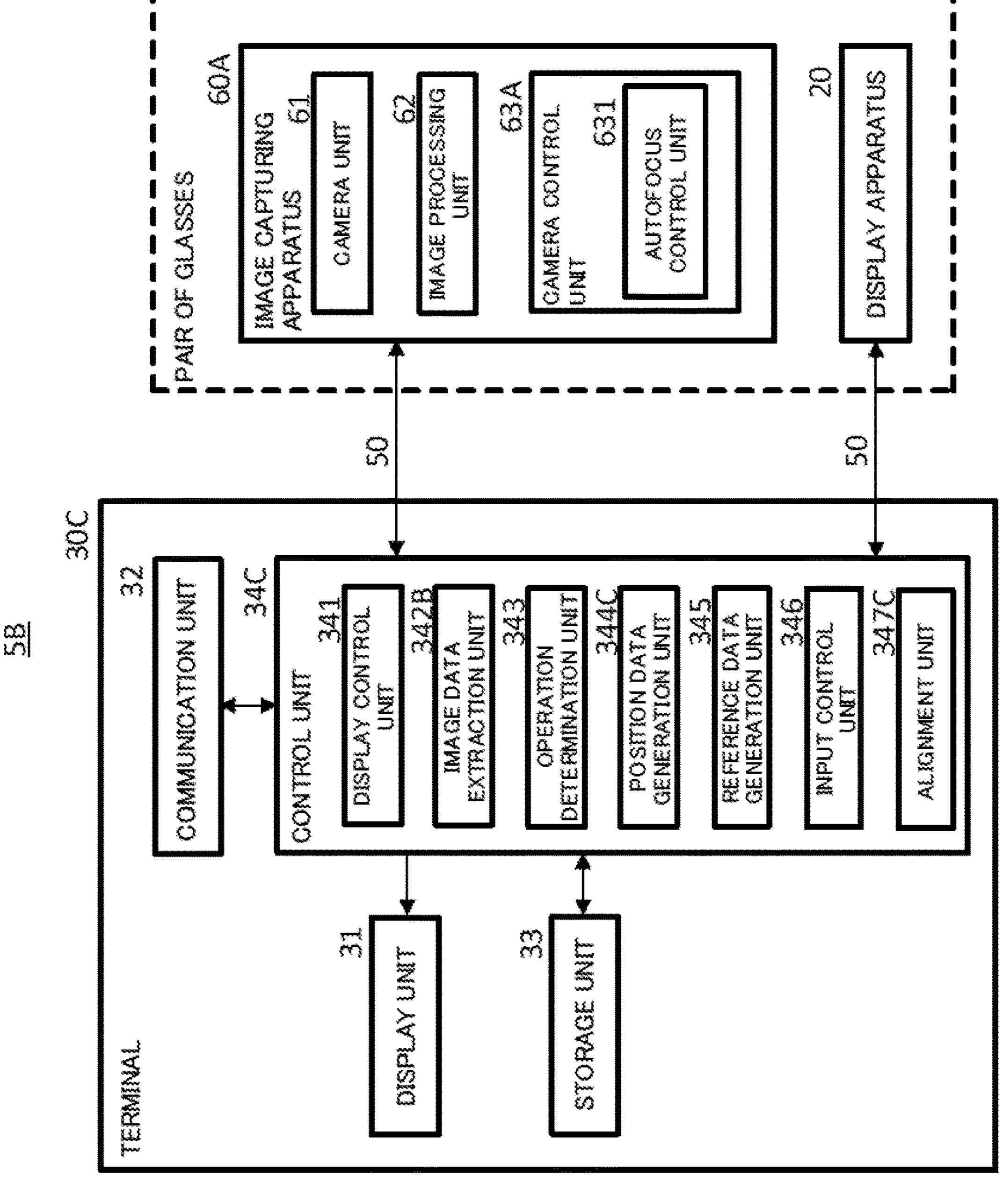
FIG. 31
5B
PAIR OF GLASSES
60A
IMAGE CAPTURING APPARATUS
61
CAMERA UNIT
62
IMAGE PROCESSING UNIT
63A
CAMERA CONTROL UNIT
631
AUTOFOCUS CONTROL UNIT
20
DISPLAY APPARATUS
50
50
30C
TERMINAL
32
COMMUNICATION UNIT
34C
CONTROL UNIT
341
DISPLAY CONTROL UNIT
342B
IMAGE DATA EXTRACTION UNIT
343
OPERATION DETERMINATION UNIT
344C
POSITION DATA GENERATION UNIT
345
REFERENCE DATA GENERATION UNIT
346
INPUT CONTROL UNIT
347C
ALIGNMENT UNIT
31
DISPLAY UNIT
33
STORAGE UNIT

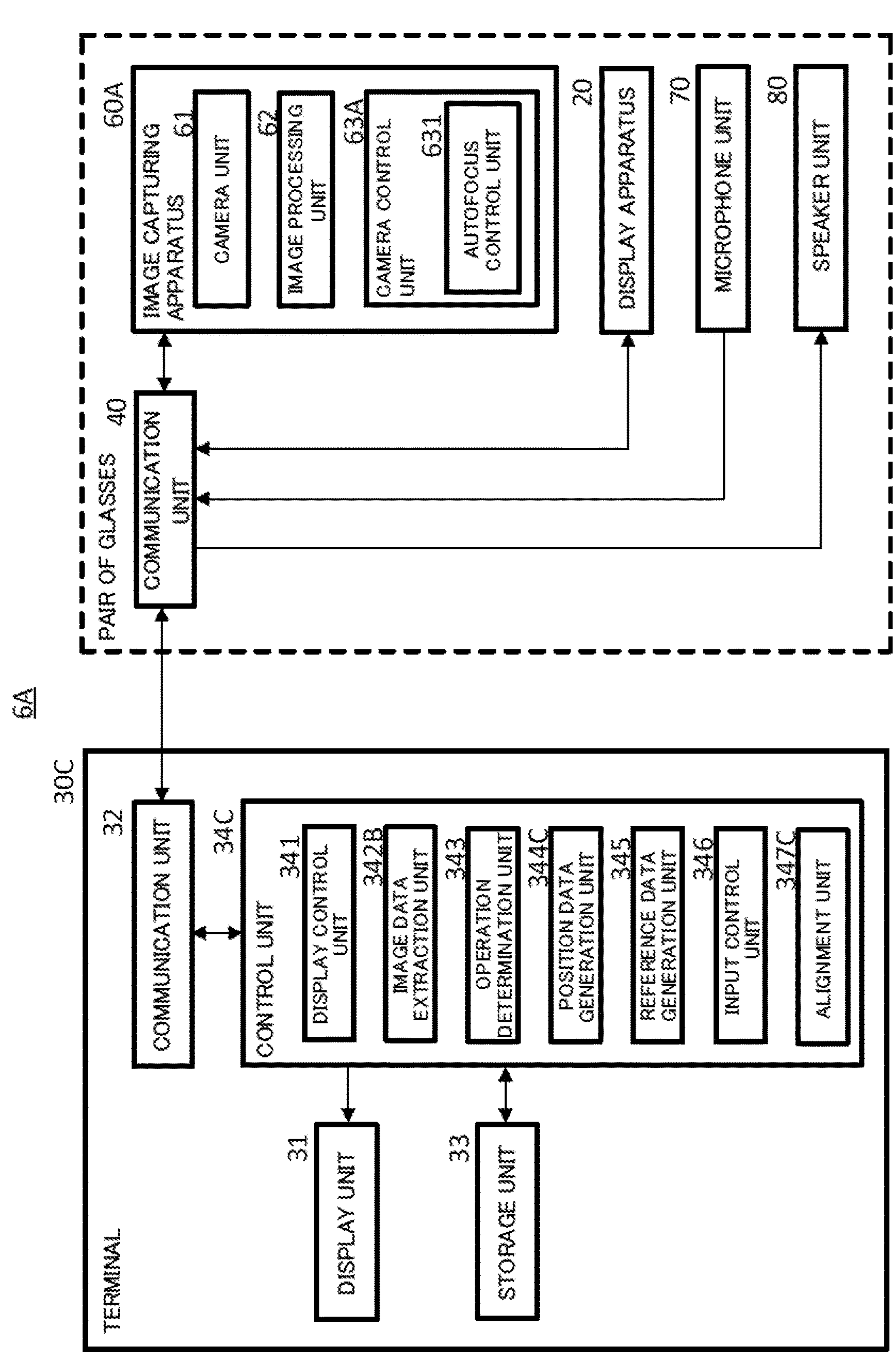
FIG. 32
6A
TERMINAL
30C
32
COMMUNICATION UNIT
34C
CONTROL UNIT
341
DISPLAY CONTROL UNIT
342B
IMAGE DATA EXTRACTION UNIT
343
OPERATION DETERMINATION UNIT
344C
POSITION DATA GENERATION UNIT
345
REFERENCE DATA GENERATION UNIT
346
INPUT CONTROL UNIT
347C
ALIGNMENT UNIT
31
DISPLAY UNIT
33
STORAGE UNIT
PAIR OF GLASSES
40
COMMUNICATION UNIT
60A
IMAGE CAPTURING APPARATUS
61
CAMERA UNIT
62
IMAGE PROCESSING UNIT
63A
CAMERA CONTROL UNIT
631
AUTOFOCUS CONTROL UNIT
20
DISPLAY APPARATUS
70
MICROPHONE UNIT
80
SPEAKER UNIT

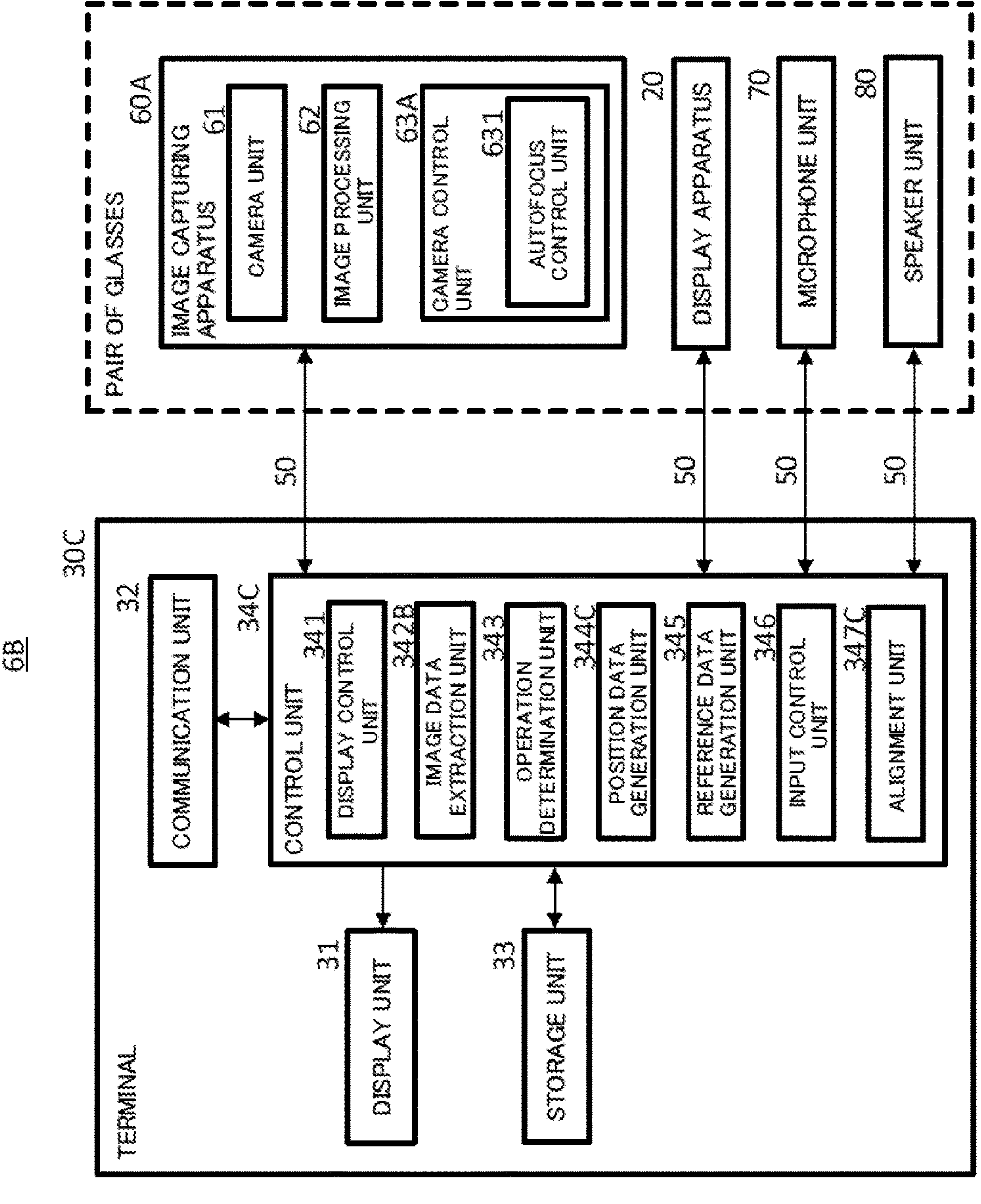
FIG. 33
6B
30C
TERMINAL
32
COMMUNICATION UNIT
34C
CONTROL UNIT
341
DISPLAY CONTROL UNIT
342B
IMAGE DATA EXTRACTION UNIT
343
OPERATION DETERMINATION UNIT
344C
POSITION DATA GENERATION UNIT
345
REFERENCE DATA GENERATION UNIT
346
INPUT CONTROL UNIT
347C
ALIGNMENT UNIT
31
DISPLAY UNIT
33
STORAGE UNIT
50
50
50
50
PAIR OF GLASSES
60A
IMAGE CAPTURING APPARATUS
61
CAMERA UNIT
62
IMAGE PROCESSING UNIT
63A
CAMERA CONTROL UNIT
631
AUTOFOCUS CONTROL UNIT
20
DISPLAY APPARATUS
70
MICROPHONE UNIT
80
SPEAKER UNIT

Figure 34:
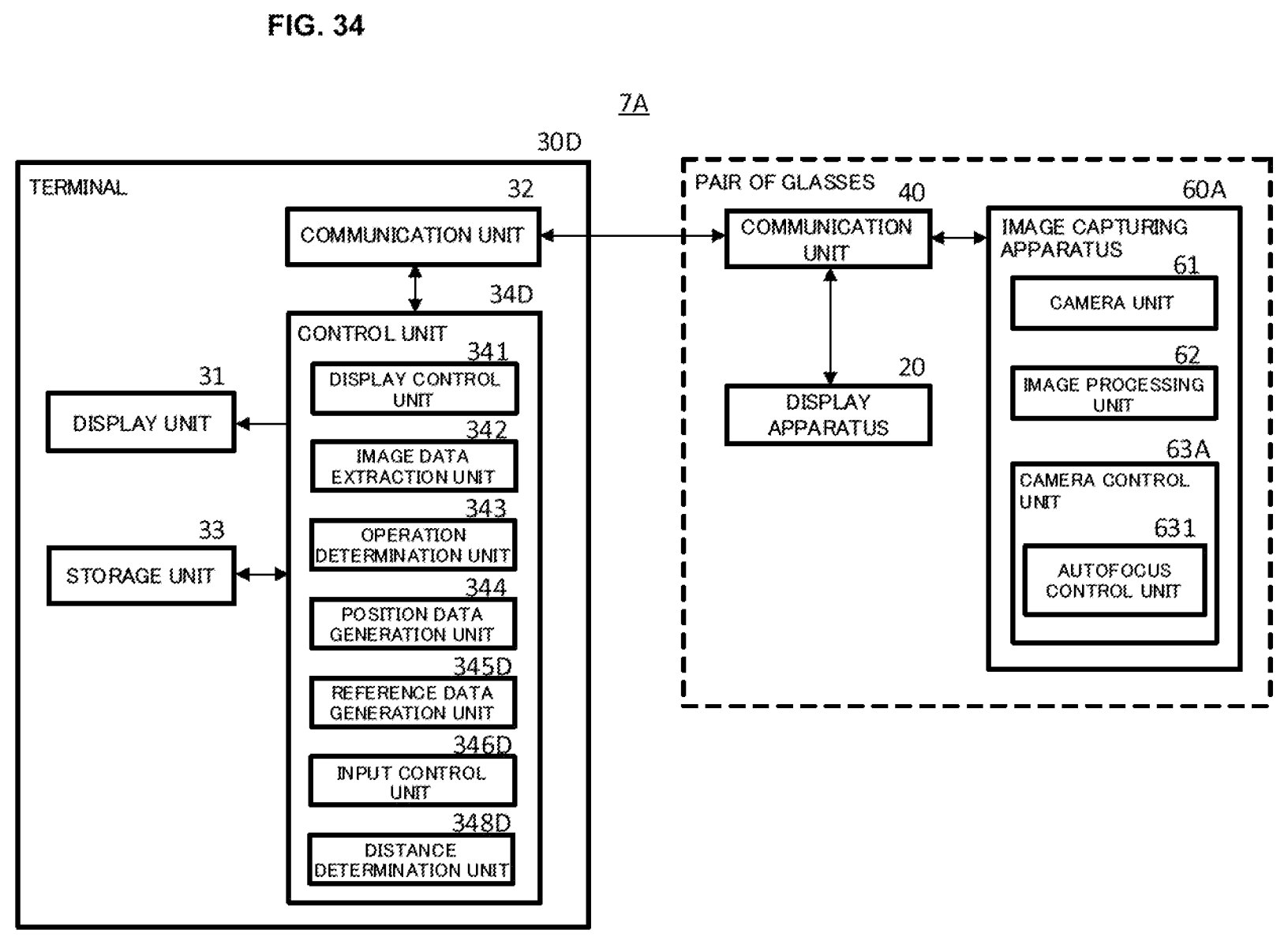

PAIR OF GLASSES

60A IMAGE CAPTURING APPARATUS

61 CAMERA UNIT

62 IMAGE PROCESSING UNIT

63A CAMERA CONTROL UNIT

631 AUTOFOCUS CONTROL UNIT

40 COMMUNICATION UNIT

20 DISPLAY APPARATUS

30D TERMINAL

32 COMMUNICATION UNIT

34D CONTROL UNIT

341 DISPLAY CONTROL UNIT

342 IMAGE DATA EXTRACTION UNIT

343 OPERATION DETERMINATION UNIT

344 POSITION DATA GENERATION UNIT

345D REFERENCE DATA GENERATION UNIT

346D INPUT CONTROL UNIT

348D DISTANCE DETERMINATION UNIT

31 DISPLAY UNIT

33 STORAGE UNIT

FIG. 42
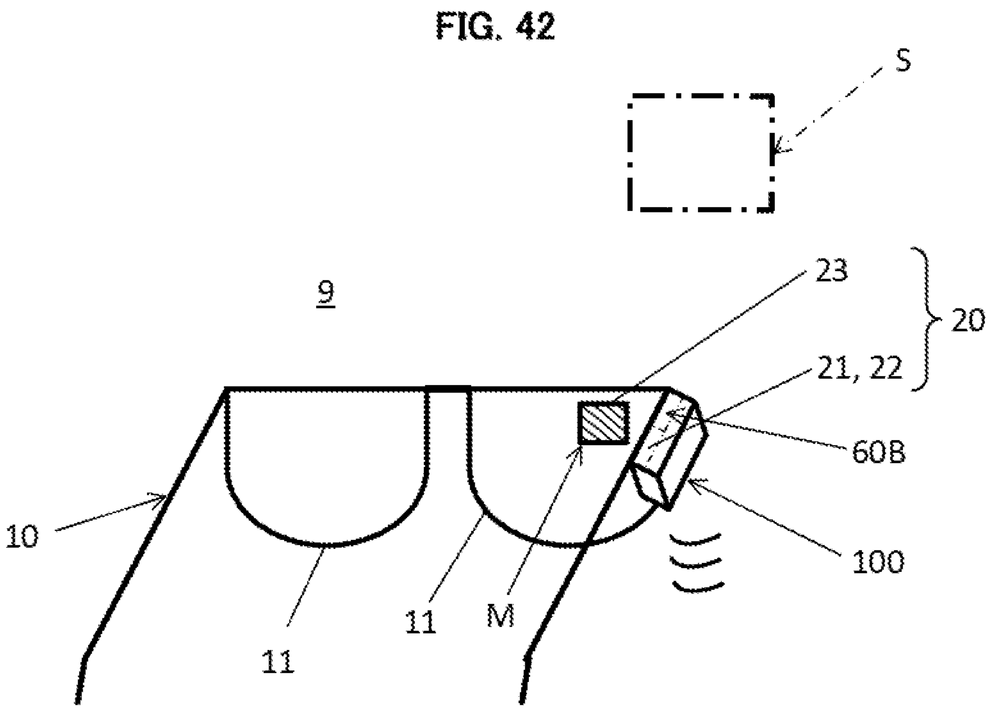
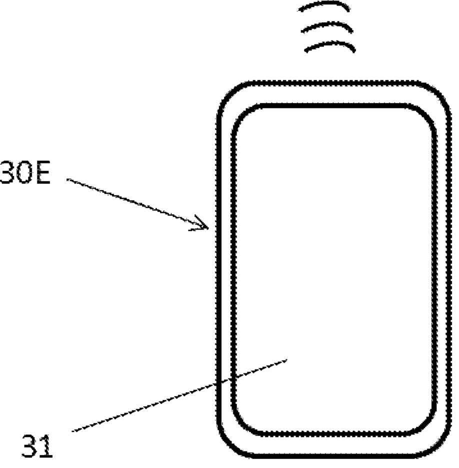

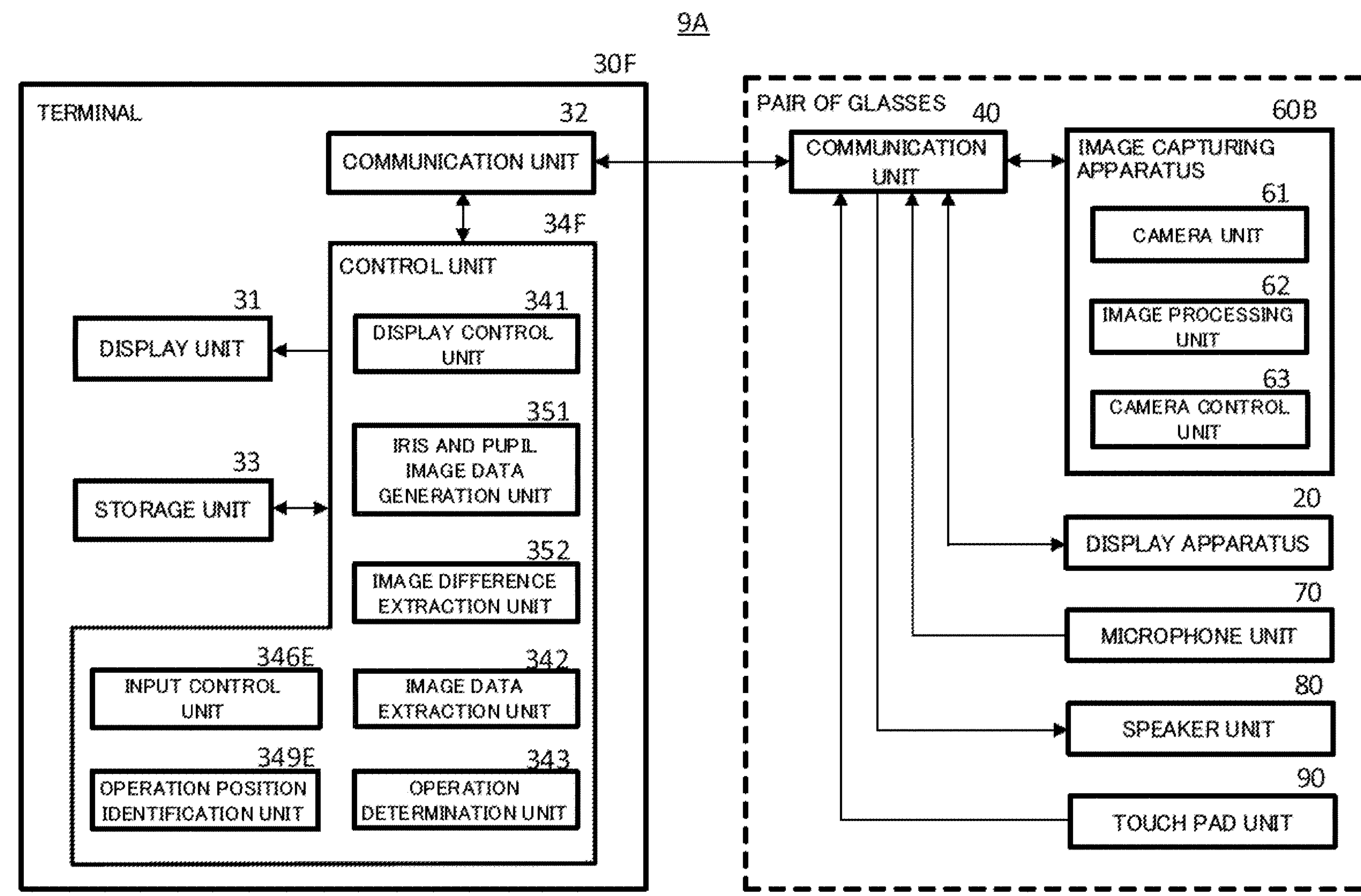
FIG. 50
9A
30F
TERMINAL
32
COMMUNICATION UNIT
34F
CONTROL UNIT
31
DISPLAY UNIT
341
DISPLAY CONTROL UNIT
351
IRIS AND PUPIL IMAGE DATA GENERATION UNIT
33
STORAGE UNIT
352
IMAGE DIFFERENCE EXTRACTION UNIT
346E
INPUT CONTROL UNIT
342
IMAGE DATA EXTRACTION UNIT
349E
OPERATION POSITION IDENTIFICATION UNIT
343
OPERATION DETERMINATION UNIT
PAIR OF GLASSES
40
COMMUNICATION UNIT
60B
IMAGE CAPTURING APPARATUS
61
CAMERA UNIT
62
IMAGE PROCESSING UNIT
63
CAMERA CONTROL UNIT
20
DISPLAY APPARATUS
70
MICROPHONE UNIT
80
SPEAKER UNIT
90
TOUCH PAD UNIT

Figure 53:
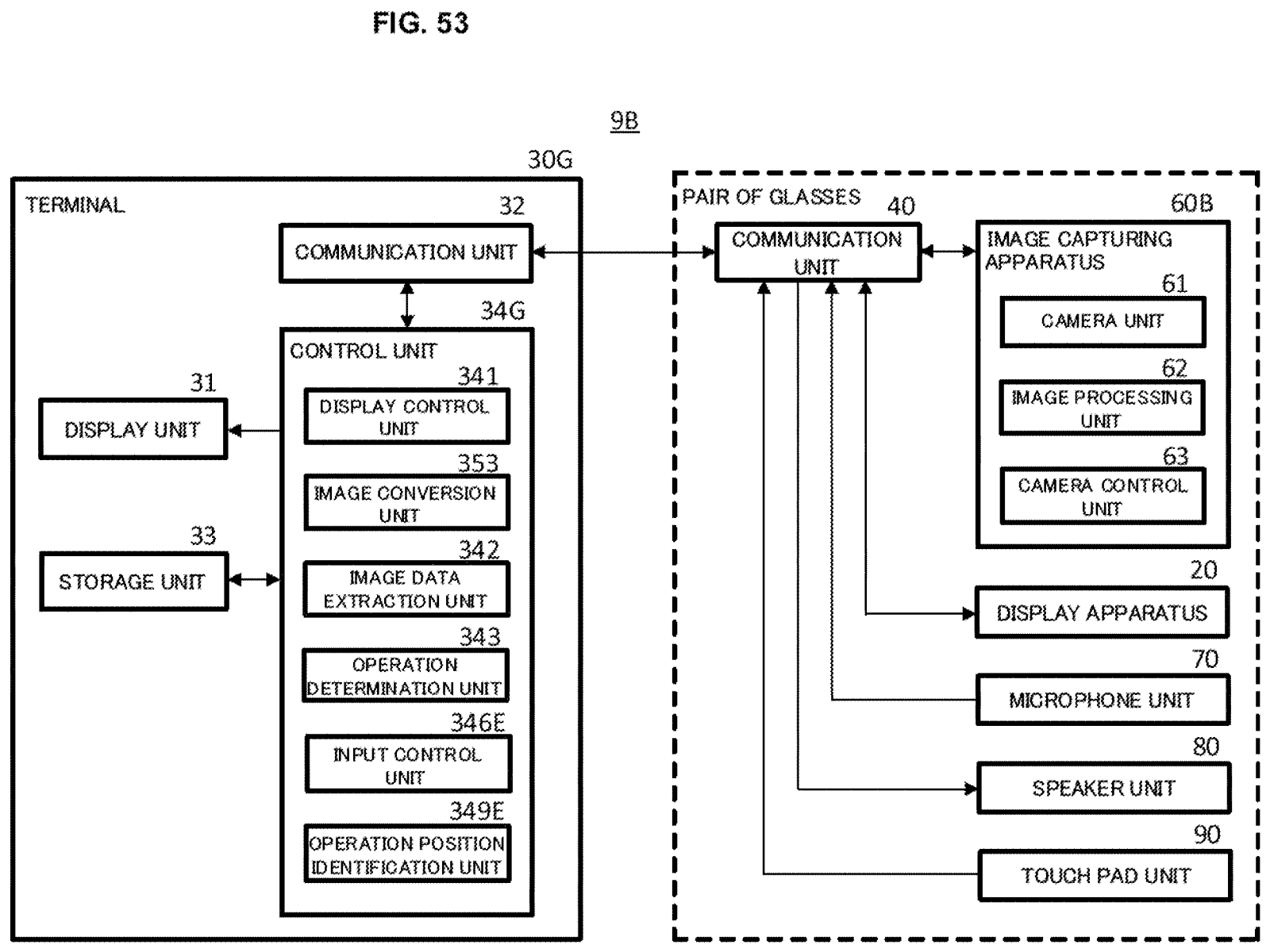

PAIR OF GLASSES

60B IMAGE CAPTURING APPARATUS

61 CAMERA UNIT

62 IMAGE PROCESSING UNIT

63 CAMERA CONTROL UNIT

20 DISPLAY APPARATUS

70 MICROPHONE UNIT

80 SPEAKER UNIT

90 TOUCH PAD UNIT

40 COMMUNICATION UNIT

30G TERMINAL

32 COMMUNICATION UNIT

34G CONTROL UNIT

341 DISPLAY CONTROL UNIT

353 IMAGE CONVERSION UNIT

342 IMAGE DATA EXTRACTION UNIT

343 OPERATION DETERMINATION UNIT

346E INPUT CONTROL UNIT

349E OPERATION POSITION IDENTIFICATION UNIT

31 DISPLAY UNIT

33 STORAGE UNIT

| CALL | | END |
|---|---|---|
| 1 | 2 | 3 |
| 4 | 5 | 6 |
| 7 | 8 | 9 |
| | 0 | |

FIG. 78B

| 1 | 2 | 3 |
|---|---|---|
| 4 | 5 | 6 |
| 7 | 8 | 9 |
| | 0 | |
| CALL | | END |

FIG. 79
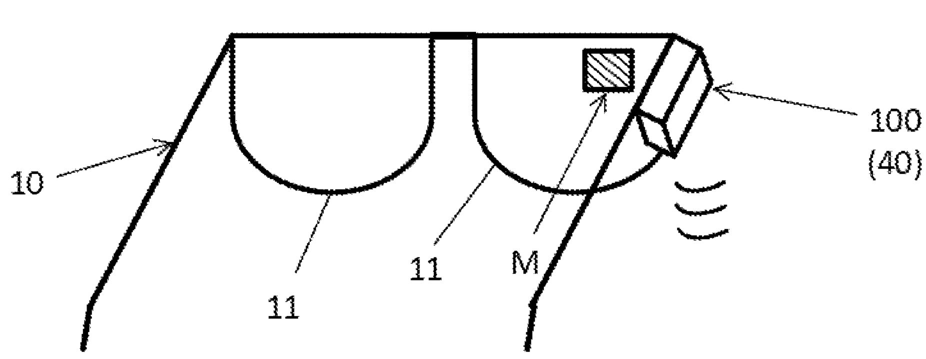
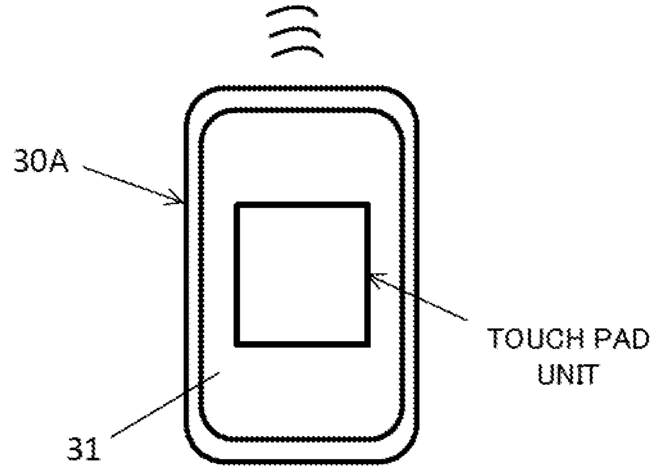

FIG. 81
BEFORE STICKING HOLOGRAM SHEET
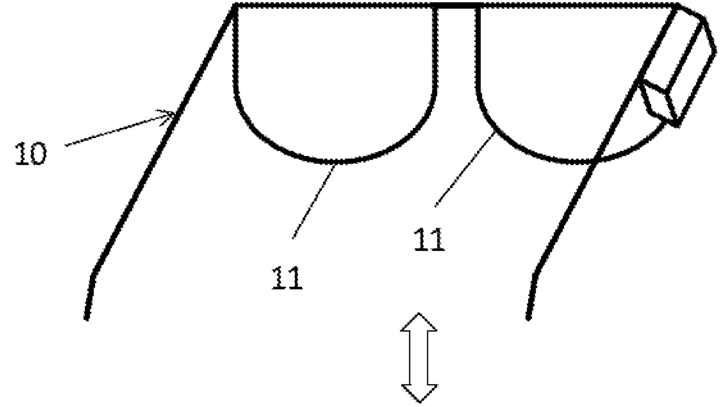
AFTER STICKING HOLOGRAM SHEET
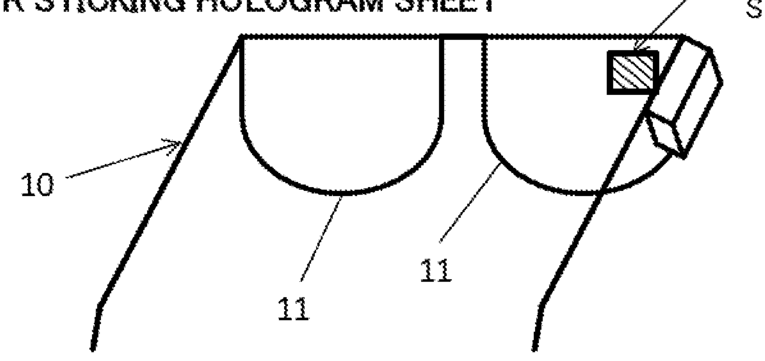
EXAMPLES OF STICKING HOLOGRAM SHEET
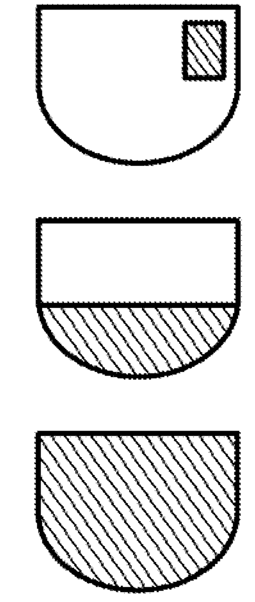

FIG. 82
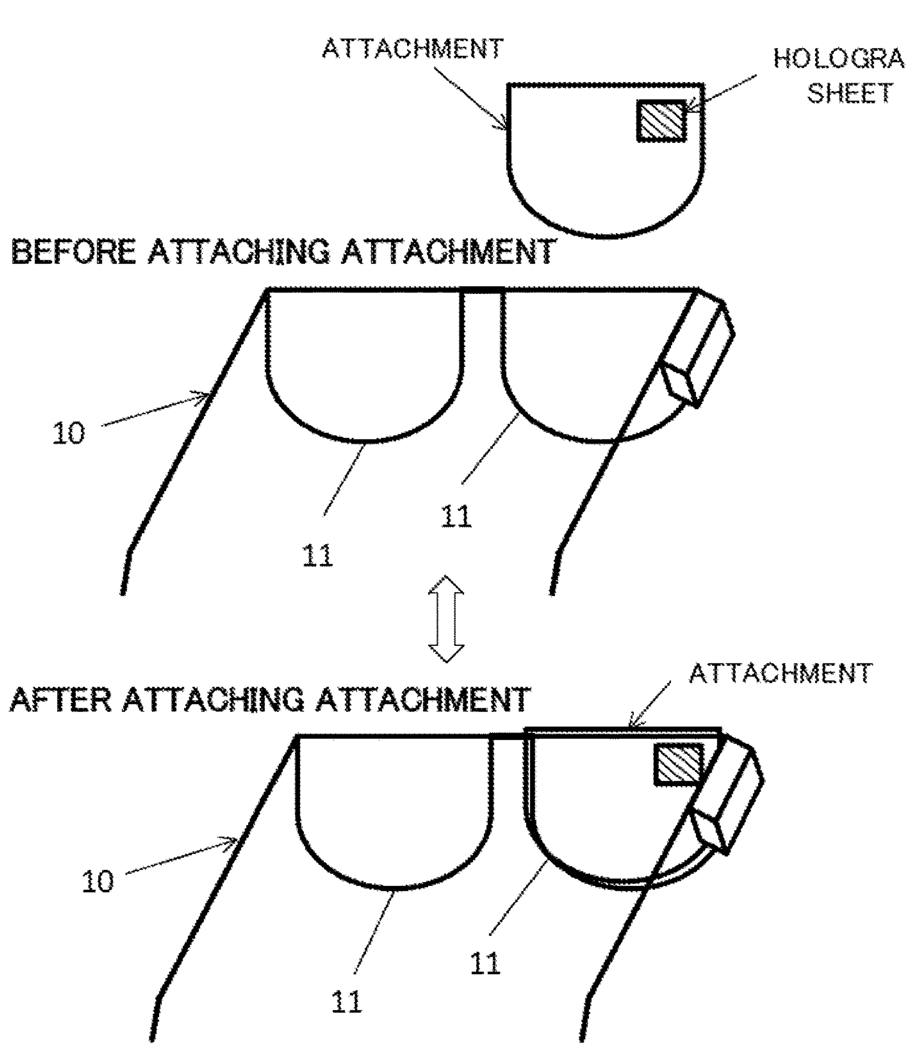
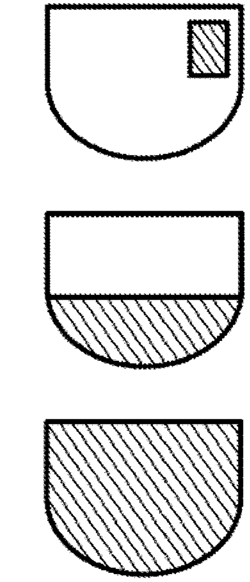

TERMINAL DEVICE

TECHNICAL FIELD

The present invention relates to a terminal device having a wearable object to be mounted on a user's head, such as a pair of glasses and a face shield.

BACKGROUND ART

In recent years, wearable terminals, for example, glasses-type terminals such as Google Glass from Google LLC have been developed and marketed (see, for example, Patent document 1). In this Google Glass, a very small display using a prism is located in front of the right eye glass of the main body of the pair of glasses. Google Glass allows users to see the screen displayed on this display together with the actual surrounding scenery at the same time. The user with wearing this glasses-type terminal, while walking, for example, on the street, can see information, for example, a map of the vicinity, displayed on a screen which appears to be floating in a field of view of the right eye of the user. Further, an advertisement of, for example, a store, a restaurant, or the like in the vicinity of the user can be displayed on the screen to the user. The use of this glasses-type terminal will bring the start of a new digital life.

RELATED ART DOCUMENTS

Patent Documents

Patent document 1: Japanese Unexamined Patent Application Publication No. H11-98227

DISCLOSURE OF THE INVENTION

Problems to be Solved by the Invention

However, the glasses-type terminals currently being developed and sold have a complicated configuration and require a large number of components, resulting in having a large number of parts and requiring a large number of steps in the manufacturing process. Accordingly, conventional glasses-type terminals are expensive, which is one of the reasons why glasses-type terminals are not widely used.

The present invention has been made in view of the foregoing, and an object of the present invention is to provide a terminal device that has a simple configuration and can be manufactured with a small number of parts.

Further, with the glasses-type terminals currently being developed and marketed, the user of the glasses-type terminal operates the screen displayed such as by issuing a voice instruction or tapping a touch pad provided at the base of a temple of the pair of glasses. However, when the users perform, for example, voice operations to input characters on the screen appearing to the users to be floating in the field of view, all the users do not always successfully input the characters because there are many homonyms in words and there are individual differences in pronunciation. Further, voice operations may fail to cause the glasses-type terminal to correctly recognize the content of the voice due to external noise or the like. In addition, the touch pad provided on the temple of the pair of glasses is not large enough to input characters. For such reasons, the conventional glasses-type terminals have a problem that it is difficult to input characters for, for example, an e-mail, by using a screen displayed in the field of view.

The present invention has been made in view of the foregoing, and an object of the present invention is to provide a terminal device that has a simple configuration and can be manufactured with a small number of parts, and can also easily and accurately perform operations such as character input on a screen displayed in a field of view.

Means of Solving the Problems

To achieve the object described above, a terminal device according to the present invention includes: a wearable object to be mounted on a head of a user; a display apparatus provided in the wearable object to display an original screen corresponding to a visual confirmation screen appearing to the user to be floating in midair; and a terminal that is separate from the wearable object and is equipped with a display unit, wherein the terminal is connected to the display apparatus wirelessly or wired, and has a function of controlling the display apparatus to display a screen displayed on the display unit as the original screen.

The display apparatus may include: a projection device including a display device; and a hologram sheet or a half mirror, the hologram sheet or the half mirror may be located in front of a face of the user and within a range of a field of view of the user, and the original screen may be displayed on the hologram sheet or the half mirror by the projection device projecting an image onto the hologram sheet or the half mirror.

Further, the display apparatus may include: a projection device including a display device; an optical system; and a projected unit onto which the original screen displayed on the display device is projected via the optical system, and the projected unit may be a translucent screen, a transmissive screen, a hologram sheet, a hologram film, a hologram optical element, or a half mirror.

Further, the display apparatus may include: a projection device including a display device; an optical system; and a projected unit onto which the original screen displayed on the display device is projected via the optical system, and the optical system may include one, some, or all of a lens, a reflecting mirror, a prism, a light guide plate, and a waveguide. Further, other optical systems than these may be used.

Furthermore, the display apparatus may be a transmissive or transparent display device, and the display device may be located in front of a face of the user and within a range of a field of view of the user.

In the terminal device of the present invention, since the wearable object to be mounted on the head of the user and the terminal that is equipped with the display unit are separate from each other, existing mobile terminals such as smartphones and tablet terminals, for example, can be used as the terminal. Such a use of an existing mobile terminal or the like as the terminal makes it possible to reduce the number of parts of the wearable object, resulting in a simplified wearable object. In addition, the use of a commercially available smartphone or the like as the terminal makes it possible to perform the operation using such a smartphone or the like that is familiar to the user, so that the operability can be improved.

In addition, the terminal device of the present invention may further include a communication unit configured to perform wireless communication between various apparatuses and units mounted on the wearable object and external devices, the terminal may have a function of performing wireless communication with external devices, and the display apparatus may be configured to perform wireless communication with the terminal via the communication unit.

With this configuration, it is desirable that the terminal and the display apparatus each perform data communication after performing authentication based on identification information transmitted from the other party to perform wireless communication.

In the terminal device of the present invention, when the terminal displays a screen displayed on the display unit as the original screen on the display apparatus, the terminal may be configured to display, according to a setting of screen display for the display apparatus made by the user, a screen in which the screen displayed on the display unit is simplified, a part of the screen displayed on the display unit, or a screen in which a character and/or a chart are enlarged in the screen displayed on the display unit. Further, in the terminal device of the present invention, when the terminal displays a screen displayed on the display unit as the original screen on the display apparatus, the terminal may be configured to maintain a display of the screen on the display unit as it is or turn off the display unit, according to a setting of a screen for the display unit made by the user. Further, in the terminal device of the present invention, when the terminal displays a screen displayed on the display unit as the original screen on the display apparatus, the terminal may be configured to display, in response to the user specifying a screen to be displayed on the display apparatus, the specified screen on the display apparatus as being separate from a screen currently displayed on the display unit.

In the terminal device of the present invention, it is desirable that the terminal is a mobile terminal and has a function of acquiring position information of its own position, and a function of generating a screen for guiding the user from a current position to a destination set by the user based on map information stored in a storage unit and the position information, and displaying the generated screen on the display unit. Further, it is desirable that the terminal is a mobile terminal and has a function of acquiring position information of its own position, and a function of searching for a shop around a current position based on map information stored in a storage unit and the position information, and displaying information about the searched and retrieved shop on the display unit.

Note that the display apparatus may be attachable to and detachable from the wearable object.

In the terminal device of the present invention, the wearable object may be provided with an image capturing apparatus configured to capture an image of a finger or a specific input instructing tool when the user performs an operation on the visual confirmation screen with the finger or the input instructing tool, and to output image data of the captured image to the terminal wirelessly or wired, and the terminal may include:

a storage unit configured to store various types of data including data on the original screen;

an operation determination unit configured to, when the image capturing apparatus captures the image of the finger or the input instructing tool with which the user performs an operation on the visual confirmation screen, determine what content of the operation is performed with the finger or the input instructing tool among the various types of operations, based on the image data of the captured image;

a position data generation unit configured to, when the image capturing apparatus captures the image of the finger or the input instructing tool with which the user performs an operation on the visual confirmation screen, generate position data of the finger or the input instructing tool within an image capture range that is a range in which the image capturing apparatus is able to capture an image, based on the image data of the captured image;

a reference data generation unit configured to, when the user performs an operation at one or more predetermined positions on the visual confirmation screen with the finger or the input instructing tool, generate data on the visual confirmation screen for identifying a position and a size of the visual confirmation screen and store the generated data as reference data in the storage unit, by using the position data of the finger or the input instructing tool generated by the position data generation unit based on the image data for which the operation determination unit determines that the operation performed at each of the predetermined positions is a predetermined operation; and an input control unit configured to, when the user performs an operation on the visual confirmation screen with the finger or the input instructing tool, recognize a content of an input instruction corresponding to the operation performed with the finger or the input instructing tool, by identifying a range of the visual confirmation screen within the image capture range and retrieving a position where the operation is performed within the identified range of the visual confirmation screen with the finger or the input instructing tool, based on data on the content of the operation performed with the finger or the input instructing tool, obtained as determined by the operation determination unit, the position data of the finger or the input instructing tool generated by the position data generation unit, the reference data on the visual confirmation screen stored in the storage unit, and the data on the original screen corresponding to the visual confirmation screen stored in the storage unit, and control a screen to be displayed on the display unit and the original screen to be displayed on the display apparatus, according to the recognized content of the input instruction.

In this way, in the terminal device of the present invention, the input control unit of the terminal is configured to, when the user performs the operation on the visual confirmation screen with the finger or the input instructing tool, recognize a content of an input instruction corresponding to the operation performed with the finger or the input instructing tool, based on data on the content of the operation performed with the finger or the input instructing tool, obtained as determined by the operation determination unit, the position data of the finger or the input instructing tool generated by the position data generation unit, and the reference data on the visual confirmation screen stored in the storage unit, and control the original screen to be displayed on the display apparatus according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the terminal device of the present invention makes it possible for the user to easily and accurately perform character input operations and various screen operations such as enlargement and reduction by operating the visual confirmation screen in the same manner as in typical smartphones terminal or tablet terminals.

In this case, it is desirable that the terminal has a function of controlling the image capturing apparatus to adjust the image capture range of the image capturing apparatus, and a function of controlling the image capturing apparatus to adjust a depth of field that is a range in a depth direction in which a subject is in focus. By using these functions to limit a target to be captured by the image capturing apparatus to only the finger or the input instructing tool operated on the visual confirmation screen, the privacy of others can be protected.

Further, in the terminal device of the present invention, the wearable object may be provided with an image capturing apparatus configured to capture an image of an eye of the user to acquire an image of the original screen and a finger or a specific input instructing tool reflected on the eye of the user when the user performs an operation on the visual confirmation screen with the finger or the input instructing tool, and to output image data of the captured image to the terminal wirelessly or wired, and the terminal may include:

a storage unit configured to store various types of data including data on the original screen;

an operation determination unit configured to, when the image capturing apparatus captures the image of the original screen and the finger or the input instructing tool reflected on the eye of the user, determine what content of the operation is performed with the finger or the input instructing tool among the various types of operations, based on a series of image data of images thus captured;

an operation position identification unit configured to, when the image capturing apparatus captures the image of the original screen and the finger or the input instructing tool reflected on the eye of the user, identify a position in the original screen where the operation is performed with the finger or the input instructing tool, based on a series of image data of images thus captured; and an input control unit configured to, when the user performs an operation on the visual confirmation screen with the finger or the input instructing tool, recognize a content of an input instruction corresponding to the operation performed on the visual confirmation screen with the finger or the input instructing tool, based on data on the content of the operation performed with the finger or the input instructing tool, obtained by the operation determination unit, data representing a position in the original screen where the operation is performed with the finger or the input instructing tool, obtained by the operation position identification unit, and the data on the original screen stored in the storage unit, and control a screen to be displayed on the display unit and the original screen to be displayed on the display apparatus, according to the recognized content of the input instruction.

In this way, in the terminal device of the present invention, the input control unit of the terminal is configured to, when the user performs the operation on the visual confirmation screen with the finger or the input instructing tool, recognize a content of an input instruction corresponding to the operation performed on the visual confirmation screen with the finger or the input instructing tool, based on data on the content of the operation performed with the finger or the input instructing tool, obtained by the operation determination unit, data representing a position in the original screen where the operation is performed with the finger or the input instructing tool, obtained by the operation position identification unit, and the data on the original screen stored in the storage unit, and control the original screen to be displayed on the display apparatus according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the terminal device of the present invention makes it possible for the user to easily and accurately perform character input operations and various screen operations such as enlargement and reduction by operating the visual confirmation screen in the same manner as in typical smartphones terminal or tablet terminals.

The operation position identification unit may be configured to, when the image capturing apparatus captures the image of the original screen and the finger or the input instructing tool reflected on the eye of the user, obtain a range of the original screen within an image capture range that is a range in which the image capturing apparatus is able to capture an image and a position of the finger or the input instructing tool within the image capture range, based on a series of image data of images thus captured, and identify the position in the original screen where the operation is performed with the finger or the input instructing tool, based on the obtained range of the original screen within the image capture range and the obtained position of the finger or the input instructing tool within the image capture range.

Further, it is desirable that the terminal further includes an image data extraction unit configured to extract image data including an image of the finger or the input instructing tool from the series of image data captured by the image capturing apparatus, the operation determination unit is configured to determine what content of the operation is performed with the finger or the input instructing tool among the various types of operations, based on a series of the image data extracted by the image data extraction unit, and the operation position identification unit is configured to identify a position in the original screen where the operation is performed with the finger or the input instructing tool, based on the series of the image data extracted by the image data extraction unit. As a result, the series of the image data extracted by the image data extraction unit includes only the image data including the image of the finger or the input instructing tool, so that the operation determination unit and the operation position identification unit can each perform the corresponding processing efficiently.

With this configuration, the terminal may further include: an iris and pupil image data generation unit configured to, when the image capturing apparatus captures an image of the eye of the user before the display apparatus displays the original screen, generate image data of an iris and pupil based on image data of the captured image and store the generated image data in the storage unit; and an image difference extraction unit configured to, when the image capturing apparatus captures the image of the original screen and the finger or the input instructing tool reflected on the eye of the user, perform a process of extracting a difference between image data of the captured image and the image data of the iris and pupil stored in the storage unit to generate image data in which an image of the iris and pupil is removed. The image data extraction unit may be configured to perform a process of extracting the image data by using a series of the image data generated by the image difference extraction unit. As a result, the image data generated by the image difference extraction unit include no image of the iris and the pupil, so that the image data extraction unit can easily perform the process of extracting the image data including the image of the finger or the input instructing tool.

In particular, in the case where the user wears a contact lens, the image difference extraction unit is preferably configured to generate image data in which the image of the contact lens is removed as well as the image of the iris and the pupil. Specifically, the terminal may further include: an iris and pupil image data generation unit configured to, when the image capturing apparatus captures an image of the eye of the user who wears a contact lens before the display apparatus displays the original screen, generate image data of a contact lens, iris, and pupil based on image data of the captured image and store the generated image data in the storage unit; and an image difference extraction unit configured to, when the image capturing apparatus captures the image of the original screen and the finger or the input instructing tool reflected on the eye of the user, perform a process of extracting a difference between image data of the captured image and the image data of the contact lens, iris, and pupil stored in the storage unit to generate image data in which an image of the contact lens, iris, and pupil is removed. The image data extraction unit may be configured to perform a process of extracting the image data by using a series of the image data generated by the image difference extraction unit. As a result, the image data generated by the image difference extraction unit include no image of the contact lens, the iris, and the pupil, so that the image data extraction unit can easily perform the process of extracting the image data including the image of the finger or the input instructing tool.

Further, the terminal preferably further includes: an eye presence/absence determination unit configured to determine whether or not the image data of the image captured by the image capturing apparatus includes an image of the eye of the user to detect that image data not including the image of the eye of the user has been continuously acquired by the image capturing apparatus for a certain period of time; and a notification control unit configured to, when the eye presence/absence determination unit detects that image data not including the image of the eye of the user has been continuously acquired by the image capturing apparatus for the certain period of time, control a notification device to output sound or vibration from the notification device. As a result, for example, in a case where a driver of an automobile uses the terminal device of the present invention, when the eye presence/absence determination unit detects that image data not including an image of an eye of the driver has been continuously acquired by the image capturing apparatus for the certain period of time, the notification control unit determines that the driver is sleeping and accordingly causes the notification device to output an alarm or vibration, so that it is possible to prevent drowsy driving.

Further, the terminal may include a position detection unit configured to detect a touch position where a touch operation is performed on the screen of the display unit and output touch position information indicating the detected position to the input control unit. The storage unit may store data on an image of a touch pad to be displayed on the display unit. The input control unit may be configured to, when the original screen is displayed on the display apparatus and the image of the touch pad is displayed on the display unit, in response to the user performing a touch operation on the image of the touch pad, recognize a content of the touch operation based on the touch position information transmitted from the position detection unit in response to the touch operation and the data on the image of the touch pad stored in the storage unit, and control the original screen displayed on the display apparatus according to the recognized content of the touch operation.

Furthermore, the terminal may include a movement information output unit configured to detect a movement direction of the terminal, measure a movement amount of the terminal, and output movement information indicating the detected movement direction and the measured movement amount to the input control unit. The storage unit may store data representing a correspondence between the movement information of the terminal and an operation related to a cursor displayed on the display apparatus. The input control unit may be configure to, when the original screen is displayed on the display apparatus and the user moves the terminal, recognize a content of an operation related to the cursor based on the movement information of the moved terminal transmitted from the movement information output unit and the data representing the correspondence stored in the storage unit, and control the original screen displayed on the display apparatus according to the recognized content of the operation.

Further, the original screen displayed on the display apparatus may include a screen corresponding to an operation unit for a remote controller for a remotely controllable device. The terminal may further include a remote control unit configured to cause the display apparatus to display the screen corresponding to the operation unit for the remote controller as the original screen, generate, when an operation is performed on the visual confirmation screen corresponding to the original screen, an instruction signal indicating a content of the operation, and wirelessly transmit the generated instruction signal to the remotely controllable device.

Furthermore, the display apparatus and the image capturing apparatus may be attachable to and detachable from the wearable object.

The terminal device of the present invention may further include a touch pad unit that is an input device for the terminal, and the touch pad unit may be attachable to and detachable from a wearable object. Further, the terminal device of the present invention may further include a sound output device configured to convert an electrical signal output from the terminal into sound and transmit the sound to the user through an ear or by bone conduction, and the sound output device may be provided in the wearable object. Furthermore, the terminal device of the present invention may further include a sound input device configured to convert a voice of the user into an electrical signal and output the electrical signal to the terminal, and the sound output device may be provided in the wearable object.

Effects of the Invention

In the terminal device of the present invention, since the wearable object to be mounted on the head of the user and the terminal that is equipped with the display unit are separate from each other, existing mobile terminals such as smartphones and tablet terminals, for example, can be used as the terminal. Such a use of an existing mobile terminal or the like as the terminal makes it possible to reduce the number of parts of the wearable object, resulting in a simplified wearable object. In addition, the use of a commercially available smartphone or the like as the terminal makes it possible to perform the operation using such a smartphone or the like that is familiar to the user, so that the operability can be improved.

BRIEF DESCRIPTION OF THE DRAWINGS

FIG. 1 is a schematic perspective view of a terminal device according to a first embodiment of the present invention;

FIG. 4 is a schematic block diagram of the terminal device according to the first embodiment;

FIG. 6 illustrates an example of a visual confirmation screen when a part of a screen of a display unit is displayed on the display apparatus;

FIG. 7 illustrates an example of a visual confirmation screen when a screen obtained by enlarging characters displayed on the screen of the display unit is displayed on the display apparatus;

FIG. 8 is a diagram illustrating an example of a visual confirmation screen when a screen for a route guidance application program is displayed on the display apparatus as an original screen;

FIG. 13 is a schematic perspective view of a terminal device according to a third embodiment of the present invention;

FIG. 24 is a schematic block diagram of a terminal device according to a fifth embodiment of the present invention;

FIG. 25 is a schematic block diagram of a terminal device according to a sixth embodiment of the present invention;

FIG. 31 is a schematic block diagram of a terminal device according to a tenth embodiment of the present invention;

FIG. 32 is a schematic block diagram of a terminal device according to an eleventh embodiment of the present invention;

FIG. 33 is a schematic block diagram of a terminal device according to a twelfth embodiment of the present invention;

FIG. 34 is a schematic block diagram of a terminal device according to a thirteenth embodiment of the present invention;

FIG. 42 is a schematic perspective view of the terminal device according to the seventeenth embodiment;

FIG. 50 is a schematic block diagram of a terminal device according to an eighteenth embodiment of the present invention;

FIG. 53 is a schematic block diagram of a terminal device according to a nineteenth embodiment of the present invention;

FIG. 64 illustrates an example of a large-sized hologram sheet attached to the terminal device according to the twenty-second embodiment;

FIG. 69A is a schematic perspective view of a terminal device including two display apparatuses of a type having a hologram sheet;

FIG. 69B is a schematic perspective view of a terminal device including two display apparatuses of a type having a half mirror;

FIG. 75 illustrates a method of attaching a solar cell to a terminal device including a face shield as a wearable object;

FIG. 78 illustrates examples of an original screen of an operation screen for making a call with a mobile phone;

FIG. 79 illustrates a state where a screen of a terminal is used as a touch pad unit in a case where a smartphone is used as the terminal;

FIG. 81 illustrates examples of a hologram sheet to be detachably stuck to a lens part of a pair of glasses; and FIG. 82 illustrates examples of a hologram sheet to be detachably stuck to a lens part of a pair of glasses.

MODE FOR CARRYING OUT THE INVENTION

Embodiments of the invention according to the present application will be described below with reference to the drawings.

First Embodiment

Figure 2A:
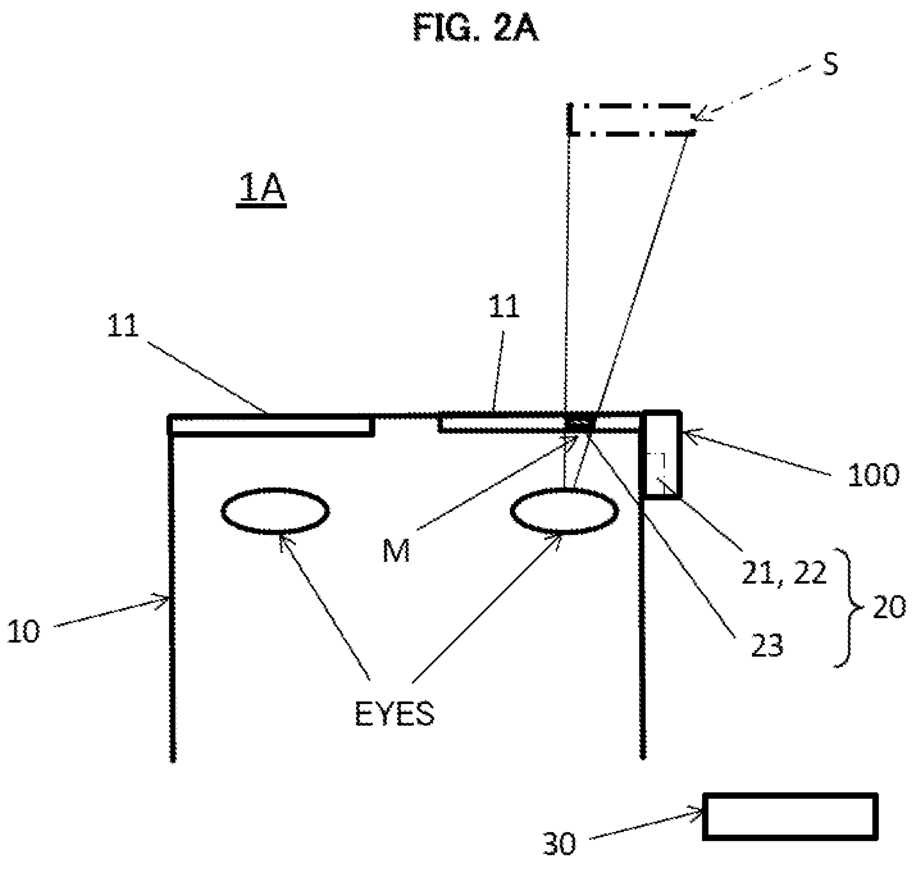
FIG. 2A is a schematic plan view of the terminal device according to the first embodiment.
Figure 2B:
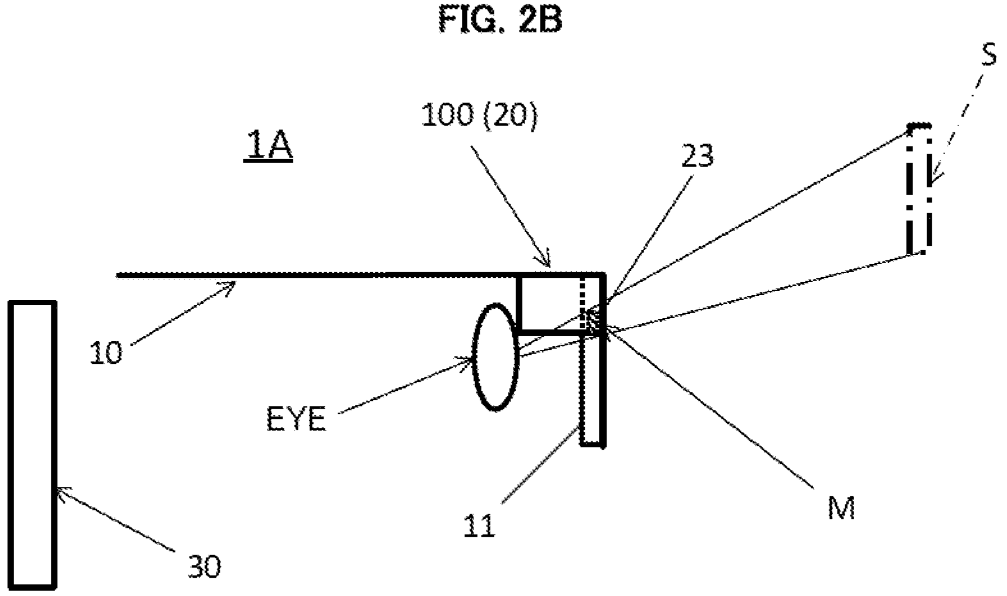
FIG. 2B is a schematic right side view of the terminal device.

First, a terminal device according to a first embodiment of the present invention will be described. FIG. 1 is a schematic perspective view of the terminal device according to the first embodiment of the present invention, FIG. 2A is a schematic plan view of the terminal device according to the first embodiment; and FIG. 2B is a schematic right side view of the terminal device. Further, FIG. 3 is a schematic diagram illustrating a state where an original screen is projected onto a hologram sheet of a display apparatus in the terminal device according to the first embodiment, and FIG. 4 is a schematic block diagram of the terminal device according to the first embodiment.

The terminal device of the present invention includes a wearable object to be mounted on the head of a user, a display apparatus provided on the wearable object, and a terminal that is separate from the wearable object and is equipped with a display unit. The first embodiment presents a case where the wearable object is a pair of glasses. As illustrated in FIGS. 1 and 2, a terminal device 1A according to the first embodiment includes a pair of glasses 10 as a wearable object, a display apparatus 20 provided on the pair of glasses 10, a terminal 30 that is separate from the pair of glasses 10 and is equipped with a display unit 31, and a communication unit 40 provided on the pair of glasses 10.

As illustrated in FIGS. 1 and 2, the pair of glasses 10 is a general one having two lens parts 11. The lens to be attached to the lens part 11 may be a convex lens or a concave lens for correcting visual acuity, may be a simple glass or plastic having no visual acuity correction function, or may be a lens for a pair of sunglasses to protect eyes from sunlight.

Figure 3:
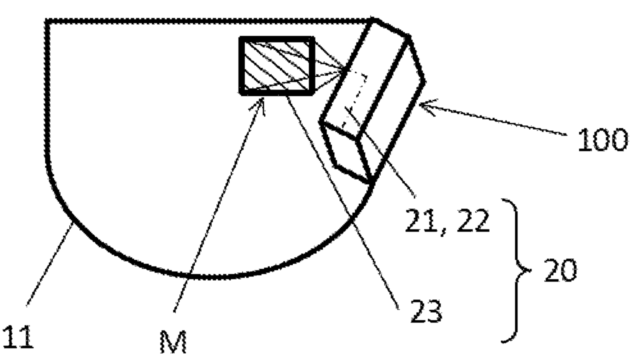
FIG. 3 is a schematic diagram illustrating a state where an original screen is projected onto a hologram sheet of a display apparatus in the terminal device according to the first embodiment.

As illustrated in FIGS. 1, 2, and 3, the display apparatus 20 includes, for example, a small projector (a projection device) 21 having a liquid crystal panel (display device), an optical system 22, and a hologram sheet (or hologram film) 23 that reflects part of light (video (picture)). Here, as the small projector 21, for example, a LCD (liquid crystal display) projector or a LCOS (liquid crystal on silicon) projector can be used. For example, the optical system 22 may use a system made of a part or all out of lenses, reflecting mirrors, prisms, or the like. The hologram sheet (or hologram film) 23 serves as a projected unit onto which an original screen displayed on the liquid crystal panel of the small projector 21 is projected via the optical system. The small projector 21 and the optical system 22 are arranged in a single housing 100, and the housing 100 is attached to a temple portion of the pair of glasses 10. In the first embodiment, the housing 100 is attachable to and detachable from the pair of glasses 10. Specifically, the small projector 21 and the optical system 22 are each attachable to and detachable from the pair of glasses 10. Although a hologram sheet and a hologram film are generally distinguished by a difference in thickness, in the present specification, the hologram sheet is defined as a concept including both the hologram sheet and the hologram film, and the term "hologram sheet" is used herein.

The hologram sheet 23 is located in front of the face of the user and within the range of the field of view of the user. Specifically, as illustrated in FIGS. 1 and 3, the hologram sheet 23 is stuck to the lens part 11 for the right eye in the pair of glasses 10. The hologram sheet 23 used herein has a rectangular shape (e.g., 1 cm in width and 1.5 cm in length), and the hologram sheet 23 is stuck to an upper portion of the lens part 11 on the slightly right side in a state where it is horizontally long. An image or a video (picture) displayed on the liquid crystal panel of the small projector 21 is projected onto the hologram sheet 23 via the optical system 22 as illustrated in FIG. 3. In particular, in the first embodiment, an image or a video (picture) displayed on the liquid crystal panel of the small projector 21 is projected onto the entire hologram sheet 23. In other words, the hologram sheet 23 itself is the projection range of an image or the like projected by the small projector 21. Actually, a very small screen is displayed on the hologram sheet 23. As illustrated in FIG. 2, the user can see an image or a video (picture) reflected by the hologram sheet 23. By wearing the pair of glasses 10 and using the terminal device 1A according to the first embodiment, the user can see a translucent screen, which is an image of the very small screen displayed on the hologram sheet 23, to be floating in midair. This translucent screen appearing to be floating is equivalent to a 25-inch screen viewed 8 feet away for the user. In the first embodiment, a case will be described in which this screen appearing to be floating is translucent, but in general, the screen does not have to be translucent. Further, in the first embodiment, a case will be described in which this screen appearing to be floating is displayed in the upper right position of the field of view of the user as illustrated in FIG. 2, but in general, the screen may be displayed in the center, upper left, lower right, or lower left position of the field of view of the user. In the following, the very small screen displayed on the hologram sheet 23 by projecting an image from the small projector 21 onto the hologram sheet 23 will be referred to as the "original screen", and the screen appearing to be floating in midair for the user who uses the pair of glasses 10 will be referred to as the "visual (virtual) confirmation screen". In this respect, it can be said that the display apparatus 20 displays the original screen corresponding to the visual confirmation screen appearing to the user to be floating in midair.

Further, in the housing 100, the communication unit 40, a power supply unit (not illustrated) such as a battery, and a power switch (not illustrated) are provided. The communication unit 40 performs wireless communication between external devices and the various apparatuses and units (display apparatus 20 in the first embodiment) mounted on the wearable object (the pair of glasses 10). The terminal 30 has a function of performing wireless communication with external devices, the display apparatus 20 can perform wireless communication with the terminal 30 via the communication unit 40. The display apparatus 20 is controlled by the terminal 30 through wireless communication. The power supply unit supplies electric power to the various apparatuses and units (display apparatus 20 and communication unit 40 in the first embodiment) mounted on the wearable object (the pair of glasses 10). Further, the power switch turns on and off the power supply from the power supply unit to the display apparatus 20 and the communication unit 40. This power switch is attached to a predetermined position on the surface of the housing 100.

In the first embodiment, the terminal 30 is not provided on the pair of glasses 10, but is separate from the pair of glasses 10. Accordingly, an existing mobile terminal such as a smartphone or a tablet terminal is used as the terminal 30. As illustrated in FIG. 4, this terminal 30 includes the display unit 31, a communication unit 32, a storage unit 33, and a control unit 34. The display unit 31 is a liquid crystal display device provided on the surface of the terminal 30. Further, a touch panel is provided on the screen of the display unit 31. This touch panel includes a position detection unit configured to detect a touch position where a touch operation is performed on the screen of the display unit 31 and output touch position information indicating the detected position to the control unit 34. On the screen of the display unit 31, various screens are displayed such as a home screen, a menu screen, an application screen, and a character input screen. By performing a touch operation on such screens, the user can issue various instructions to the terminal 30. Here, the touch operation includes various operations such as tap, double tap, long press (long tap), drag, flick, pinch-in, and pinch-out operations.

Further, the terminal 30 has a function of performing wireless communication with external devices. This function is implemented in the communication unit 32. Of course, the terminal 30 can perform wireless communication with the display apparatus 20 via the communication unit 32 and the communication unit 40 included in the housing 100. In this respect, the terminal 30 is wirelessly connected to the display apparatus 20. As a method of wireless communication between the terminal 30 and the display apparatus 20, for example, Bluetooth may be used. Further, from the perspective of security, the terminal 30 and the display apparatus 20 each perform data communication after performing authentication based on identification information transmitted from the other party to perform wireless communication.

The storage unit 33 stores various programs, data, and the like. The storage unit 33 stores, for example, a special display apparatus control program by which the terminal 30 controls the display apparatus 20. This display apparatus control program is an application program by which the control unit 34 implements a function of controlling the display apparatus 20 to display on the display apparatus 20 a screen displayed on the display unit 31 as the original screen M. When the display apparatus control program is executed by the control unit 34, the screen displayed on the display unit 31 is displayed not only on the display unit 31 but also on the display apparatus 20.

In addition, when the display apparatus control program is executed, a setting screen for that program is displayed on the display unit 31. In the setting screen, a plurality of buttons for making the settings of screen display of the display apparatus 20 are arranged. Specifically, the buttons for making the settings of screen display of the display apparatus 20 include: a button B1 for issuing an instruction in which a screen in which the screen displayed on the display unit 31 is simplified is to be displayed on the display apparatus 20; a button B2 for issuing an instruction in which a part of the screen displayed on the display unit 31 is to be displayed on the display apparatus 20; and a button B3 for issuing an instruction in which a screen in which characters and charts (figures, photographs, tables, etc.) in the screen displayed on the display unit 31 are enlarged is to be displayed on the display apparatus 20. Further, arranged in the setting screen for the display apparatus control program are a button B4 for setting that the display unit 31 is to be turned off to display on the display apparatus 20 the screen displayed on the display unit 31 as the original screen M, and a button B5 for issuing an instruction to end that program. The button B4 makes it possible to provide the setting whether the display of the screen on the display unit 31 is maintained as it is or the display unit 31 is turned off, when displaying on the display apparatus 20 the content of the screen displayed on the display unit 31. Further, when the display unit 31 of the terminal 30 is turned on, the user can turn off the display unit 31 by pressing the power button of the terminal 30. On the contrary, when the display unit 31 of the terminal 30 is turned off, the user can cancel the off state of the display unit 31 by pressing the power button of the terminal 30.

In this way, when the display apparatus control program is executed, the screen displayed on the display unit 31 is displayed on the display apparatus 20, and as a result, the same screen is displayed on the display unit 31 and the display apparatus 20. However, by using the setting screen for the display apparatus control program, the user can specify that a screen having a content different from the content of the screen displayed on the display unit 31 is to be displayed on the display apparatus 20. For example, the setting screen for the display apparatus control program has a field for specifying a screen to be displayed on the display apparatus 20. When the user uses this field to specify a screen to be displayed on the display apparatus 20, the control unit 34 displays the screen specified by the user, not the screen currently displayed on the display unit 31, on the display apparatus 20. As a result, in this case, different screens are displayed on the display unit 31 and the display apparatus 20 respectively.

The control unit 34 includes a central processing unit (CPU) and the like to control the entire terminal 30 and also control the display apparatus 20. For example, when the user performs a touch operation on the display unit 31, the control unit 34 recognizes the content of the instruction issued by the operation, and executes processing according to the recognized content. Further, the control unit 34 executes the display apparatus control program to control the display apparatus 20 to display on the display apparatus 20 the screen displayed on the display unit 31 as the original screen M.

Furthermore, as illustrated in FIG. 4, the control unit 34 includes a display control unit 341. This display control unit 341 controls the display on the display unit 31 and the display apparatus 20. Specifically, when the user issues an instruction to start the display apparatus control program, the display control unit 341 executes the display apparatus control program stored in the storage unit 33 to display on the display apparatus 20 the screen displayed on the display unit 31 as the original screen M. This makes it possible for the user who wears the pair of glasses 10 to see the visual confirmation screen S corresponding to the original screen M to be floating in midair. However, if the user has made the various settings on the setting screen for the display apparatus control program, the display control unit 341 controls the display unit 31 and the display apparatus 20 according to the settings.

Figure 5:
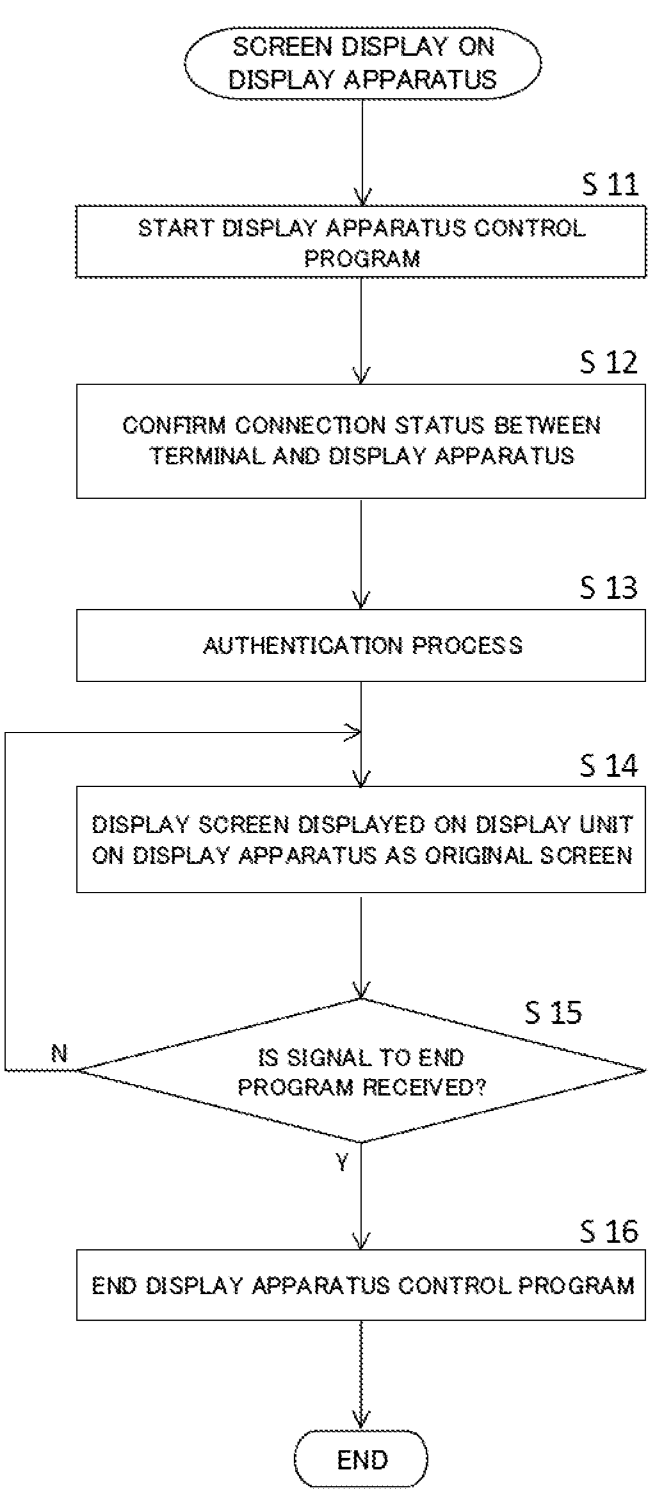
FIG. 5 is a flowchart of the procedure for the process of displaying a screen on the display apparatus in accordance with a display apparatus control program in the terminal device according to the first embodiment.

Next, a process of displaying a screen on the display apparatus 20 in accordance with the display apparatus control program in the terminal device 1A according to the first embodiment will be described. FIG. 5 is a flowchart of the procedure for the process of displaying a screen on the display apparatus 20 in accordance with the display apparatus control program in the terminal device 1A according to the first embodiment.

The user first turns on the power switch provided in the housing 100. As a result, the display apparatus 20 and the communication unit 40 come to a power-on state. Here, it is assumed that the user operates while wearing the pair of glasses 10. Next, the user operates the terminal 30 to display a menu screen on the display unit 31. Then, the user taps the icon for the display apparatus control program on the menu screen to select the display apparatus control program. In response to receiving a signal indicating that the display apparatus control program has been selected, the control unit 34 of the terminal 30 starts the display apparatus control program (S11). When the display apparatus control program is started, the control unit 34 performs processing according to the display apparatus control program. Specifically, the control unit 34 first performs a process of confirming the connection state between the terminal 30 and the display apparatus 20 (S12). When the connection is confirmed, the control unit 34 requests the display apparatus 20 to transmit the identification information, and performs an authentication process based on the identification information transmitted from the display apparatus 20 (S13). When the display apparatus 20 is thus authenticated, the control unit 34 displays the setting screen for the display apparatus control program on the display unit 31. Then, the control unit 34 wirelessly transmits data on the screen currently displayed on the display unit 31 to the display apparatus 20, and causes the display apparatus 20 to display the screen displayed on the display unit 31 as the original screen M (S14). This makes it possible for the user to feel and see the visual confirmation screen S corresponding to the original screen M through the pair of glasses 10 to be floating in midair. After that, when the user operates the terminal 30 to for example select a desired application program, the control unit 34 executes the application program, displays a screen for the application program on the display unit 31, and wirelessly transmits data on the screen to the display apparatus 20 to cause the display apparatus 20 to display the same screen as the screen displayed on the display unit 31. As a result, the user can see the visual confirmation screen S for the screen for the application program through the pair of glasses 10 to be floating in midair.

Incidentally, when the screen displayed on the display unit 31 is displayed on the display apparatus 20, the user may feel that it is hard to recognize the content of the visual confirmation screen S corresponding to the original screen M because of, for example, fine characters and the like displayed on the original screen M. In this case, the user can tap the button B2 or the button B3 in the setting screen for the display apparatus control program, which is displayed on the display unit 31. When the user taps the button B2, the control unit 34 transmits data on a part of the screen displayed on the display unit 31 to the display apparatus 20, and as a result, the part of the screen displayed on the display unit 31 is displayed on the display apparatus 20. FIG. 6 illustrates an example of the visual confirmation screen S when a part of the screen of the display unit 31 is displayed on the display apparatus 20. In the example of FIG. 6, almost half of the screen displayed on the display unit 31 is displayed on the display apparatus 20. When the user sees the almost half of the screen displayed on the display apparatus 20, the user can recognize the visual confirmation screen S corresponding to the almost half of the screen. In this case, the almost half of the screen displayed on the display apparatus 20 is displayed larger than the almost half of the screen when the entire screen is displayed on the display apparatus 20, so that it is easy for the user to recognize the content of the visual confirmation screen S. On the other hand, in a case where a screen including characters and charts is displayed on the display unit 31, when the user taps the button B3, the control unit 34 transmits to the display apparatus 20 data on a screen in which the characters and charts are enlarged in the screen displayed on the display unit 31, and as a result, the screen in which the characters and charts are enlarged in the screen displayed on the display unit 31 is displayed on the display apparatus 20. FIG. 7 illustrates an example of the visual confirmation screen S when a screen obtained by enlarging characters displayed on the screen of the display unit 31 is displayed on the display apparatus 20. With this configuration, as illustrated in FIG. 7, the user can see the screen in which the characters are enlarged as the visual confirmation screen S, so that the characters on the screen can be correctly recognized. FIG. 7 illustrates the example of the screen with only characters, but also in a case where a screen with charts is displayed on the display unit 31, the user can see as the visual confirmation screen S the screen in which not only the characters but also the charts are enlarged, so that the contents of the characters and the charts can be accurately recognized.

To end the screen display on the display apparatus 20, the user causes the display unit 31 of the terminal 30 to display the setting screen for the display apparatus control program, and taps the button B5 for issuing an instruction to end the display apparatus control program, provided in the setting screen. In response to receiving a signal indicating that the display apparatus control program is to be ended (S15), the control unit 34 ends the display apparatus control program (S16). Alternatively, when the user taps the button B5 on the visual confirmation screen S (the setting screen for the display apparatus control program) with a finger, the control unit 34 may be configured to recognize that the tap operation has been performed on the button B5 and end the display apparatus control program. As a result, the control unit 34 stops transmitting the data on the screen to the display apparatus 20, and accordingly, nothing is displayed on the screen of the display apparatus 20. Finally, the user turns off the power switch provided in the housing 100. When the screen for the application program is displayed on the display unit 31 in which a predetermined icon is displayed at a predetermined position (e.g., the position of the lower corner) in that screen, the control unit 34 may recognize, in response to the user performing a tap operation on the icon in the visual confirmation screen S with a finger, that the tap operation has been performed on the icon, and control the power supply unit to turn off the power supply from the power supply unit to the display apparatus 20 and the communication unit 40.

Next, a specific usage example of the terminal device 1A according to the first embodiment will be described. Now consider a case where the terminal 30 is a mobile terminal and the terminal 30 has a GPS (Global Positioning System) function for acquiring position information of its own position.

A first example is that a route guidance application program is installed on the terminal 30. The route guidance application program causes the control unit 34 to implement a function for generating a screen for guiding the user from the current position to a destination set by the user based on map information stored in the storage unit 33 and the position information obtained by the GPS function, and displaying the generated screen on the display unit 31. In this case, when the user operates the terminal 30 to instruct the execution of the route guidance application program during the execution of the display apparatus control program, the control unit 34 starts the route guidance application program to display on the display unit 31 a screen for guiding the user to the destination set by the user as a screen for the route guidance application program, and also to display that screen as the original screen M on the display apparatus 20. FIG. 8 is a diagram illustrating an example of the visual confirmation screen S when the screen for the route guidance application program is displayed on the display apparatus 20 as the original screen M. In FIG. 8, an image of an arrow indicating a direction for the user to go is displayed as the screen for guiding the user to the destination. The user can reach the destination by looking at the visual confirmation screen S and going according to the direction of the arrow displayed there.

In the above example, a case has been described in which the control unit 34 executes the route guidance application program to display a screen (e.g., arrow image screen) for guiding the user to the destination on the display unit 31 and the display apparatus 20. However, the control unit 34 may execute the route guidance application program to display map information indicating the user's current position or map information indicating the user's current position and destination on the display unit 31 and to display a screen (e.g., arrow image screen) for guiding the user to the destination on the display apparatus 20.

A second example is that a shop search application program is installed on the terminal 30. The shop search application program causes the control unit 34 to implement a function for searching for shops around the current position based on the map information stored in the storage unit 33 and the position information obtained by the GPS function, and displaying information about the retrieved shops on the display unit 31. In this case, when the user operates the terminal 30 to instruct the execution of the shop search application program during the execution of the display apparatus control program, the control unit 34 starts the shop search application program to display on the display unit 31 a screen with the information about the shops around the current position as a screen for the shop search application program, and also to display that screen as the original screen M on the display apparatus 20. The user can obtain the information about the stores around the current position by looking at the visual confirmation screen S corresponding to the original screen M.

Note that, in the above-mentioned examples, the map information does not necessarily have to be stored in the storage unit 33 in advance. For example, when the control unit 34 starts the route guidance application program or the shop search application program, the control unit 34 may access a predetermined site on the Internet to use the map information on the site.

In the terminal device according to the first embodiment, the terminal is separate from the pair of glasses serving as a wearable object. Therefore, for example, an existing mobile terminal such as a smartphone or a tablet terminal can be used as the terminal. Such a use of an existing mobile terminal or the like as the terminal makes it possible to reduce the number of parts of the pair of glasses serving as a wearable object, resulting in a simplified pair of glasses. In addition, the use of a commercially available smartphone or the like as the terminal makes it possible to perform the operation using such a smartphone or the like that is familiar to the user, so that the operability can be improved.

In the first embodiment, a case has been described in which the hologram sheet 23 used in the display apparatus 20 is stuck to the lens part 11 of the pair of glasses 10. However, the hologram sheet 23 may be embedded in or integrated with the lens part 11.

Figure 9A:
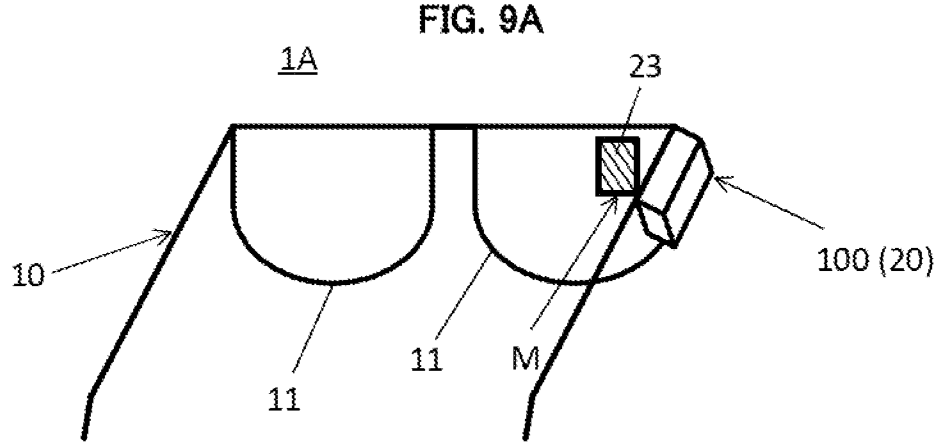
FIG. 9 illustrates examples of a hologram sheet to be stuck to a lens part of a pair of glasses of a terminal device according to the present invention.
Figure 9B:
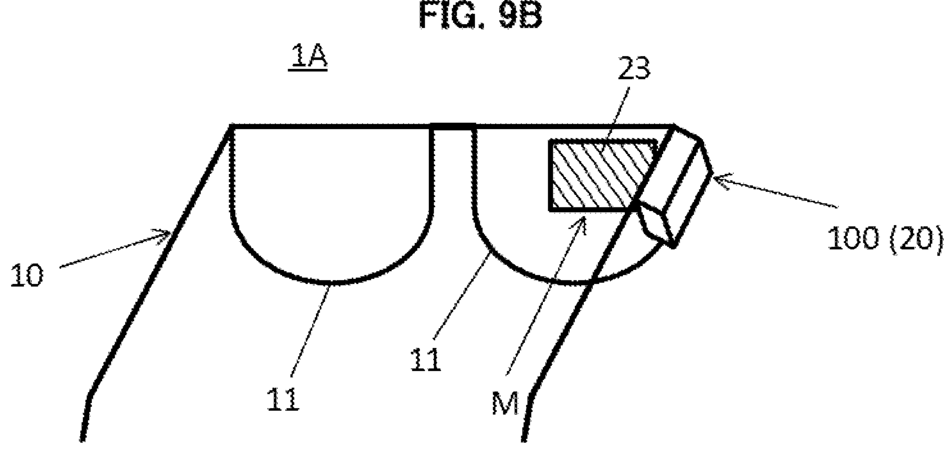
Figure 9C:
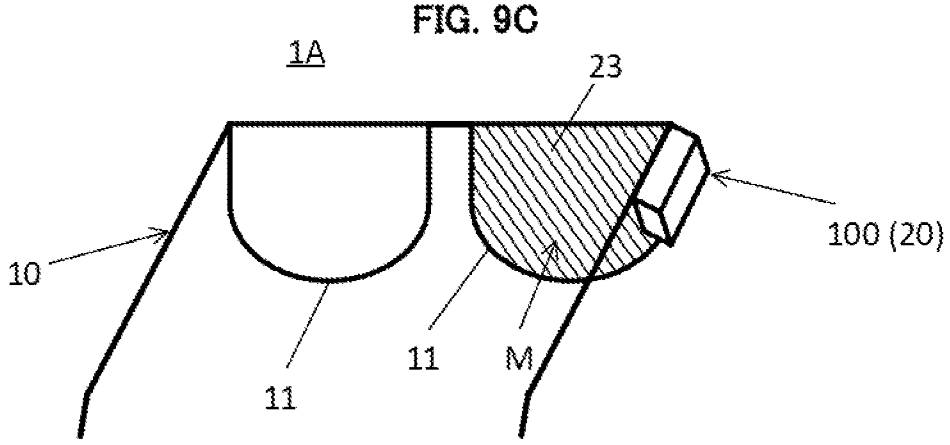

Further, in the first embodiment, a case has been described in which the hologram sheet 23 used in the display apparatus 20 has a small rectangular shape, the hologram sheet 23 is stuck to an upper portion of the lens part 11 on the slightly right side in a state where it is horizontally long, and an image or a video (picture) displayed on the liquid crystal panel of the small projector 21 is projected onto the entire hologram sheet 23. However, the hologram sheet 23 may be one of various types of sizes and shapes. FIG. 9 illustrates examples of a hologram sheet 23 to be stuck to a lens part 11 of a pair of glasses 10 of a terminal device according to the present invention. In the example illustrated in FIG. 9A, a small rectangular hologram sheet 23 is used, and the hologram sheet 23 is stuck to an upper portion of the lens part 11 on the slightly right side in a state where it is vertically long. In the example illustrated in FIG. 9B, a large rectangular hologram sheet 23 (e.g., 1.5 cm in width and 2.5 cm in length) is used, and the hologram sheet 23 is stuck to an upper portion of the lens part 11 on the slightly right side in a state where it is horizontally long. Further, in the example illustrated in FIG. 9C, a hologram sheet 23 is stuck to the entire surface of the lens part 11. Also in these examples, the image or video (picture) displayed on the liquid crystal panel of the small projector 21 is projected onto the entire hologram sheet 23. Of course, for example, the image or video (picture) may be projected onto a part of the hologram sheet 23 illustrated in FIGS. 9A, 9B, and 9C.

Furthermore, although in the first embodiment, the case where the small projector 21 and the optical system 22, which are parts of the display apparatus 20, are detachably attached to the pair of glasses 10 has been described, the hologram sheet 23 may be detachably attached to the pair of glasses 10 in addition to the small projector 21 and the optical system 22, for example, by using one that can be repeatedly stuck to the lens part 11 as the hologram sheet 23.

Second Embodiment

Figure 10:
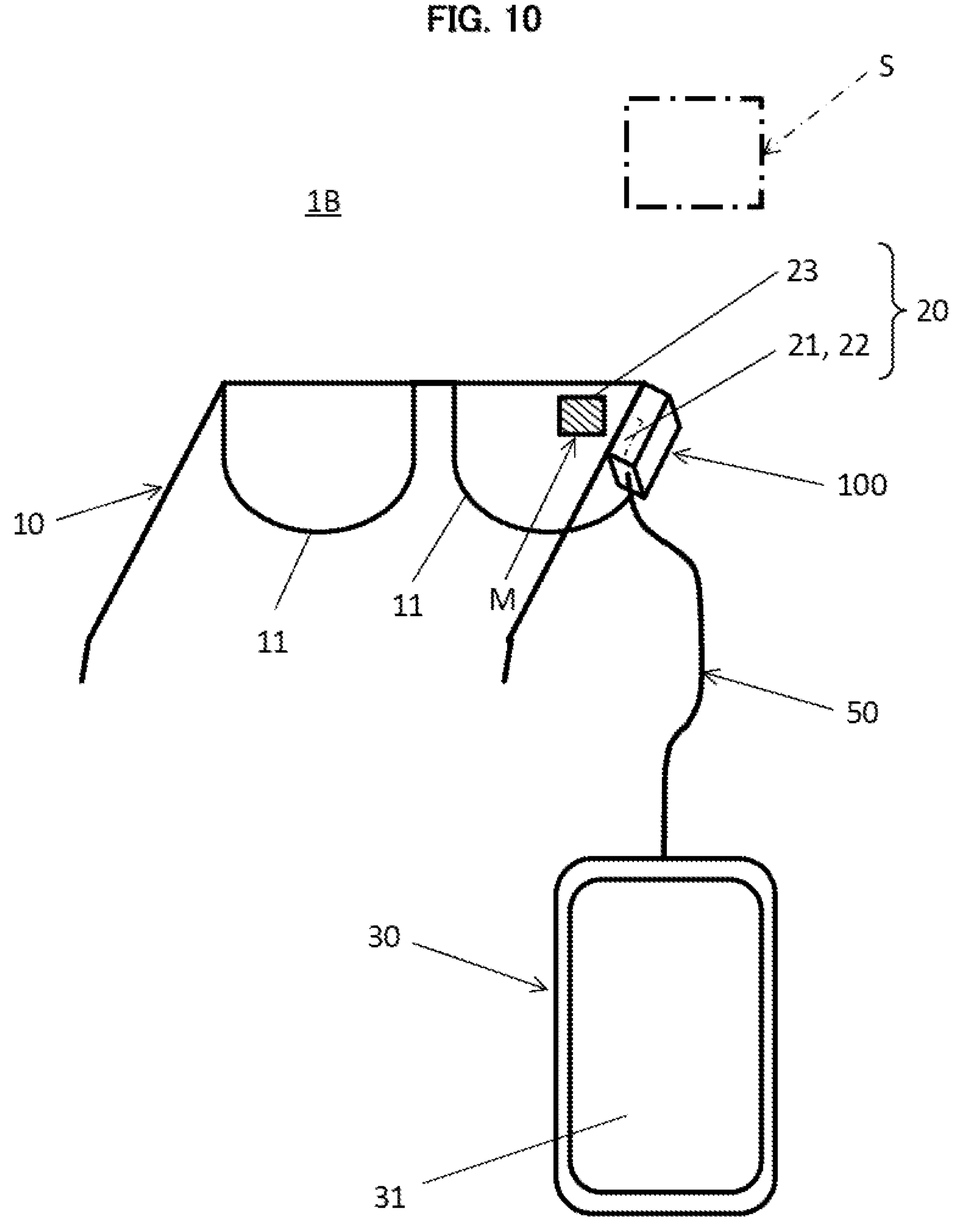
FIG. 10 is a schematic perspective view of a terminal device according to a second embodiment of the present invention.
Figure 11:
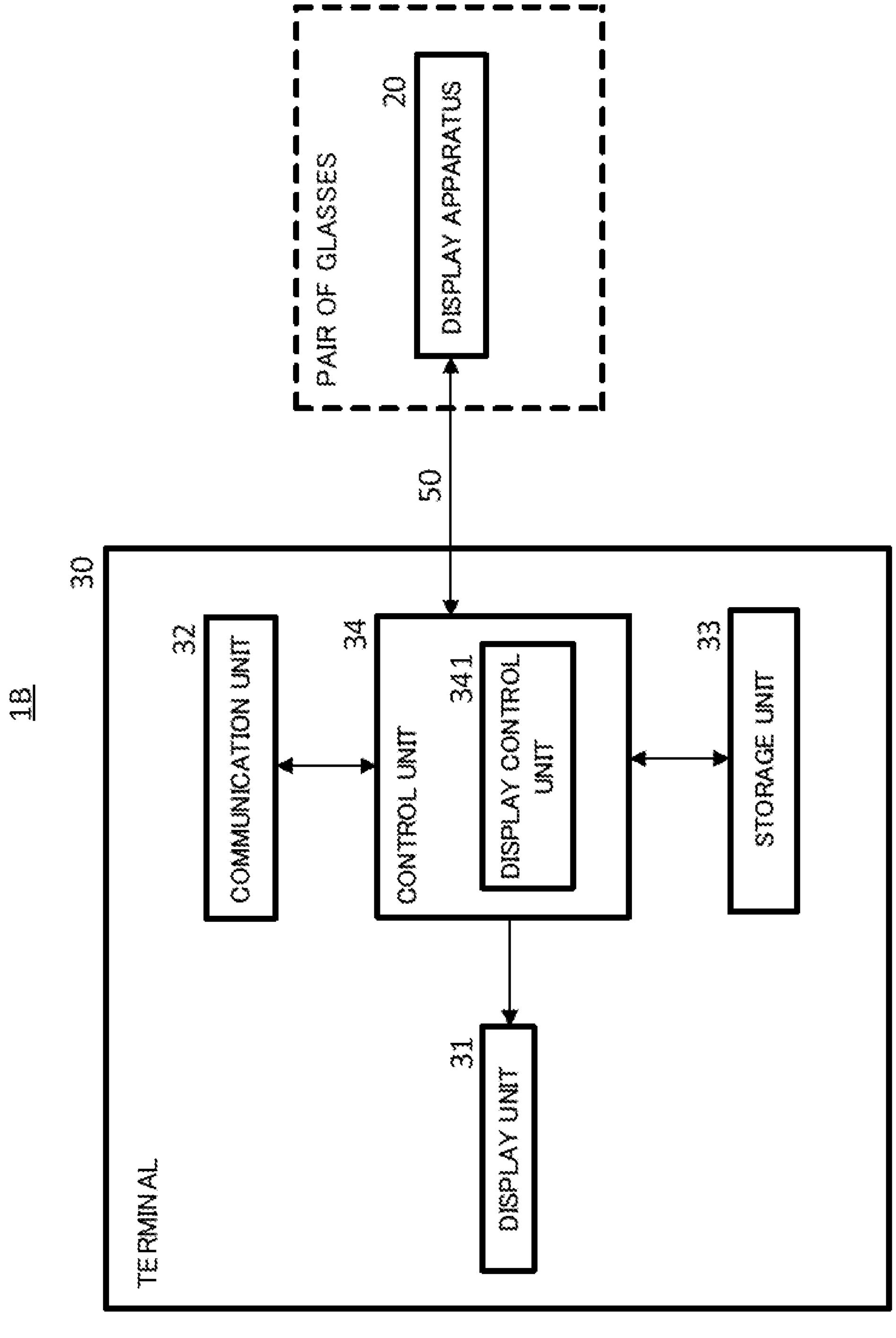
FIG. 11 is a schematic block diagram of the terminal device according to the second embodiment.

Next, a terminal device according to a second embodiment of the present invention will be described. FIG. 10 is a schematic perspective view of the terminal device according to the second embodiment of the present invention, and FIG. 11 is a schematic block diagram of the terminal device according to the second embodiment. In the second embodiment, the apparatuses/units having the same functions as those of the first embodiment described above are designated by the same reference numerals, and detailed description thereof will be omitted.

As illustrated in FIGS. 10 and 11, the terminal device 1B according to the second embodiment includes the pair of glasses 10 serving as a wearable object to be mounted on the head of the user, the display apparatus 20 mounted on the pair of glasses 10, the terminal 30 being separate from the pair of glasses 10 and including the display unit 31, and a cable 50 for connecting between the display apparatus 20 and the terminal 30.

The terminal device 1B according to the second embodiment mainly differs from the terminal device 1A according to the first embodiment in that the display apparatus 20 and the terminal 30 are connected by wire using the cable 50. The other configurations of the terminal device 1B according to the second embodiment are the same as those of the terminal device 1A according to the first embodiment.

As illustrated in FIG. 10, the display apparatus 20 includes the small projector 21, the optical system 22, and the hologram sheet 23. The small projector 21 and the optical system 22 are arranged in the housing 100, and the housing 100 is attached to a temple portion of the pair of glasses 10. The housing 100 is attachable to and detachable from the pair of glasses. Further, a connection terminal (not illustrated) for connecting the cable 50 to the display apparatus 20 is provided at a predetermined position on the surface of the housing 100. In the second embodiment, the display apparatus 20 is controlled by the terminal 30 through wired communication using the cable 50. Further, the electric power to the display apparatus 20 is supplied from the terminal 30 via the cable 50. Therefore, in the second embodiment, the power supply unit and the power switch in the first embodiment are not provided in the housing 100. Note that, even in this case, the power supply unit may be provided in the housing 100.

As illustrated in FIG. 11, the terminal 30 includes the display unit 31, the communication unit 32, the storage unit 33, the control unit 34, and a connection terminal (not illustrated) serving as an interface. A touch panel is provided on the screen of the display unit 31. The cable 50 is connected to the connection terminal of the terminal 30. The display apparatus 20 and the terminal 30 are connected by the cable 50, and the terminal 30 can communicate with the display apparatus 20 via this cable 50. For example, an HDMI (registered trademark) terminal may be used as the connection terminal of the terminal 30 and the connection terminal provided in the housing 100, and an HDMI (registered trademark) cable may be used as the cable 50. Further, a USB terminal may be used as the connection terminal of the terminal 30 and the connection terminal provided in the housing 100, and a USB cable may be used as the cable 50.

The storage unit 33 stores various programs, data, and the like. Similarly to the first embodiment described above, the storage unit 33 stores, for example, the special display apparatus control program by which the terminal 30 controls the display apparatus 20. When this display apparatus control program is executed by the control unit 34, the screen displayed on the display unit 31 is displayed not only on the display unit 31 but also on the display apparatus 20. Since the setting screen for the display apparatus control program is the same as that in the first embodiment described above, detailed description thereof will be omitted here.

The control unit 34 controls the entire terminal 30 and also controls the display apparatus 20. As illustrated in FIG. 11, the control unit 34 includes the display control unit 341. The display control unit 341 controls the display on the display unit 31 and the display apparatus 20. Specifically, when the user issues an instruction to start the display apparatus control program, the display control unit 341 executes the display apparatus control program stored in the storage unit 33 to display on the display apparatus 20 the content of the screen displayed on the display unit 31 as the content of the original screen M. This makes it possible for the user who wears the pair of glasses 10 to see the visual confirmation screen S corresponding to the original screen M to be floating in midair.

Figure 12:
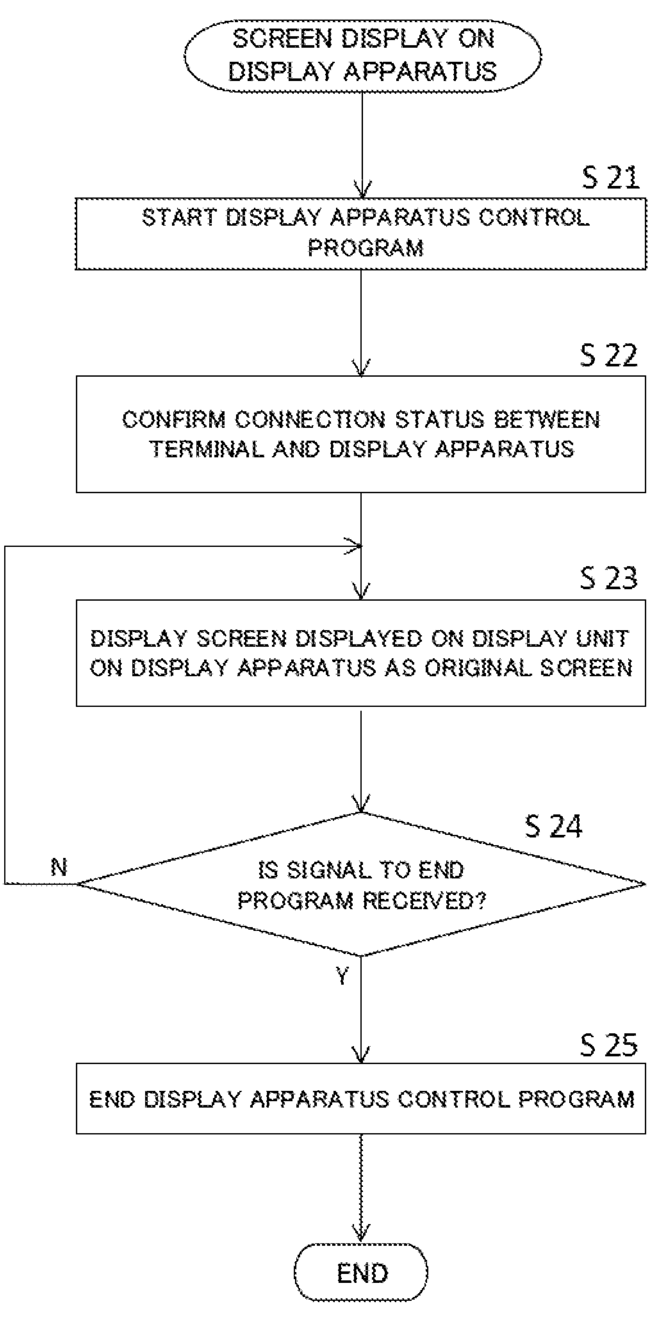
FIG. 12 is a flowchart of the procedure of the process of displaying a screen on a display apparatus in accordance with a display apparatus control program in the terminal device according to the second embodiment.

Next, a process of displaying a screen on the display apparatus 20 in accordance with the display apparatus control program in the terminal device 1B according to the second embodiment will be described. FIG. 12 is a flowchart of the procedure of the process of displaying a screen on the display apparatus 20 in accordance with the display apparatus control program in the terminal device 1B according to the second embodiment.

The user performs the following operations while wearing the pair of glasses 10. The user first makes settings for starting power supply to the display apparatus 20 through a home screen of the terminal 30. As a result, electric power is supplied from the terminal 30 to the display apparatus 20, and the display apparatus 20 is powered on. In a case where a power supply unit is provided in the housing 100, the power supply unit provided in the housing 100 covers all or part of the electric power supplied to the display apparatus 20. In that case, a power switch may be provided in the housing 100, and when the power switch is pressed, the display apparatus 20 may be powered on. Next, the user operates the terminal 30 to display a menu screen on the display unit 31. Then, the user taps the icon for the display apparatus control program on the menu screen to select the display apparatus control program. In response to receiving a signal indicating that the display apparatus control program has been selected, the control unit 34 of the terminal 30 starts the display apparatus control program (S21). When the display apparatus control program is started, the control unit 34 performs processing according to the display apparatus control program. Specifically, the control unit 34 first performs a process of confirming the connection state between the terminal 30 and the display apparatus 20 (S22). When the connection is confirmed, the control unit 34 displays the setting screen for the display apparatus control program on the display unit 31. Then, the control unit 34 transmits data on the screen currently displayed on the display unit 31 to the display apparatus 20 via the cable 50, and causes the display apparatus 20 to display the content of the screen displayed on the display unit 31 as the content of the original screen M (S23). This makes it possible for the user to feel and see the visual confirmation screen S corresponding to the original screen M through the pair of glasses 10 to be floating in midair. After that, when the user operates the terminal 30 to for example select a desired application program, the control unit 34 executes the application program, displays a screen for the application program on the display unit 31, and transmits data on the screen to the display apparatus 20 via the cable 50 to cause the display apparatus 20 to display the same screen as the screen displayed on the display unit 31. As a result, the user can see the visual confirmation screen S for the screen for the application program through the pair of glasses 10 to be floating in midair.

To end the screen display on the display apparatus 20, the user causes the display unit 31 of the terminal 30 to display the setting screen for the display apparatus control program, and taps the button B5 for ending the display apparatus control program, provided in the setting screen. In response to receiving a signal indicating that the display apparatus control program is to be ended (S24), the control unit 34 ends the display apparatus control program (S25). Alternatively, when the user taps the button B5 on the visual confirmation screen S (the setting screen for the display apparatus control program) with a finger, the control unit 34 may be configured to recognize that the tap operation has been performed on the button B5 and end the display apparatus control program. As a result, the control unit 34 stops transmitting the data on the screen to the display apparatus 20, and accordingly, nothing is displayed on the screen of the display apparatus 20. Finally, the user makes settings for stopping the power supply to the display apparatus 20 through the home screen of the terminal 30. As a result, the display apparatus 20 is powered off. When the screen for the application program is displayed on the display unit 31 in which a predetermined icon is displayed at a predetermined position (e.g., the position of the lower corner) in that screen, the control unit 34 may recognize, in response to the user performing a tap operation on the icon in the visual confirmation screen S with a finger, that the tap operation has been performed on the icon, and turn off the power supply from the terminal 30 to the display apparatus 20 via the cable 50. In particular, in a case where the housing 100 is provided with a power supply unit, the control unit 34 may recognize, in response to the user performing a tap operation on the icon in the visual confirmation screen S with a finger, that the tap operation has been performed on the icon, turn off the power supply from the terminal 30 to the display apparatus 20 via the cable 50, and also control the power supply unit via the cable 50 to turn off the power supply from the power supply unit of the housing 100 to the display apparatus 20. Further, in a case where the power supply unit of the housing 100 supplies all of the power to be supplied to the display apparatus 20, when the control unit 34 recognize, in response to the user performing a tap operation on the icon in the visual confirmation screen S with a finger, that the tap operation has been performed on the icon, the control unit 34 may control the power supply unit via the cable 50 to turn off the power supply from the power supply unit of the housing 100 to the display apparatus 20.

Similarly to the first embodiment described above, in the terminal device according to the second embodiment, the terminal is separate from the pair of glasses serving as a wearable object. Therefore, for example, an existing mobile terminal such as a smartphone or a tablet terminal can be used as the terminal. Such a use of an existing mobile terminal or the like as the terminal makes it possible to reduce the number of parts of the pair of glasses serving as a wearable object, resulting in a simplified pair of glasses. In addition, the use of a commercially available smartphone or the like as the terminal makes it possible to perform the operation using such a smartphone or the like that is familiar to the user, so that the operability can be improved.

Third Embodiment

Figure 14:
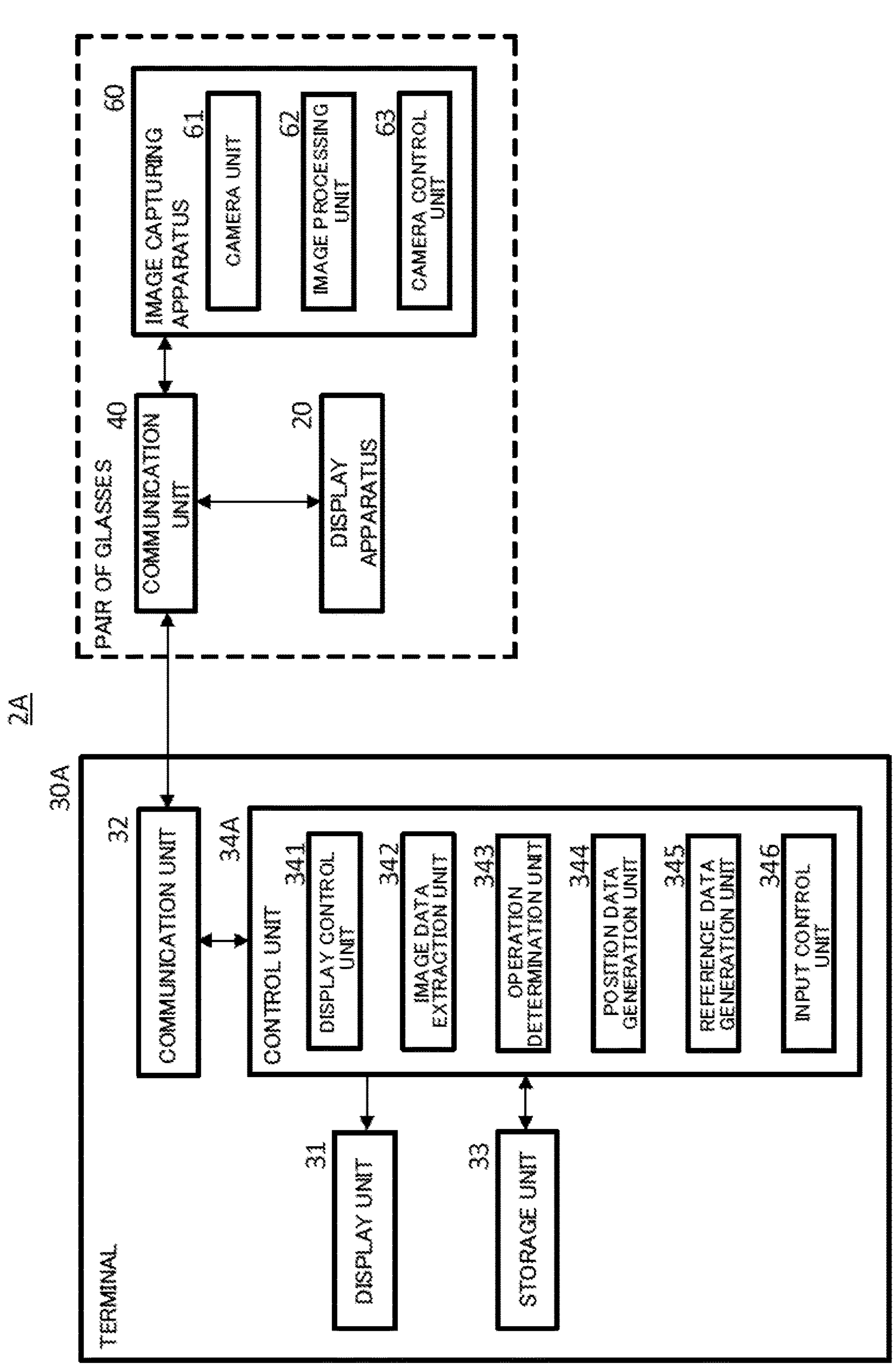
FIG. 14 is a schematic block diagram of the terminal device according to the third embodiment.

Next, a terminal device according to a third embodiment of the present invention will be described. FIG. 13 is a schematic perspective view of the terminal device according to the third embodiment of the present invention, and FIG. 14 is a schematic block diagram of the terminal device according to the third embodiment. In the third embodiment, the apparatuses/units having the same functions as those of the first embodiment described above are designated by the same reference numerals, and detailed description thereof will be omitted.

As illustrated in FIGS. 13 and 14, the terminal device 2A according to the third embodiment includes the pair of glasses 10 serving as a wearable object to be mounted on the head of the user, the display apparatus 20 mounted on the pair of glasses 10, a terminal 30A being separate from the pair of glasses 10 and including the display unit 31, the communication unit 40, and an image capturing apparatus 60 for capturing an image in front of the user.

The main differences between the terminal device 2A according to the third embodiment and the terminal device 1A according to the first embodiment are that this terminal device 2A includes the image capturing apparatus 60, that the terminal 30A controls the image capturing apparatus 60, and that the user is allowed to perform a touch operation on the visual confirmation screen to input an instruction corresponding to that operation. The other configurations of the terminal device 2A according to the third embodiment are the same as those of the terminal device 1A according to the first embodiment.

As illustrated in FIG. 13, the display apparatus 20 includes the small projector 21 having a liquid crystal panel (display device), the optical system 22, and the hologram sheet 23 that reflects part of light (video (picture)). The small projector 21 and the optical system 22 are arranged in the single housing 100, and the housing 100 is attached to a temple portion of the pair of glasses 10. As illustrated in FIG. 13, the hologram sheet 23 is stuck to the lens part 11 for the right eye in the pair of glasses 10. Further, in the housing 100, the communication unit 40, a power supply unit (not illustrated) such as a battery, and a power switch (not illustrated) are provided. The communication unit 40 performs wireless communication between the terminal 30A and the various apparatuses and units (the display apparatus 20 and the image capturing apparatus 60 in the third embodiment) mounted on the pair of glasses 10. Accordingly, the display apparatus 20 and the image capturing apparatus 60 perform wireless communication with the terminal 30A via the communication unit 40. The display apparatus 20 and the image capturing apparatus 60 are controlled by the terminal 30A through wireless communication. The power supply unit supplies electric power to the various apparatuses and units (the display apparatus 20, the communication unit 40, and the image capturing apparatus 60 in the third embodiment) mounted on the pair of glasses 10. Further, the power switch turns on and off the power supply from the power supply unit to the display apparatus 20, the communication unit 40, and the image capturing apparatus 60. This power switch is attached to a predetermined position on the surface of the housing 100.

Figure 15:
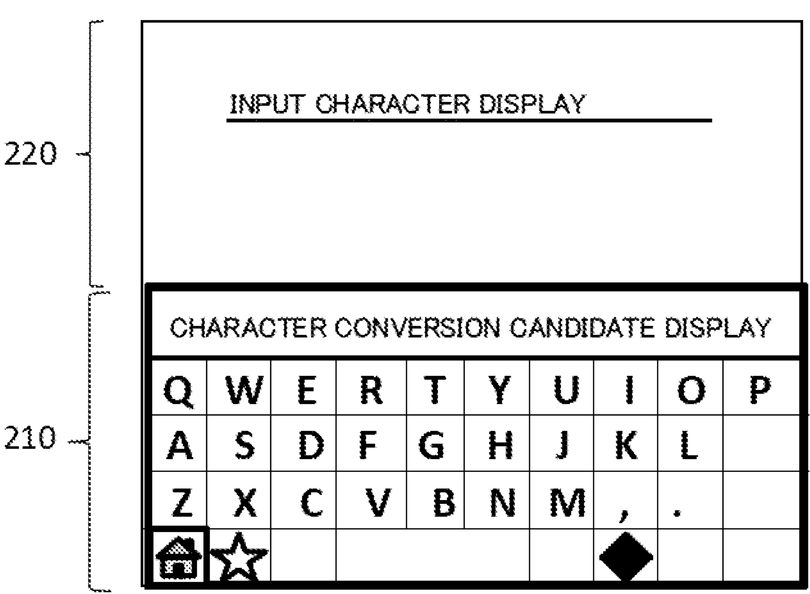
FIG. 15 illustrates an example of a character input screen.
Figure 16:
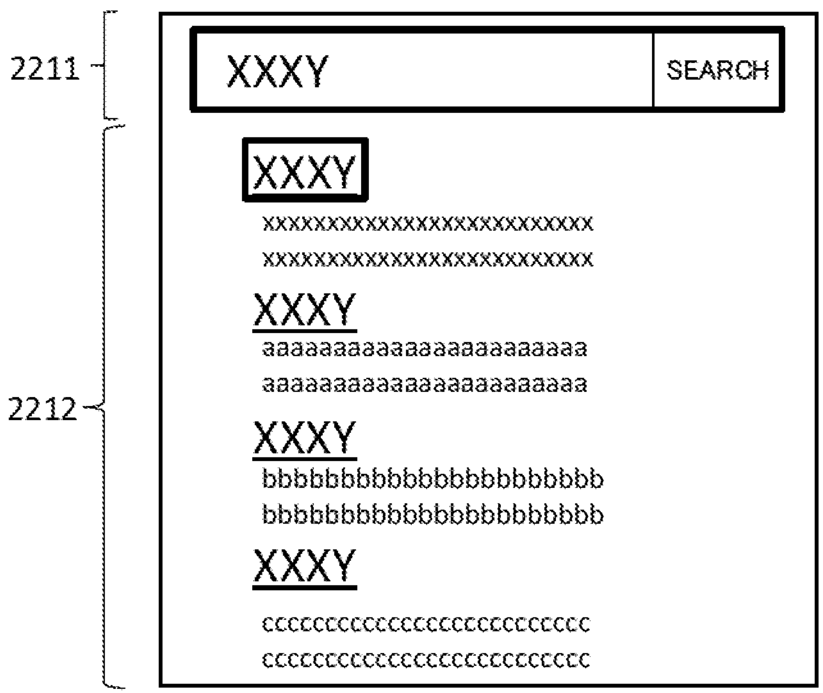
FIG. 16 illustrates an example of a search screen displayed in the character input screen.

As illustrated in FIG. 14, the terminal 30A includes the display unit 31, the communication unit 32, the storage unit 33, and a control unit 34A. The display unit 31 is a liquid crystal display device provided on the surface of the terminal 30A, and a touch panel is provided on the screen of the display unit 31. On the screen of the display unit 31, various screens are displayed such as a home screen, a menu screen, an application screen, and a character input screen. The character input screen will now be explained. FIG. 15 illustrates an example of the character input screen. As illustrated in FIG. 15, the character input screen 200 has a keyboard image 210 and a display area 220 for displaying input characters and the like. The keyboard image 210 includes a plurality of character key images associated with characters (including symbols) and a plurality of function key images to which specific functions are assigned. In the example of FIG. 15, the QWERTY layout is adopted as the layout of the character key images in the keyboard image 210. Note that the keyboard image 210 may be a keyboard image having a hiragana 50-sound layout, a keyboard image in the corresponding country's language, a numeric keypad image, a key image similar to the key layout of a mobile phone, or the like. Further, for example, a search screen is displayed in the display area 220. FIG. 16 illustrates an example of the search screen displayed in the character input screen 200. The search screen 221 is for searching Internet sites, and has a keyword input field 2211 and a search result display field 2212 for displaying search results. When the user looks at the character input screen 200 displayed on the display unit 31, the user can use the key images of the keyboard image 210 to input a keyword in the keyword input field 2211.

Since the screen of the display unit 31 is provided with the touch panel, the user can issue various instructions to the control unit 34A of the terminal 30A by performing a touch operation on the screen of the display unit 31 with a finger. In particular, in the third embodiment, when the display apparatus control program is executed and the screen displayed on the display unit 31 is displayed on the display apparatus 20, the user can issue various instructions to the control unit 34A of the terminal 30A by performing a touch operation on the visual confirmation screen S with a finger. How the control unit 34A recognizes the content of an instruction through a touch operation performed on the visual confirmation screen S by the user will be described below in detail.

The image capturing apparatus 60 is configured to capture an image of the finger of the user performing an operation on the visual confirmation screen S, and output image data of the captured image to the terminal. As illustrated in FIG. 13, this image capturing apparatus 60 is provided on a temple portion of the pair of glasses 10 adjacent to the display apparatus 20. Further, as illustrated in FIG. 14, the image capturing apparatus 60 includes a camera unit 61, an image processing unit 62, and a camera control unit 63. The camera unit 61 has a lens and an image sensor. The image processing unit 62 performs, based on the image data of an image captured by the camera unit 61, a process of correcting the color and gradation of the captured image, and performs image processing such as compression of the image data. The camera control unit 63 controls the image processing unit 62 and controls the exchange of image data between the camera control unit 63 and the control unit 34A of the terminal 30A. In the third embodiment, a case will be described in which the image processing unit 62 is provided in the image capturing apparatus 60. However, the image processing unit 62 may be provided in the control unit 34A of the terminal 30A instead of the image capturing apparatus 60.

In addition, the image capturing apparatus 60 can capture an image of a part of the field of view of the user (or substantially the entire field of view) as an image capture range in which the image capturing apparatus 60 can capture images. In particular, in the third embodiment, the image capturing apparatus 60 is configured to focus on a subject at the position of the visual confirmation screen S recognized by the user, specifically, for example, the position of a finger of a hand when the user reaches out to touch the visual confirmation screen S with the hand, the position being at a substantially constant distance from the image capturing apparatus 60 along the depth direction. Moreover, the focus range (depth of field) is limited to a narrow range. For example, the focus position is set at a position about 40 cm away from the image capturing apparatus 60, and the depth of field is in a range of about 5 cm. However, in the third embodiment, the image capturing apparatus 60 restricts the focus range to a narrow range only for operations to set reference data, input characters, and display a screen, which will be described later. For normal image capture with a camera and other situations, the focus range is not limited to a narrow range. Note that, as the image capturing apparatus 60, for example, a type may be used that can switch the focus position by the user manually changing the settings using a distance ring (focusing ring) in the same way as a typical camera.

Further, in the third embodiment, the focus position of the image capturing apparatus 60 is set to the position of the visual confirmation screen S recognized by the user. Therefore, when the user performs an operation on the visual confirmation screen S with a finger, the image capturing apparatus 60 captures an image of the finger with which the operation is being performed in a focused state. The image data of the image captured by the image capturing apparatus 60 is transmitted to the control unit 34A of the terminal 30A through wireless communication, and is stored in the storage unit 33 by the control unit 34A. Further, the image capturing apparatus 60 has a still image capturing function and a moving image capturing function, so that the control unit 34A can acquire still image data and moving image data as image data, as needed.

The control unit 34A includes a central processing unit (CPU) and the like to control the entire terminal 30A and also control the display apparatus 20 and the image capturing apparatus 60. For example, when the user performs a touch operation on the display unit 31, the control unit 34A recognizes the content of the instruction issued by the operation, and executes processing according to the recognized content. Further, the control unit 34A executes the display apparatus control program to control the display apparatus 20 to display on the display apparatus 20 the content of the screen displayed on the display unit 31 as the content of the original screen M. Specifically, as illustrated in FIG. 14, the control unit 34A includes the display control unit 341, an image data extraction unit 342, an operation determination unit 343, a position data generation unit 344, a reference data generation unit 345, and an input control unit 346.

The display control unit 341 controls the display on the display unit 31 and the display apparatus 20. Specifically, when the user issues an instruction to start the display apparatus control program, the display control unit 341 executes the display apparatus control program stored in the storage unit 33 to display on the display apparatus 20 the content of the screen displayed on the display unit 31 as the content of the original screen M. This makes it possible for the user who wears the pair of glasses 10 to see the visual confirmation screen S corresponding to the original screen M to be floating in midair.

The image data extraction unit 342 is configured to, when the image capturing apparatus 60 captures an image of a subject in focus in response to the user operating the visual confirmation screen S with a finger, determine based on image data of the captured image whether or not the subject is a finger, and extract image data including an image of the finger. A general image recognition method is used to determine whether or not the subject is a finger. In the third embodiment, since the depth of field of the image capturing apparatus 60 is limited to a narrow range, if it is determined that the subject is a finger, the finger is expected to be at a substantially constant distance from the image capturing apparatus 60 along the depth direction. In this way, the image data extraction unit 342 extracts image data in which the finger is at a substantially constant distance from the image capturing apparatus 60 along the depth direction. Further, the operation determination unit 343, the position data generation unit 344, and the reference data generation unit 345 perform processing based on the image data extracted by the image data extraction unit 342.

The operation determination unit 343 is configured to, when the image capturing apparatus 60 captures an image of the finger of the user performing an operation on the visual confirmation screen S, determine what content of the operation is performed with the finger among various types of operations, based on the image data, of the captured image, extracted by the image data extraction unit 342. In this determination, for example, a general image recognition method is used. As a result, the operation determination unit 343 can recognize which of the tap, double tap, and long press operations, and others is the operation performed with the finger. The data on the recognized content of the operation performed with the finger is stored in the storage unit 33.

The position data generation unit 344 is configured to, when the image capturing apparatus 60 captures an image of the finger of the user performing an operation on the visual confirmation screen S, generate position data of the finger (fingertip) within the image capture range of the image capturing apparatus 60, based on the image data, of the captured image, extracted by the image data extraction unit 342. Here, in the third embodiment, as illustrated in FIG. 13, an XY coordinate system is set with the left-right direction as the X-axis direction and the vertical direction as the Y-axis direction within the image capture range of the image capturing apparatus 60. The origin of this XY coordinate system is, for example, the lower left point in the image capture range. The position data generation unit 344 acquires the position data of the finger in this XY coordinate system. If it is necessary to obtain three-dimensional position data, the Z-axis direction is set in the depth direction to this XY coordinate system to constitute an XYZ coordinate system.

The reference data generation unit 345 is configured to, when the user performs an operation at one or more predetermined positions on the visual confirmation screen S with a finger, generate data on the visual confirmation screen S by using the position data of the finger generated by the position data generation unit 344 based on the image data for which the operation determination unit 343 determines that the operation performed at each of the predetermined positions is a predetermined operation. The generated data on the visual confirmation screen S is stored in the storage unit 33 as reference data. As the reference data, data that can identify the position and size of the visual confirmation screen S is used. For example, when the user performs an operation with a finger on the four corners of the outer frame of the visual confirmation screen S, position data of the finger at each position of the four corners can be used as the reference data. Here, since the image data extracted by the image data extraction unit 342 is of a captured image of a finger that is at a substantially constant distance from the image capturing apparatus 60 along the Z-axis direction, the position data of the finger at each position of the four corners can be considered to represent position information of the finger on a plane parallel to the XY plane (substantially parallel to the user's body) at the substantially constant distance from the image capturing apparatus 60 along the Z-axis direction. Further, when the user performs an operation with a finger on one point of the four corners of the outer frame of the visual confirmation screen S, the position data of the finger at that one point and data on the size of the visual confirmation screen S (e.g., the vertical width and horizontal width calculated or measured in advance) obtained from data on the original screen M corresponding to the visual confirmation screen S can be used as the reference data.

The input control unit 346 is configured to, when the user performs an operation on the visual confirmation screen S with a finger, recognize a content of an input instruction corresponding to the operation performed with the finger, by identifying a range of the visual confirmation screen S within the image capture range and retrieving a position where the operation is performed within the identified range of the visual confirmation screen S with the finger, based on data on the content of the operation performed with the finger, obtained as determined by the operation determination unit 343, the position data of the finger generated by the position data generation unit 344, the reference data on the visual confirmation screen S stored in the storage unit 33, and the data on the original screen M corresponding to the visual confirmation screen S stored in the storage unit 33; and control a screen to be displayed on the display unit 31 and the original screen M to be displayed on the display apparatus 20, according to the recognized content of the input instruction. For example, in a case where the visual confirmation screen S is the character input screen 200 illustrated in FIG. 15, the input control unit 346 can recognize, based on the reference data on the visual confirmation screen S, a range in which the character input screen 200 that the user looks at is present within the image capture range of the image capturing apparatus 60. At this time, since the configuration of the character input screen 200 is known in advance, the input control unit 346 can also recognize the range of the keyboard image 210 on the character input screen 200, the area of each character key image, and the like. Accordingly, for example, when the user performs a touch operation on a character key image in the keyboard image 210 as the visual confirmation screen S with a finger, the input control unit 346 can retrieve which of the areas of the character key images in the keyboard image 210 corresponds to the position of the finger obtained from the position data of the finger, and thus identify the character key on which the operation is performed.

When the input control unit 346 recognizes the content of an input instruction corresponding to an operation performed with a finger in response to the user performing the operation on the visual confirmation screen S with the finger, the input control unit 346 may first generate a reference screen corresponding to the visual confirmation screen S on a virtual plane corresponding to the image capture range of the image capturing apparatus 60 based on the reference data on the visual confirmation screen S stored in the storage unit 33, then retrieve a position in the reference screen corresponding to the position data of the finger generated by the position data extraction unit 344, and thus identify the position where the user performs the operation on the visual confirmation screen S with the finger.

In addition to the display apparatus control program described above, examples of the programs stored in the storage unit 33 include a reference data setting processing program for performing a reference data setting process, a character input processing program for performing a character input process based on an operation performed on the character input screen 200 in the case where the visual confirmation screen S is the character input screen 200, and a screen display processing program for performing a screen display process such as enlargement, reduction, and switching of the original screen M corresponding to the visual confirmation screen S based on an operation performed on the visual confirmation screen S. Examples of the data stored in the storage unit 33 include image data of various original screens M, data on each original screen M (specifically, the size, shape, content, arrangement, and the like of the original screen M), and various types of image data used to generate an original screen for setting reference data, which will be described later. Further, the storage unit 33 is also used as a working memory.

In the terminal device 2A according to the third embodiment, the input control unit 346 is configured to, when the user performs an operation on the visual confirmation screen S with a finger, recognize a content of an input instruction corresponding to the operation performed with the finger, based on data on the content of the operation performed with the finger, obtained as determined by the operation determination unit 343, the position data of the finger generated by the position data generation unit 344, the reference data on the visual confirmation screen S stored in the storage unit 33, and the data on the original screen M corresponding to the visual confirmation screen S stored in the storage unit 33; and control a screen to be displayed on the display unit 31 and the original screen M to be displayed on the display apparatus 20, according to the recognized content of the input instruction. This makes it possible for the user to input an instruction corresponding to an operation by performing, on the visual confirmation screen S that the user looks at, the same operation as in operating a screen displayed on a typical touch panel. Actually, when the user performs a touch operation on the visual confirmation screen S with a finger, the input control unit 346 can recognize an instruction corresponding to the touch operation in the same manner as when the visual confirmation screen S is displayed on the touch panel. For example, when the user performs a double tap operation on the visual confirmation screen S with a finger, the input control unit 346 recognizes an instruction to enlarge or reduce the original screen M corresponding to the visual confirmation screen S. When the user performs a long press operation on the visual confirmation screen S with a finger, the input control unit 346 recognizes an instruction to display an option menu screen as the original screen M. When the user performs a drag or flick operation on the visual confirmation screen S with a finger, the input control unit 346 recognizes an instruction to scroll and display the original screen M. Further, when the user performs a touch operation on a character key image on the character input screen 200 with a finger, the input control unit 346 performs the process of recognizing an instruction corresponding to the operation, that is, an instruction to input the corresponding character key, and displaying the character indicated by the input instruction on the original screen M, in the same manner as when the character input screen 200 is displayed on the touch panel.

Figure 17A:
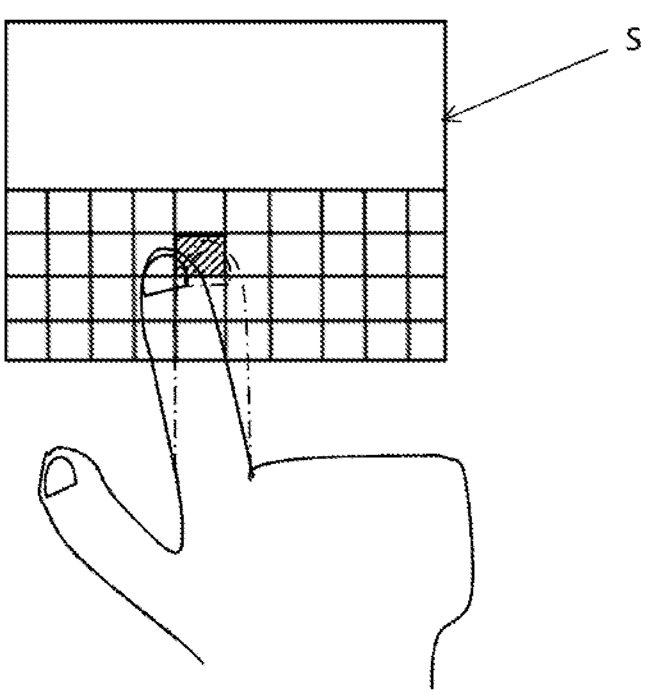
FIG. 17 illustrates examples of how to perform a touch operation on a visual confirmation screen.
Figure 17B:
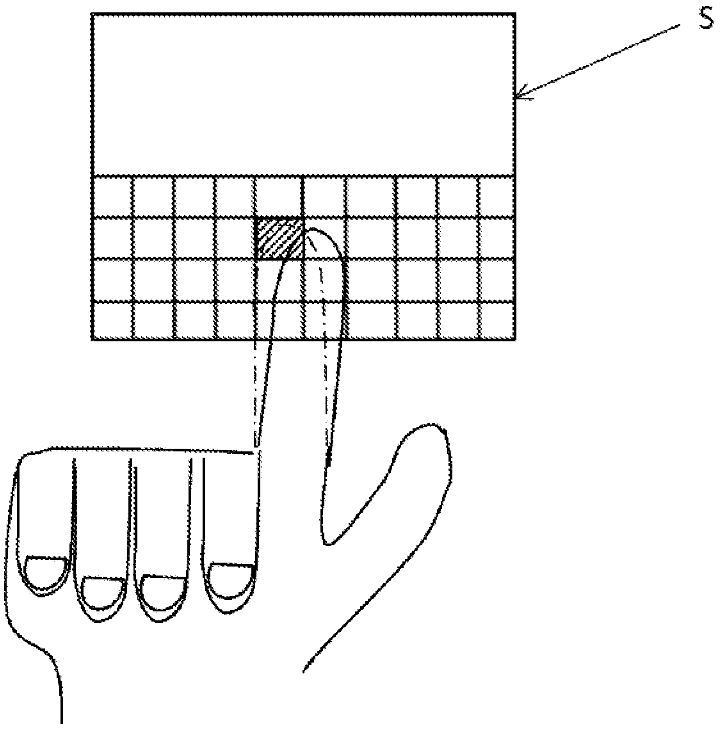
Figure 18A:
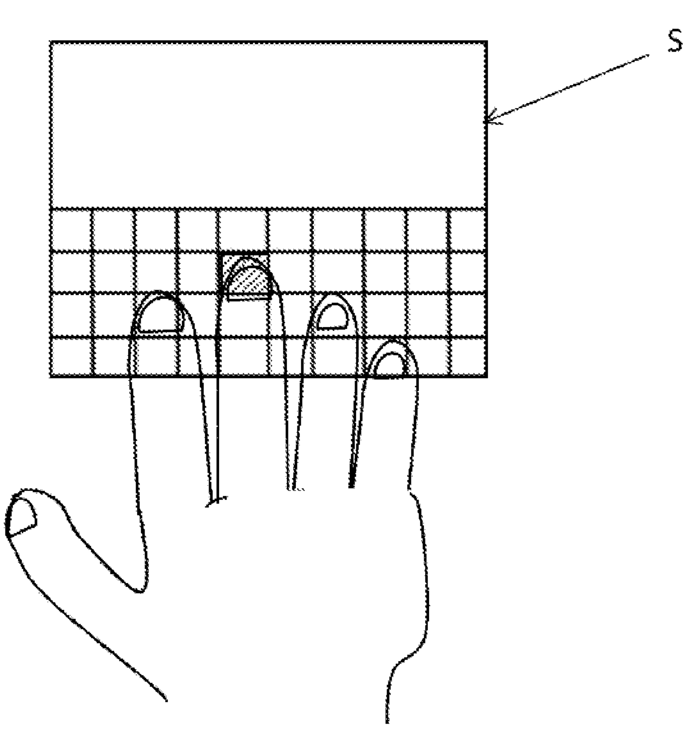
FIG. 18 illustrates examples of how to perform a touch operation on a visual confirmation screen.
Figure 18B:
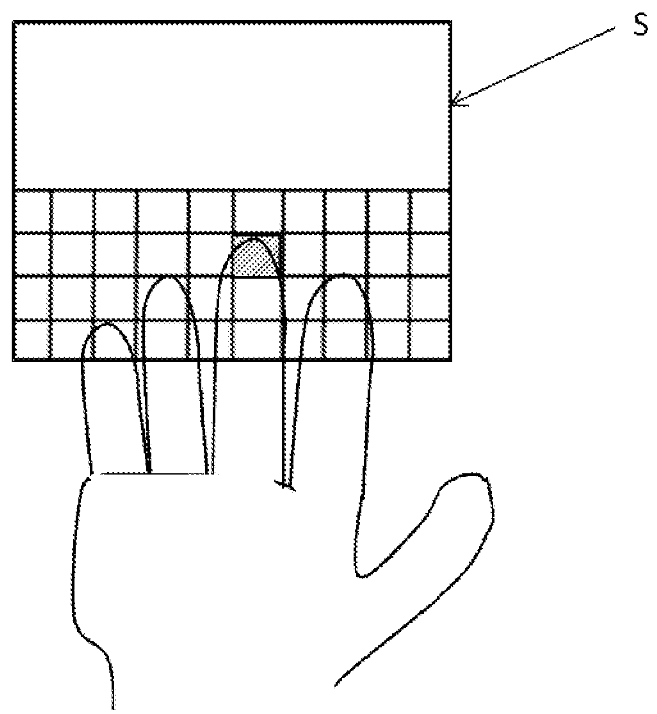

In the third embodiment, since the user performs a touch operation on the visual confirmation screen S appearing to be floating in midair with a finger, the user can also perform a touch operation in a manner that is impossible to perform a touch operation on a screen displayed on a typical touch panel. FIGS. 17 and 18 illustrate examples of how to perform a touch operation on the visual confirmation screen S. The user usually performs a touch operation with one finger from the front side of the visual confirmation screen S as illustrated in FIG. 17A. The user can also perform a touch operation with one finger from the back side of the visual confirmation screen S as illustrated in FIG. 17B. Further, the user can perform a touch operation with multiple fingers from the front side of the visual confirmation screen S as illustrated in FIG. 18A, and perform a touch operation with multiple fingers from the back side of the visual confirmation screen S as illustrated in FIG. 18B.

In the third embodiment, when the user operates the terminal 30A to issue an instruction to start the display apparatus control program, the control unit 34A of the terminal 30A executes the display apparatus control program to display on the display apparatus 20 the content of the screen displayed on the display unit 31 as the content of the original screen M. The process of displaying a screen on the display apparatus 20 in accordance with the display apparatus control program in the terminal device 2A according to the third embodiment is the same as the processing in the terminal device 1A according to the first embodiment. Therefore, detailed description thereof is omitted here.

Figure 19:
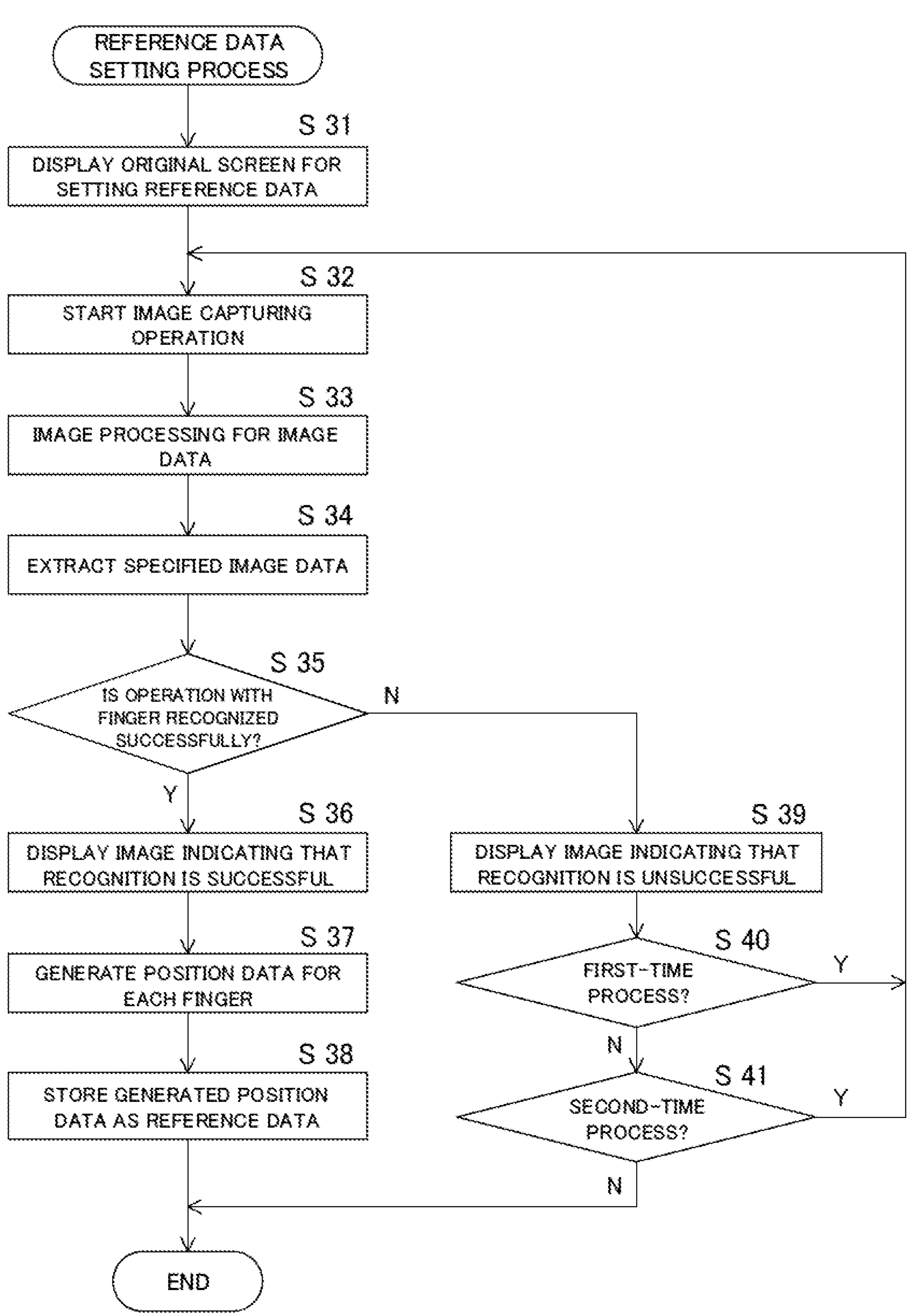
FIG. 19 is a flowchart of the procedure for a reference data setting process in the terminal device according to the third embodiment.

Next, a process of setting reference data in the terminal device 2A according to the third embodiment will be described. FIG. 19 is a flowchart of the procedure for the reference data setting process in the terminal device 2A according to the third embodiment. Now consider a case where the terminal 30A is executing the display apparatus control program. Specifically, it is assumed that the display apparatus 20, the communication unit 40, and the image capturing apparatus 60 are in a power-on state, and the communication of the terminal 30A with the display apparatus 20 and the image capturing apparatus 60 is enabled.

The user operates the terminal 30A to display a menu screen on the display unit 31. Then, the user taps the icon for the reference data setting processing program on the menu screen to select the reference data setting processing program. In response to receiving a signal indicating that the reference data setting processing program has been selected, the control unit 34A of the terminal 30A reads the reference data setting processing program from the storage unit 33 to perform the reference data setting process according to the processing flow illustrated in FIG. 19.

Figure 20A:
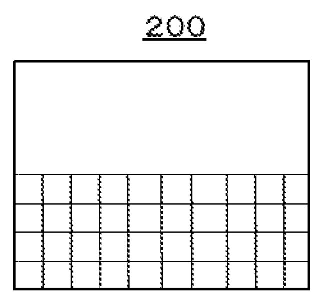
FIG. 20 illustrates examples of the original screen displayed in the process of setting the reference data.
Figure 20B:
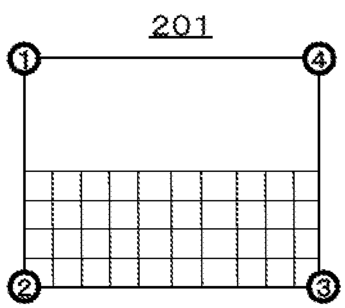
Figure 20C:
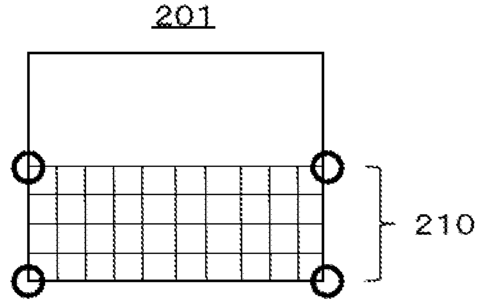

First, the user operates the terminal 30A to select a screen (e.g., the character input screen 200) on which the reference data is to be set, to cause the display apparatus 20 to display that screen as the original screen M. At this time, the display control unit 341 adds, for example, a circle image to one or more predetermined positions on the original screen M to generate a new original screen M (original screen for setting reference data), and displays the generated original screen M on the display apparatus 20 (S31). Here, the circle image is a mark indicating that the user is prompted to perform an operation on the circle at its position with a finger. FIG. 20 illustrates examples of the original screen M displayed in the process of setting the reference data. These examples are for the case where the original screen M is the character input screen 200. The original character input screen 200 is illustrated in FIG. 20A, but when the process of step S31 is executed, a character input screen 201 (original screen for setting reference data) illustrated in FIG. 20B is displayed on the display apparatus 20. On the character input screen 201 illustrated in FIG. 20B, images indicating circles and numbers are added at the four corner positions. When the character input screen 201 illustrated in FIG. 20B is displayed on the display apparatus 20, the user can see the visual confirmation screen S (visual confirmation screen for setting reference data) corresponding to the character input screen 201, that is, a screen having the same content as the character input screen 201 illustrated in FIG. 20B. Although the circle images are displayed at the four corners of the character input screen 201 in FIG. 20B, circle images may be displayed at the four corners of the keyboard image 210 of the character input screen 201 as illustrated in FIG. 20C.

After the process of step S31, the control unit 34A starts an image capturing operation of the image capturing apparatus 60 (S32). When the user sees the character input screen 201 illustrated in FIG. 20B as the visual confirmation screen S for setting reference data, the user performs a predetermined operation, for example, a tap operation, on each circle to which a number is assigned with a finger in order of the numbers on the visual confirmation screen S for setting reference data. Here, the reason why the user performs the predetermined operation is to inform the control unit 34A of the position on which the user performs the operation. Such a user operation is captured by the image capturing apparatus 60. At this time, in the third embodiment, the image capturing apparatus 60 captures an image of a subject in focus. Then, the image processing unit 62 performs predetermined image processing on the image data of the captured image, and the image data subjected to the image processing is transmitted from the image capturing apparatus 60 to the control unit 34A of the terminal 30A through wireless communication (S33).

Next, the image data extraction unit 342 determines whether or not the subject is a finger based on the image data of the image captured by the image capturing apparatus 60 and thus extracts image data including an image of the finger (S34). Here, the image capturing apparatus 60 transmits the image data of the captured image of the subject in focus to the image data extraction unit 342. Accordingly, the image data extraction unit 342 extracts image data in which the finger is at a substantially constant distance from the image capturing apparatus 60 along the Z-axis direction. After that, the operation determination unit 343 determines whether or not the operation performed with the finger is a predetermined operation (a tap operation as used herein) based on the image data extracted by the image data extraction unit 342. The operation determination unit 343 performs such determination processing and determines whether or not the tap operation performed on all four circles with the finger is successfully recognized (S35). For example, if a determination that the operation performed with the finger is a tap operation is only made once, twice, or three times within a predetermined time, or if the image data including an image of the finger fails to be transmitted from the image data extraction unit 342 within a predetermined time, the operation determination unit 343 determines that the tap operation performed on all four circles with the finger is unsuccessfully recognized. When the operation determination unit 343 determines that the tap operation performed on all four circles with the finger is successfully recognized, the operation determination unit 343 stores the data on the content of the operation performed with the finger in the storage unit 33, and also transmits to the display control unit 341 a signal indicating that the tap operation performed with the finger is successfully recognized. Then, the display control unit 341 adds to the original screen M an image of a green light indicating that the tap operation performed with the finger is successfully recognized, and displays the resulting image on the display apparatus 20 (S36). At this time, the display control unit 341 may add to the original screen M an image of characters or figures indicating that the tap operation performed with the finger is successfully recognized, in addition to or instead of the image of a green light.

After the process of step S36, the position data generation unit 344 generates position data (XY coordinates) of each finger (fingertip) in the image capture range of the image capturing apparatus 60 based on the image data for which the operation determination unit 343 determines that the operation on each circle is the predetermined operation (S37). Then, the reference data generation unit 345 stores the four pieces of position data thus generated in the storage unit 33 as reference data on the visual confirmation screen S currently displayed (S38). Since the reference data is used to identify the position and size of the visual confirmation screen S, the control unit 34A can use the reference data to recognize a range in which the visual confirmation screen S that the user looks at is present within the image capture range of the image capturing apparatus 60. The process of step S38 is performed, and then the reference data setting processing ends.

On the other hand, when the operation determination unit 343 determines in the process of step S35 that the tap operation performed on all four circles with the finger is unsuccessfully recognized, the operation determination unit 343 transmits a signal indicating unsuccessful to the display control unit 341. Then, the display control unit 341 adds to the original screen M an image of a red light indicating that the tap operation performed with the finger is unsuccessfully recognized, and displays the resulting image on the display apparatus 20 (S39). When the user sees the image indicating the red light, the user is prompted to perform a tap operation on each circle with a finger again on the visual confirmation screen S for setting reference data. At this time, the display control unit 341 may add to the original screen M an image of characters or figures indicating that the tap operation performed with the finger is unsuccessfully recognized, in addition to or instead of the image of a red light.

After the process of step S39, the control unit 34A determines whether or not the process of step S35 this time is the first-time process (S40). If the process of step S35 this time is the first-time process, the process proceeds to step S32. On the other hand, if the process of step S35 this time is not the first-time process, the control unit 34A determines whether or not the process of step S35 this time is the second-time process (S41). If the process of step S35 this time is the second-time process, the process proceeds to step S32. On the other hand, if the process of step S35 this time is not the second-time process, then the reference data setting process ends. In other words, when the red light is displayed in the visual confirmation screen S, the user is given two more opportunities to perform an operation with a finger. If the operation performed with the finger is still unsuccessfully recognized, the reference data setting process may be executed again.

In the third embodiment, a case has been described in which in step S35 described above, the operation determination unit 343 determines whether or not the operation performed on each circle with the finger is a tap operation, and determines whether or not the tap operation performed on all four circles with the finger is successfully recognized. However, the operation determination unit 343 may determine whether or not an operation is a tap operation every time the operation is performed on each circle with a finger, and determines whether or not the tap operation is successfully recognized. In this case, it is desirable that every time the operation determination unit 343 determines that the tap operation performed on each circle with the finger is successfully recognized, the display control unit 341 displays on the original screen M an image indicating that the tap operation performed on the circle is successfully recognized; on the other hand, every time the operation determination unit 343 determines that the tap operation performed on each circle with the finger is unsuccessfully recognized, the display control unit 341 displays on the original screen M an image indicating that the tap operation performed on the circle is unsuccessfully recognized. Specifically, examples of the image indicating that the tap operation performed on each circle is successfully recognized include an image in which the circle is displayed in reverse, and an image in which the circle is displayed in green; examples of the image indicating that the tap operation performed on each circle is unsuccessfully recognized include an image in which the circle is displayed in red.

Further, although in the third embodiment, a case has been described in which the user performs a predetermined operation on predetermined four places on the visual confirmation screen S with a finger to acquire four pieces of position data, the user may perform a predetermined operation on predetermined one, two, or three places on the visual confirmation screen S with a finger to acquire their position data. However, in this case, it is necessary to calculate data on the size of the visual confirmation screen S in advance by computation using the data of the original screen M corresponding to the visual confirmation screen S and store the calculated data in the storage unit 33. The reference data is composed of the acquired pieces of position data and the data on the size of the visual confirmation screen S.

Figure 21:
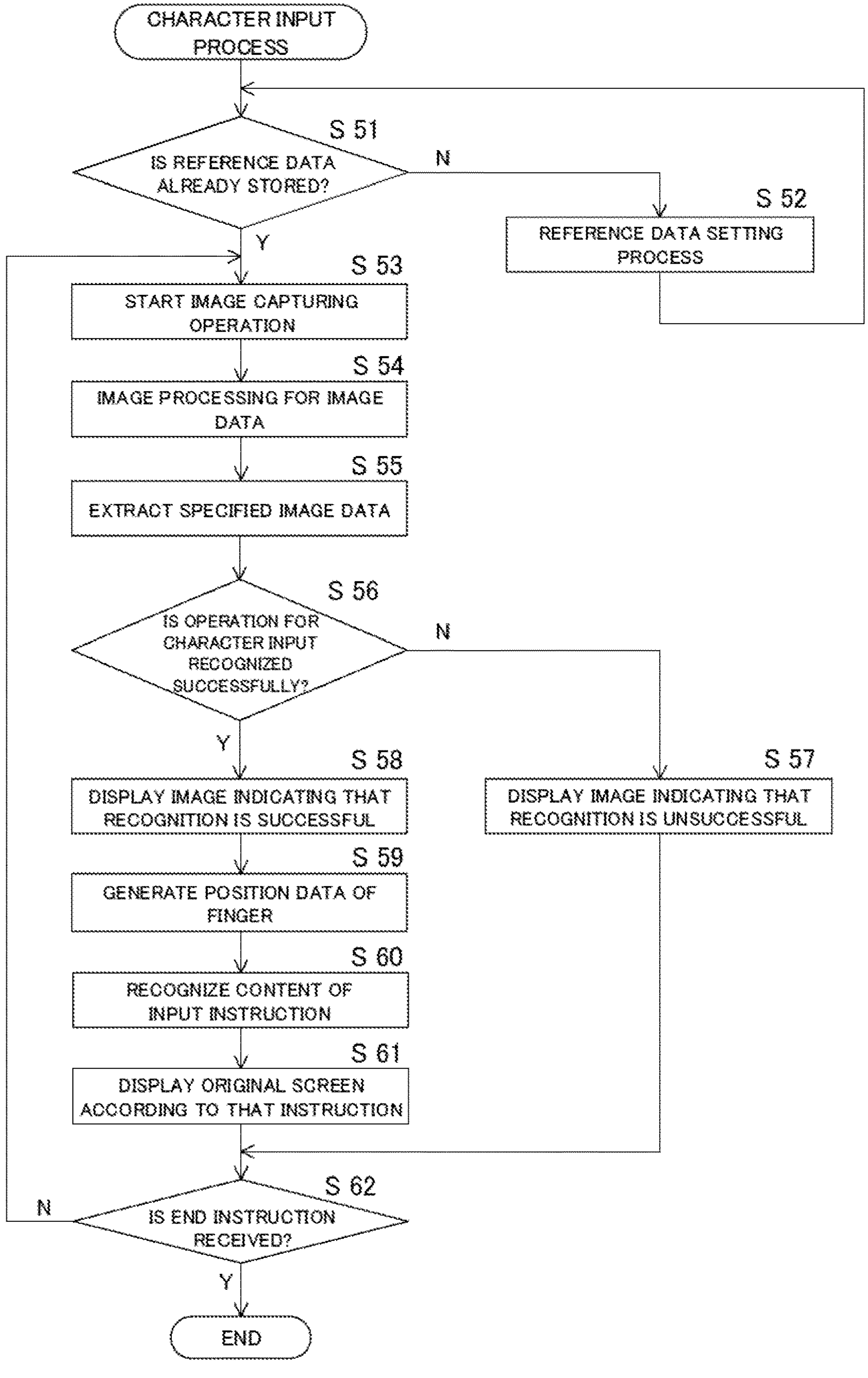
FIG. 21 is a flowchart of the procedure for a character input process using a visual confirmation screen in the terminal device according to the third embodiment.

Next, a character input process using the visual confirmation screen S in the terminal device 2A according to the third embodiment will be described. FIG. 21 is a flowchart of the procedure for the character input process using the visual confirmation screen S in the terminal device 2A according to the third embodiment. Now consider a case where the terminal 30A is executing the display apparatus control program. In other words, it is assumed that the display apparatus 20, the communication unit 40, and the image capturing apparatus 60 are in a power-on state, and the communication of the terminal 30A with the display apparatus 20 and the image capturing apparatus 60 is enabled.

The user operates the terminal 30A to display a menu screen on the display unit 31. Then, the user taps the icon for the character input processing program on the menu screen to select the character input processing program. In response to receiving a signal indicating that the character input processing program has been selected, the control unit 34A of the terminal 30A reads the character input processing program from the storage unit 33 to perform the character input process using the visual confirmation screen S according to the processing flow illustrated in FIG. 21. Note that the character input process may be executed automatically when the character input screen 200 is displayed on the display apparatus 20 as the original screen M.

First, the control unit 34A displays the character input screen 200 as the original screen M on the display apparatus 20, and determines whether or not the reference data on the visual confirmation screen S corresponding to the original screen M is stored in the storage unit 33 (S51). If the reference data on the visual confirmation screen S is not stored in the storage unit 33, the control unit 34A reads the reference data setting processing program from the storage unit 33 to perform the reference data setting process according to the processing flow illustrated in FIG. 19 (S52). After that, the process proceeds to step S51. In the third embodiment, the reference data setting process is executed if the reference data on the visual confirmation screen S is not stored in the storage unit 33. However, the reference data setting process may be executed to generate the reference data again in response to receiving an instruction from the user even if the reference data on the visual confirmation screen S is stored in the storage unit 33.

On the other hand, when it is determined in the process of step S51 that the reference data on the visual confirmation screen S is stored in the storage unit 33, the control unit 34A starts an image capturing operation of the image capturing apparatus 60 (S53). The user performs a predetermined operation, for example, a tap operation on the keyboard image 210 of the character input screen 200, which is the visual confirmation screen S, with a finger. Here, the reason why the user performs the predetermined operation is to inform the control unit 34A of the position on which the user performs the operation. Such an operation performed by the user is captured by the image capturing apparatus 60, and the image data thus obtained is transmitted to the image processing unit 62. Then, the image processing unit 62 performs predetermined image processing on the image data, and the image data subjected to the image processing is transmitted from the image capturing apparatus 60 to the control unit 34A through wireless communication (S54).

Next, the image data extraction unit 342 determines whether or not the subject is a finger based on the image data of the image captured by the image capturing apparatus 60 and thus extracts image data including an image of the finger (S55). In other words, the image data extraction unit 342 extracts image data in which the finger is at a substantially constant distance from the image capturing apparatus 60 along the Z-axis direction. Next, the operation determination unit 343 determines whether or not the operation performed with the finger is a predetermined operation (a tap operation as used herein) based on the image data extracted by the image data extraction unit 342. This determination is made within a predetermined time. Then, the operation determination unit 343 determines that the operation for character input is successfully recognized if the operation performed with the finger is a tap operation; the operation determination unit 343 determines that the operation for character input is unsuccessfully recognized if the operation performed with the finger is not a tap operation (S56). When the operation determination unit 343 determines that the operation for character input is successfully recognized, the operation determination unit 343 stores the data on the content of the operation performed with the finger in the storage unit 33, and also transmits to the display control unit 341 a signal indicating that the operation for character input is successfully recognized. In response to receiving the signal, the display control unit 341 adds to the original screen M an image of a green light indicating that the operation for character input is successfully recognized, and displays the resulting image on the display apparatus 20 (S58). Note that the display control unit 341 may add to the original screen M an image of characters or figures indicating that the operation for character input is successfully recognized, in addition to or instead of the image of a green light.

On the other hand, when the operation determination unit 343 determines in the process of step S56 that the operation for character input is unsuccessfully recognized within a predetermined time, the operation determination unit 343 transmits a signal indicating unsuccessful to the display control unit 341. At this time, for example, also when image data including an image of a finger is not transmitted from the image data extraction unit 342 within a predetermined time, the operation determination unit 343 determines that the tap operation is unsuccessfully recognized. In response to receiving the signal indicating unsuccessful, the display control unit 341 adds to the original screen M an image of a red light indicating that the operation for character input is unsuccessfully recognized, and displays the resulting image on the display apparatus 20 (S57). After that, the process proceeds to step S62. At this time, the display control unit 341 may add to the original screen M an image of characters or figures indicating that the operation for character input is unsuccessfully recognized, in addition to or instead of the image of a red light.

After the process of step S58, the position data generation unit 344 generates position data of a finger (fingertip) in the image capture range of the image capturing apparatus 60 based on the image data for which the operation determination unit 343 determines that the operation performed with the finger is a tap operation (S59). This generated position data of the finger is stored in the storage unit 33.

Next, the input control unit 346 recognizes a content of an input instruction corresponding to the operation performed with the finger, based on data on the content of the operation performed with the finger, obtained as determined by the operation determination unit 343, the position data of the finger generated by the position data generation unit 344, the reference data on the visual confirmation screen S stored in the storage unit 33, and the data on the original screen M corresponding to the visual confirmation screen S stored in the storage unit 33 (S60). For example, when the user performs a tap operation on a character key image in the keyboard image 210 with a finger, the input control unit 346 can retrieve which of the areas of the character key images in the keyboard image 210 corresponds to the position of the finger obtained from the position data of the finger, thus identify the character key on which the tap operation is performed, and then recognize an instruction issued to input the identified character key. After that, the input control unit 346 transmits a signal indicating the content of the recognized input instruction to the display control unit 341, and the display control unit 341 displays an original screen M corresponding to the content of the input instruction on the display apparatus 20 (S61).

After the process of step S61 or step S57, the control unit 34A determines whether or not an instruction to end the character input using the visual confirmation screen S has been received from the user (S62). If the instruction to end the character input has been received, the character input process using the visual confirmation screen S ends. Contrary to this, if the instruction to end the character input has not been received, the process proceeds to step S53 to continue the character input process using the visual confirmation screen S. The user operates the terminal 30A to issue the instruction to end the character input.

Figure 22:
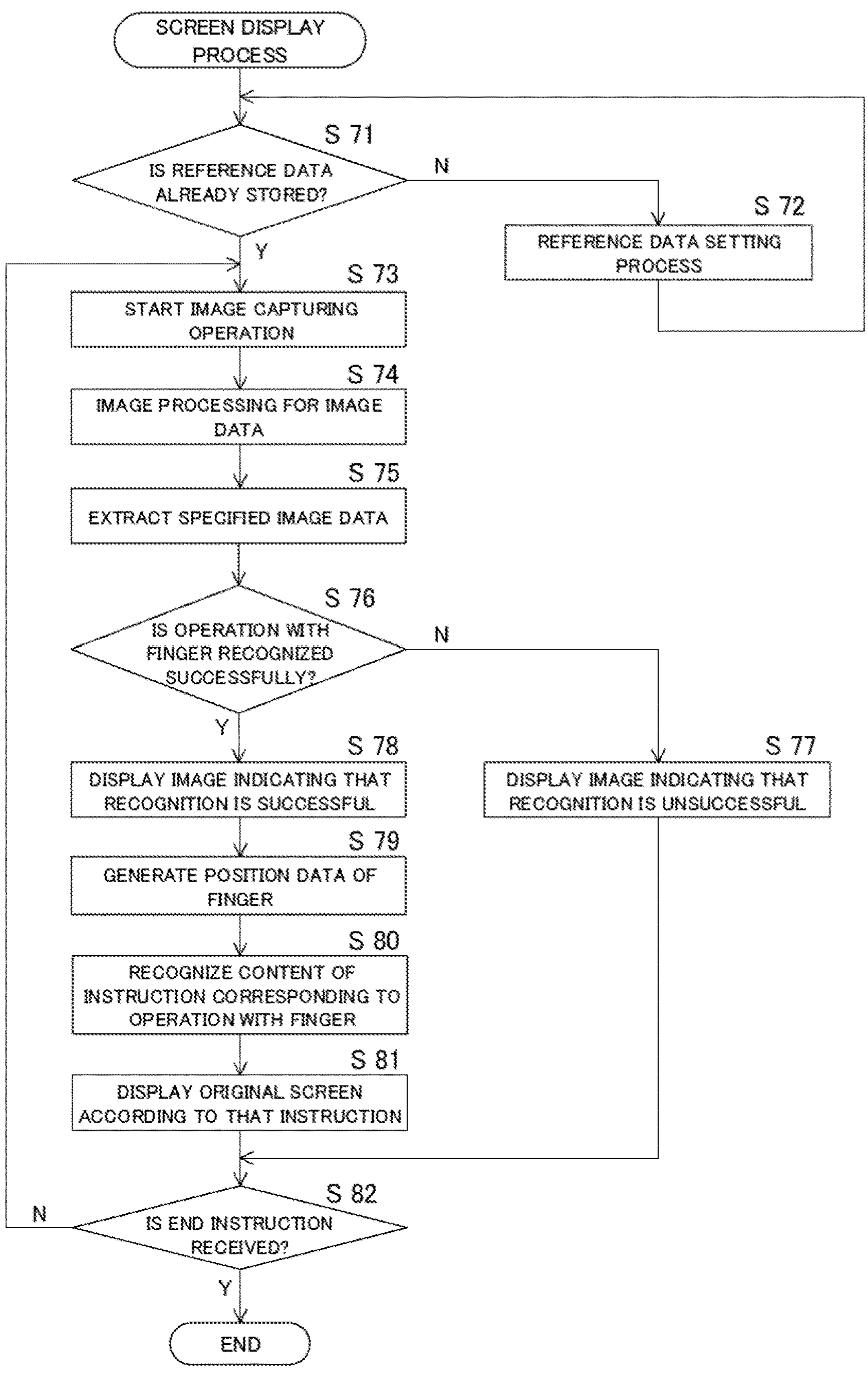
FIG. 22 is a flowchart of the procedure for a screen display process using a visual confirmation screen in the terminal device according to the third embodiment.

Next, a screen display process using the visual confirmation screen S in the terminal device 2A according to the third embodiment will be described. FIG. 22 is a flowchart of the procedure for the screen display process using the visual confirmation screen S in the terminal device 2A according to the third embodiment. Now consider a case where the terminal 30A is executing the display apparatus control program. In other words, it is assumed that the display apparatus 20, the communication unit 40, and the image capturing apparatus 60 are in a power-on state, and the communication of the terminal 30A with the display apparatus 20 and the image capturing apparatus 60 is enabled.

The user operates the terminal 30A to display a menu screen on the display unit 31. Then, the user taps the icon for the screen display processing program on the menu screen to select the screen display processing program. In response to receiving a signal indicating that the screen display processing program has been selected, the control unit 34A of the terminal 30A reads the screen display processing program from the storage unit 33 to perform the screen display process using the visual confirmation screen S according to the processing flow illustrated in FIG. 22. The screen display process may be executed automatically when the original screen M is displayed on the display apparatus 20.

First, the user operates the terminal 30A to display a desired screen on the display apparatus 20. The control unit 34A determines whether or not the reference data on the visual confirmation screen S corresponding to the displayed screen (original screen M) is stored in the storage unit 33 (S71). If the reference data on the visual confirmation screen S is not stored in the storage unit 33, the control unit 34A reads the reference data setting processing program from the storage unit 33 to perform the reference data setting process according to the processing flow illustrated in FIG. 19 (S72). After that, the process proceeds to step S71. In the third embodiment, the reference data setting process is executed if the reference data on the visual confirmation screen S is not stored in the storage unit 33. However, the reference data setting process may be executed to generate the reference data again in response to receiving an instruction from the user even if the reference data on the visual confirmation screen S is stored in the storage unit 33.

On the other hand, when it is determined in the process of step S71 that the reference data on the visual confirmation screen S is stored in the storage unit 33, the control unit 34A starts an image capturing operation of the image capturing apparatus 60 (S73). The user performs a desired operation on the visual confirmation screen S with a finger. Such an operation performed by the user is captured by the image capturing apparatus 60, and the image data thus obtained is transmitted to the image processing unit 62. Then, the image processing unit 62 performs predetermined image processing on the image data, and the image data subjected to the image processing is transmitted from the image capturing apparatus 60 to the control unit 34A through wireless communication (S74).

Next, the image data extraction unit 342 determines whether or not the subject is a finger based on the image data of the image captured by the image capturing apparatus 60 and thus extracts image data including an image of the finger (S75). In other words, the image data extraction unit 342 extracts image data in which the finger is at a substantially constant distance from the image capturing apparatus 60 along the Z-axis direction. Next, the operation determination unit 343 determines the content of the operation performed with the finger based on the image data extracted by the image data extraction unit 342. Then, the operation determination unit 343 determines whether or not the operation performed with the finger is successfully recognized (S76). When the operation determination unit 343 determines that the operation performed with the finger is successfully recognized, the operation determination unit 343 stores the data on the content of the operation performed with the finger in the storage unit 33, and also transmits to the display control unit 341 a signal indicating that the operation performed with the finger is successfully recognized. In response to receiving the signal, the display control unit 341 adds to the original screen M an image of a green light indicating that the operation performed with the finger is successfully recognized, and displays the resulting image on the display apparatus 20 (S78). The display control unit 341 may add to the original screen M an image of characters or figures indicating that the operation performed with the finger is successfully recognized, in addition to or instead of the image of a green light.

On the other hand, when the operation determination unit 343 determines in the process of step S76 that the operation performed with the finger is unsuccessfully recognized, the operation determination unit 343 transmits a signal indicating unsuccessful to the display control unit 341. At this time, for example, also when image data including an image of a finger is not transmitted from the image data extraction unit 342 within a predetermined time, the operation determination unit 343 determines that the tap operation is unsuccessfully recognized. In response to receiving the signal, the display control unit 341 adds to the original screen M an image of a red light indicating that the operation performed with the finger is unsuccessfully recognized, and displays the resulting image on the display apparatus 20 (S77). After that, the process proceeds to step S82. At this time, the display control unit 341 may add to the original screen M an image of characters or figures indicating that the operation performed with the finger is unsuccessfully recognized, in addition to or instead of the image of a red light.

After the process of step S78, the position data generation unit 344 generates position data of a finger (fingertip) in the image capture range of the image capturing apparatus 60 based on the image data for which the operation determination unit 343 determines the content of the operation performed with the finger (S79). This generated position data of the finger is stored in the storage unit 33.

Next, the input control unit 346 recognizes a content of an instruction corresponding to the operation performed with the finger, based on data on the content of the operation performed with the finger, obtained as determined by the operation determination unit 343, the position data of the finger generated by the position data generation unit 344, the reference data on the visual confirmation screen S stored in the storage unit 33, and the data on the original screen M corresponding to the visual confirmation screen S stored in the storage unit 33 (S80). For example, when the user performs a double tap operation on the visual confirmation screen S with a finger, the input control unit 346 identifies that this operation is a double tap operation, and recognizes that an instruction to enlarge (or reduce) the original screen M has been received. After that, the input control unit 346 transmits a signal indicating the content of the recognized instruction to the display control unit 341, and the display control unit 341 displays an original screen M corresponding to the content of the instruction on the display apparatus 20 (S81).

After the process of step S81 or step S77, the control unit 34A determines whether or not an instruction to end the operation for screen display using the visual confirmation screen S has been received from the user (S82). If the instruction to end the operation for screen display has been received, the screen display process using the visual confirmation screen S ends. Contrary to this, if the instruction to end the operation for screen display has not been received, the process proceeds to step S73 to continue the screen display process using the visual confirmation screen S. The user operates the terminal 30A to issue the instruction to end the operation for screen display using the visual confirmation screen S.

The terminal device according to the third embodiment has the same functions and advantageous effects as the first embodiment. In other words, in the terminal device according to the third embodiment, the terminal is separate from the pair of glasses serving as a wearable object. Therefore, for example, an existing mobile terminal such as a smartphone or a tablet terminal can be used as the terminal. Such a use of an existing mobile terminal or the like as the terminal makes it possible to reduce the number of parts of the pair of glasses serving as a wearable object, resulting in a simplified pair of glasses. In addition, the use of a commercially available smartphone or the like as the terminal makes it possible to perform the operation using such a smartphone or the like that is familiar to the user, so that the operability can be improved.

In particular, in the terminal device according to the third embodiment, the input control unit of the terminal is configured to, when the user performs an operation on the visual confirmation screen with a finger, recognize a content of an input instruction corresponding to the operation performed with the finger, based on data on the content of the operation performed with the finger, obtained as determined by the operation determination unit, the position data of the finger generated by the position data generation unit, the reference data on the visual confirmation screen stored in the storage unit, and the data on the original screen corresponding to the visual confirmation screen stored in the storage unit; and control the original screen to be displayed on the display apparatus, according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the terminal device according to the third embodiment makes it possible for the user to easily and accurately perform character input operations and various screen operations such as enlargement and reduction by operating the visual confirmation screen in the same manner as in typical smartphones terminal or tablet terminals.

In the terminal device according to the third embodiment, it is desirable that the terminal has a function of controlling the image capturing apparatus to adjust the image capture range of the image capturing apparatus, and a function of controlling the image capturing apparatus to adjust a depth of field that is a range in a depth direction in which a subject is in focus. By using these functions to limit a target to be captured by the image capturing apparatus to only the finger operated on the visual confirmation screen, the privacy of others can be protected.

Fourth Embodiment

Figure 23:
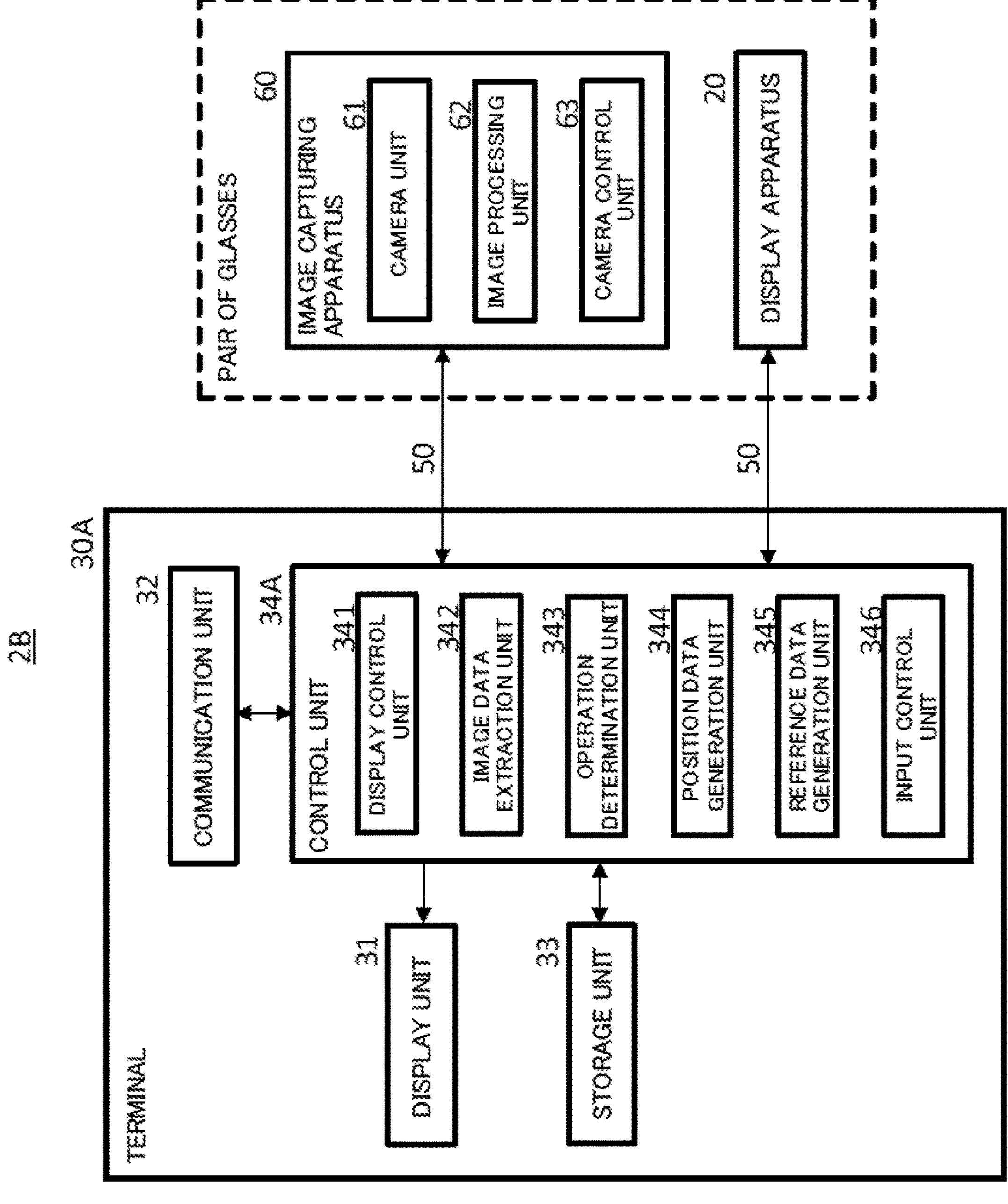
FIG. 23 is a schematic block diagram of a terminal device according to a fourth embodiment of the present invention.

Next, a terminal device according to a fourth embodiment of the present invention will be described. FIG. 23 is a schematic block diagram of the terminal device according to the fourth embodiment of the present invention. In the fourth embodiment, the apparatuses/units having the same functions as those of the third embodiment described above are designated by the same reference numerals, and detailed description thereof will be omitted.

As illustrated in FIG. 23, the terminal device 2B according to the fourth embodiment includes the pair of glasses 10 serving as a wearable object to be mounted on the head of the user, the display apparatus 20 mounted on the pair of glasses 10, the terminal 30A being separate from the pair of glasses 10 and including the display unit 31, one or more cables 50, and the image capturing apparatus 60 for capturing an image in front of the user. The cables 50 connect between the display apparatus 20 and the terminal 30A and between the image capturing apparatus 60 and the terminal 30A.

The terminal device 2B according to the fourth embodiment mainly differs from the terminal device 2A according to the third embodiment in that the display apparatus 20 and the image capturing apparatus 60 are connected to the terminal 30A by wire using the cables 50 instead of wireless connection. The other configurations of the terminal device 2B according to the fourth embodiment are the same as those of the terminal device 2A according to the third embodiment.

The terminal 30A has connection terminals (not illustrated) as interfaces, and the cables 50 are connected to the connection terminals. The electric power to the display apparatus 20 and the image capturing apparatus 60 is supplied from the terminal 30A via the cables 50.

Also in the fourth embodiment, when the user operates the terminal 30A to issue an instruction to start the display apparatus control program, the control unit 34A of the terminal 30A executes the display apparatus control program to display on the display apparatus 20 the content of the screen displayed on the display unit 31 as the content of the original screen M. The process of displaying a screen on the display apparatus 20 in accordance with the display apparatus control program in the terminal device 2B according to the fourth embodiment is the same as the processing in the terminal device 1B according to the second embodiment. Therefore, detailed description thereof is omitted here.

Further, the user can perform the reference data setting process, the character input process using the visual confirmation screen S, or the screen display process using the visual confirmation screen S during the execution of the display apparatus control program. The procedures of these processes in the terminal device 2B according to the fourth embodiment are the same as the processing flows illustrated in FIGS. 19, 21, and 22 in the third embodiment. Therefore, detailed description thereof is omitted here.

The terminal device according to the fourth embodiment has the same functions and advantageous effects as the terminal device according to the third embodiment.

Fifth Embodiment

Next, a terminal device according to a fifth embodiment of the present invention will be described. FIG. 24 is a schematic block diagram of the terminal device according to the fifth embodiment of the present invention. A schematic perspective view of the terminal device according to the fifth embodiment is substantially the same as the schematic perspective view of the terminal device according to the third embodiment illustrated in FIG. 13, except that some components are not illustrated. Thus, FIG. 13 is now referred to as the schematic perspective view of the terminal device according to the fifth embodiment. In the fifth embodiment, the apparatuses/units having the same functions as those of the third embodiment are designated by the same reference numerals, and detailed description thereof will be omitted.

As illustrated in FIGS. 13 and 24, the terminal device 3A according to the fifth embodiment includes the pair of glasses 10 serving as a wearable object to be mounted on the head of the user, the display apparatus 20 mounted on the pair of glasses 10, the terminal 30A being separate from the pair of glasses 10 and including the display unit 31, the communication unit 40, the image capturing apparatus 60 for capturing an image in front of the user, a microphone unit (sound input device) 70, and a speaker unit (sound output device) 80.

The terminal device 3A according to the fifth embodiment mainly differs from the terminal device 2A according to the third embodiment in that the terminal device 3A includes the microphone unit 70 and the speaker unit 80, and the terminal 30A controls the microphone unit 70 and the speaker unit 80. The other configurations of the terminal device 3A are the same as those of the third embodiment.

The microphone unit 70 and the speaker unit 80 are provided on a temple portion of the pair of glasses 10. In FIG. 13, the microphone unit 70 and the speaker unit 80 are not illustrated. The microphone unit 70 converts a voice of the user into an electrical signal and outputs the electrical signal to the terminal 30A. By using the microphone unit 70, the terminal 30A can be operated according to a voice instruction of the user. The electrical signal indicating the voice input from the microphone unit 70 is transmitted to the control unit 34A of the terminal 30A via the communication unit 40, and the control unit 34A analyzes the content of the electrical signal. Further, the speaker unit 80 is of a bone conduction type that converts an electric signal output from the terminal 30A into sound and transmits the sound to the user by vibration of bones. In general, the speaker unit 80 is not limited to transmitting sound to the user by utilizing vibration of bones, and may be a normal speaker, earphone, headphone, or the like, which transmits sound to the user through the user's ears.

When a voice is input from the microphone unit 70, the control unit 34A recognizes the content of the electrical signal indicating the input voice, and executes processing according to the recognized content. For example, when the user issues a voice instruction through the microphone unit 70 to display a desired screen, the display control unit 341 displays the screen indicated by the instruction on the display unit 31. Further, when the user issues a voice instruction to execute a desired application program (e.g., the display apparatus control program, the reference data setting processing program, the character input processing program, and the screen display processing program) through the microphone unit 70, the control unit 34A reads the application program indicated by the instruction from the storage unit 33 to execute the application program. In addition, when the user issues a voice instruction to end the application program currently being executed (e.g., the display apparatus control program, the reference data setting processing program, the character input processing program, and the screen display processing program) through the microphone unit 70, the control unit 34A ends the execution of the application program indicated by the instruction.

Further, the control unit 34A controls the sound output from the speaker unit 80. For example, when there is information to be notified to the user during the execution of a certain application program, the control unit 34A can display the information on the display unit 31 and outputs a sound corresponding to the information from the speaker unit 80.

The terminal device according to the fifth embodiment has the same functions and advantageous effects as the third embodiment. In particular, in the terminal device according to the fifth embodiment, the microphone unit and the speaker unit being provided on the pair of glasses make it possible for the user to issue an instruction to the terminal through the microphone unit without operating the terminal, and also to obtain information from the terminal as a sound through the speaker unit.

Sixth Embodiment

Next, a terminal device according to a sixth embodiment of the present invention will be described. FIG. 25 is a schematic block diagram of the terminal device according to the sixth embodiment of the present invention. In the sixth embodiment, the apparatuses/units having the same functions as those of the fifth embodiment described above are designated by the same reference numerals, and detailed description thereof will be omitted.

As illustrated in FIG. 25, the terminal device 3B according to the sixth embodiment includes the pair of glasses 10 serving as a wearable object to be mounted on the head of the user, the display apparatus 20 mounted on the pair of glasses 10, the terminal 30A being separate from the pair of glasses 10 and including the display unit 31, one or more cables 50, the image capturing apparatus 60 for capturing an image in front of the user, the microphone unit 70, and the speaker unit 80. The cables 50 connect the display apparatus 20, the image capturing apparatus 60, the microphone unit 70, and the speaker unit 80 to the terminal 30A.

The terminal device 3B according to the sixth embodiment mainly differs from the terminal device 3A according to the fifth embodiment in that the display apparatus 20, the image capturing apparatus 60, the microphone unit 70, and the speaker unit 80 are connected to the terminal 30A by wire using the cables 50 instead of wireless connection. The other configurations of the terminal device 3B according to the sixth embodiment are the same as those of the terminal device 3A according to the fifth embodiment.

The terminal 30A has connection terminals (not illustrated) as interfaces, and the cables 50 are connected to the connection terminals. The electric power to the display apparatus 20, the image capturing apparatus 60, the microphone unit 70, and the speaker unit 80 is supplied from the terminal 30A via the cables 50.

The terminal device according to the sixth embodiment has the same functions and advantageous effects as the fifth embodiment described above.

Seventh Embodiment

Figure 26:
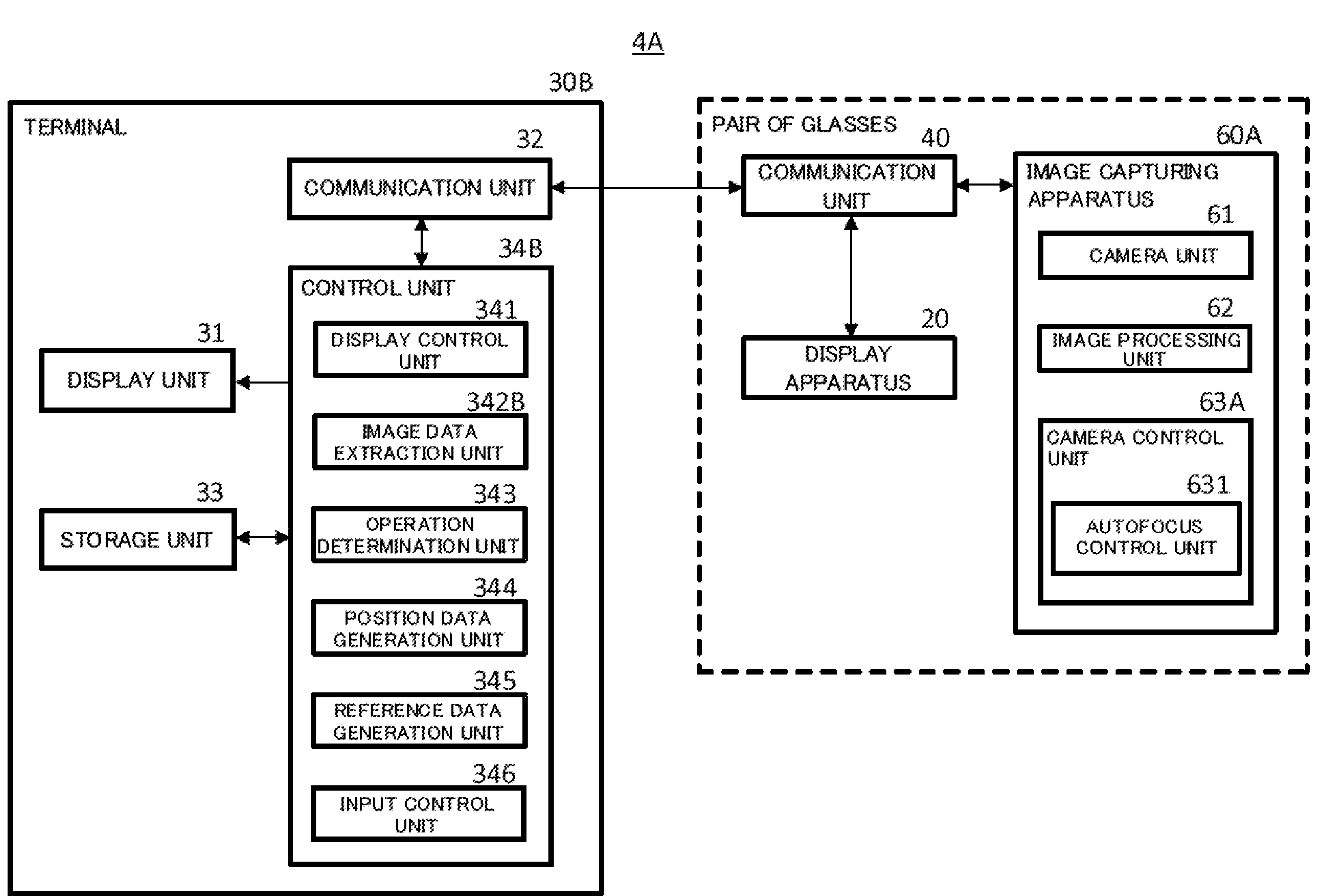
FIG. 26 is a schematic block diagram of a terminal device according to a seventh embodiment of the present invention.

Next, a terminal device according to a seventh embodiment of the present invention will be described. FIG. 26 is a schematic block diagram of the terminal device according to the seventh embodiment of the present invention. A schematic perspective view of the terminal device according to the seventh embodiment is substantially the same as the schematic perspective view of the terminal device according to the third embodiment illustrated in FIG. 13. Thus, FIG. 13 is now referred to as the schematic perspective view of the terminal device according to the seventh embodiment. In the seventh embodiment, the apparatuses/units having the same functions as those of the third embodiment are designated by the same reference numerals, and detailed description thereof will be omitted.

As illustrated in FIGS. 13 and 26, the terminal device 4A according to the seventh embodiment includes the pair of glasses 10, the display apparatus 20 mounted on the pair of glasses 10, a terminal 30B being separate from the pair of glasses 10 and including the display unit 31, the communication unit 40, and an image capturing apparatus 60A for capturing an image in front of the user. Further, the terminal 30B includes the display unit 31, the communication unit 32, the storage unit 33, and a control unit 34B, and the control unit 34B includes the display control unit 341, an image data extraction unit 342B, the operation determination unit 343, the position data generation unit 344, the reference data generation unit 345, and the input control unit 346. Furthermore, the image capturing apparatus 60A includes the camera unit 61, the image processing unit 62, and a camera control unit 63A including an autofocus control unit 631.

The terminal device 4A according to the seventh embodiment mainly differs from the terminal device 2A according to the third embodiment in that the camera control unit 63A of the image capturing apparatus 60A includes the autofocus control unit 631, and the image data extraction unit 342B extracts, from among image data transmitted from the image capturing apparatus 60A to the terminal 30B through wireless communication, image data in which a subject is a finger and the finger is at a substantially constant distance from the image capturing apparatus 60A along the Z-axis direction.

The autofocus control unit 631 is configured to control the camera unit 61 so as to automatically focus on a subject at a predetermined position within the image capture range. In the seventh embodiment, the image capturing apparatus 60A has a large number of focus points so that it can automatically focus on any position within the image capture range. Therefore, when the user performs an operation on the visual confirmation screen S with a finger, the image capturing apparatus 60A can automatically focus on the finger with which the operation is being performed and capture an image of the finger in a focused state. In addition, when the image of the automatically focused subject is captured, the autofocus control unit 631 calculates data on a distance to the captured subject. This calculated distance data is associated with the corresponding image data. The image data of the image captured by the image capturing apparatus 60A and the distance data associated with the image data are transmitted to the control unit 34B of the terminal 30B. Note that the autofocus method may be an active method in which the subject is irradiated with infrared rays, ultrasonic waves, or the like and the distance to the subject is detected by the time that the reflected wave takes to return and the irradiation angle, or a passive method such as a phase difference detection method or a contrast detection method in which distance measurement is performed by using an image captured by the lens part of the camera unit 61.

Further, the image data extraction unit 342B is configured to, when the image capturing apparatus 60A captures an image of a subject in focus in response to the user operating the visual confirmation screen S with a finger, determine based on image data of the captured image whether or not the subject is a finger, determine based on the distance data associated with the image data of the captured image whether or not the subject is at a substantially constant distance, which is determined in advance, from the image capturing apparatus 60A along the Z-axis direction, and thus extract image data in which the subject is a finger and the finger is at the substantially constant distance from the image capturing apparatus 60A along the Z-axis direction. A general image recognition method is used to determine whether or not the subject is a finger in the same manner as in the third embodiment. Further, the substantially constant distance as referred to in determining whether or not the subject is at the substantially constant distance from the image capturing apparatus 60A along the Z-axis direction is a distance between the image capturing apparatus 60A and the position of the visual confirmation screen S recognized by the user in the Z-axis direction. For example, when the user recognizes the visual confirmation screen S at a position about 40 cm away from the image capturing apparatus 60A, the substantially constant distance is set to a distance within a range of about 40 cm±5 cm from the image capturing apparatus 60A. In this way, the image data extraction unit 342B excludes image data of a finger with which an operation is being performed at a position extremely in front or back of the position where the visual confirmation screen S is displayed, so that image data of a finger with which an appropriate operation is being performed on the visual confirmation screen S can be extracted. The operation determination unit 343, the position data generation unit 344, and the reference data generation unit 345 perform processing based on the image data extracted by the image data extraction unit 342B.

Similarly to the third embodiment, the reference data generation unit 345 is configured to, when the user performs an operation at one or more predetermined positions on the visual confirmation screen S with a finger, generate, as the reference data, data on the visual confirmation screen S by using the position data of the finger generated by the position data generation unit 344 based on the image data for which the operation determination unit 343 determines that the operation performed at each of the predetermined positions is a predetermined operation. For example, when the user performs an operation with a finger on the four corners of the outer frame of the visual confirmation screen S, position data of the finger at each position of the four corners can be used as the reference data. As described above, also in the seventh embodiment, since the image data extracted by the image data extraction unit 342B is of a captured image of a finger that is at a substantially constant distance from the image capturing apparatus 60A along the Z-axis direction, the position data of the finger at each position of the four corners can be considered to represent position information of the finger on a plane parallel to the XY plane (substantially parallel to the user's body) at the substantially constant distance from the image capturing apparatus 60A along the Z-axis direction.

Next, a process of setting reference data in the terminal device 4A according to the seventh embodiment will be described.

The flowchart of the procedure of the reference data setting process in the terminal device 4A according to the seventh embodiment is substantially the same as that of the third embodiment illustrated in FIG. 19. The reference data setting process in the seventh embodiment differs from the reference data setting process in the third embodiment in the processing (steps S32 and S33) in the image capturing apparatus 60A and the image data extraction process (step S34) in the image data extraction unit 342B. Thus, in the following, matters of the reference data setting process in the seventh embodiment that differ from the reference data setting process in the third embodiment will be described with reference to the flowchart illustrated in FIG. 19. Now consider a case where the terminal 30B is executing the display apparatus control program. Specifically, it is assumed that the display apparatus 20, the communication unit 40, and the image capturing apparatus 60A are in a power-on state, and the communication of the terminal 30B with the display apparatus 20 and the image capturing apparatus 60A is enabled.

After the process of step S31, the control unit 34B starts an image capturing operation of the image capturing apparatus 60A (S32). When the user sees the character input screen 201 illustrated in FIG. 20B as the visual confirmation screen S for setting reference data, the user performs a predetermined operation, for example, a tap operation, on each circle to which a number is assigned with a finger in order of the numbers on the visual confirmation screen S for setting reference data. Such a user operation is captured by the image capturing apparatus 60A. At this time, the autofocus control unit 631 controls the camera unit 61 so as to automatically focus on a subject within the image capture range so that the image capturing apparatus 60A can capture an image of the subject in focus. In addition, when the image of the automatically focused subject is captured, the autofocus control unit 631 calculates data on a distance to the captured subject, and associates the calculated distance data with the corresponding image data. The image data of the captured image is transmitted to the image processing unit 62, and the image processing unit 62 performs predetermined image processing on the image data. Then, the image data subjected to the image processing and the distance data associated with the image data are transmitted from the image capturing apparatus 60A to the control unit 34B of the terminal 30B through wireless communication (S33).

In step S34, the image data extraction unit 342B first determines whether or not the subject is a finger based on the image data of the image captured by the image capturing apparatus 60A and thus extracts image data including an image of the finger. After that, the image data extraction unit 342B determines whether or not the subject is at a substantially constant distance from the image capturing apparatus 60A along the Z-axis direction based on the distance data associated with the extracted image data including the image of the finger, and thus extracts image data in which the subject is a finger and the finger is at the substantially constant distance from the image capturing apparatus 60A along the Z-axis direction. In the reference data setting process in the seventh embodiment, the contents of step S35 and the subsequent steps are the same as those in the third embodiment.

Next, a character input process using the visual confirmation screen S in the terminal device 4A according to the seventh embodiment will be described.

The flowchart of the procedure of the character input process using the visual confirmation screen S in the terminal device 4A according to the seventh embodiment is substantially the same as that of the third embodiment illustrated in FIG. 21. The character input process using the visual confirmation screen S in the seventh embodiment differs from the character input process using the visual confirmation screen S in the third embodiment in the processing (steps S53 and S54) in the image capturing apparatus 60A and the image data extraction process (step S55) in the image data extraction unit 342B. Thus, in the following, matters of the character input process using the visual confirmation screen S in the seventh embodiment that differ from the character input process using the visual confirmation screen S in the third embodiment will be described with reference to the flowchart illustrated in FIG. 21. Now consider a case where the terminal 30B is executing the display apparatus control program. Specifically, it is assumed that the display apparatus 20, the communication unit 40, and the image capturing apparatus 60A are in a power-on state, and the communication of the terminal 30B with the display apparatus 20 and the image capturing apparatus 60A is enabled.

When it is determined in the process of step S51 that the reference data on the visual confirmation screen S is stored in the storage unit 33, the control unit 34B starts an image capturing operation of the image capturing apparatus 60A (S53). The user performs a predetermined operation, for example, a tap operation on the keyboard image 210 of the character input screen 200, which is the visual confirmation screen S, with a finger. Such a user operation is captured by the image capturing apparatus 60A. At this time, the autofocus control unit 631 controls the camera unit 61 so as to automatically focus on a subject within the image capture range so that the image capturing apparatus 60A can capture an image of the subject in focus. In addition, when the image of the automatically focused subject is captured, the autofocus control unit 631 calculates data on a distance to the captured subject, and associates the calculated distance data with the corresponding image data. The image data of the captured image is transmitted to the image processing unit 62, and the image processing unit 62 performs predetermined image processing on the image data. Then, the image data subjected to the image processing and the distance data associated with the image data are transmitted from the image capturing apparatus 60A to the control unit 34B of the terminal 30B through wireless communication (S54).

In step S55, the image data extraction unit 342B first determines whether or not the subject is a finger based on the image data of the image captured by the image capturing apparatus 60A and thus extracts image data including an image of the finger. After that, the image data extraction unit 342B determines whether or not the subject is at a substantially constant distance from the image capturing apparatus 60A along the Z-axis direction based on the distance data associated with the extracted image data including the image of the finger, and thus extracts image data in which the subject is a finger and the finger is at the substantially constant distance from the image capturing apparatus 60A along the Z-axis direction. In the character input process in the seventh embodiment, the contents of step S56 and the subsequent steps are the same as those in the third embodiment.

Next, a screen display process using the visual confirmation screen S in the terminal device 4A according to the seventh embodiment will be described.

The flowchart of the procedure of the screen display process using the visual confirmation screen S in the terminal device 4A according to the seventh embodiment is substantially the same as that of the third embodiment illustrated in FIG. 22. The screen display process using the visual confirmation screen S in the seventh embodiment differs from the screen display process using the visual confirmation screen S in the third embodiment in the processing (steps S73 and S74) in the image capturing apparatus 60A and the image data extraction process (step S75) in the image data extraction unit 342B. Thus, in the following, matters of the screen display process using the visual confirmation screen S in the seventh embodiment that differ from the screen display process using the visual confirmation screen S in the third embodiment will be described with reference to the flowchart illustrated in FIG. 22. Now consider a case where the terminal 30B is executing the display apparatus control program. Specifically, it is assumed that the display apparatus 20, the communication unit 40, and the image capturing apparatus 60A are in a power-on state, and the communication of the terminal 30B with the display apparatus 20 and the image capturing apparatus 60A is enabled.

When it is determined in the process of step S71 that the reference data on the visual confirmation screen S is stored in the storage unit 33, the control unit 34B starts an image capturing operation of the image capturing apparatus 60A (S73). The user performs a desired operation on the visual confirmation screen S with a finger. Such a user operation is captured by the image capturing apparatus 60A. At this time, the autofocus control unit 631 controls the camera unit 61 so as to automatically focus on a subject within the image capture range so that the image capturing apparatus 60A can capture an image of the subject in focus. In addition, when the image of the automatically focused subject is captured, the autofocus control unit 631 calculates data on a distance to the captured subject, and associates the calculated distance data with the corresponding image data. The image data of the captured image is transmitted to the image processing unit 62, and the image processing unit 62 performs predetermined image processing on the image data. Then, the image data subjected to the image processing and the distance data associated with the image data are transmitted from the image capturing apparatus 60A to the control unit 34B of the terminal 30B through wireless communication (S74).

In step S75, the image data extraction unit 342B first determines whether or not the subject is a finger based on the image data of the image captured by the image capturing apparatus 60A and thus extracts image data including an image of the finger. After that, the image data extraction unit 342B determines whether or not the subject is at a substantially constant distance from the image capturing apparatus 60A along the Z-axis direction based on the distance data associated with the extracted image data including the image of the finger, and thus extracts image data in which the subject is a finger and the finger is at the substantially constant distance from the image capturing apparatus 60A along the Z-axis direction. In the screen display process in the seventh embodiment, the contents of step S76 and the subsequent steps are the same as those in the third embodiment.

The terminal device according to the seventh embodiment has the same functions and advantageous effects as the terminal device according to the third embodiment. In particular, in the seventh embodiment, the image capturing apparatus includes the autofocus control unit that can automatically focus on a subject, and when an image of the subject automatically focused by the autofocus control unit is captured, the autofocus control unit calculates data on a distance to the captured subject, and outputs the calculated distance data together with the corresponding image data of the captured image, so that an image of the subject can be captured with the finger (fingertip), which is the subject, in more accurate focus. Accordingly, the control unit can generate more accurate reference data and perform more accurately the character input process and the like, based on the image data of the captured image and the distance data.

Eighth Embodiment

Figure 27:
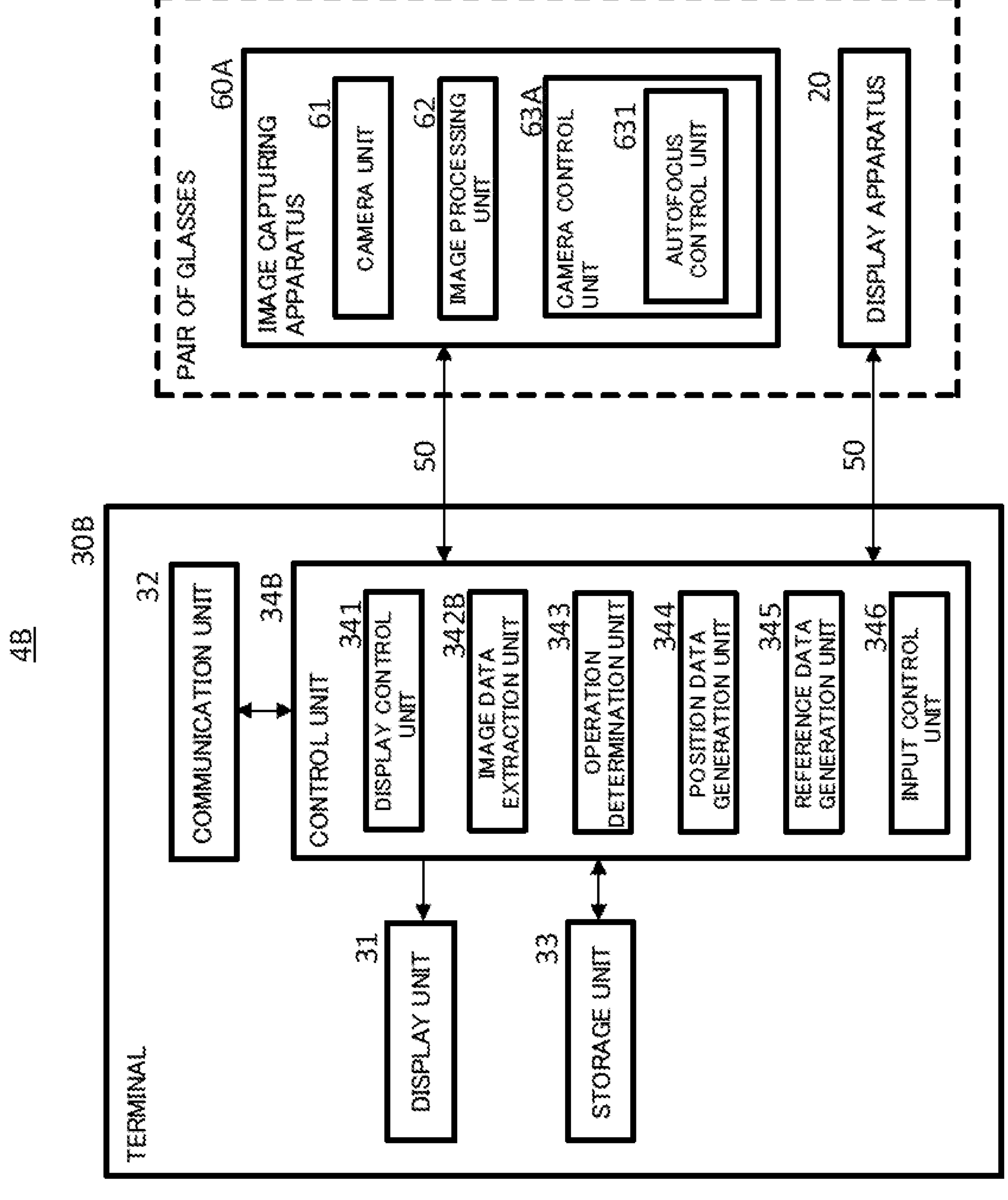
FIG. 27 is a schematic block diagram of a terminal device according to an eighth embodiment of the present invention.

Next, a terminal device according to an eighth embodiment of the present invention will be described. FIG. 27 is a schematic block diagram of the terminal device according to the eighth embodiment of the present invention. In the eighth embodiment, the apparatuses/units having the same functions as those of the seventh embodiment described above are designated by the same reference numerals, and detailed description thereof will be omitted.

As illustrated in FIG. 27, the terminal device 4B according to the eighth embodiment includes the pair of glasses 10, the display apparatus 20 mounted on the pair of glasses 10, the terminal 30B being separate from the pair of glasses 10 and including the display unit 31, one or more cables 50, and the image capturing apparatus 60A for capturing an image in front of the user. The cables 50 connect the display apparatus 20 and the image capturing apparatus 60A to the terminal 30B.

The terminal device 4B according to the eighth embodiment mainly differs from the terminal device 4A according to the seventh embodiment in that the display apparatus 20 and the image capturing apparatus 60A are connected to the terminal 30B by wire using the cables 50 instead of wireless connection. The other configurations of the terminal device 4B according to the eighth embodiment are the same as those of the terminal device 4A according to the seventh embodiment.

The terminal 30B has connection terminals (not illustrated) as interfaces. The cables 50 are connected to the connection terminals. The electric power to the display apparatus 20 and the image capturing apparatus 60A is supplied from the terminal 30B via the cables 50.

The terminal device according to the eighth embodiment has the same functions and advantageous effects as the seventh embodiment described above.

Ninth Embodiment

Figure 28:
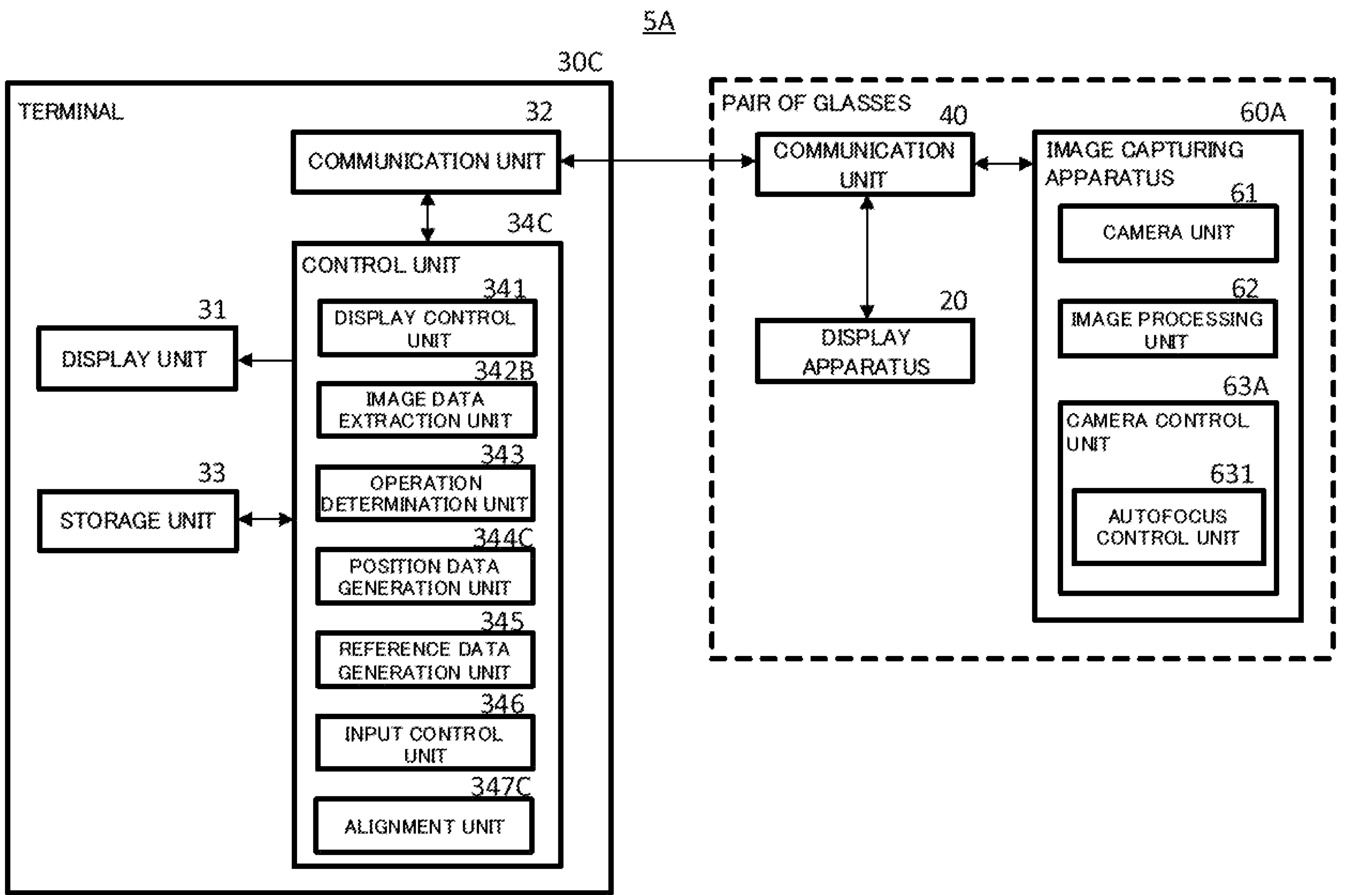
FIG. 28 is a schematic block diagram of a terminal device according to a ninth embodiment of the present invention.

Next, a terminal device according to a ninth embodiment of the present invention will be described. FIG. 28 is a schematic block diagram of the terminal device according to the ninth embodiment of the present invention. A schematic perspective view of the terminal device according to the ninth embodiment is substantially the same as the schematic perspective view of the terminal device according to the third embodiment illustrated in FIG. 13. Thus, FIG. 13 is now referred to as the schematic perspective view of the terminal device according to the ninth embodiment. In the ninth embodiment, the apparatuses/units having the same functions as those of the seventh embodiment described above are designated by the same reference numerals, and detailed description thereof will be omitted.

As illustrated in FIGS. 13 and 28, the terminal device 5A according to the ninth embodiment includes the pair of glasses 10, the display apparatus 20 mounted on the pair of glasses 10, a terminal 30C being separate from the pair of glasses 10 and including the display unit 31, the communication unit 40, and the image capturing apparatus 60A for capturing an image in front of the user. Further, the terminal 30C includes the display unit 31, the communication unit 32, the storage unit 33, and a control unit 34C, and the control unit 34C includes the display control unit 341, the image data extraction unit 342B, the operation determination unit 343, a position data generation unit 344C, the reference data generation unit 345, the input control unit 346, and an alignment unit 347C.

The terminal device 5A according to the ninth embodiment mainly differs from the terminal device 4A according to the seventh embodiment in that the control unit 34C includes the alignment unit 347C. In addition, in the ninth embodiment, a plane corresponding to the visual confirmation screen S obtained based on the reference data on the visual confirmation screen S stored in the storage unit 33 is referred to as a "reference screen K".

When the user looks at the visual confirmation screen S to, for example, input characters, the user may recognize a screen on which an operation is to be actually performed (hereinafter also referred to as an "operation screen T") as being positioned in front of the reference screen K obtained based on the reference data or in back of the reference screen K, and then perform the operation on the operation screen T with a finger. In other words, there may be a misalignment between the operation screen T and the reference screen K. If this misalignment is significant, the control unit 34C may fail to accurately determine a position in the reference screen K corresponding to the position of a finger when the user performs an operation with the finger. The alignment unit 347C is configured to perform a process of converting position data of a finger with which the user performs an operation on the operation screen T into position data on the reference screen K. Here, the position data of the finger with which the user performs the operation on the operation screen T is generated by the position data generation unit 344C.

Figure 29:
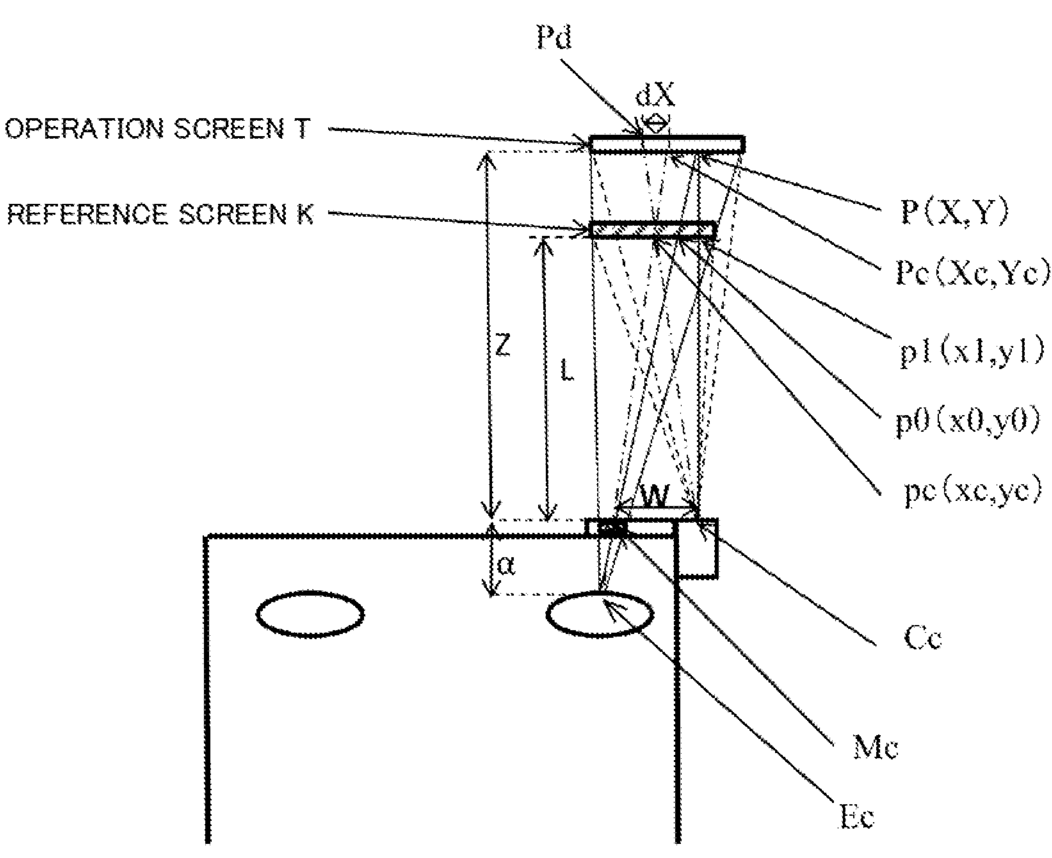
FIG. 29 illustrates a process in which an alignment unit converts an X coordinate of position data to an X coordinate of position data on a reference screen in the ninth embodiment.
Figure 30:
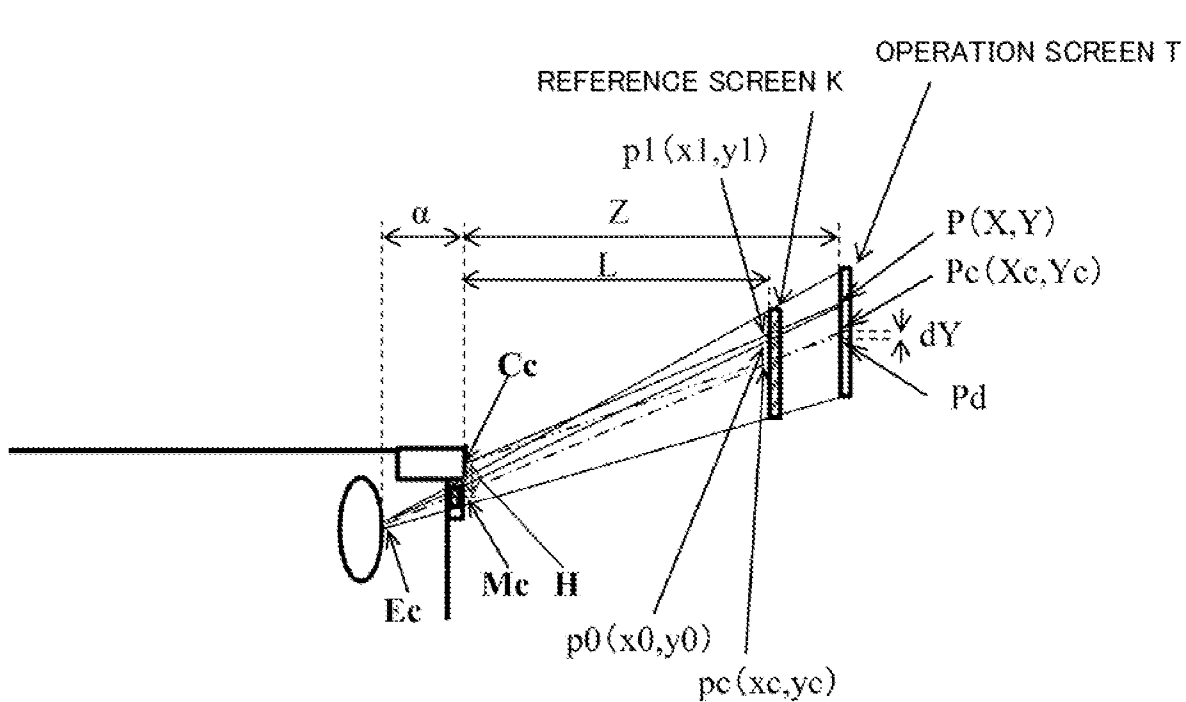
FIG. 30 illustrates a process in which the alignment unit converts a Y coordinate of the position data to a Y coordinate of the position data on the reference screen in the ninth embodiment.

Next, the position data conversion process in the alignment unit 347C will be described in detail. This conversion process is performed for each of the X coordinate and Y coordinate of the position data. FIG. 29 illustrates a process in which the alignment unit 347C converts an X coordinate of the position data to an X coordinate of the position data on the reference screen K in the ninth embodiment, and FIG. 30 illustrates a process in which the alignment unit 347C converts a Y coordinate of the position data to a Y coordinate of the position data on the reference screen K in the ninth embodiment. FIGS. 29 and 30 illustrate a case where the user recognizes that the operation screen T is positioned in back of the reference screen K.

In FIGS. 29 and 30, a point Cc is the center position of the camera unit 61, a point Mc is the center position of the original screen M, and a point Ec is the center position of a pupil of the user. A point pc is the center position of the reference screen K, and a point Pc is the center position of the operation screen T. In addition, the point Pc, the point pc, the point Mc, and the point Ec are on the same straight line. Further, W is the distance in the X-axis direction between the center position of the camera unit 61 and the center position of the original screen M, H is the distance in the Y-axis direction between the center position of the camera unit 61 and the center position of the original screen M, L is the distance in the Z-axis direction between the original screen M and the reference screen K, and α is the distance in the Z-axis direction between the pupil of the user and the original screen M. The values of W, H, and α are stored in the storage unit 33 in advance, and the value of L is obtained when the reference data is generated, and stored in the storage unit 33.

Now assume that the user has performed an operation on a point P on the operation screen T with a finger. In addition, assume that the point at which the straight line connecting the points P and Mc intersects the reference screen K is p0, and the point at which the straight line connecting the points P and Cc intersects the reference screen K is p1. In the ninth embodiment, the position data generation unit 344C acquires as the position data of the finger the XY coordinates when the actual position of the finger is projected onto the reference screen K. Therefore, the position data generation unit 344C calculates the position data of the point p1 as the position data of the point P. Further, the distance in the Z-axis direction between the point P and the original screen M, that is, the distance Z in the Z-axis direction between the operation screen T and the original screen M is obtained from the distance data associated with the image data used when the position data of the point P is generated. Since the point p0 is a position on the reference screen K corresponding to the point P on the operation screen T, what is required is for the alignment unit 347C to obtain the position data of the point p0 from the position data of the point p1. In the following, let (X, Y), (x0, y0), (xc, yc), (Xc, Yc), and (x1, y1) be the position coordinates of the point P, the position coordinates of the point p0, the position coordinates of the point pc, the position coordinates of the point Pc, and the position coordinates of the point p1, respectively. Here, since the point pc is the center position of the reference screen K, the position coordinate (xc, yc) is known and stored in the storage unit 33. Further, let Pd, dX, and dY be the point where the straight line connecting the points pc and Cc intersects the operation screen T, the distance between the points Pd and P in the X-axis direction, and the distance between the points Pd and P in the Y-axis direction, respectively.

An equation representing x0 by X can be obtained as follows. First, in FIG. 29, for a triangle pc-Pd-Pc and a triangle pc-Cc-Mc, the following equation is obtained from dX:W=(Z−L):L, $$dX=W\times(Z-L)/L$$

Further, for a triangle Cc-Pd-P and a triangle Cc-pc-p1, the following equation is obtained from {(X−Xc)+dX}:(x1−xc)=Z:L, $$X-Xc=(x1-xc)\times Z/L-dX$$

$$=(x1-xc)\times Z/L-W\times(Z-L)/L$$

Furthermore, for a triangle Ec-Pc-P and a triangle Ec-pc-p0, the following equation is obtained from (X−Xc):(x0−xc)=(Z+α):(L+α), $$x0-xc=(X-Xc)\times(L+\alpha)/(Z+\alpha)=\{(x1-xc)\times Z/L-W\times(Z-L)/L\}\times(L+\alpha)/(Z+\alpha)$$

Therefore, $$x0=(x0-xc)+xc=\{(x1-xc)\times Z/L-W\times(Z-L)/L\}\times(L+\alpha)/(Z+\alpha)+xc \quad (1)$$

On the other hand, the same applies to FIG. 30, and thus an equation representing y0 by Y can be obtained as follows.

$$y0=(y0-yc)+yc=\{(y1-yc)\times Z/L-H\times(Z-L)/L\}\times(L+\alpha)/(Z+\alpha)+yc \quad (2)$$

Note that both Equations (1) and (2) described above can be applied even when the user recognizes that the operation screen T is positioned in front of the reference screen K.

The alignment unit 347C can obtain the position data (x0, y0) of the point p0 by substituting the value of the position data (x1, y1) of the point p1 generated by the position data generation unit 344C and the value of the distance Z in the Z-axis direction between the point P and the original screen M for Equations (1) and (2) described above.

The input control unit 346 is configured to, when the user performs an operation with a finger, recognize a content of an input instruction corresponding to the operation performed with the finger, based on data on the content of the operation performed with the finger, obtained as determined by the operation determination unit 343, the position data (x0, y0) of the finger obtained by the alignment unit 347C, the reference data on the reference screen K (visual confirmation screen S) stored in the storage unit 33, and the data on the original screen M corresponding to the visual confirmation screen S stored in the storage unit 33, and control the original screen M to be displayed on the display apparatus 20, according to the recognized content of the input instruction.

The terminal device according to the ninth embodiment has the same functions and advantageous effects as the terminal device according to the seventh embodiment. In particular, in the ninth embodiment, when the user issues an instruction for the visual confirmation screen with a finger, even in a case where there is a misalignment between the operation screen T being recognized by the user and the reference screen K due to the finger of the user being positioned in front or back of the reference screen K, the alignment unit can obtain the position of the finger of the user on the reference screen K, and the input control unit can accurately recognize the content of the finger instruction.

In the ninth embodiment, the position data generation unit 344C acquires as the position data of a finger the XY coordinates when the position of the finger with which the user actually performs an operation is projected onto the reference screen K. However, the position data generation unit 344 may similarly acquire as the position data of a finger the XY coordinates when the position of the finger with which the user actually performs an operation is projected onto the reference screen K also in the above-described embodiments.

Tenth Embodiment

Next, a terminal device according to a tenth embodiment of the present invention will be described. FIG. 31 is a schematic block diagram of the terminal device according to the tenth embodiment of the present invention. In the tenth embodiment, the apparatuses/units having the same functions as those of the ninth embodiment described above are designated by the same reference numerals, and detailed description thereof will be omitted.

As illustrated in FIG. 31, the terminal device 5B according to the tenth embodiment includes the pair of glasses 10, the display apparatus 20 mounted on the pair of glasses 10, the terminal 30C being separate from the pair of glasses 10 and including the display unit 31, one or more cables 50, and the image capturing apparatus 60A for capturing an image in front of the user. The cables 50 connect the display apparatus 20 and the image capturing apparatus 60A to the terminal 30C.

The terminal device 5B according to the tenth embodiment mainly differs from the terminal device 5A according to the ninth embodiment in that the display apparatus 20 and the image capturing apparatus 60A are connected to the terminal 30C by wire using the cables 50 instead of wireless connection. The other configurations of the terminal device 5B according to the tenth embodiment are the same as those of the terminal device 5A according to the ninth embodiment.

The terminal 30C has connection terminals (not illustrated) as interfaces. The cables 50 are connected to the connection terminals. The electric power to the display apparatus 20 and the image capturing apparatus 60A is supplied from the terminal 30C via the cables 50.

The terminal device according to the tenth embodiment has the same functions and advantageous effects as the ninth embodiment.

Eleventh Embodiment

Next, a terminal device according to an eleventh embodiment of the present invention will be described. FIG. 32 is a schematic block diagram of the terminal device according to the eleventh embodiment of the present invention. In the eleventh embodiment, the apparatuses/units having the same functions as those of the ninth embodiment are designated by the same reference numerals, and detailed description thereof will be omitted.

As illustrated in FIG. 32, the terminal device 6A according to the eleventh embodiment includes the pair of glasses 10, the display apparatus 20 mounted on the pair of glasses 10, the terminal 30C being separate from the pair of glasses 10 and including the display unit 31, the communication unit 40, the image capturing apparatus 60A for capturing an image in front of the user, a microphone unit (sound input device) 70, and a speaker unit (sound output device) 80. The microphone unit 70 and the speaker unit 80 are the same as those in the fifth embodiment.

The terminal device 6A according to the eleventh embodiment mainly differs from the terminal device 5A according to the ninth embodiment in that the terminal device 6A includes the microphone unit 70 and the speaker unit 80, the control unit 34C of the terminal 30C performs processing according to the content of the electric signal indicating a voice input from the microphone unit 70, and the control unit 34C controls a sound to be output from the speaker unit 80. The other configurations of the terminal device 6A according to the eleventh embodiment are the same as those of the terminal device 5A according to the ninth embodiment.

The terminal device according to the eleventh embodiment has the same functions and advantageous effects as the ninth embodiment. In particular, in the terminal device according to the eleventh embodiment, the microphone unit and the speaker unit being provided on the pair of glasses make it possible for the user to issue an instruction to the terminal through the microphone unit without operating the terminal, and also to obtain information from the terminal as a sound through the speaker unit.

Twelfth Embodiment

Next, a terminal device according to a twelfth embodiment of the present invention will be described. FIG. 33 is a schematic block diagram of the terminal device according to the twelfth embodiment of the present invention. In the twelfth embodiment, the apparatuses/units having the same functions as those of the eleventh embodiment described above are designated by the same reference numerals, and detailed description thereof will be omitted.

As illustrated in FIG. 33, the terminal device 6B according to the twelfth embodiment includes the pair of glasses 10, the display apparatus 20 mounted on the pair of glasses 10, the terminal 30C being separate from the pair of glasses 10 and including the display unit 31, one or more cables 50, the image capturing apparatus 60A for capturing an image in front of the user, the microphone unit 70, and the speaker unit 80. The cables 50 connect the display apparatus 20, the image capturing apparatus 60A, the microphone unit 70, and the speaker unit 80 to the terminal 30C.

The terminal device 6B according to the twelfth embodiment mainly differs from the terminal device 6A according to the eleventh embodiment in that the display apparatus 20, the image capturing apparatus 60A, the microphone unit 70, and the speaker unit 80 are connected to the terminal 30C by wire using the cables 50 instead of wireless connection. The other configurations of the terminal device 6B according to the twelfth embodiment are the same as those of the terminal device 6A according to the eleventh embodiment.

The terminal 30C has connection terminals (not illustrated) as interfaces. The cables 50 are connected to the connection terminals. The electric power to the display apparatus 20, the image capturing apparatus 60A, the microphone unit 70, and the speaker unit 80 is supplied from the terminal 30C via the cables 50.

The terminal device according to the twelfth embodiment has the same functions and advantageous effects as the eleventh embodiment.

Thirteenth Embodiment

Next, a terminal device according to a thirteenth embodiment of the present invention will be described. FIG. 34 is a schematic block diagram of the terminal device according to the thirteenth embodiment of the present invention. A schematic perspective view of the terminal device according to the thirteenth embodiment is substantially the same as the schematic perspective view of the terminal device according to the third embodiment illustrated in FIG. 13. Thus, FIG. 13 is now referred to as the schematic perspective view of the terminal device according to the thirteenth embodiment. In the thirteenth embodiment, the apparatuses/units having the same functions as those of the third embodiment are designated by the same reference numerals, and detailed description thereof will be omitted.

As illustrated in FIGS. 13 and 34, the terminal device 7A according to the thirteenth embodiment includes the pair of glasses 10, the display apparatus 20 mounted on the pair of glasses 10, a terminal 30D being separate from the pair of glasses 10 and including the display unit 31, the communication unit 40, and the image capturing apparatus 60A for capturing an image in front of the user. Further, the terminal 30D includes the display unit 31, the communication unit 32, the storage unit 33, and a control unit 34D, and the control unit 34D includes the display control unit 341, the image data extraction unit 342, the operation determination unit 343, the position data generation unit 344, a reference data generation unit 345D, an input control unit 346D, and a distance determination unit 348D. Furthermore, the image capturing apparatus 60A includes the camera unit 61, the image processing unit 62, and a camera control unit 63A. This image capturing apparatus 60A is the same as that in the seventh embodiment.

The terminal device 7A according to the thirteenth embodiment mainly differs from the terminal device 2A according to the third embodiment in that the camera control unit 63A includes an autofocus control unit 631, the reference data generation unit 345D of the control unit 34D generates data that can identify the position and size of the visual confirmation screen in space as data (reference data) on the visual confirmation screen, and the control unit 34D includes the distance determination unit 348D configured to, when the user performs an operation on the visual confirmation screen S with a finger, determine whether or not the position of the finger is within a substantially constant distance from a plane representing the visual confirmation screen S obtained using the reference data. The other configurations of the terminal device 7A according to the thirteenth embodiment are the same as those of the terminal device 2A according to the third embodiment.

The autofocus control unit 631 is the same as the autofocus control unit in the seventh embodiment, and is configured to control the camera unit 61 so as to automatically focus on a subject at a predetermined position within the image capture range. Therefore, when the user performs an operation on the visual confirmation screen S with a finger, the image capturing apparatus 60A can automatically focus on the finger with which the operation is being performed and capture an image of the finger in a focused state. In addition, when the image of the automatically focused subject is captured, the autofocus control unit 631 calculates data on a distance to the captured subject. This calculated distance data is associated with the corresponding image data. The image data of the image captured by the image capturing apparatus 60A and the distance data associated with the image data are transmitted from the image capturing apparatus 60A to the control unit 34D through wireless communication.

The reference data generation unit 345D is configured to, when the user performs an operation with a finger at three predetermined positions on the visual confirmation screen S, for example, three corners of the visual confirmation screen S, generate data that can identify the position and size of the visual confirmation screen S in three-dimensional space as data on the visual confirmation screen S, by using position data of a finger at each predetermined position generated by the position data generation unit 344 based on image data for which the operation determination unit 343 determines that an operation at the predetermined position is a predetermined operation and by using distance data associated with the image data used when the position data of the finger is generated; and store the generated data as reference data in the storage unit 33. Specifically, for each predetermined position, coordinate information (three-dimensional data) in the XYZ coordinate system is formed based on the position data of the finger (two-dimensional position data) and the distance data (one-dimensional position data), and for the three positions, XYZ coordinate information (three-dimensional data) can be used as the reference data. Further, by using such reference data, an equation for a plane representing the visual confirmation screen S in the XYZ coordinate system can be calculated. In general, the plane representing the visual confirmation screen S identified in this way is not necessarily parallel to the XY plane. In the thirteenth embodiment, a plane corresponding to the visual confirmation screen S obtained based on the reference data on the visual confirmation screen S is referred to as a “reference screen”.

The distance determination unit 348D is configured to, when the image capturing apparatus 60A captures an image of a subject in focus in response to the user performing an operation with a finger on the visual confirmation screen S, determine whether or not the finger is within a substantially constant distance, which is determined in advance, from the plane (reference screen) corresponding to the visual confirmation screen S, based on position data of the finger generated by the position data generation unit 344 based on image data for which the operation determination unit 343 determines that an operation performed with the finger is a predetermined operation, distance data associated with the image data used when the position data of the finger is generated, and the plane (reference screen) corresponding to the visual confirmation screen S obtained based on the reference data on the visual confirmation screen S. The substantially constant distance as referred to in determining whether or not the finger is within the substantially constant distance from the reference screen is a distance that allows to recognize that the user performs a proper operation on the visual confirmation screen S. Here, the substantially constant distance is set to about 5 cm, for example. As a result, when the distance determination unit 348D determines that the finger is beyond the substantially constant distance from the reference screen, the distance determination unit 348D recognizes that the user performs the operation at a position extremely in front or back of the position of the visual confirmation screen S. On the other hand, when the distance determination unit 348D determines that the finger is within the substantially constant distance from the reference screen, the distance determination unit 348D recognizes that the user performs a proper operation on the visual confirmation screen S.

The input control unit 346D is configured to, when the user performs an operation on the visual confirmation screen S with a finger and the distance determination unit 348D determines that the finger is within the substantially constant distance from the reference screen, recognize a content of an input instruction corresponding to the operation performed with the finger, based on data on the content of the operation performed with the finger, obtained as determined by the operation determination unit 343, the position data of the finger generated by the position data generation unit 344 based on the image data used for the determination, the distance data associated with the image data used for the determination, the reference data on the visual confirmation screen S stored in the storage unit 33, and the data on the original screen M corresponding to the visual confirmation screen S stored in the storage unit 33; and control the original screen M to be displayed on the display apparatus 20, according to the recognized content of the input instruction.

Next, a process of setting reference data in the terminal device 7A according to the thirteenth embodiment will be described. Now consider a case where the terminal 30D is executing the display apparatus control program.

The flowchart of the procedure of the reference data setting process in the terminal device 7A according to the thirteenth embodiment is substantially the same as that of the third embodiment illustrated in FIG. 19. The reference data setting process in the thirteenth embodiment differs from the reference data setting process in the third embodiment in the processing (steps S32 and S33) in the image capturing apparatus 60A and the reference data generation process (step S38) in the reference data generation unit 345D. Thus, in the following, matters of the reference data setting process in the thirteenth embodiment that differ from the reference data setting process in the third embodiment will be described with reference to the flowchart illustrated in FIG. 19.

Figure 35A:
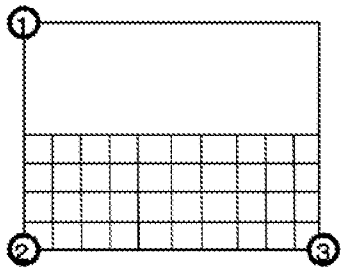
FIG. 35 is a diagram illustrating an example of an original screen for setting reference data to be displayed in the process of setting the reference data in the thirteenth embodiment.
Figure 35B:
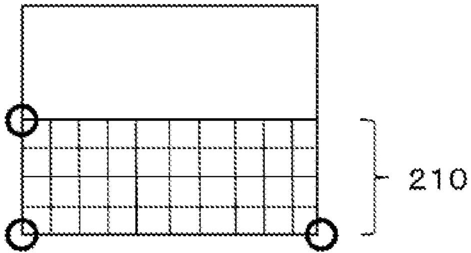

First, the user operates the terminal 30D to select a screen on which the reference data is to be set, to cause the display apparatus 20 to display that screen as the original screen M. At this time, the display control unit 341 generates an original screen for setting reference data and displays the original screen on the display apparatus 20 (S31). FIG. 35 is a diagram illustrating an example of the original screen M for setting reference data to be displayed in the process of setting the reference data in the thirteenth embodiment. In the example of FIG. 35A, the original screen M for setting reference data is the character input screen 201, and images representing circles and numbers are added at three predetermined positions of the four corners. Although circle images are displayed at three predetermined positions of the four corners of the character input screen 201 in FIG. 35A, circle images may be displayed at three predetermined positions of the four corners of the keyboard image 210 of the character input screen 201 as illustrated in FIG. 35B. After the process of step S31, the control unit 34D starts an image capturing operation of the image capturing apparatus 60A (S32). When the user sees as the visual confirmation screen S for setting reference data the character input screen 201 in which the images representing circles and numbers are added at the three predetermined positions of the four corners as illustrated in FIG. 35A, the user performs a predetermined operation, for example, a tap operation, on each circle to which a number is assigned with a finger in order of the numbers on the visual confirmation screen S for setting reference data. Such a user operation is captured by the image capturing apparatus 60A. At this time, the autofocus control unit 631 controls the camera unit 61 so as to automatically focus on a subject within the image capture range so that the image capturing apparatus 60A can capture an image of the subject in focus. In addition, when the image of the automatically focused subject is captured, the autofocus control unit 631 calculates data on a distance to the captured subject, and associates the calculated distance data with the corresponding image data. The image data of the captured image is transmitted to the image processing unit 62, and the image processing unit 62 performs predetermined image processing on the image data. Then, the image data subjected to the image processing and the distance data associated with the image data are transmitted from the image capturing apparatus 60A to the control unit 34D through wireless communication (S33).

In step S38, the reference data generation unit 345D generates reference data on the visual confirmation screen S currently displayed, by using the position data of the finger at the three predetermined positions, generated by the position data generation unit 344 in the process of step S37, and the distance data associated with the image data used when the position data of the finger is generated; and stores the generated reference data in the storage unit 33.

Figure 36:
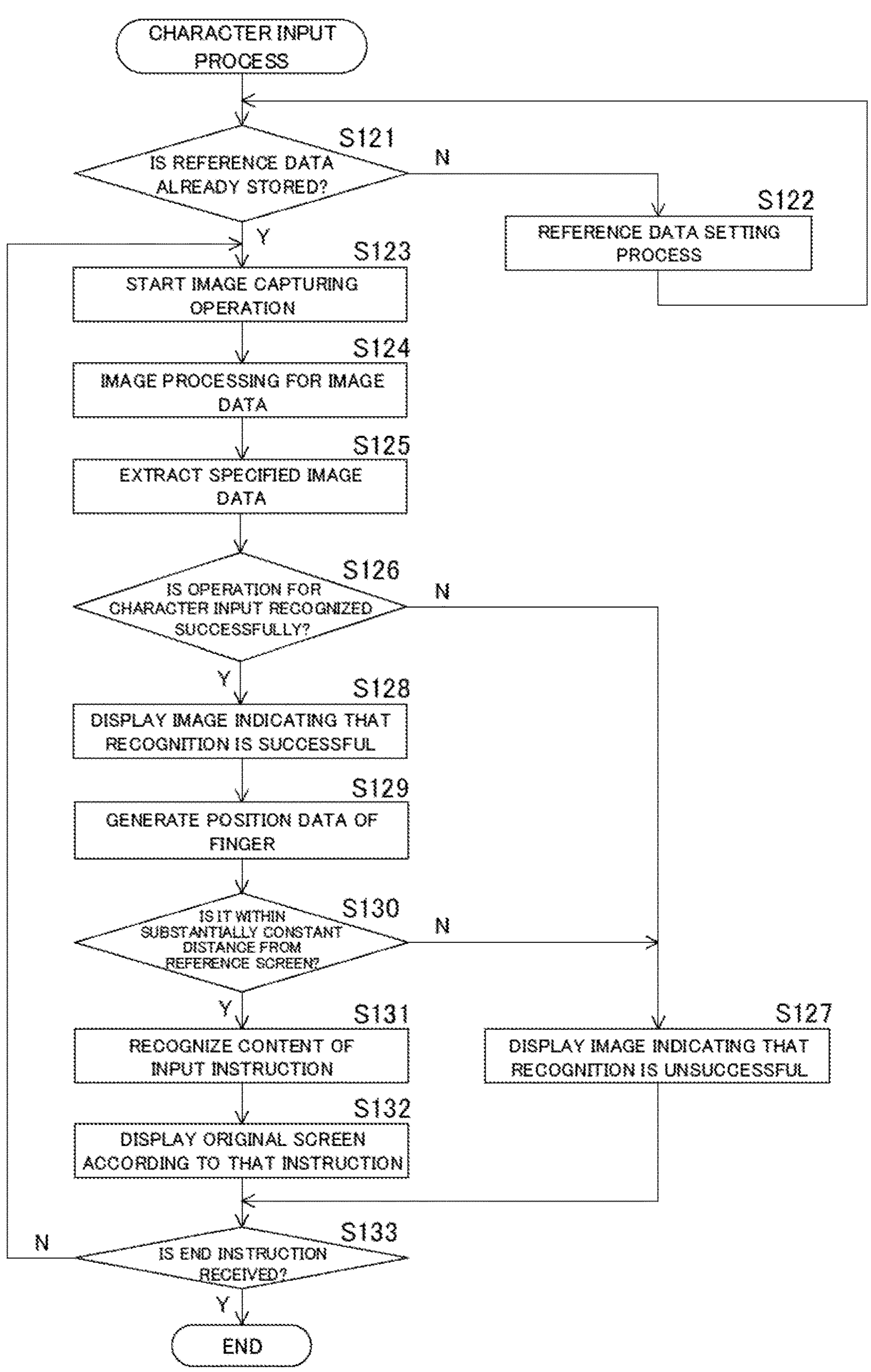
FIG. 36 is a flowchart of the procedure for a character input process using a visual confirmation screen in the terminal device according to the thirteenth embodiment.

Next, a character input process using the visual confirmation screen S in the terminal device 7A according to the thirteenth embodiment will be described. FIG. 36 is a flowchart of the procedure for the character input process using the visual confirmation screen S in the terminal device 7A according to the thirteenth embodiment. Now consider a case where the terminal 30D is executing the display apparatus control program. Specifically, it is assumed that the display apparatus 20, the communication unit 40, and the image capturing apparatus 60A are in a power-on state, and the communication of the terminal 30D with the display apparatus 20 and the image capturing apparatus 60A is enabled.

The user operates the terminal 30D to display a menu screen on the display unit 31. Then, the user taps the icon for the character input processing program on the menu screen to select the character input processing program. In response to receiving a signal indicating that the character input processing program has been selected, the control unit 34D of the terminal 30D reads the character input processing program from the storage unit 33 to perform the character input process using the visual confirmation screen S according to the processing flow illustrated in FIG. 36. Note that the character input process may be executed automatically when the character input screen 200 is displayed on the display apparatus 20 as the original screen M.

First, the control unit 34D displays the character input screen 200 as the original screen M on the display apparatus 20, and determines whether or not the reference data on the visual confirmation screen S corresponding to the original screen M is stored in the storage unit 33 (S121). If the reference data on the visual confirmation screen S is not stored in the storage unit 33, the control unit 34D reads the reference data setting processing program from the storage unit 33 to perform the reference data setting process (S122). After that, the process proceeds to step S121. In the thirteenth embodiment, the reference data setting process is executed if the reference data on the visual confirmation screen S is not stored in the storage unit 33. However, the reference data setting process may be executed to generate the reference data again in response to receiving an instruction from the user even if the reference data on the visual confirmation screen S is stored in the storage unit 33.

On the other hand, when it is determined in the process of step S121 that the reference data on the visual confirmation screen S is stored in the storage unit 33, the control unit 34D starts an image capturing operation of the image capturing apparatus 60A (S123). The user performs a predetermined operation, for example, a tap operation on the keyboard image 210 of the character input screen 200, which is the visual confirmation screen S, with a finger. Such a user operation is captured by the image capturing apparatus 60A. At this time, the autofocus control unit 631 controls the camera unit 61 so as to automatically focus on a subject within the image capture range so that the image capturing apparatus 60A can capture an image of the subject in focus. In addition, when the image of the automatically focused subject is captured, the autofocus control unit 631 calculates data on a distance to the captured subject, and associates the calculated distance data with the corresponding image data. The image data of the captured image is transmitted to the image processing unit 62, and the image processing unit 62 performs predetermined image processing on the image data. Then, the image data subjected to the image processing and the distance data associated with the image data are transmitted from the image capturing apparatus 60A to the control unit 34D through wireless communication (S124).

Next, the image data extraction unit 342 determines whether or not the subject is a finger based on the image data of the image captured by the image capturing apparatus 60A and thus extracts image data including an image of the finger (S125). Next, the operation determination unit 343 determines whether or not the operation performed with the finger is a predetermined operation (a tap operation as used herein) based on the image data extracted by the image data extraction unit 342. This determination is made within a predetermined time. Then, the operation determination unit 343 determines that the operation for character input is successfully recognized if the operation performed with the finger is a tap operation; the operation determination unit 343 determines that the operation for character input is unsuccessfully recognized if the operation performed with the finger is not a tap operation (S126). When the operation determination unit 343 determines that the operation for character input is successfully recognized, the operation determination unit 343 stores the data on the content of the operation performed with the finger in the storage unit 33, and also transmits to the display control unit 341 a signal indicating that the operation for character input is successfully recognized. In response to receiving the signal, the display control unit 341 adds to the original screen M an image of a green light indicating that the operation for character input is successfully recognized, and displays the resulting image on the display apparatus 20 (S128). Note that the display control unit 341 may add to the original screen M an image of characters or figures indicating that the operation for character input is successfully recognized, in addition to or instead of the image of a green light.

On the other hand, when the operation determination unit 343 determines in the process of step S126 that the operation for character input is unsuccessfully recognized within a predetermined time, the operation determination unit 343 transmits a signal indicating unsuccessful to the display control unit 341. At this time, for example, also when image data including an image of a finger is not transmitted from the image data extraction unit 342 within a predetermined time, the operation determination unit 343 determines that the tap operation is unsuccessfully recognized. In response to receiving the signal indicating unsuccessful, the display control unit 341 adds to the original screen M an image of a red light indicating that the operation for character input is unsuccessfully recognized, and displays the resulting image on the display apparatus 20 (S127). After that, the process proceeds to step S133. Note that, at this time, the display control unit 341 may add to the original screen M an image of characters or figures indicating that the operation for character input is unsuccessfully recognized, in addition to or instead of the image of a red light.

After the process of step S128, the position data generation unit 344 generates position data of a finger (fingertip) in the image capture range of the image capturing apparatus 60A based on the image data for which the operation determination unit 343 determines that the operation performed with the finger is a tap operation (S129). This generated position data of the finger is stored in the storage unit 33.

Next, the distance determination unit 348D determines whether or not the finger is within a substantially constant distance, which is determined in advance, from a plane (reference screen) corresponding to the visual confirmation screen S, based on the position data of the finger generated by the position data generation unit 344, the distance data associated with the image data used when the position data of the finger is generated, and the reference data on the visual confirmation screen S stored in the storage unit 33 (S130). When the distance determination unit 348D determines that the finger is beyond the substantially constant distance from the reference screen, the distance determination unit 348D determines that the user fails to perform a proper operation on the visual confirmation screen S, and then the process proceeds to step S127. On the other hand, when the distance determination unit 348D determines in the process of step S130 that the finger is within the substantially constant distance from the reference screen, the distance determination unit 348D recognizes that the user performs a proper operation on the visual confirmation screen S, and then the process proceeds to step S131.

In step S131, the input control unit 346D recognizes a content of an input instruction corresponding to the operation performed with the finger, based on data on the content of the operation performed with the finger, obtained as determined by the operation determination unit 343, the position data of the finger generated by the position data generation unit 344, the distance data associated with the image data used for the determination, the reference data on the visual confirmation screen S stored in the storage unit 33, and the data on the original screen M corresponding to the visual confirmation screen S stored in the storage unit 33. For example, when the user performs a tap operation on a character key image in the keyboard image 210 with a finger, the input control unit 346D can retrieve which of the areas of the character key images in the keyboard image 210 corresponds to the position of the finger obtained from the position data of the finger, thus identify the character key on which the tap operation is performed, and then recognize an instruction issued to input the identified character key. After that, the input control unit 346D transmits a signal indicating the content of the recognized input instruction to the display control unit 341, and the display control unit 341 displays an original screen M corresponding to the content of the input instruction on the display apparatus 20 (S132).

After the process of step S132 or step S127, the control unit 34D determines whether or not an instruction to end the character input using the visual confirmation screen S has been received from the user (S133). If the instruction to end the character input has been received, the character input process ends. Contrary to this, if the instruction to end the character input has not been received, the process proceeds to step S123 to continue the character input process using the visual confirmation screen S. The user operates the terminal 30D to issue the instruction to end the character input.

Figure 37:
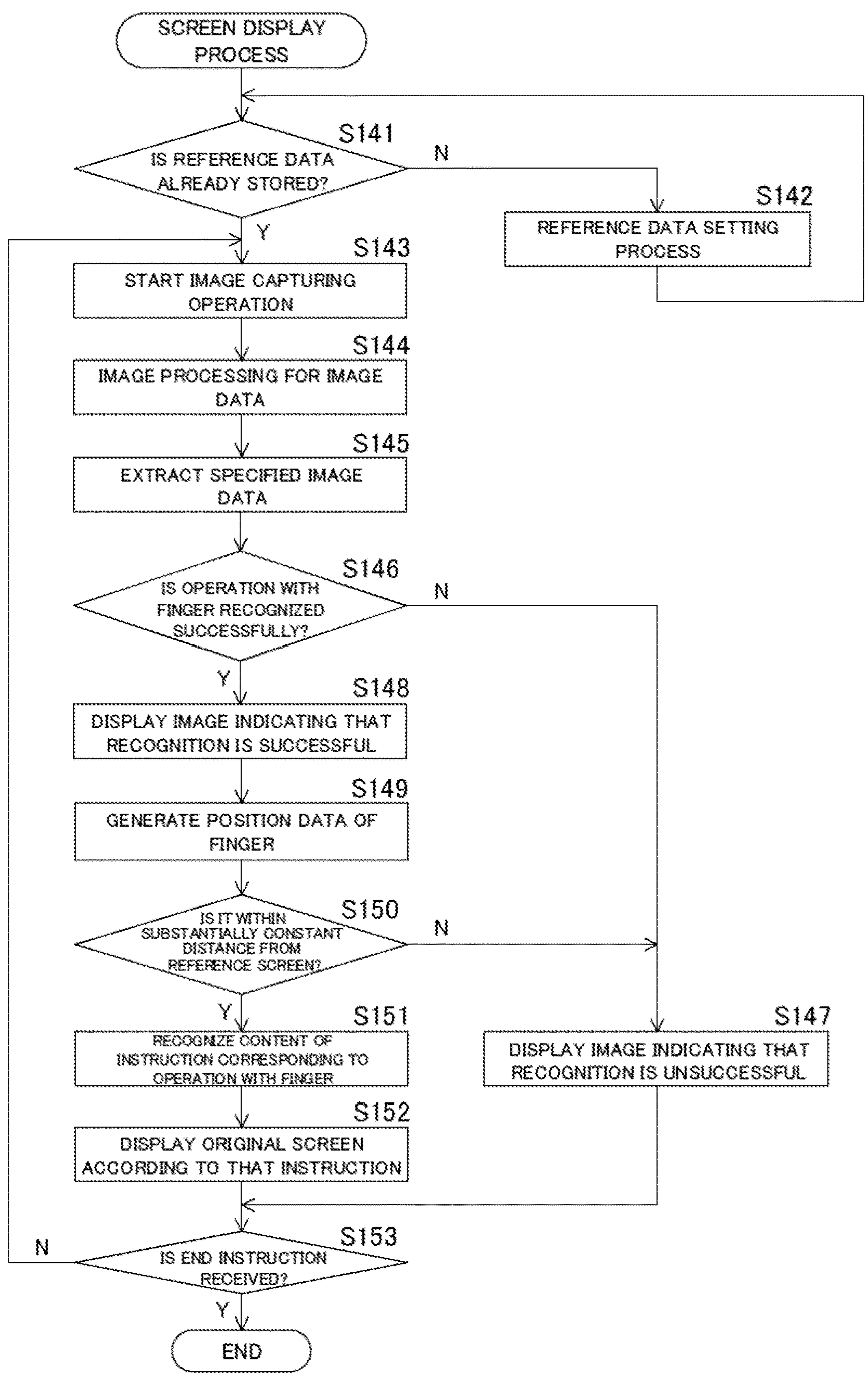
FIG. 37 is a flowchart of the procedure for a screen display process using a visual confirmation screen in the terminal device according to the thirteenth embodiment.

Next, a screen display process using the visual confirmation screen S in the terminal device 7A according to the thirteenth embodiment will be described. FIG. 37 is a flowchart of the procedure for the screen display process using the visual confirmation screen S in the terminal device 7A according to the thirteenth embodiment. Now consider a case where the terminal 30D is executing the display apparatus control program. Specifically, it is assumed that the display apparatus 20, the communication unit 40, and the image capturing apparatus 60D are in a power-on state, and the communication of the terminal 30D with the display apparatus 20 and the image capturing apparatus 60A is enabled.

The user operates the terminal 30D to display a menu screen on the display unit 31. Then, the user taps the icon for the screen display processing program on the menu screen to select the screen display processing program. In response to receiving a signal indicating that the screen display processing program has been selected, the control unit 34D of the terminal 30D reads the screen display processing program from the storage unit 33 to perform the screen display process using the visual confirmation screen S according to the processing flow illustrated in FIG. 37. The screen display process may be executed automatically when the original screen M is displayed on the display apparatus 20.

First, the user operates the terminal 30D to display a desired screen on the display apparatus 20. The control unit 34D determines whether or not the reference data on the visual confirmation screen S corresponding to the displayed screen (original screen M) is stored in the storage unit 33 (S141). If the reference data on the visual confirmation screen S is not stored in the storage unit 33, the control unit 34D reads the reference data setting processing program from the storage unit 33 to perform the reference data setting process (S142). After that, the process proceeds to step S141. In the thirteenth embodiment, the reference data setting process is executed if the reference data on the visual confirmation screen S is not stored in the storage unit 33. However, the reference data setting process may be executed to generate the reference data again in response to receiving an instruction from the user even if the reference data on the visual confirmation screen S is stored in the storage unit 33.

On the other hand, when it is determined in the process of step S141 that the reference data on the visual confirmation screen S is stored in the storage unit 33, the control unit 34D starts an image capturing operation of the image capturing apparatus 60A (S143). The user performs a predetermined operation, for example, a tap operation on the keyboard image 210 of the character input screen 200, which is the visual confirmation screen S, with a finger. Such a user operation is captured by the image capturing apparatus 60A. At this time, the autofocus control unit 631 controls the camera unit 61 so as to automatically focus on a subject within the image capture range so that the image capturing apparatus 60A capture an image of the subject in focus. In addition, when the image of the automatically focused subject is captured, the autofocus control unit 631 calculates data on a distance to the captured subject, and associates the calculated distance data with the corresponding image data. The image data of the captured image is transmitted to the image processing unit 62, and the image processing unit 62 performs predetermined image processing on the image data. Then, the image data subjected to the image processing and the distance data associated with the image data are transmitted from the image capturing apparatus 60A to the control unit 34D through wireless communication (S144).

Next, the image data extraction unit 342 determines whether or not the subject is a finger based on the image data of the image captured by the image capturing apparatus 60A and thus extracts image data including an image of the finger (S145). Next, the operation determination unit 343 determines the content of the operation performed with the finger based on the image data extracted by the image data extraction unit 342. Then, the operation determination unit 343 determines whether or not the operation performed with the finger is successfully recognized (S146). When the operation determination unit 343 determines that the operation performed with the finger is successfully recognized, the operation determination unit 343 stores the data on the content of the operation performed with the finger in the storage unit 33, and also transmits to the display control unit 341 a signal indicating that the operation performed with the finger is successfully recognized. In response to receiving the signal, the display control unit 341 adds to the original screen M an image of a green light indicating that the operation performed with the finger is successfully recognized, and displays the resulting image on the display apparatus 20 (S148). The display control unit 341 may add to the original screen M an image of characters or figures indicating that the operation performed with the finger is successfully recognized, in addition to or instead of the image of a green light.

On the other hand, when the operation determination unit 343 determines in the process of step S146 that the operation performed with the finger is unsuccessfully recognized, the operation determination unit 343 transmits a signal indicating unsuccessful to the display control unit 341. At this time, for example, also when image data including an image of a finger is not transmitted from the image data extraction unit 342 within a predetermined time, the operation determination unit 343 determines that the tap operation is unsuccessfully recognized. In response to receiving the signal, the display control unit 341 adds to the original screen M an image of a red light indicating that the operation performed with the finger is unsuccessfully recognized, and displays the resulting image on the display apparatus 20 (S147). After that, the process proceeds to step S153. At this time, the display control unit 341 may add to the original screen M an image of characters or figures indicating that the operation performed with the finger is unsuccessfully recognized, in addition to or instead of the image of a red light.

After the process of step S148, the position data generation unit 344 generates position data of each finger (fingertip) in the image capture range of the image capturing apparatus 60A based on the image data for which the operation determination unit 343 determines the content of the operation performed with the finger (S149). This generated position data of the finger is stored in the storage unit 33.

Next, the distance determination unit 348D determines whether or not the finger is within a substantially constant distance, which is determined in advance, from a plane (reference screen) corresponding to the visual confirmation screen S, based on the position data of the finger generated by the position data generation unit 344, the distance data associated with the image data used when the position data of the finger is generated, and the reference data on the visual confirmation screen S stored in the storage unit 33 (S150). When the distance determination unit 348D determines that the finger is more than the substantially constant distance away from the reference screen, the distance determination unit 348D determines that the user fails to perform a proper operation on the visual confirmation screen S, and then the process proceeds to step S147. On the other hand, when the distance determination unit 348D determines in the process of step S150 that the finger is within the substantially constant distance from the reference screen, the distance determination unit 348D recognizes that the user performs a proper operation on the visual confirmation screen S, and then the process proceeds to step S151.

In step S151, the input control unit 346D recognizes a content of an input instruction corresponding to the operation performed with the finger, based on data on the content of the operation performed with the finger, obtained as determined by the operation determination unit 343, the position data of the finger generated by the position data generation unit 344, the distance data associated with the image data used for the determination, the reference data on the visual confirmation screen S stored in the storage unit 33, and the data on the original screen M corresponding to the visual confirmation screen S stored in the storage unit 33. For example, when the user performs a double tap operation on the visual confirmation screen S with a finger, the input control unit 346D identifies that this operation is a double tap operation, and recognizes that an instruction to enlarge (or reduce) the original screen M has been received. After that, the input control unit 346D transmits a signal indicating the content of the recognized instruction to the display control unit 341, and the display control unit 341 displays an original screen M corresponding to the content of the instruction on the display apparatus 20 (S152).

After the process of step S152 or step S147, the control unit 34D determines whether or not an instruction to end the operation for screen display using the visual confirmation screen S has been received from the user (S153). If the instruction to end the operation for screen display has been received, the screen display process ends. Contrary to this, if the instruction to end the operation for screen display has not been received, the process proceeds to step S143 to continue the screen display process using the visual confirmation screen S. The user operates the terminal 30D to issue the instruction to end the operation for screen display using the visual confirmation screen S.

The terminal device according to the thirteenth embodiment has the same functions and advantageous effects as the terminal device according to the third embodiment. In particular, in the thirteenth embodiment, the reference data generation unit generates, as the reference data, data that can identify the position and size of the visual confirmation screen S in space, so that even if the user performs an operation with a finger on the visual confirmation screen S with a habit that, for example, performs an operation on the visual confirmation screen S at positions in front of the visual confirmation screen S for the two left corners and performs an operation on the visual confirmation screen S at positions in back of the visual confirmation screen S for the two right corners, the reference data generation unit can generate reference data that matches the habit of the user.

Fourteenth Embodiment

Figure 38:
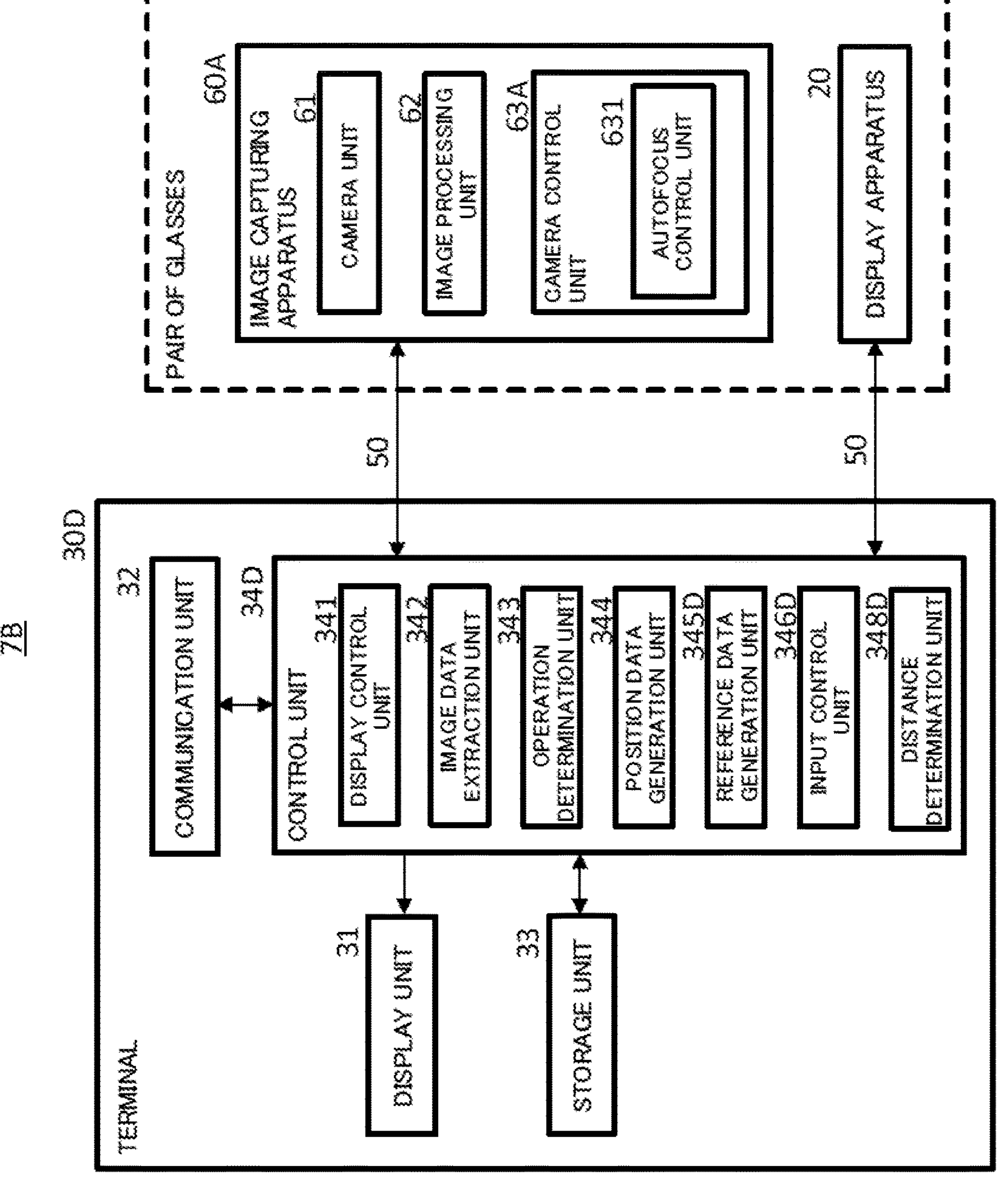
FIG. 38 is a schematic block diagram of a terminal device according to a fourteenth embodiment of the present invention.

Next, a terminal device according to a fourteenth embodiment of the present invention will be described. FIG. 38 is a schematic block diagram of the terminal device according to the fourteenth embodiment of the present invention. In the fourteenth embodiment, the apparatuses/units having the same functions as those of the thirteenth embodiment described above are designated by the same reference numerals, and detailed description thereof will be omitted.

As illustrated in FIG. 38, the terminal device 7B according to the fourteenth embodiment includes the pair of glasses 10, the display apparatus 20 mounted on the pair of glasses 10, the terminal 30D being separate from the pair of glasses 10 and including the display unit 31, one or more cables 50, and the image capturing apparatus 60A for capturing an image in front of the user. The cables 50 connect the display apparatus 20 and the image capturing apparatus 60A to the terminal 30D.

The terminal device 7B according to the fourteenth embodiment mainly differs from the terminal device 7A according to the thirteenth embodiment in that the display apparatus 20 and the image capturing apparatus 60A are connected to the terminal 30D by wire using the cables 50 instead of wireless connection. The other configurations of the terminal device 7B according to the fourteenth embodiment are the same as those of the terminal device 7A according to the thirteenth embodiment.

The terminal 30D has connection terminals (not illustrated) as interfaces. The cables 50 are connected to the connection terminals. The electric power to the display apparatus 20 and the image capturing apparatus 60A is supplied from the terminal 30D via the cables 50.

The terminal device according to the fourteenth embodiment has the same functions and advantageous effects as the thirteenth embodiment.

Fifteenth Embodiment

Figure 39:
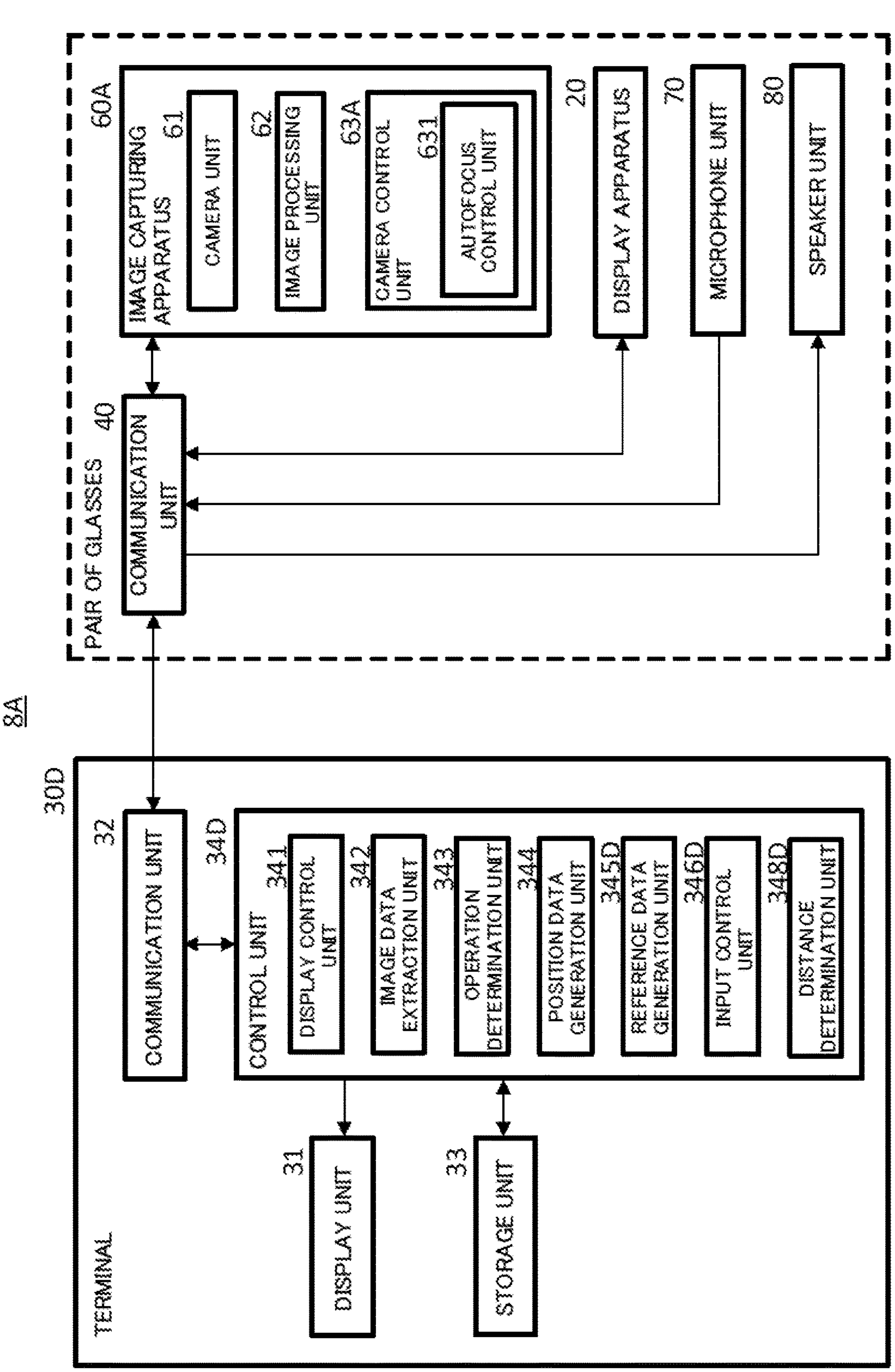
FIG. 39 is a schematic block diagram of a terminal device according to a fifteenth embodiment of the present invention.

Next, a terminal device according to a fifteenth embodiment of the present invention will be described. FIG. 39 is a schematic block diagram of the terminal device according to the fifteenth embodiment of the present invention. In the fifteenth embodiment, the apparatuses/units having the same functions as those of the thirteenth embodiment are designated by the same reference numerals, and detailed description thereof will be omitted.

As illustrated in FIG. 39, the terminal device 8A according to the fifteenth embodiment includes the pair of glasses 10, the display apparatus 20 mounted on the pair of glasses 10, the terminal 30D being separate from the pair of glasses 10 and including the display unit 31, the communication unit 40, the image capturing apparatus 60A for capturing an image in front of the user, a microphone unit 70, and a speaker unit 80. The microphone unit 70 and the speaker unit 80 are the same as those in the fifth embodiment.

The terminal device 8A according to the fifteenth embodiment mainly differs from the terminal device 7A according to the thirteenth embodiment in that the terminal device 8A includes the microphone unit 70 and the speaker unit 80, the control unit 34D of the terminal 30D performs processing according to the content of the electric signal indicating a voice input from the microphone unit 70, and the control unit 34D controls a sound to be output from the speaker unit 80. The other configurations of the terminal device 8A according to the fifteenth embodiment are the same as those of the terminal device 7A according to the thirteenth embodiment.

The terminal device according to the fifteenth embodiment has the same functions and advantageous effects as the thirteenth embodiment. In particular, in the terminal device according to the fifteenth embodiment, the microphone unit and the speaker unit being provided on the pair of glasses make it possible for the user to issue an instruction to the terminal through the microphone unit without operating the terminal, and also to obtain information from the terminal as a sound through the speaker unit.

Sixteenth Embodiment

Figure 40:
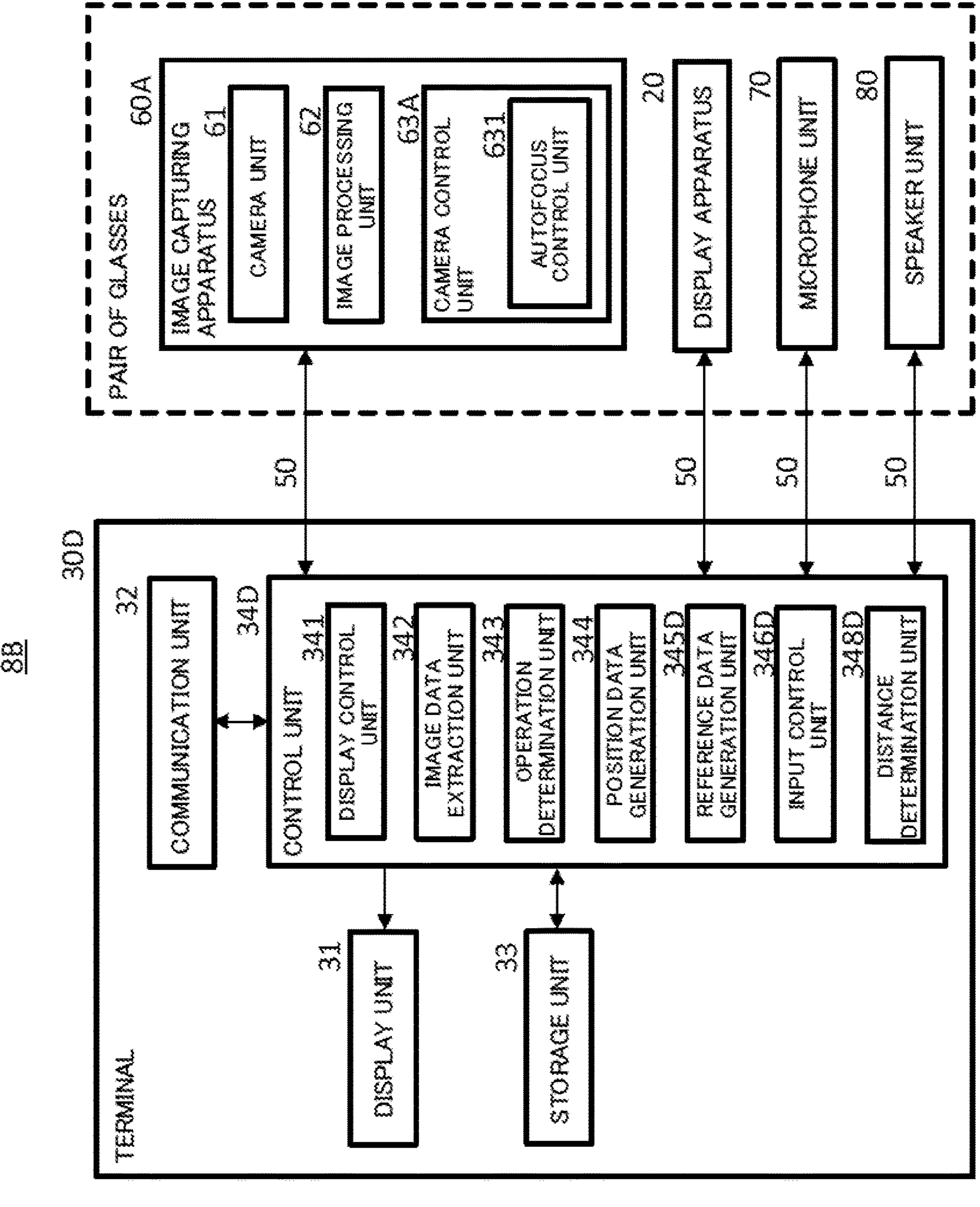
FIG. 40 is a schematic block diagram of a terminal device according to a sixteenth embodiment of the present invention.

Next, a terminal device according to a sixteenth embodiment of the present invention will be described. FIG. 40 is a schematic block diagram of the terminal device according to the sixteenth embodiment of the present invention. In the sixteenth embodiment, the apparatuses/units having the same functions as those of the fifteenth embodiment described above are designated by the same reference numerals, and detailed description thereof will be omitted.

As illustrated in FIG. 40, the terminal device 8B according to the sixteenth embodiment includes the pair of glasses 10, the display apparatus 20 mounted on the pair of glasses 10, the terminal 30D being separate from the pair of glasses 10 and including the display unit 31, one or more cables 50, the image capturing apparatus 60A for capturing an image in front of the user, the microphone unit 70, and the speaker unit 80. The cables 50 connect the display apparatus 20, the image capturing apparatus 60A, the microphone unit 70, and the speaker unit 80 to the terminal 30D.

The terminal device 8B according to the sixteenth embodiment mainly differs from the terminal device 8A according to the fifteenth embodiment in that the display apparatus 20, the image capturing apparatus 60A, the microphone unit 70, and the speaker unit 80 are connected to the terminal 30D by wire using the cables 50 instead of wireless connection. The other configurations of the terminal device 8B according to the sixteenth embodiment are the same as those of the terminal device 8A according to the fifteenth embodiment.

The terminal 30D has connection terminals (not illustrated) as interfaces. The cables 50 are connected to the connection terminals. The electric power to the display apparatus 20, the image capturing apparatus 60A, the microphone unit 70, and the speaker unit 80 is supplied from the terminal 30D via the cables 50.

The terminal device according to the sixteenth embodiment has the same functions and advantageous effects as the fifteenth embodiment.

Seventeenth Embodiment

Figure 41A:
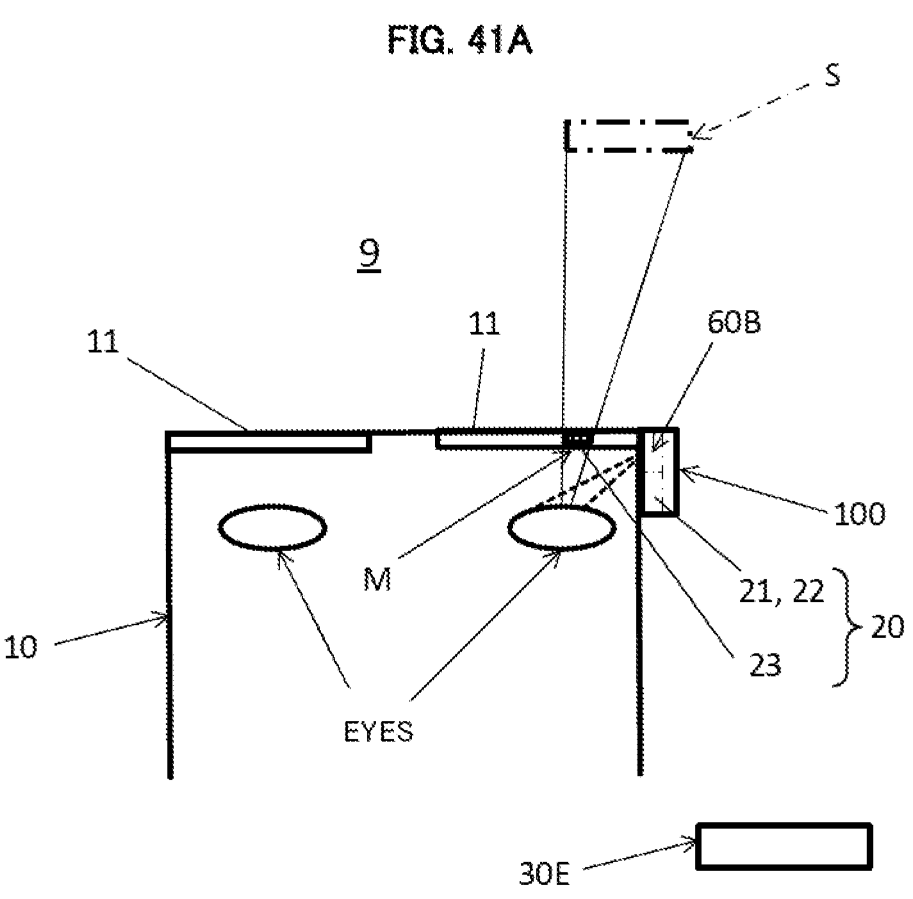
FIG. 41A is a schematic plan view of a terminal device according to a seventeenth embodiment of the present invention.
Figure 41B:
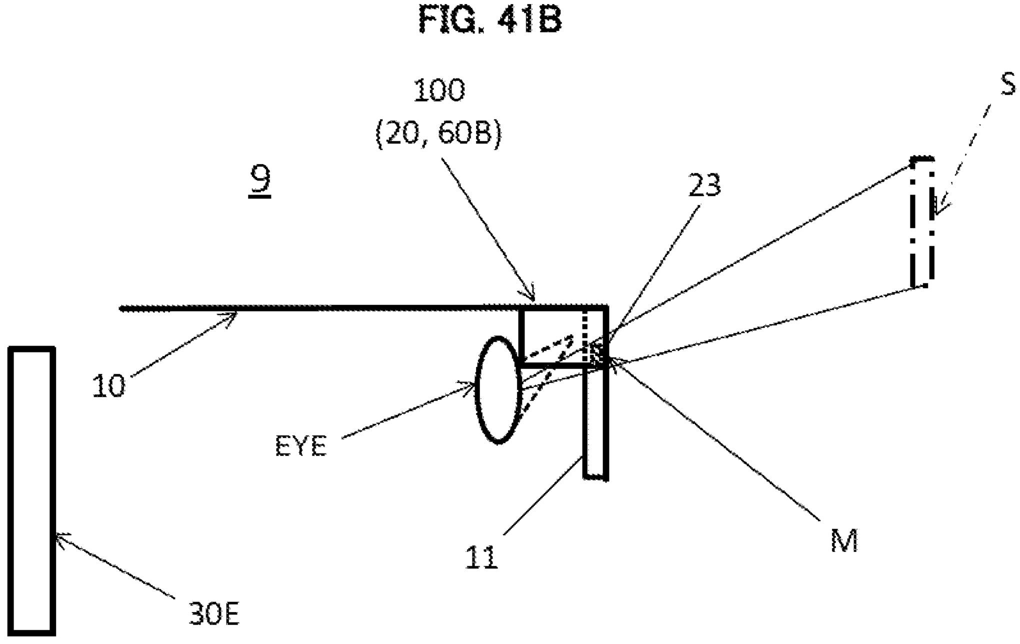
FIG. 41B is a schematic right side view of the terminal device.
Figure 43:
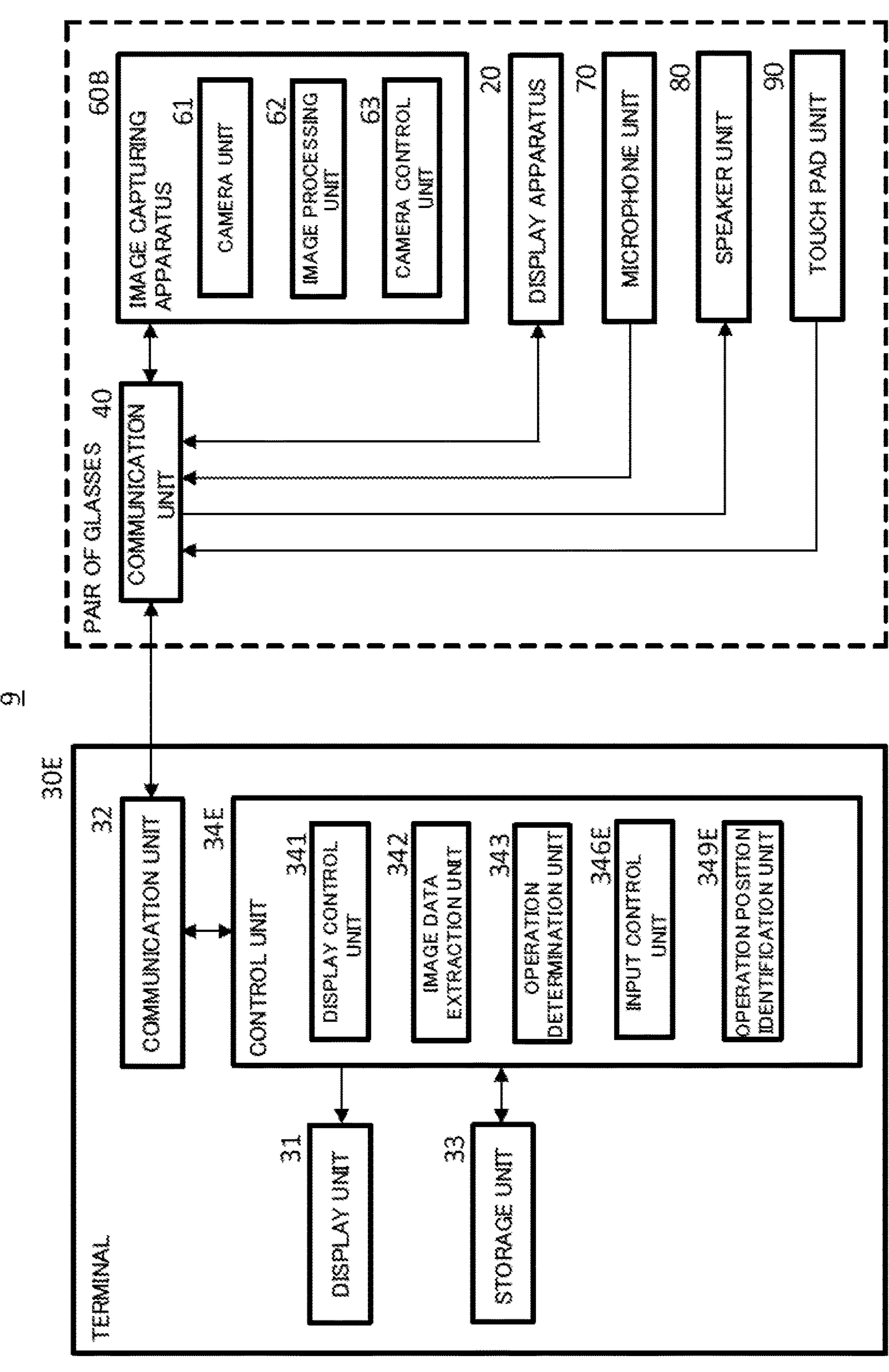
FIG. 43 is a schematic block diagram of the terminal device according to the seventeenth embodiment.

Next, a terminal device according to a seventeenth embodiment of the present invention will be described. FIG. 41A is a schematic plan view of the terminal device according to the seventeenth embodiment of the present invention, and FIG. 41B is a schematic right side view of the terminal device. FIG. 42 is a schematic perspective view of the terminal device according to the seventeenth embodiment. Further, FIG. 43 is a schematic block diagram of the terminal device according to the seventeenth embodiment. In the seventeenth embodiment, the apparatuses/units having the same functions as those of the third embodiment described above are designated by the same reference numerals, and detailed description thereof will be omitted.

As illustrated in FIGS. 41, 42, and 43, the terminal device 9 according to the seventeenth embodiment includes the pair of glasses 10 serving as a wearable object to be mounted on the head of the user, the display apparatus 20 mounted on the pair of glasses 10, a terminal 30E being separate from the pair of glasses 10 and including the display unit 31, the communication unit 40, an image capturing apparatus 60B for capturing an image of an eye of the user, a microphone unit (sound input device) 70, a speaker unit (sound output device) 80, and a touch pad unit 90.

The terminal device 9 according to the seventeenth embodiment mainly differs from the terminal device 2A according to the third embodiment in that the terminal device 9 includes the image capturing apparatus 60B for capturing an image of an eye of the user instead of the image capturing apparatus 60 for capturing an image in front of the user, the terminal 30E recognizes the content of an operation performed on the visual confirmation screen S by the user based on image data of the image captured by the image capturing apparatus 60B, and the terminal device 9 includes the microphone unit 70, the speaker unit 80, and the touch pad unit 90. The other configurations of the terminal device 9 according to the seventeenth embodiment are the same as those of the terminal device 2A according to the third embodiment.

As illustrated in FIGS. 41 and 42, the image capturing apparatus 60B is mounted on a temple portion of the pair of glasses 10. This image capturing apparatus 60B is arranged in the housing 100 together with the small projector 21 and the optical system 22 of the display apparatus 20. Further, as illustrated in FIG. 43, the image capturing apparatus 60B includes a camera unit 61, an image processing unit 62, and a camera control unit 63.

Figure 44A:
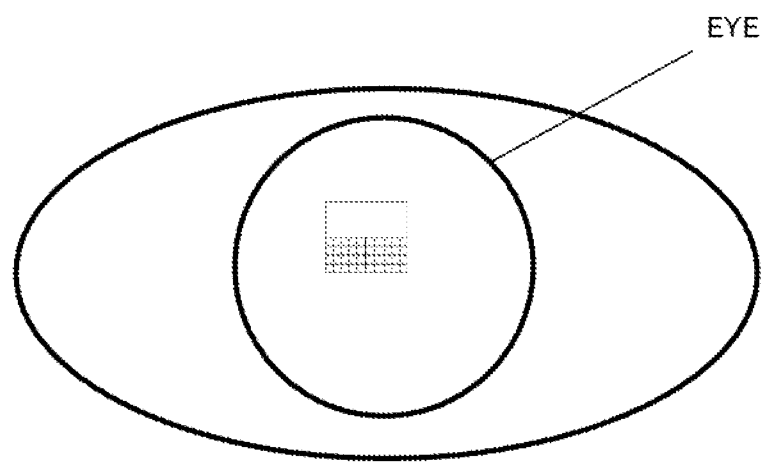
FIG. 44A illustrates an example of the original screen reflected on an eye.
Figure 44B:
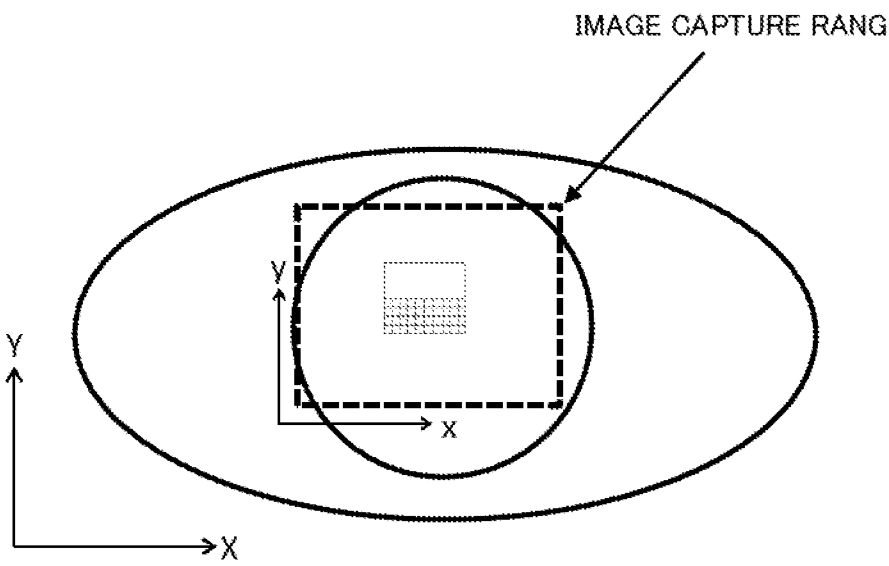
FIG. 44B illustrates an example of an image capture range of an image capturing apparatus in the terminal device according to the seventeenth embodiment.

Further, the image capturing apparatus 60B captures an image of an eye of the user (at least a part of the eye) to obtain an image of the original screen and a finger reflected on the eye of the user when the user operates the visual confirmation screen S with the finger. Here, the original screen displayed on the display apparatus 20 or the finger of the user who operates the visual confirmation screen is usually reflected on a part of the eye that can be seen from the outside and is also composed of a colored iris and a pupil. For this reason, the image capturing apparatus 60B actually captures an image of a portion composed of the iris and pupil of the eye of the user (or a part of the portion) to acquire an image of the original screen and the finger. In the seventeenth embodiment, the image capturing apparatus 60B is configured to focus on the eye of the user in advance. Specifically, the image capturing apparatus 60B is attached to the pair of glasses 10 so that the eye of the user is positioned on the optical axis of the lens of the camera unit 61, and the focus position is adjusted so that the eye is in focus. Further, the image capture range in which the image capturing apparatus 60B can capture images is a range that includes at least a part of the eye. FIG. 44A illustrates an example of the original screen reflected on an eye, and FIG. 44B illustrates an example of the image capture range of the image capturing apparatus 60B in the terminal device 9 according to the seventeenth embodiment. Therefore, when the user operates the visual confirmation screen S with a finger of the user, the image capturing apparatus 60B can capture an image of the original screen and the finger reflected on the eye of the user in a focused state. The image data of the image captured by the image capturing apparatus 60B is transmitted from the image capturing apparatus 60B to the terminal 30E through wireless communication, and is stored in the terminal 30E. Further, the image capturing apparatus 60B in the seventeenth embodiment has a still image capturing function and a moving image capturing function, so that the terminal 30E can acquire still image data and moving image data as image data, as needed.

As illustrated in FIG. 43, the pair of glasses 10 is provided with the microphone unit 70, the speaker unit 80 which is of a bone conduction type, and the touch pad unit 90. In FIGS. 41 and 42, the details of these units are omitted for simplification of the drawings. The microphone unit 70, which is an input device for the terminal 30E, converts a voice of the user into an electrical signal and outputs the electrical signal to the terminal 30E. By using the microphone unit 70, the terminal 30E can be operated according to a voice instruction of the user. The electrical signal indicating the voice input from the microphone unit 70 is transmitted to a control unit 34E of the terminal 30E via the communication unit 40, and the control unit 34E analyzes the content of the electrical signal. Further, the speaker unit 80, which is an output device for the terminal 30E, is of a bone conduction type that converts an electric signal output from the terminal 30E into sound and transmits the sound to the user by vibration of bones. In general, the speaker unit 80 is not limited to transmitting sound to the user by utilizing vibration of bones, and may be a normal speaker, earphone, headphone, or the like, which transmits sound to the user through the user's ears. The touch pad unit 90, which is an input device for the terminal 30E, issues various instructions to the terminal 30E in response to the user performing a touch operation.

Figure 45A:
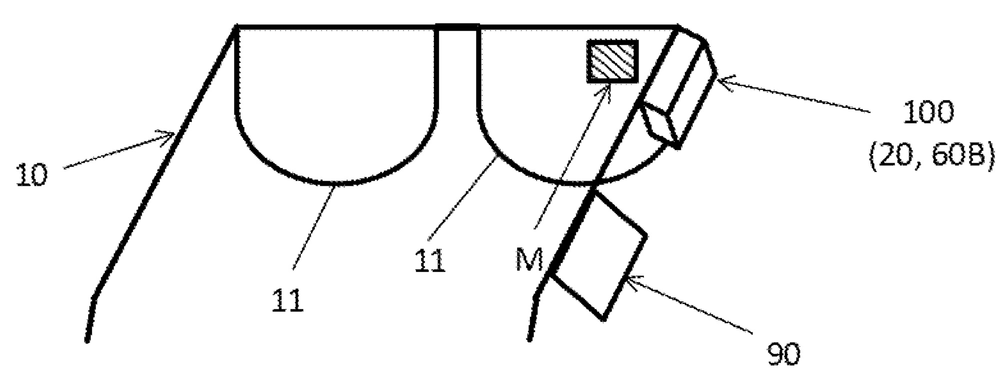
FIG. 45 illustrates examples of a location where a touch pad unit is mounted.
Figure 45B:
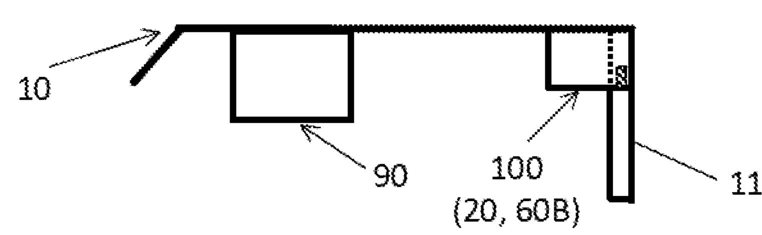
Figure 45C:
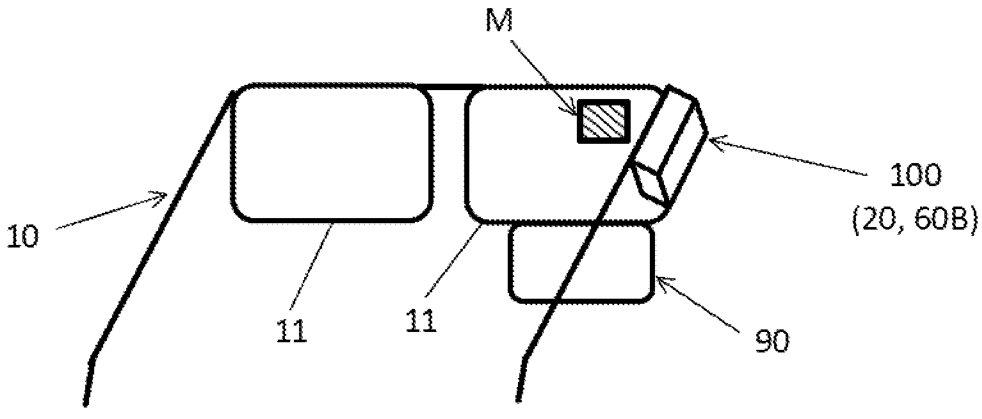
Figure 46A:
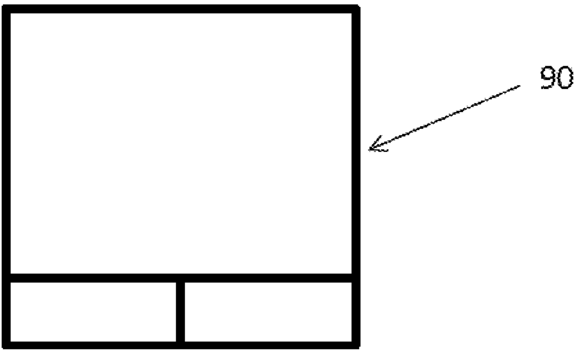
FIG. 46 illustrates configuration examples of the touch pad unit.
Figure 46B:
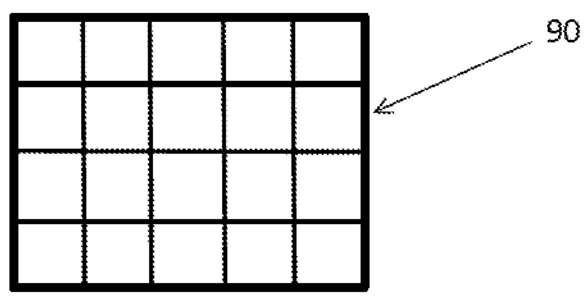
Figure 46C:
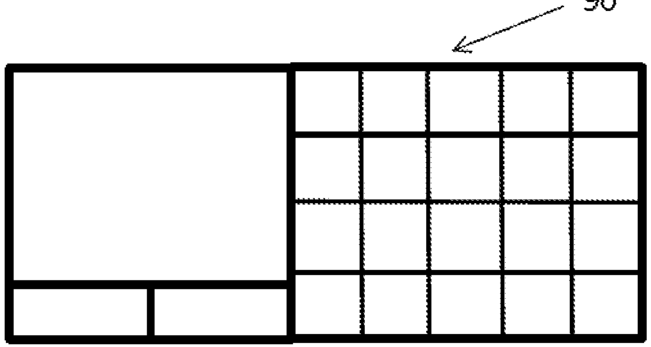

The touch pad unit 90 used in the terminal device 9 according to the seventeenth embodiment will now be described in detail. FIG. 45 illustrates examples of a location where the touch pad unit 90 is mounted, and FIG. 46 illustrates configuration examples of the touch pad unit 90. The touch pad unit 90 is attached to the temple on the right side of the pair of glasses 10 as illustrated in FIGS. 45A and 45B, or is attached to the bottom portion of the lens part 11 for the right eye as illustrated in FIG. 45C. Here, FIG. 45A is a schematic perspective view of a terminal device 9 including the touch pad unit 90 attached to the temple, and FIG. 45B is a schematic side view of the terminal device 9. Further, FIG. 45C is a schematic perspective view of a terminal device 9 including the touch pad unit 90 attached to the lens part. The touch pad unit 90 is fixedly attached to the corresponding portion, but may be attachable to and detachable from the pair of glasses (wearable object) 10. Further, the touch pad unit 90 as used may have a mouse function as illustrated in FIG. 46A, may have a simple keyboard function as illustrated in FIG. 46B, and may have both a mouse function and a simple keyboard function as illustrated in FIG. 46C. Further, the touch pad unit 90 is not limited to such examples, and may have a numeric key panel, an operation panel, or the like.

As illustrated in FIG. 43, the terminal 30E includes the display unit 31, the communication unit 32, the storage unit 33, and the control unit 34E. Examples of the programs stored in the storage unit 33 include a display apparatus control program for controlling the display apparatus 20 so that the content of the screen displayed on the display unit 31 is displayed on the display apparatus 20, a character input processing program for performing a character input process based on an operation performed on the character input screen 200 in the case where the visual confirmation screen S is the character input screen 200, and a screen display processing program for performing a screen display process such as enlargement, reduction, and switching of the original screen M corresponding to the visual confirmation screen S based on an operation performed on the visual confirmation screen S. Examples of the data stored in the storage unit 33 include image data of various original screens M and data on each original screen M (specifically, the size, shape, content, arrangement, and the like of the original screen M).

The control unit 34E includes a central processing unit (CPU) and the like to control the entire terminal 30E and also control the display apparatus 20 and the image capturing apparatus 60B. For example, when the user performs a touch operation on the display unit 31 or when the user operates the touch pad unit 90, the control unit 34E recognizes the content of the instruction issued by the operation, and executes processing according to the recognized content. When a voice is input from the microphone unit 70, the control unit 34E recognizes the content of the electrical signal indicating the input voice, and executes processing according to the recognized content. Further, the control unit 34E controls the sound output from the speaker unit 80. Furthermore, the control unit 34E executes the display apparatus control program to control the display apparatus 20 so as to display on the display apparatus 20 the content of the screen displayed on the display unit 31 as the content of the original screen M. Specifically, as illustrated in FIG. 43, the control unit 34E includes the display control unit 341, the image data extraction unit 342, the operation determination unit 343, an input control unit 346E, and an operation position identification unit 349E.

The display control unit 341 controls the display on the display unit 31 and the display apparatus 20. Specifically, when the user issues an instruction to start the display apparatus control program, the display control unit 341 executes the display apparatus control program stored in the storage unit 33 to display on the display apparatus 20 the content of the screen displayed on the display unit 31 as the content of the original screen M. This makes it possible for the user who wears the pair of glasses 10 to see the visual confirmation screen S corresponding to the original screen M to be floating in midair.

When the image capturing apparatus 60B captures images of the original screen M reflected on the eye of the user, the image data extraction unit 342 extracts image data including an image of a finger from a series of image data of the captured images. A general image recognition method is used to determine whether or not the image data includes an image of a finger. Further, the operation determination unit 343 and the operation position identification unit 349E perform processing based on the image data extracted by the image data extraction unit 342.

When the image capturing apparatus 60E captures images of the original screen M and the finger reflected on the eye of the user, the operation determination unit 343 determines what content of the operation is performed with the finger among various types of operations, based on a series of image data of the captured images that is extracted by the image data extraction unit 342. In this determination, for example, a general image recognition method is used. As a result, the operation determination unit 343 can recognize which of the tap, double tap, and long press operations, and others is the operation performed with the finger. The data on the recognized content of the operation performed with the finger is stored in the storage unit 33. In order for the operation determination unit 343 to accurately recognize the content of the operation, it is preferable that the user performs various touch operations on the visual confirmation screen S slowly and exaggeratedly.

When the image capturing apparatus 60B captures images of the original screen M and the finger reflected on the eye of the user, the operation position identification unit 349E identifies the position in the original screen M where the operation is performed with the finger, based on a series of image data of the captured images that is extracted by the image data extraction unit 342. Specifically, in the seventeenth embodiment, the operation position identification unit 349E first identifies the original screen M and the finger which are included in the image based on the image data by using a general image recognition method. Next, the operation position identification unit 349E retrieves the position where the finger is within the range of the identified original screen M, and thus generates data representing the position where the operation is performed with the finger on the original screen M. The generated data is stored in the storage unit 33.

When the user performs an operation on the visual confirmation screen S with a finger, the input control unit 346E recognizes the content of an input instruction corresponding to the operation performed on the visual confirmation screen S with the finger, based on data on the content of the operation performed with the finger, determined by the operation determination unit 343, data representing the position in the original screen M where the operation is performed with the finger, obtained by the operation position identification unit 349E, and the data on the original screen M stored in the storage unit 33, and controls the screen to be displayed on the display unit 31 and the original screen M to be displayed on the display apparatus 20 according to the recognized content of the input instruction.

Actually, when the user performs a touch operation on the visual confirmation screen S with a finger in the same manner as when the visual confirmation screen S is displayed on the touch panel, the input control unit 346E recognizes an instruction corresponding to the touch operation. For example, in the case where the visual confirmation screen S is the character input screen 200 illustrated in FIG. 15, it is assumed that the user has performed an operation of tapping a desired character key image on the character input screen 200 with a finger. In this case, the input control unit 346E recognizes that this operation is a tap operation based on the data on the content of the operation with the finger obtained by the operation determination unit 343. Further, the input control unit 346E can recognize, based on the data on the original screen M corresponding to the character input screen 200, the content of the character input screen 200 (e.g., the arrangement of the keyboard image 210 in the character input screen 200, the layout of the character key images, etc.). Accordingly, based on the data representing the position in the original screen M where the operation is performed with the finger, obtained by the operation position identification unit 349E, the input control unit 346E can identify the operated character key by retrieving a position corresponding the position represented by that data in the character input screen 200. In this way, since the tap operation is performed by the user and the operation is performed on the identified character key, the input control unit 346E can recognize that this operation indicates that an instruction to input the character represented by the character key is issued. As a result, the input control unit 346E displays on the display apparatus 20 the original screen M in which the character represented by the character keys is input in the display area 220 of the character input screen 200.

Further, when the user performs a double tap operation on the visual confirmation screen S with a finger, the input control unit 346E recognizes an instruction to enlarge or reduce the original screen M corresponding to the visual confirmation screen S. When the user performs a long press operation on the visual confirmation screen S with a finger, the input control unit 346E recognizes an instruction to display an option menu screen as the original screen M. When the user performs a drag or flick operation on the visual confirmation screen S with a finger, the input control unit 346E recognizes an instruction to scroll and display the original screen M.

In this way, the terminal device 9 according to the seventeenth embodiment makes it possible for the user to input an instruction corresponding to an operation by performing, on the visual confirmation screen S that the user looks at, the same operation as in operating a screen displayed on a typical touch panel.

In the seventeenth embodiment, since the user performs a touch operation on the visual confirmation screen S appearing to be floating in midair with a finger, the user can also perform a touch operation in a manner that is impossible to perform a touch operation on a screen displayed on a typical touch panel. The user usually performs a touch operation with one finger from the front side of the visual confirmation screen S as illustrated in FIG. 17A. The user can also perform a touch operation with one finger from the back side of the visual confirmation screen S as illustrated in FIG. 17B. Further, the user can perform a touch operation with multiple fingers from the front side of the visual confirmation screen S as illustrated in FIG. 18A, and perform a touch operation with multiple fingers from the back side of the visual confirmation screen S as illustrated in FIG. 18B.

Figure 47:
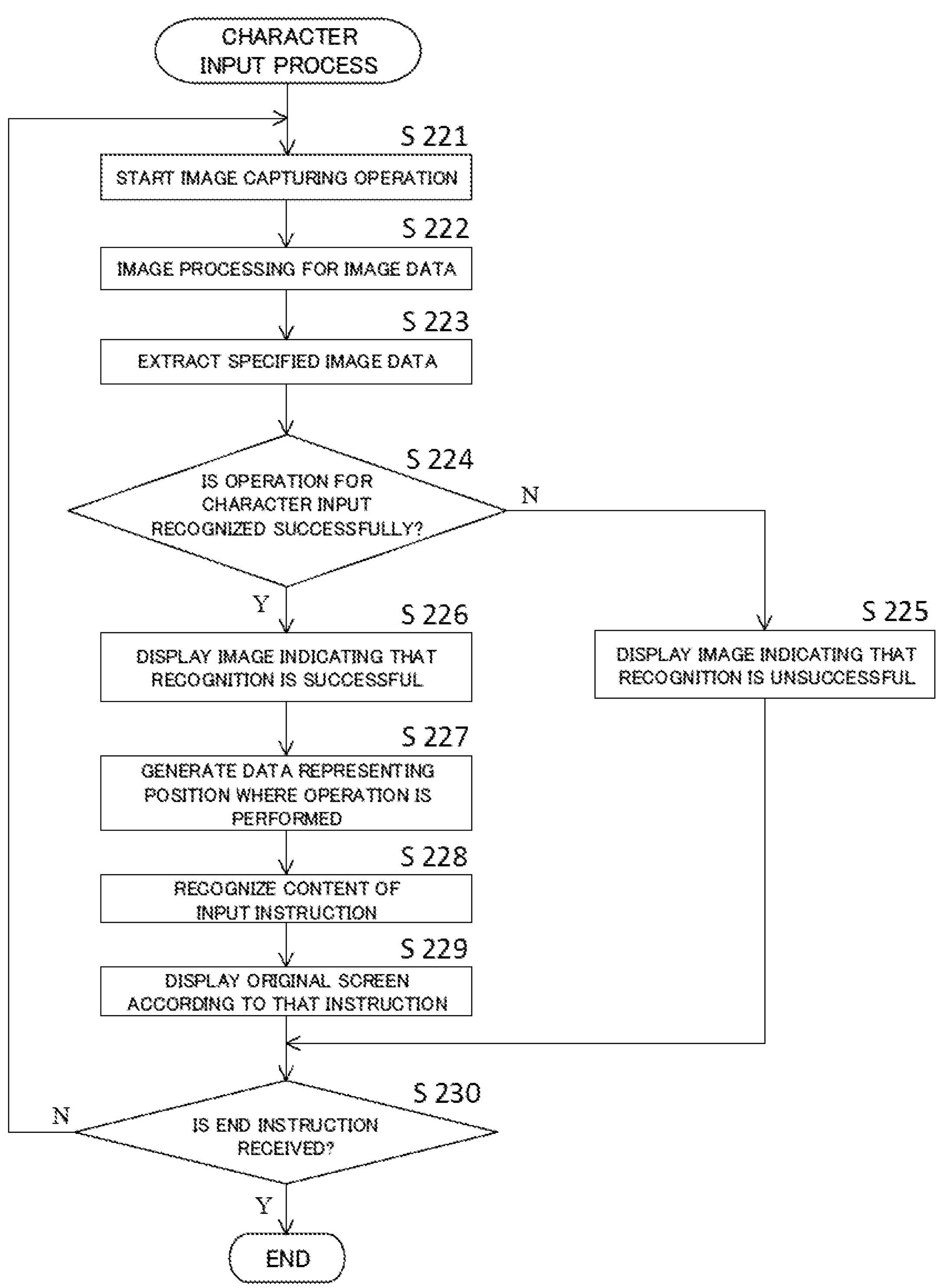
FIG. 47 is a flowchart of the procedure for a character input process using a visual confirmation screen in the terminal device according to the seventeenth embodiment.

Next, a character input process using the visual confirmation screen S in the terminal device 9 according to the seventeenth embodiment will be described. FIG. 47 is a flowchart of the procedure for the character input process using the visual confirmation screen S in the terminal device 9 according to the seventeenth embodiment. Now consider a case where the terminal 30E is executing the display apparatus control program. Specifically, it is assumed that the display apparatus 20, the communication unit 40, and the image capturing apparatus 60B are in a power-on state, and the communication of the terminal 30E with the display apparatus 20 and the image capturing apparatus 60B is enabled.

Next, the user operates the terminal 30E to display a menu screen on the display unit 31. Then, the user taps the icon for the character input processing program on the menu screen to select the character input processing program. In response to receiving a signal indicating that the character input processing program has been selected, the control unit 34E of the terminal 30E reads the character input processing program from the storage unit 33 to perform the character input process using the visual confirmation screen S according to the processing flow illustrated in FIG. 47. Note that the character input process may be executed automatically when the character input screen 200 is displayed on the display apparatus 20 as the original screen M.

The control unit 34E first displays on the display apparatus 20 the character input screen 200 as the original screen M and controls the image capturing apparatus 60B to start an image capturing operation for capturing an image of the eye of the user (S221). The user performs a predetermined operation, for example, a tap operation on the keyboard image 210 of the character input screen 200, which is the visual confirmation screen S corresponding to the original screen M currently displayed on the display apparatus 20, with a finger. Here, the reason why the user performs the predetermined operation is to inform the control unit 34E of the position on which the user performs the operation. At the time of such an operation by the user, the original screen M, or the original screen M and a finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34E through wireless communication (S222).

Next, the image data extraction unit 342 determines whether or not the transmitted image data includes an image of a finger by using a general image recognition method to extract image data that includes the image of the finger from a series of the image data of images captured by the image capturing apparatus 60B (S223). In other words, the image data extraction unit 342 extracts only the image data representing a content in which the user performs an operation with a finger. Next, the operation determination unit 343 determines whether or not the operation performed with the finger is a predetermined operation (a tap operation as used herein) based on the image data extracted by the image data extraction unit 342. This determination is made within a predetermined time. Then, the operation determination unit 343 determines that the operation for character input is successfully recognized if the operation performed with the finger is a tap operation; the operation determination unit 343 determines that the operation for character input is unsuccessfully recognized if the operation performed by the finger is not a tap operation (S224). When the operation determination unit 343 determines that the operation for character input is successfully recognized, the operation determination unit 343 stores the data on the content of the operation performed with the finger in the storage unit 33, and also transmits to the display control unit 341 a signal indicating that the operation for character input is successfully recognized. In response to receiving the signal, the display control unit 341 adds to the original screen M an image of a green light indicating that the operation for character input is successfully recognized, and displays the resulting image on the display apparatus 20 (S226). Note that the display control unit 341 may add to the original screen M an image of characters or figures indicating that the operation for character input is successfully recognized, in addition to or instead of the image of a green light. Alternatively, the control unit 34E may output a specific notification sound from the speaker unit 80 in addition to or instead of displaying such an image indicating that the operation for character input is successfully recognized.

On the other hand, when the operation determination unit 343 determines in the process of step S224 that the operation for character input is unsuccessfully recognized within a predetermined time, the operation determination unit 343 transmits a signal indicating unsuccessful to the display control unit 341. At this time, for example, also when image data including an image of a finger is not transmitted from the image data extraction unit 342 within a predetermined time, the operation determination unit 343 determines that the tap operation is unsuccessfully recognized. In response to receiving the signal indicating unsuccessful, the display control unit 341 adds to the original screen M an image of a red light indicating that the operation for character input is unsuccessfully recognized, and displays the resulting image on the display apparatus 20 (S225). After that, the process proceeds to step S230. Note that, at this time, the display control unit 341 may add to the original screen M an image of characters or figures indicating that the operation for character input is unsuccessfully recognized, in addition to or instead of the image of a red light. Alternatively, the control unit 34E may output a specific notification sound from the speaker unit 80 in addition to or instead of displaying such an image indicating that the operation for character input is unsuccessfully recognized.

After the process of step S226, the operation position identification unit 349E identifies, based on the image data determined by the operation determination unit 343 that the operation performed with the finger is a tap operation, a position in the original screen M where the operation is performed with the finger, and generates data representing the position in the original screen where the operation is performed with the finger (S227). This generated data representing the position where the operation is performed is stored in the storage unit 33.

Next, the input control unit 346E recognizes a content of an input instruction corresponding to the operation performed with the finger, based on data on the content of the operation performed with the finger, obtained by the operation determination unit 343, data representing the position in the original screen M where the operation is performed with the finger, obtained by the operation position identification unit 349E, and the data on the original screen M stored in the storage unit 33 (S228). For example, when the user performs a tap operation on a character key image in the keyboard image 210 with a finger, the input control unit 346E can determine which of the areas of the character key images in the keyboard image 210 corresponds to the position of the finger obtained from the data representing the position where the operation is performed with the finger, thus identify the character key on which the tap operation is performed, and then recognize an instruction issued to input the identified character key. After that, the input control unit 346E transmits a signal indicating the content of the recognized input instruction to the display control unit 341, and the display control unit 341 displays an original screen M corresponding to the content of the input instruction on the display apparatus 20 (S229).

After the process of step S229 or step S225, the control unit 34E determines whether or not an instruction to end the character input using the visual confirmation screen S has been received from the user (S230). If the instruction to end the character input has been received, the character input process using the visual confirmation screen S ends. Contrary to this, if the instruction to end the character input has not been received, the process proceeds to step S221 to continue the character input process using the visual confirmation screen S. The user issues an instruction to end the character input by, for example, an operation on the terminal 30E, voice, or a touch operation on the touch pad unit 90.

Figure 48:
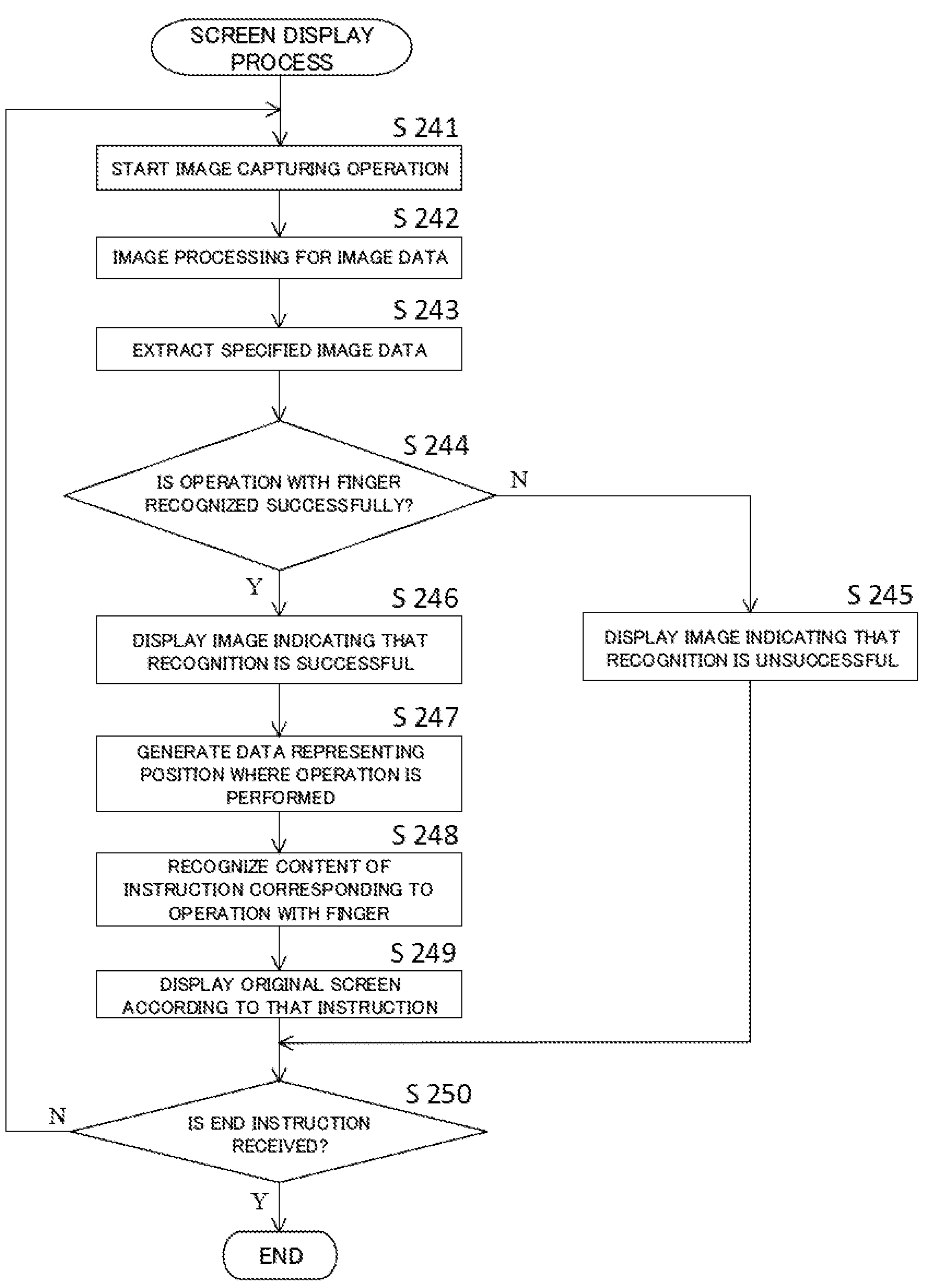
FIG. 48 is a flowchart of the procedure for a screen display process using a visual confirmation screen in the terminal device according to the seventeenth embodiment.

Next, a screen display process using the visual confirmation screen S in the terminal device 9 according to the seventeenth embodiment will be described. FIG. 48 is a flowchart of the procedure for the screen display process using the visual confirmation screen S in the terminal device 9 according to the seventeenth embodiment. Now consider a case where the terminal 30E is executing the display apparatus control program. Specifically, it is assumed that the display apparatus 20, the communication unit 40, and the image capturing apparatus 60B are in a power-on state, and the communication of the terminal 30E with the display apparatus 20 and the image capturing apparatus 60B is enabled.

Next, the user operates the terminal 30E to display a menu screen on the display unit 31. Then, the user taps the icon for the screen display processing program on the menu screen to select the screen display processing program. In response to receiving a signal indicating that the screen display processing program has been selected, the control unit 34E of the terminal 30E reads the screen display processing program from the storage unit 33 to perform the screen display process using the visual confirmation screen S according to the processing flow illustrated in FIG. 48. The screen display process may be executed automatically when the original screen M is displayed on the display apparatus 20.

The user first operates the terminal 30E to display a desired screen on the display apparatus 20. On the other hand, the control unit 34E controls the image capturing apparatus 60B to start an image capturing operation for capturing an image of the eye of the user (S241). The user performs a desired operation with a finger on the visual confirmation screen S corresponding to the original screen M currently displayed on the display apparatus 20. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34E through wireless communication (S242).

Next, the image data extraction unit 342 determines whether or not the transmitted image data includes an image of a finger by using a general image recognition method to extract image data that includes the image of the finger from a series of the image data of images captured by the image capturing apparatus 60B (S243). In other words, the image data extraction unit 342 extracts only the image data representing a content in which the user performs an operation with a finger. Next, the operation determination unit 343 determines the content of the operation performed with the finger based on the image data extracted by the image data extraction unit 342. This determination is made within a predetermined time. Then, the operation determination unit 343 determines whether or not the operation performed with the finger is successfully recognized (S244). When the operation determination unit 343 determines that the operation performed with the finger is successfully recognized, the operation determination unit 343 stores the data on the content of the operation performed with the finger in the storage unit 33, and also transmits to the display control unit 341 a signal indicating that the operation performed with the finger is successfully recognized. In response to receiving the signal, the display control unit 341 adds to the original screen M an image of a green light indicating that the operation performed with the finger is successfully recognized, and displays the resulting image on the display apparatus 20 (S246). Note that the display control unit 341 may add to the original screen M an image of characters or figures indicating that the operation performed with the finger is successfully recognized, in addition to or instead of the image of a green light. Alternatively, the control unit 34E may output a specific notification sound from the speaker unit 80 in addition to or instead of displaying such an image indicating that the operation performed with the finger is successfully recognized.

On the other hand, when the operation determination unit 343 determines in the process of step S244 that the operation performed with the finger is unsuccessfully recognized, the operation determination unit 341 transmits a signal indicating unsuccessful to the display control unit 341. At this time, for example, also when image data including an image of a finger is not transmitted from the image data extraction unit 342 within a predetermined time, the operation determination unit 343 determines that the operation performed with the finger is unsuccessfully recognized. In response to receiving the signal, the display control unit 341 adds to the original screen M an image of a red light indicating that the operation performed with the finger is unsuccessfully recognized, and displays the resulting image on the display apparatus 20 (S245). After that, the process proceeds to step S250. Note that, at this time, the display control unit 341 may add to the original screen M an image of characters or figures indicating that the operation performed with the finger is unsuccessfully recognized, in addition to or instead of the image of a red light. Alternatively, the control unit 34E may output a specific notification sound from the speaker unit 80 in addition to or instead of displaying such an image indicating that the operation performed with the finger is unsuccessfully recognized.

After the process of step S246, the operation position identification unit 349E identifies, based on the image data in which the content of the operation performed with the finger is determined by the operation determination unit 343, a position in the original screen M where the operation is performed with the finger, and generates data representing the position in the original screen M where the operation is performed with the finger (S247). This generated data representing the position where the operation is performed is stored in the storage unit 33.

Next, the input control unit 346E recognizes a content of an instruction corresponding to the operation performed with the finger, based on data on the content of the operation performed with the finger, obtained by the operation determination unit 343, data representing the position in the original screen M where the operation is performed with the finger, obtained by the operation position identification unit 349E, and the data on the original screen M stored in the storage unit 33 (S248). For example, when the user performs a double tap operation on the visual confirmation screen S with a finger, the input control unit 346E identifies that this operation is a double tap operation, and recognizes that an instruction to enlarge (or reduce) the original screen M has been received. After that, the input control unit 346E transmits a signal indicating the content of the recognized instruction to the display control unit 341, and the display control unit 341 displays an original screen M corresponding to the content of the instruction on the display apparatus 20 (S249).

After the process of step S249 or step S245, the control unit 34E determines whether or not an instruction to end the operation for screen display has been received from the user (S250). If the instruction to end the operation for screen display has been received, the screen display process ends. Contrary to this, if the instruction to end the operation for screen display has not been received, the process proceeds to step S241 to continue the screen display process. The user issues an instruction to end the operation for screen display by, for example, an operation on the terminal 30E, voice, or a touch operation on the touch pad unit 90.

Note that the above-described examples are described for the case where the control unit 34E performs the character input process in response to an instruction to input characters from the user, and also the control unit 34E performs the screen display process in response to an instruction to perform an operation for screen display from the user, but the control unit 34E may automatically switch between the character input process and the screen display process.

The terminal device according to the seventeenth embodiment has the same functions and advantageous effects as the first embodiment. Specifically, in the terminal device according to the seventeenth embodiment, the terminal is separate from the pair of glasses serving as a wearable object. Therefore, for example, an existing mobile terminal such as a smartphone or a tablet terminal can be used as the terminal. Such a use of an existing mobile terminal or the like as the terminal makes it possible to reduce the number of parts of the pair of glasses serving as a wearable object, resulting in a simplified pair of glasses. In addition, the use of a commercially available smartphone or the like as the terminal makes it possible to perform the operation using such a smartphone or the like that is familiar to the user, so that the operability can be improved.

In particular, in the terminal device according to the seventeenth embodiment, an image capturing apparatus is mounted on a main body and is configured to capture an image of an eye of a user to acquire an image of an original screen and a finger of the user reflected on the eye of the user when performing an operation on a visual confirmation screen with the finger. Further, an operation determination unit of the terminal device is configured such that when the image capturing apparatus captures the image of the original screen and the finger reflected on the eye of the user, the operation determination unit determines what content of the operation is performed with the finger among the various types of operations, based on a series of image data of images thus captured. Further, an operation position identification unit of the terminal device is configured such that when the image capturing apparatus captures the image of the original screen and the finger reflected on the eye of the user, the operation position identification unit identifies a position in the original screen where the operation is performed with the finger, based on a series of image data of images thus captured. In addition, an input control unit of the terminal device is configured such that when the user performs an operation on the visual confirmation screen with the finger, the input control unit recognizes the content of an input instruction corresponding to the operation performed on the visual confirmation screen with the finger, based on data on the content of the operation performed with the finger, obtained by the operation determination unit, data representing the position in the original screen where the operation is performed with the finger, obtained by the operation position identification unit, and the data on the original screen stored in the storage unit, and controls the original screen to be displayed on the display apparatus according to the recognized content of the input instruction. This makes it possible for the user to input an instruction corresponding to an operation by performing, on the visual confirmation screen appearing to be floating in midair, the same operation as in operating a screen displayed on a typical touch panel. Accordingly, using the terminal device according to the seventeenth embodiment makes it possible for the user to easily and accurately perform character input operations and various screen operations such as enlargement and reduction by operating the visual confirmation screen in the same manner as in typical smartphone terminals or tablet terminals.

In the above-described seventeenth embodiment, a case has been described in which the display apparatus and the image capturing apparatus are wirelessly connected to the terminal. However, the display apparatus and the image capturing apparatus may be connected to the terminal by wire using one or more cables.

In the above-described seventeenth embodiment, a case has been described in which the terminal device includes the microphone unit, the speaker unit, and the touch pad unit. However, the terminal device does not have to include all, some, or one of the microphone unit, the speaker unit, and the touch pad unit.

Further, in the above-described seventeenth embodiment, a case has been described in which the image capturing apparatus is configured to focus on an eye of the user in advance. However, an image capturing apparatus having an autofocus function may be used. In this case, the camera control unit of the image capturing apparatus includes an autofocus control unit configured to automatically focus on the eye of the user. This autofocus control unit generally controls the camera unit so as to automatically focus on a subject at a predetermined position within the image capture range. For example, the camera unit of the image capturing apparatus has one focus point in the center of the image capture range. The image capturing apparatus is attached to the pair of glasses so that the eye of the user is positioned in the optical axis of the lens of the camera unit. When image capturing is started, the autofocus control unit focuses on the subject, that is, the eye of the user in the focus point. Accordingly, the image capturing apparatus can acquire an image in a state where the eye of the user is in focus. Further, the autofocus control unit may recognize an eye, which is the subject, and automatically focus on the recognized eye.

Further, in the seventeenth embodiment, a case has been described in which the operation position identification unit identifies the original screen and the finger which are included in the image based on the image data by using a general image recognition method, then retrieves the position where the finger is within the range of the identified original screen, and thus generates data representing the position where the operation is performed with the finger on the original screen. However, the operation position identification unit as used herein may perform the following processing. Specifically, the operation position identification unit may be configured such that when the image capturing apparatus captures the image of the original screen and the finger reflected on the eye of the user, the operation position identification unit obtains a range of the original screen within an image capture range that is a range in which the image capturing apparatus can capture an image and a position of the finger within the image capture range, based on a series of image data of images thus captured, and identifies the position in the original screen where the operation is performed with the finger, based on the obtained range of the original screen within the image capture range and the obtained position of the finger within the image capture range.

Figure 49A:
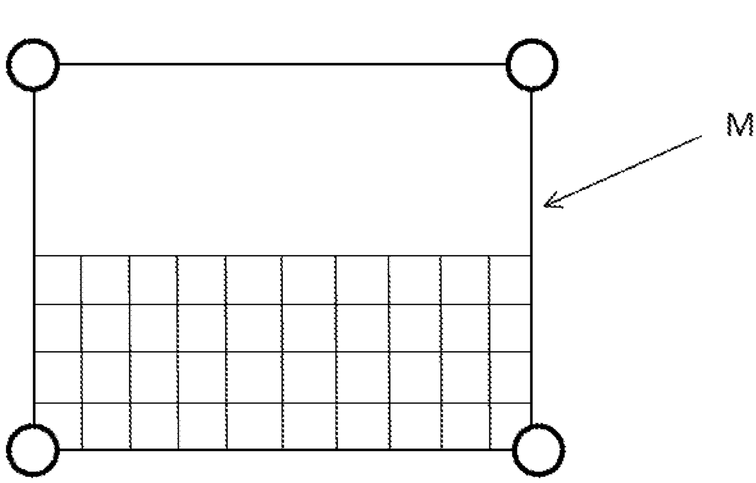
FIG. 49 illustrates examples of an original screen which is desirable for an operation position identification unit to identify the range of the original screen.
Figure 49B:
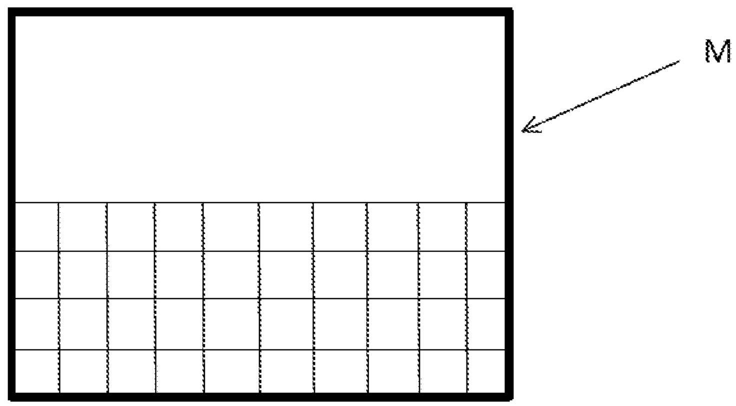

The content of the processing performed by this operation position identification unit will be described in detail. For this processing, as illustrated in FIG. 44B, an XY coordinate system is set with the left-right direction as the X-axis direction and the vertical direction as the Y-axis direction within the image capture range of the image capturing apparatus. The origin of this XY coordinate system is taken at an arbitrary position. The operation position identification unit first recognizes the image of the original screen based on the image data, and acquires position data for each position of the four corners of the image of the original screen in the XY coordinate system. The acquired position data for each position of the four corners is data representing the range of the original screen within the image capture range. Examples of the original screen which is desirable for the operation position identification unit to identify the range of the original screen are now illustrated in FIG. 49. In order for the operation position identification unit to easily recognize the image on the original screen, for example, the original screen may have large circles or the like arranged in advance at the four corners as illustrated in FIG. 49A, or have a frame represented by a thick line as illustrated in FIG. 49B. Next, the operation position identification unit recognizes the finger of the user based on the image data, and acquires position data of the finger of the user in the XY coordinate system. After that, the operation position identification unit calculates position data of the finger of the user in an xy coordinate system, for example, with the lower left point of the original screen as the origin, based on the position data for each position of the four corners in the XY coordinate system and the position data of the finger of the user in the XY coordinate system. The position data of the finger of the user in the xy coordinate system thus calculated is data for identifying the position in the original screen where the operation is performed with the finger.

Eighteenth Embodiment

Next, a terminal device according to a eighteenth embodiment of the present invention will be described. FIG. 50 is a schematic block diagram of the terminal device according to the eighteenth embodiment of the present invention. In the eighteenth embodiment, the apparatuses/units having the same functions as those of the seventeenth embodiment described above are designated by the same reference numerals, and detailed description thereof will be omitted.

As illustrated in FIG. 50, the terminal device 9A according to the eighteenth embodiment includes the pair of glasses 10, the display apparatus 20 mounted on the pair of glasses 10, a terminal 30F being separate from the pair of glasses 10 and including the display unit 31, the communication unit 40, the image capturing apparatus 60B for capturing an image of an eye of the user, the microphone unit 70, the speaker unit 80, and the touch pad unit 90. Further, the terminal 30F includes the display unit 31, the communication unit 32, the storage unit 33, and a control unit 34F, and the control unit 34F includes the display control unit 341, an iris and pupil image data generation unit 351, an image difference extraction unit 352, the image data extraction unit 342, the operation determination unit 343, the input control unit 346E, and the operation position identification unit 349E.

This terminal device 9A according to the eighteenth embodiment mainly differs from the terminal device 9 according to the seventeenth embodiment in that the control unit 34F of the terminal 30F includes the iris and pupil image data generation unit 351 and the image difference extraction unit 352. The other configurations of the terminal device 9A according to the eighteenth embodiment are the same as those of the terminal device 9 according to the seventeenth embodiment.

When the image capturing apparatus 60B captures an image of an eye of the user before the original screen M is displayed on the display apparatus 20, the iris and pupil image data generation unit 351 generates image data of the iris and pupil based on the image data of the captured image, and stores the generated image data in the storage unit 33. Here, it is preferable that the timing at which the image capturing apparatus 60B captures the image for the image data is immediately before the original screen M is displayed on the display apparatus 20. This is because the state of the iris and pupil of the user included in the image data of the iris and pupil generated by the iris and pupil image data generation unit 351 needs to be almost the same as the state when the user performs an operation on the visual confirmation screen S. Further, when the image capturing apparatus 60B captures an image of the original screen M and the finger reflected on the eye of the user, the image difference extraction unit 352 performs a process of extracting a difference between the image data of the captured image and the image data of the iris and pupil stored in the storage unit 33 to generate image data in which an image of the iris and pupil is removed. Accordingly, the image data from which the difference is extracted is the image data in which the image of the iris and pupil of the user unnecessary for performing image recognition is removed and thus only the original screen M and the finger remain. In the eighteenth embodiment, the image data extraction unit 342 performs an image data extraction process using a series of image data generated by the image difference extraction unit 352.

Figure 51:
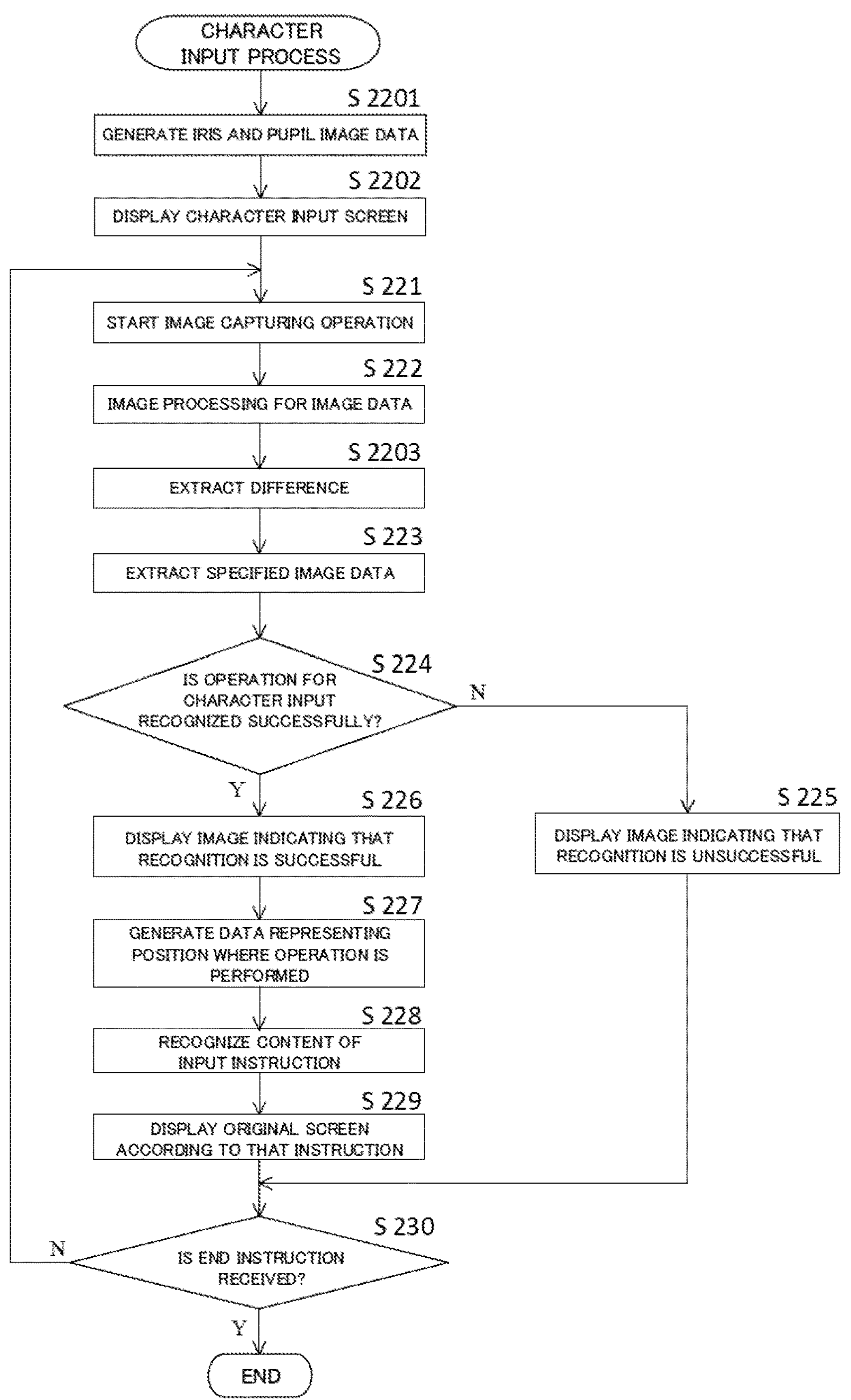
FIG. 51 is a flowchart of the procedure for a character input process using a visual confirmation screen in the terminal device according to the eighteenth embodiment.

Next, a character input process using the visual confirmation screen S in the terminal device 9A according to the eighteenth embodiment will be described. FIG. 51 is a flowchart of the procedure for the character input process using the visual confirmation screen S in the terminal device 9A according to the eighteenth embodiment. In the flowchart of FIG. 51, the processing having the same content as the flowchart of FIG. 47 in the above-described seventeenth embodiment is given the same step reference numerals, and detailed description thereof will be omitted.

Now consider a case where the terminal 30F is executing the display apparatus control program. Specifically, it is assumed that the display apparatus 20, the communication unit 40, and the image capturing apparatus 60B are in a power-on state, and the communication of the terminal 30F with the display apparatus 20 and the image capturing apparatus 60B is enabled.

Next, the user operates the terminal 30F to display a menu screen on the display unit 31. Then, the user taps the icon for the character input processing program on the menu screen to select the character input processing program. In response to receiving a signal indicating that the character input processing program has been selected, the control unit 34F of the terminal 30F reads the character input processing program from the storage unit 33 to perform the character input process using the visual confirmation screen S according to the processing flow illustrated in FIG. 51.

According to the processing flow illustrated in FIG. 51, the control unit 34F first causes the speaker unit 80 to output, for example, voice "Look in the direction in which the original screen is displayed for a few seconds". As a result, the user looks in the direction in which the original screen is displayed according to that voice instruction. At this time, the control unit 34F temporarily puts the display apparatus 20 into a state in which nothing is displayed, and controls the image capturing apparatus 60B to capture an image of an eye of the user by the image capturing apparatus 60B. Then, the iris and pupil image data generation unit 351 generates image data of the iris and pupil based on the image data of the image of the eye of the user captured by the image capturing apparatus 60B (S2201). The generated image data of the iris and pupil are stored in the storage unit 33. When the image data of the iris and pupil is generated in this way, the display control unit 341 displays the character input screen 200 as the original screen M on the display apparatus 20 (S2202). This makes it possible for the user to see the visual confirmation screen S corresponding to the original screen M to be floating in midair. After that, the control unit 34F controls the image capturing apparatus 60B to start an image capturing operation for capturing an image of the eye of the user (S221). The user performs a predetermined operation, for example, a tap operation on the keyboard image 210 of the character input screen 200, which is the visual confirmation screen S, with a finger. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34F through wireless communication (S222).

Next, the image difference extraction unit 352 performs the process of extracting a difference between the image data of the image captured by the image capturing apparatus 60B and the image data of the iris and pupil stored in the storage unit 33 (S2203). As a result, image data in which the image of the iris and pupil is removed can be obtained. Next, the image data extraction unit 342 determines whether or not the image data generated by the image difference extraction unit 352 includes an image of a finger by using a general image recognition method to extract image data that includes the image of the finger from a series of the image data of images captured by the image capturing apparatus 60B (S223). Here, since the image data extracted by the image data extraction unit 342 includes a finger, the image data includes the image of the original screen M and the finger reflected on the eye of the user. After that, the process proceeds to step S224. The processes of step S224 and the subsequent steps are the same as the processing according to the flowchart of FIG. 47 in the seventeenth embodiment.

Figure 52:
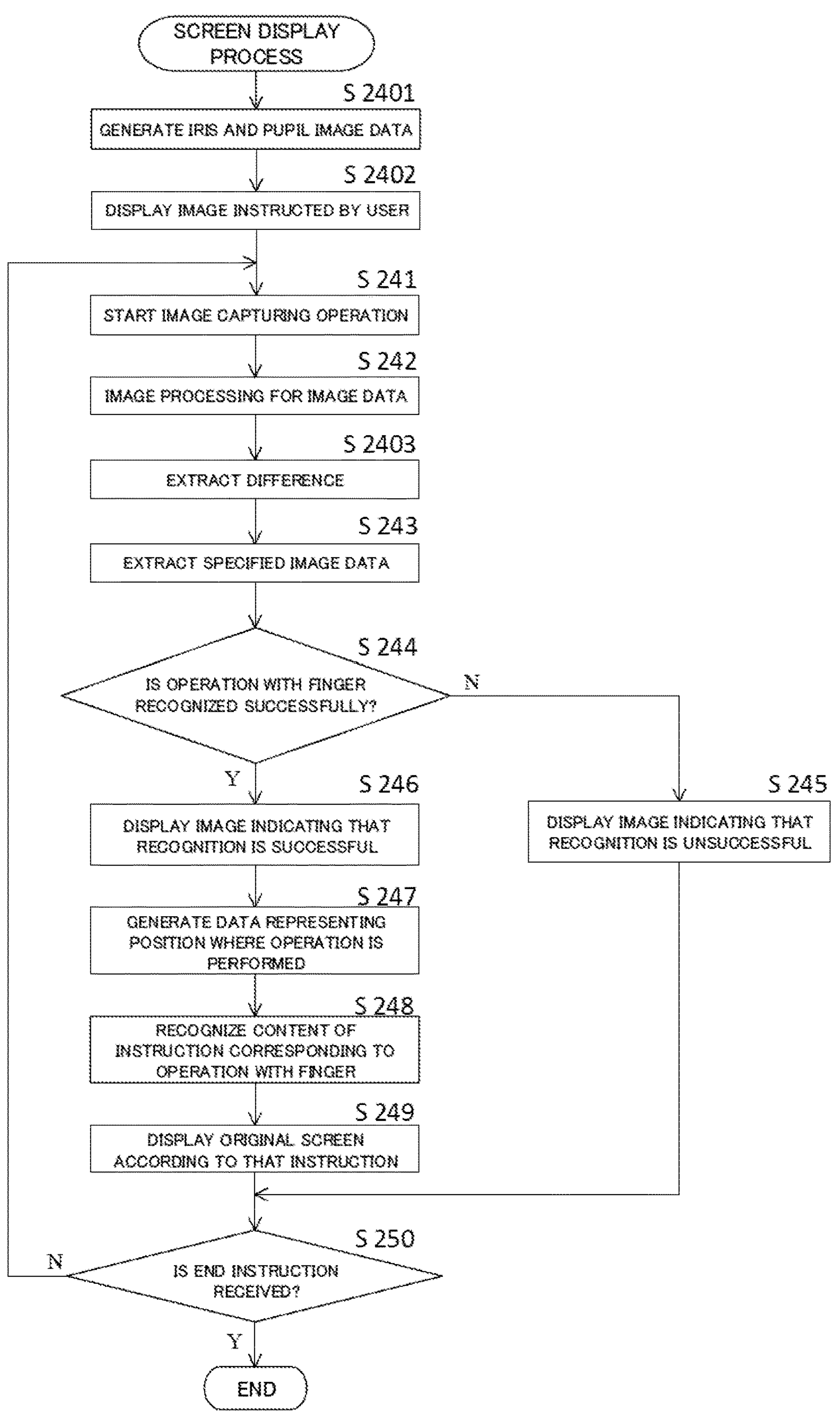
FIG. 52 is a flowchart of the procedure for a screen display process using a visual confirmation screen in the terminal device according to the eighteenth embodiment.

Next, a screen display process using the visual confirmation screen S in the terminal device 9A according to the eighteenth embodiment will be described. FIG. 52 is a flowchart of the procedure for the screen display process using the visual confirmation screen S in the terminal device 9A according to the eighteenth embodiment. In the flowchart of FIG. 52, the processing having the same content as the flowchart of FIG. 48 in the above-described seventeenth embodiment is given the same step reference numerals, and detailed description thereof will be omitted.

Now consider a case where the terminal 30F is executing the display apparatus control program. Specifically, it is assumed that the display apparatus 20, the communication unit 40, and the image capturing apparatus 60B are in a power-on state, and the communication of the terminal 30F with the display apparatus 20 and the image capturing apparatus 60B is enabled.

Next, the user operates the terminal 30F to display a menu screen on the display unit 31. Then, the user taps the icon for the screen display processing program on the menu screen to select the screen display processing program. In response to receiving a signal indicating that the screen display processing program has been selected, the control unit 34F of the terminal 30F reads the screen display processing program from the storage unit 33 to perform the screen display process using the visual confirmation screen S according to the processing flow illustrated in FIG. 52.

According to the processing flow illustrated in FIG. 52, the control unit 34F first causes the speaker unit 60 to output, for example, voice "Look in the direction in which the original screen is displayed for a few seconds". As a result, the user looks in the direction in which the original screen is displayed according to that voice instruction. At this time, the control unit 34F temporarily puts the display apparatus 20 into a state in which nothing is displayed, and controls the image capturing apparatus 60B to capture an image of an eye of the user by the image capturing apparatus 60B. Then, the iris and pupil image data generation unit 351 generates image data of the iris and pupil based on the image data of the image of the eye of the user captured by the image capturing apparatus 60B (S2401). The generated image data of the iris and pupil are stored in the storage unit 33. Next, the user operates the terminal 30F to display a desired screen on the display apparatus 20. As a result, the display control unit 341 displays the screen as the original screen M on the display apparatus 20 (S2402), and thus the user can see the visual confirmation screen S corresponding to the original screen M to be floating in midair. After that, the control unit 34F controls the image capturing apparatus 60B to start an image capturing operation for capturing an image of the eye of the user (S241). The user performs a desired operation on the visual confirmation screen S with a finger. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34F through wireless communication (S242).

Next, the image difference extraction unit 352 performs the process of extracting a difference between the image data of the image captured by the image capturing apparatus 60B and the image data of the iris and pupil stored in the storage unit 33 (S2403). As a result, image data in which the image of the iris and pupil is removed can be obtained. Next, the image data extraction unit 342 determines whether or not the image data generated by the image difference extraction unit 352 includes an image of a finger by using a general image recognition method to extract image data that includes the image of the finger from a series of the image data of images captured by the image capturing apparatus 60B (S243). Here, since the image data extracted by the image data extraction unit 342 includes a finger, the image data includes the image of the original screen M and the finger reflected on the eye of the user. After that, the process proceeds to step S244. The processes of step S244 and the subsequent steps are the same as the processing according to the flowchart of FIG. 48 in the seventeenth embodiment.

The terminal device according to the eighteenth embodiment has the same functions and advantageous effects as the seventeenth embodiment.

In particular, the terminal device according to the eighteenth embodiment includes an iris and pupil image data generation unit configured such that when the image capturing apparatus captures an image of the eye of the user before the display apparatus displays the original screen, the iris and pupil image data generation unit generates image data of an iris and pupil based on image data of the captured image and stores the generated image data in the storage unit; and an image difference extraction unit configured such that when the image capturing apparatus captures the image of the original screen and the finger reflected on the eye of the user, the image difference extraction unit performs a process of extracting a difference between image data of the captured image and the image data of the iris and pupil stored in the storage unit to generate image data in which an image of the iris and pupil is removed. The image data extraction unit is configured to perform a process of extracting the image data by using a series of the image data generated by the image difference extraction unit. As a result, the image data generated by the image difference extraction unit include no image of the iris and the pupil, so that the image data extraction unit can easily perform the process of extracting the image data including the image of the finger.

Incidentally, in the case where the user wears a contact lens, the image difference extraction unit may be configured to generate image data in which the image of the contact lens is removed as well as the image of the iris and the pupil. Specifically, the iris and pupil image data generation unit may be configured such that when the image capturing apparatus captures an image of the eye of the user who wears a contact lens before the display apparatus displays the original screen, the iris and pupil image data generation unit generates image data of the contact lens, iris, and pupil based on image data of the captured image and stores the generated image data in the storage unit. The image difference extraction unit may be configured such that when the image capturing apparatus captures the image of the original screen and the finger reflected on the eye of the user, the image difference extraction unit performs a process of extracting a difference between image data of the captured image and the image data of contact lens, iris, and pupil stored in the storage unit to generate image data in which an image of the contact lens, iris and pupil is removed. As a result, the image data generated by the image difference extraction unit include no image of the contact lens, the iris, and the pupil, so that the image data extraction unit can easily perform the process of extracting the image data including the image of the finger.

In the above-described eighteenth embodiment, a case has been described in which the display apparatus and the image capturing apparatus are wirelessly connected to the terminal. However, the display apparatus and the image capturing apparatus may be connected to the terminal by wire using one or more cables.

Nineteenth Embodiment

Next, a terminal device according to a nineteenth embodiment of the present invention will be described. FIG. 53 is a schematic block diagram of the terminal device according to the nineteenth embodiment of the present invention. In the nineteenth embodiment, the apparatuses/units having the same functions as those of the seventeenth embodiment described above are designated by the same reference numerals, and detailed description thereof will be omitted.

As illustrated in FIG. 53, the terminal device 9B according to the nineteenth embodiment includes the pair of glasses 10, the display apparatus 20 mounted on the pair of glasses 10, a terminal 30G being separate from the pair of glasses 10 and including the display unit 31, the communication unit 40, the image capturing apparatus 60B for capturing an image of an eye of the user, the microphone unit 70, the speaker unit 80, and the touch pad unit 90. Further, the terminal 30G includes the display unit 31, the communication unit 32, the storage unit 33, and a control unit 34G, and the control unit 34G includes the display control unit 341, an image conversion unit 353, the image data extraction unit 342, the operation determination unit 343, the input control unit 346E, and the operation position identification unit 349E.

This terminal device 9B according to the nineteenth embodiment mainly differs from the terminal device 9 according to the seventeenth embodiment in that the control unit 34G of the terminal 30G includes the image conversion unit 353. The other configurations of the terminal device 9B according to the nineteenth embodiment are the same as those of the terminal device 9 according to the seventeenth embodiment.

The image conversion unit 353 performs image conversion on the image data of an image captured by the image capturing apparatus 60B such that the image of the original screen M and the finger reflected on the eye of the user having a spherical shape in nature becomes an image imaged on a plane. For example, this image conversion is performed by an image conversion formula created in advance using the curvature of an eye (eyeball surface) or the like. In the nineteenth embodiment, the image data extraction unit 342 performs a predetermined process using a series of image data subjected to the image conversion by the image conversion unit 353.

Figure 54:
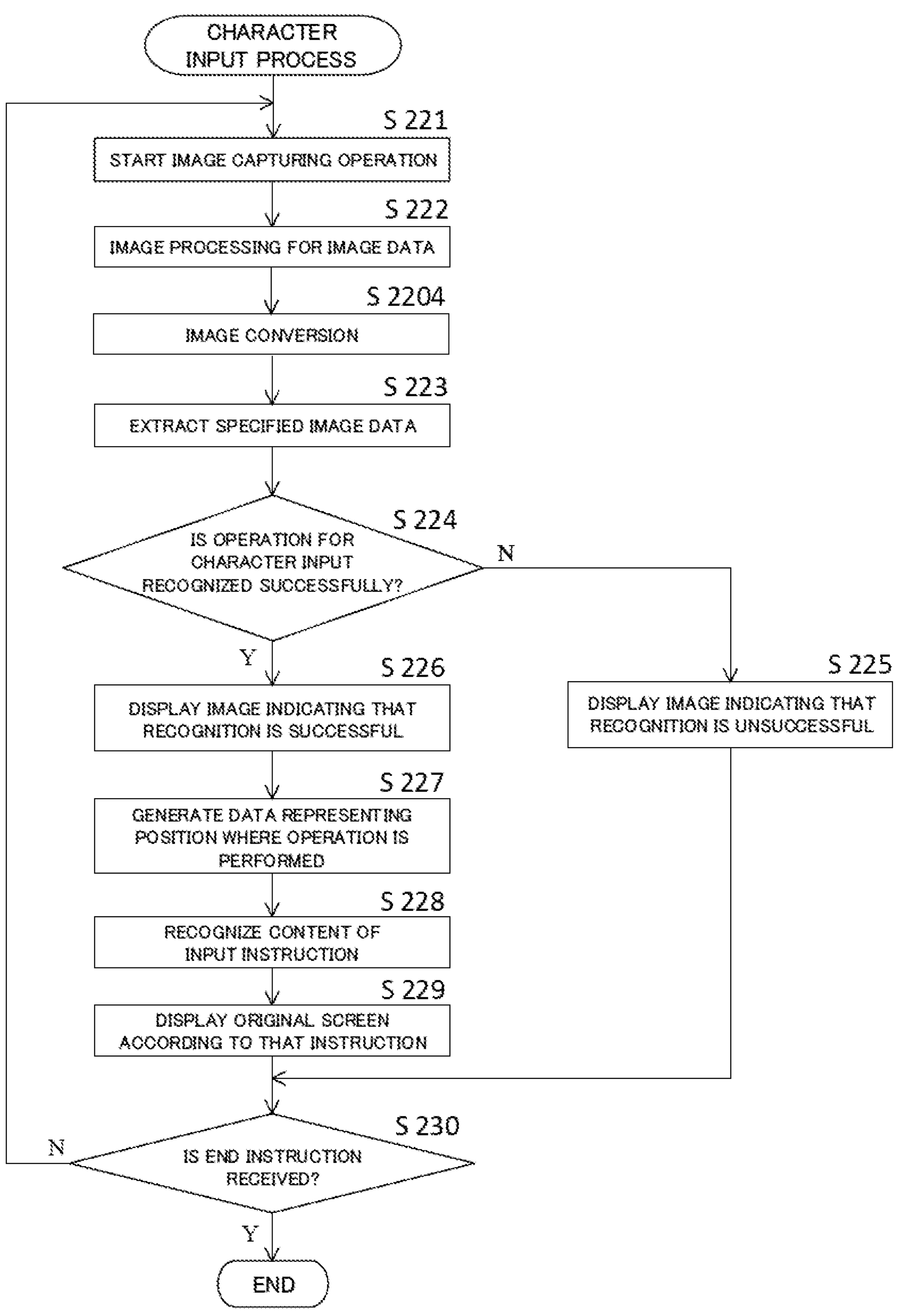
FIG. 54 is a flowchart of the procedure for a character input process using a visual confirmation screen in the terminal device according to the nineteenth embodiment.

Next, a character input process using the visual confirmation screen S in the terminal device 9B according to the nineteenth embodiment will be described. FIG. 54 is a flowchart of the procedure for the character input process using the visual confirmation screen S in the terminal device 9B according to the nineteenth embodiment. In the flowchart of FIG. 54, the processing having the same content as the flowchart of FIG. 47 in the above-described seventeenth embodiment is given the same step reference numerals, and detailed description thereof will be omitted.

Now consider a case where the terminal 30G is executing the display apparatus control program. Specifically, it is assumed that the display apparatus 20, the communication unit 40, and the image capturing apparatus 60B are in a power-on state, and the communication of the terminal 30G with the display apparatus 20 and the image capturing apparatus 60B is enabled.

Next, the user operates the terminal 30G to display a menu screen on the display unit 31. Then, the user taps the icon for the character input processing program on the menu screen to select the character input processing program. In response to receiving a signal indicating that the character input processing program has been selected, the control unit 34G of the terminal 30G reads the character input processing program from the storage unit 33 to perform the character input process using the visual confirmation screen S according to the processing flow illustrated in FIG. 54. Note that the character input process may be executed automatically when the character input screen 200 is displayed on the display apparatus 20 as the original screen M.

According to the processing flow illustrated in FIG. 54, the control unit 34G first displays on the display apparatus 20 the character input screen 200 as the original screen M and controls the image capturing apparatus 60B to start an image capturing operation for capturing an image of the eye of the user (S221). The user performs a predetermined operation, for example, a tap operation on the keyboard image 210 of the character input screen 200, which is the visual confirmation screen S corresponding to the original screen M currently displayed on the display apparatus 20, with a finger. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34G through wireless communication (S222).

Next, the image conversion unit 353 performs image conversion on the image data of the image captured by the image capturing apparatus 60B such that the image of the original screen M and the finger reflected on the eye of the user having a spherical shape in nature becomes an image imaged on a plane (S2204). This image data obtained by the image conversion is transmitted to the image data extraction unit 342. Then, the image data extraction unit 342 determines whether or not the transmitted image data includes an image of a finger by using a general image recognition method to extract image data that includes the image of the finger from a series of the image data of images captured by the image capturing apparatus 60B (S223). After that, the process proceeds to step S224. The processes of step S224 and the subsequent steps are the same as the processing according to the flowchart of FIG. 47 in the seventeenth embodiment.

Figure 55:
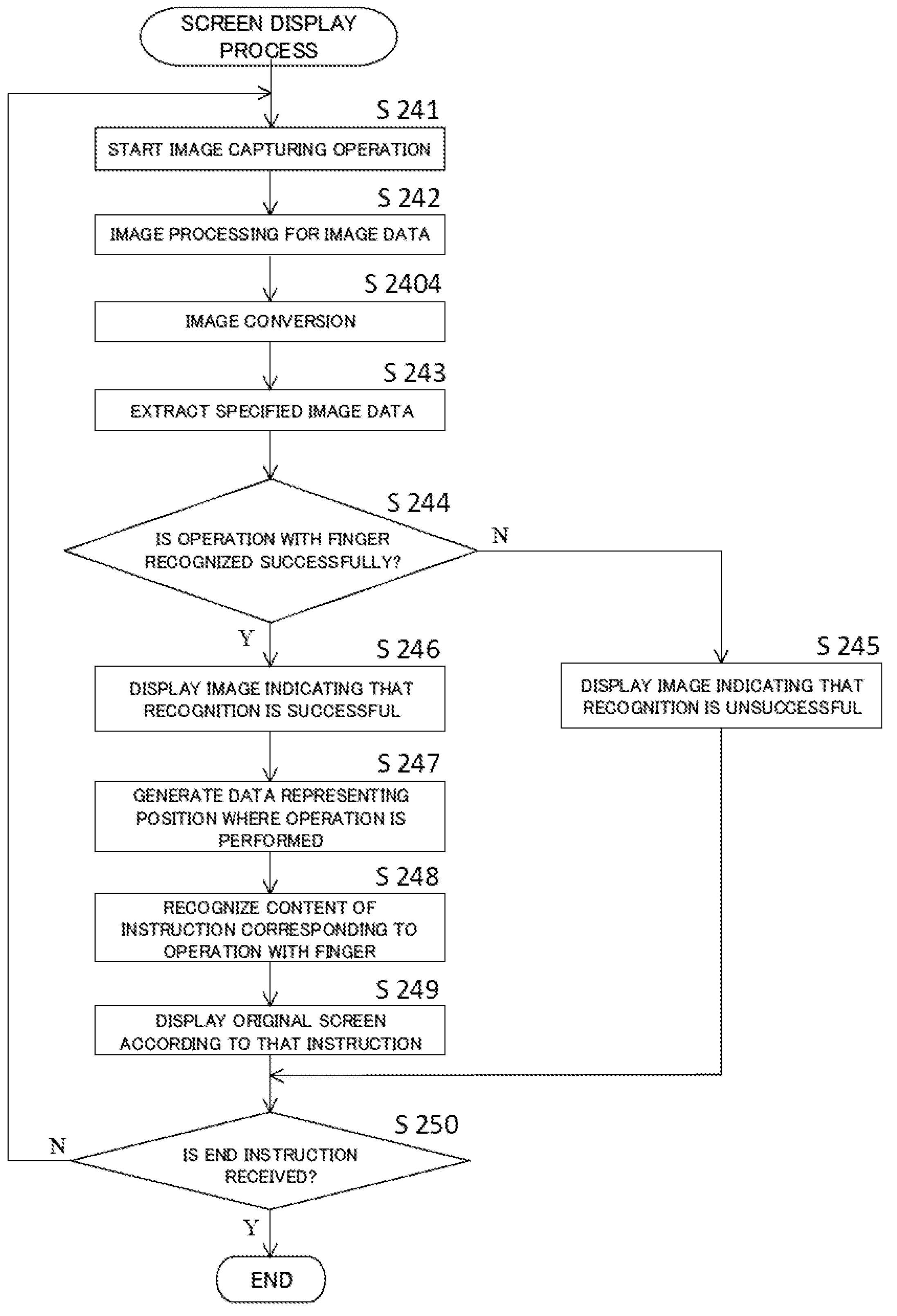
FIG. 55 is a flowchart of the procedure for a screen display process using a visual confirmation screen in the terminal device according to the nineteenth embodiment.

Next, a screen display process using the visual confirmation screen S in the terminal device 9B according to the nineteenth embodiment will be described. FIG. 55 is a flowchart of the procedure for the screen display process using the visual confirmation screen S in the terminal device 9B according to the nineteenth embodiment. In the flowchart of FIG. 55, the processing having the same content as the flowchart of FIG. 48 in the above-described seventeenth embodiment is given the same step reference numerals, and detailed description thereof will be omitted.

Now consider a case where the terminal 30G is executing the display apparatus control program. Specifically, it is assumed that the display apparatus 20, the communication unit 40, and the image capturing apparatus 60B are in a power-on state, and the communication of the terminal 30G with the display apparatus 20 and the image capturing apparatus 60B is enabled.

Next, the user operates the terminal 30G to display a menu screen on the display unit 31. Then, the user taps the icon for the screen display processing program on the menu screen to select the screen display processing program. In response to receiving a signal indicating that the screen display processing program has been selected, the control unit 34G of the terminal 30G reads the screen display processing program from the storage unit 33 to perform the screen display process using the visual confirmation screen S according to the processing flow illustrated in FIG. 55. Note that the screen display process may be executed automatically when the original screen M is displayed on the display apparatus 20.

The user first operates the terminal 30G to display a desired screen on the display apparatus 20. On the other hand, the control unit 34G controls the image capturing apparatus 60B to start an image capturing operation for capturing an image of the eye of the user (S241). The user performs a desired operation with a finger on the visual confirmation screen S corresponding to the original screen M currently displayed on the display apparatus 20. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34G through wireless communication (S242).

Next, the image conversion unit 353 performs image conversion on the image data of the image captured by the image capturing apparatus 60B such that the image of the original screen M and the finger reflected on the eye of the user having a spherical shape in nature becomes an image imaged on a plane (S2404). This image data obtained by the image conversion is transmitted to the image data extraction unit 342. Then, the image data extraction unit 342 determines whether or not the transmitted image data includes an image of a finger by using a general image recognition method to extract image data that includes the image of the finger from a series of the image data of images captured by the image capturing apparatus 60B (S243). After that, the process proceeds to step S244. The processes of step S244 and the subsequent steps are the same as the processing according to the flowchart of FIG. 48 in the seventeenth embodiment.

The terminal device according to the nineteenth embodiment has the same functions and advantageous effects as the seventeenth embodiment.

In particular, the terminal device according to the nineteenth embodiment includes an image conversion unit configured to perform image conversion on the image data of the images captured by the image capturing apparatus such that the image of the original screen and the finger reflected on the eye of the user having a spherical shape in nature becomes an image imaged on a plane. The image data extraction unit is configured to use a series of image data subjected to the image conversion by the image conversion unit to perform a process of extracting the image data. As a result, the terminal device has an advantageous effect that the series of image data extracted by the image data extraction unit has been subjected to distortion correction, so that the operation position identification unit can accurately identify the position in the original screen where the operation is performed with the finger.

Note that the image conversion unit in the nineteenth embodiment may be provided in the terminal of the terminal device in the eighteenth embodiment.

In the above-described nineteenth embodiment, a case has been described in which the display apparatus and the image capturing apparatus are wirelessly connected to the terminal. However, the display apparatus and the image capturing apparatus may be connected to the terminal by wire using one or more cables.

Twentieth Embodiment

Figure 56:
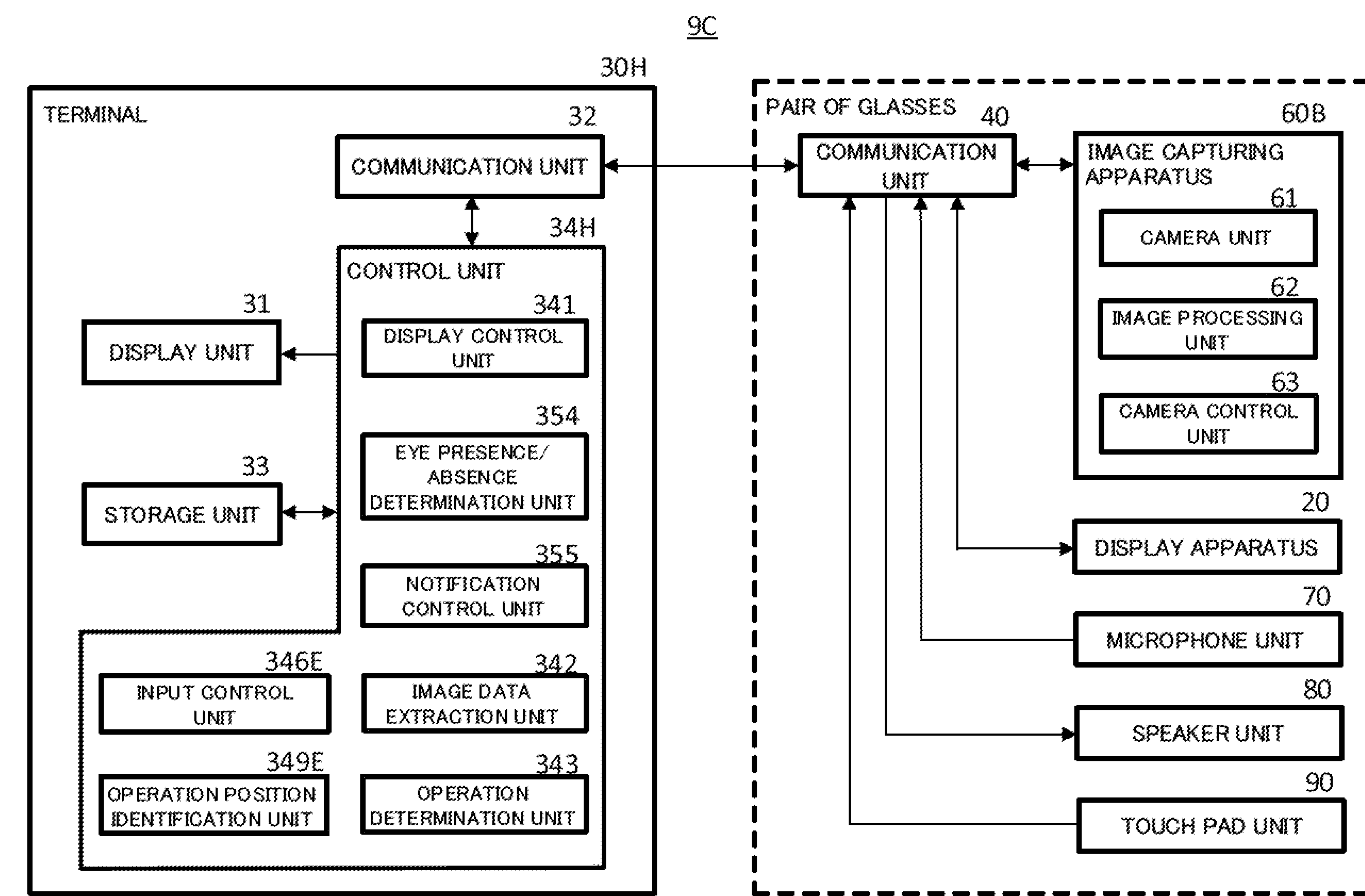
FIG. 56 is a schematic block diagram of a terminal device according to a twentieth embodiment of the present invention.

Next, a terminal device according to a twentieth embodiment of the present invention will be described. FIG. 56 is a schematic block diagram of the terminal device according to the twentieth embodiment of the present invention. In the twentieth embodiment, the apparatuses/units having the same functions as those of the seventeenth embodiment described above are designated by the same reference numerals, and detailed description thereof will be omitted.

As illustrated in FIG. 56, the terminal device 9C according to the twentieth embodiment includes the pair of glasses 10, the display apparatus 20 mounted on the pair of glasses 10, a terminal 30H being separate from the pair of glasses 10 and including the display unit 31, the communication unit 40, the image capturing apparatus 60B for capturing an image of an eye of the user, the microphone unit 70, the speaker unit 80, and the touch pad unit 90. Further, the terminal 30H includes the display unit 31, the communication unit 32, the storage unit 33, and a control unit 34H, and the control unit 34H includes the display control unit 341, an eye presence/absence determination unit 354, a notification control unit 355, the image data extraction unit 342, the operation determination unit 343, the input control unit 346E, and the operation position identification unit 349E.

This terminal device 9C according to the twentieth embodiment mainly differs from the terminal device 9 according to the seventeenth embodiment in that the control unit 34H of the terminal 30H includes the eye presence/absence determination unit 354 and the notification control unit 355. The other configurations of the terminal device 9C according to the twentieth embodiment are the same as those of the terminal device 9 according to the seventeenth embodiment.

The eye presence/absence determination unit 354 determines whether or not the image data of the image captured by the image capturing apparatus 60B includes an image of the eye of the user by using a general image recognition method to detect that image data not including the image of the eye of the user has been continuously acquired by the image capturing apparatus 60B for a certain period of time. Further, when the eye presence/absence determination unit 354 detects that image data not including the image of the eye of the user has been continuously acquired by the image capturing apparatus 60B for the certain period of time, the notification control unit 355 controls the speaker unit (notification device) 80 to output sound from the speaker unit 80. The fact that the image data not including the image of the eye of the user has been continuously acquired by the image capturing apparatus 60B for the certain period of time is considered to mean that the user has the eye closed, for example, sleeping. Therefore, for example, when the user is driving a car, the notification control unit 355 recognizes that the user is dozing off based on the detection result from the eye presence/absence determination unit 354, and causes the speaker unit 80 to output a warning sound, so that it is possible to prevent dozing driving.

Figure 57:
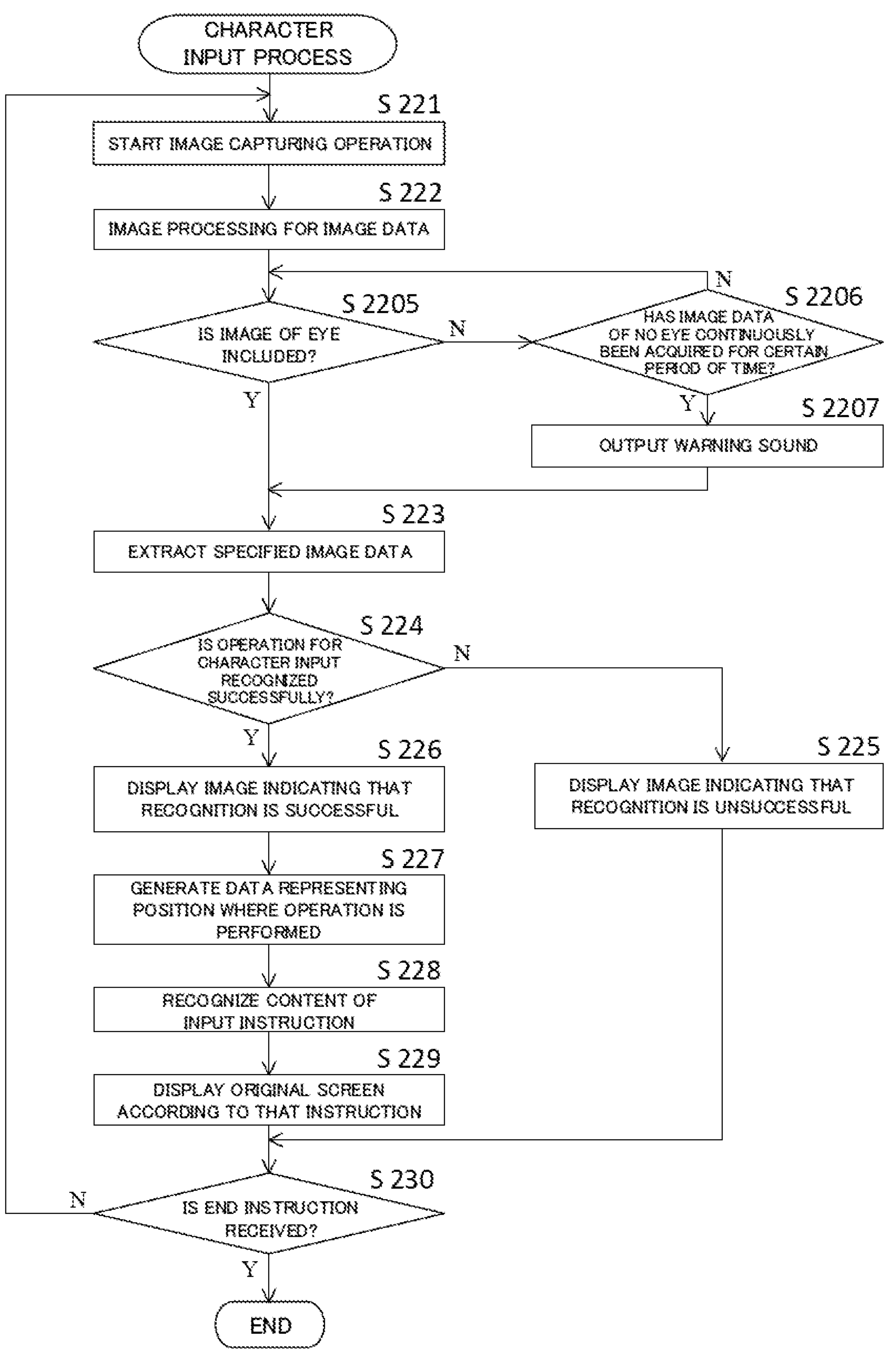
FIG. 57 is a flowchart of the procedure for a character input process using a visual confirmation screen in the terminal device according to the twentieth embodiment.

Next, a character input process using the visual confirmation screen S in the terminal device 9C according to the twentieth embodiment will be described. FIG. 57 is a flowchart of the procedure for the character input process using the visual confirmation screen S in the terminal device 9C according to the twentieth embodiment. In the flowchart of FIG. 57, the processing having the same content as the flowchart of FIG. 47 in the above-described seventeenth embodiment is given the same step reference numerals, and detailed description thereof will be omitted.

Now consider a case where the terminal 30H is executing the display apparatus control program. Specifically, it is assumed that the display apparatus 20, the communication unit 40, and the image capturing apparatus 60B are in a power-on state, and the communication of the terminal 30H with the display apparatus 20 and the image capturing apparatus 60B is enabled.

Next, the user operates the terminal 30H to display a menu screen on the display unit 31. Then, the user taps the icon for the character input processing program on the menu screen to select the character input processing program. In response to receiving a signal indicating that the character input processing program has been selected, the control unit 34H of the terminal 30H reads the character input processing program from the storage unit 33 to perform the character input process using the visual confirmation screen S according to the processing flow illustrated in FIG. 57. Note that the character input process may be executed automatically when the character input screen 200 is displayed on the display apparatus 20 as the original screen M.

According to the processing flow illustrated in FIG. 57, the control unit 34H first displays on the display apparatus 20 the character input screen 200 as the original screen M and controls the image capturing apparatus 60B to start an image capturing operation for capturing an image of the eye of the user (S221). The user performs a predetermined operation, for example, a tap operation on the keyboard image 210 of the character input screen 200, which is the visual confirmation screen S corresponding to the original screen M currently displayed on the display apparatus 20, with a finger. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34H through wireless communication (S222).

Next, the eye presence/absence determination unit 354 determines whether or not the transmitted image data includes an image of an eye by using a general image recognition method (S2205). If the eye presence/absence determination unit 354 determines that the image data includes the image of the eye, the eye presence/absence determination unit 354 transmits the image data to the image data extraction unit 342. After that, the process proceeds to step S223. On the other hand, if the eye presence/absence determination unit 354 determines that the image data does not include the image of the eye, the eye presence/absence determination unit 354 does not transmit the image data to the image data extraction unit 342. Then, in this case, the eye presence/absence determination unit 354 determines whether or not the image data not including the image of the eye of the user has been continuously acquired by the image capturing apparatus 60B for a certain period of time (52206). If the image data not including the image of the eye of the user has not been continuously acquired by the image capturing apparatus 60B for the certain period of time, the process proceeds to step S2205. On the other hand, if the eye presence/absence determination unit 354 determines that the image data not including the image of the eye of the user has been continuously acquired by the image capturing apparatus 60B for the certain period of time, the eye presence/absence determination unit 354 transmits a signal indicating no continuous eye image to the notification control unit 355. In response to receiving the signal, the notification control unit 355 recognizes that the user is dozing off, and controls the speaker unit 80 to output a predetermined warning sound from the speaker unit 80 (52207). After that, the process proceeds to step S223.

Then, at step S223, the image data extraction unit 342 determines whether or not the image data transmitted from the eye presence/absence determination unit 354 (image data including the image of the eye of the user) includes an image of a finger by using a general image recognition method to extract image data that includes the image of the finger from a series of the image data of images captured by the image capturing apparatus 60B. After that, the process proceeds to step S224. The processes of step S224 and the subsequent steps are the same as the processing according to the flowchart of FIG. 47 in the seventeenth embodiment.

Figure 58:
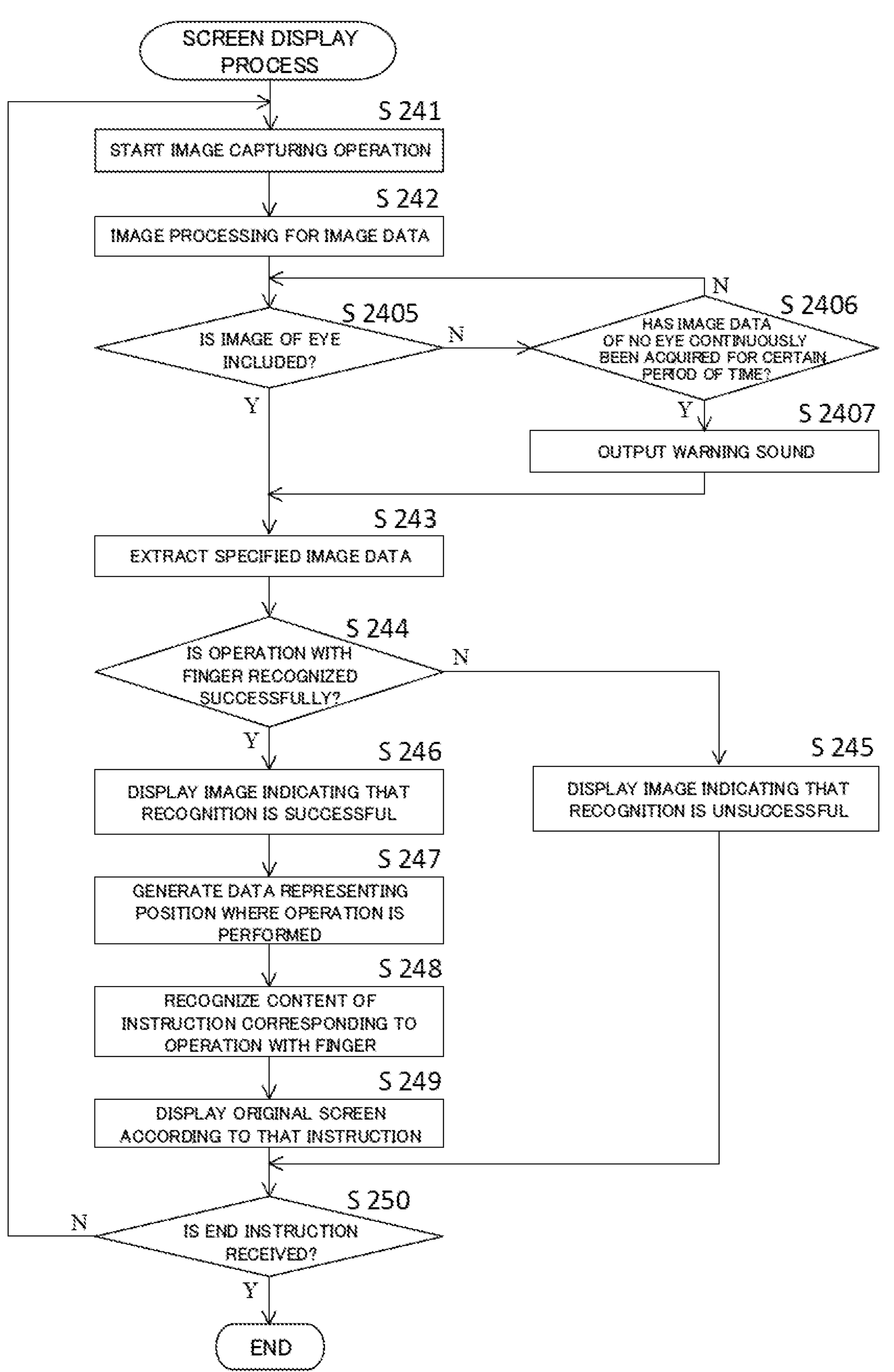
FIG. 58 is a flowchart of the procedure for a screen display process using a visual confirmation screen in the terminal device according to the twentieth embodiment.

Next, a screen display process using the visual confirmation screen S in the terminal device 9C according to the twentieth embodiment will be described. FIG. 58 is a flowchart of the procedure for the screen display process using the visual confirmation screen S in the terminal device 9C according to the twentieth embodiment. In the flowchart of FIG. 58, the processing having the same content as the flowchart of FIG. 48 in the above-described seventeenth embodiment is given the same step reference numerals, and detailed description thereof will be omitted.

Now consider a case where the terminal 30H is executing the display apparatus control program. Specifically, it is assumed that the display apparatus 20, the communication unit 40, and the image capturing apparatus 60B are in a power-on state, and the communication of the terminal 30H with the display apparatus 20 and the image capturing apparatus 60B is enabled.

The user operates the terminal 30H to display a menu screen on the display unit 31. Then, the user taps the icon for the screen display processing program on the menu screen to select the screen display processing program. In response to receiving a signal indicating that the screen display processing program has been selected, the control unit 34H of the terminal 30H reads the screen display processing program from the storage unit 33 to perform the screen display process using the visual confirmation screen S according to the processing flow illustrated in FIG. 58. Note that the screen display process may be executed automatically when the original screen M is displayed on the display apparatus 20.

The user first operates the terminal 30H to display a desired screen on the display apparatus 20. On the other hand, the control unit 34H controls the image capturing apparatus 60B to start an image capturing operation for capturing an image of the eye of the user (S241). The user performs a desired operation with a finger on the visual confirmation screen S corresponding to the original screen M currently displayed on the display apparatus 20. At the time of such an operation by the user, the original screen M, or the original screen M and the finger with which the operation is performed are reflected on the eye of the user. Then, an image of the eye of the user is captured by the image capturing apparatus 60B, and the image data thus obtained by the image capturing apparatus 60B is transmitted to the image processing unit 62. Then, the image processing unit 62 performs predetermined image processing on the image data, and the image data subjected to the image processing is transmitted from the image capturing apparatus 60B to the control unit 34H through wireless communication (S242).

Next, the eye presence/absence determination unit 354 determines whether or not the transmitted image data includes an image of an eye by using a general image recognition method (S2405). If the eye presence/absence determination unit 354 determines that the image data includes the image of the eye, the eye presence/absence determination unit 354 transmits the image data to the image data extraction unit 342. After that, the process proceeds to step S243. On the other hand, if the eye presence/absence determination unit 354 determines that the image data does not include the image of the eye, the eye presence/absence determination unit 354 does not transmit the image data to the image data extraction unit 342. Then, in this case, the eye presence/absence determination unit 354 determines whether or not the image data not including the image of the eye of the user has been continuously acquired by the image capturing apparatus 60B for a certain period of time (52406). If the image data not including the image of the eye of the user has not been continuously acquired by the image capturing apparatus 60B for the certain period of time, the process proceeds to step S2405. On the other hand, if the eye presence/absence determination unit 354 determines that the image data not including the image of the eye of the user has been continuously acquired by the image capturing apparatus 60B for the certain period of time, the eye presence/absence determination unit 354 transmits a signal indicating no continuous eye image to the notification control unit 355. In response to receiving the signal, the notification control unit 355 recognizes that the user is dozing off, and controls the speaker unit 80 to output a predetermined warning sound from the speaker unit 80 (52407). After that, the process proceeds to step S243.

Then, at step S243, the image data extraction unit 342 determines whether or not the image data transmitted from the eye presence/absence determination unit 354 (image data including the image of the eye of the user) includes an image of a finger by using a general image recognition method to extract image data that includes the image of the finger from a series of the image data of images captured by the image capturing apparatus 60B. After that, the process proceeds to step S244. The processes of step S244 and the subsequent steps are the same as the processing according to the flowchart of FIG. 48 in the seventeenth embodiment.

The terminal device according to the twentieth embodiment has the same functions and advantageous effects as the seventeenth embodiment.

In particular, the terminal device according to the twentieth embodiment includes an eye presence/absence determination unit configured to determine whether or not the image data of the image captured by the image capturing apparatus includes an image of the eye of the user to detect that image data not including the image of the eye of the user has been continuously acquired by the image capturing apparatus for a certain period of time; and a notification control unit configured such that when the eye presence/absence determination unit detects that image data not including the image of the eye of the user has been continuously acquired by the image capturing apparatus for the certain period of time, the notification control unit controls a speaker unit to output sound from the speaker unit. As a result, for example, in a case where a driver of an automobile uses the terminal device according to the twentieth embodiment, when the eye presence/absence determination unit detects that image data not including an image of an eye of the driver has been continuously acquired by the image capturing apparatus for the certain period of time, the notification control unit causes the speaker unit to output an alarm, so that it is possible to prevent dozing driving.

Note that the terminal of the terminal device according to the eighteenth embodiment or the nineteenth embodiment may include the eye presence/absence determination unit and the notification control unit in the twentieth embodiment. Further, the terminal of the terminal device according to the eighteenth embodiment may include the eye presence/absence determination unit and the notification control unit in the twentieth embodiment and the image conversion unit in the nineteenth embodiment.

In the above-described twentieth embodiment, a case has been described in which the display apparatus and the image capturing apparatus are wirelessly connected to the terminal. However, the display apparatus and the image capturing apparatus may be connected to the terminal by wire using one or more cables.

Twenty-First Embodiment

Figure 59A:
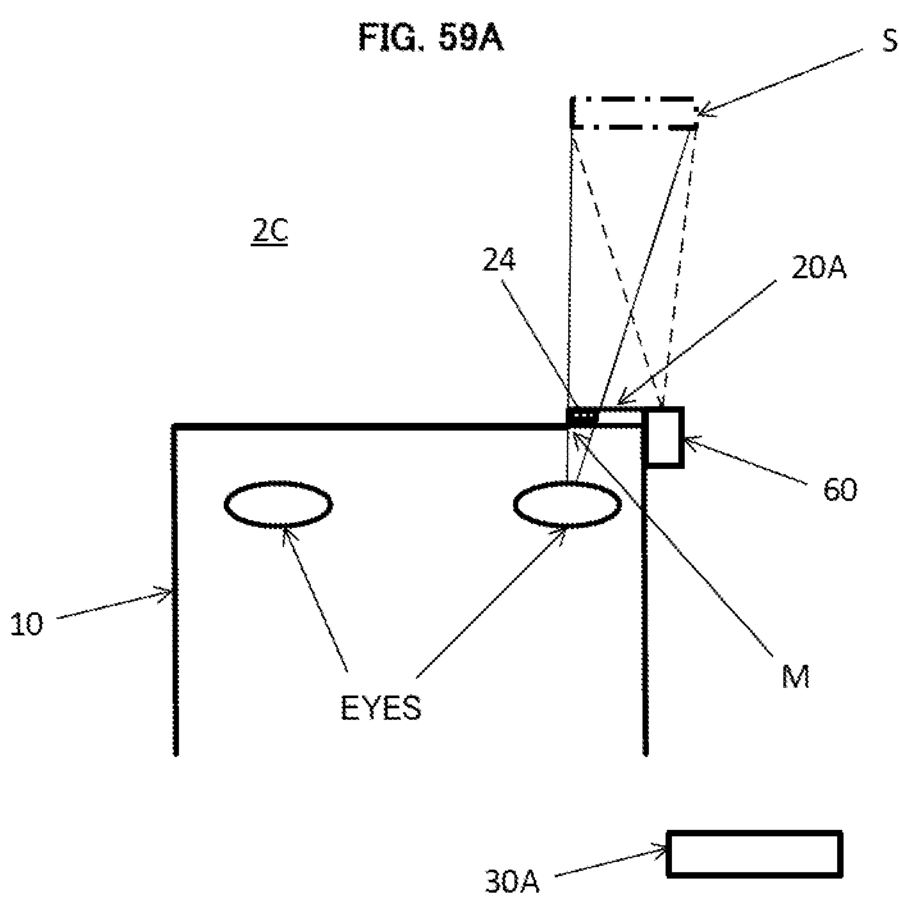
FIG. 59A is a schematic plan view of a terminal device according to a twenty-first embodiment of the present invention.
Figure 59B:
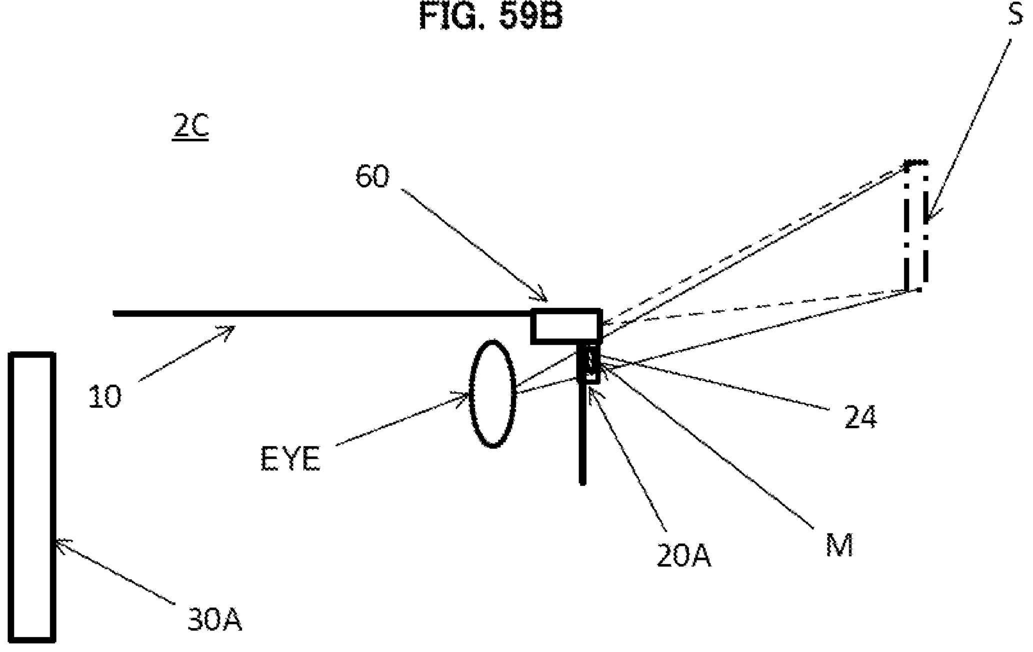
FIG. 59B is a schematic right side view of the terminal device.
Figure 60:
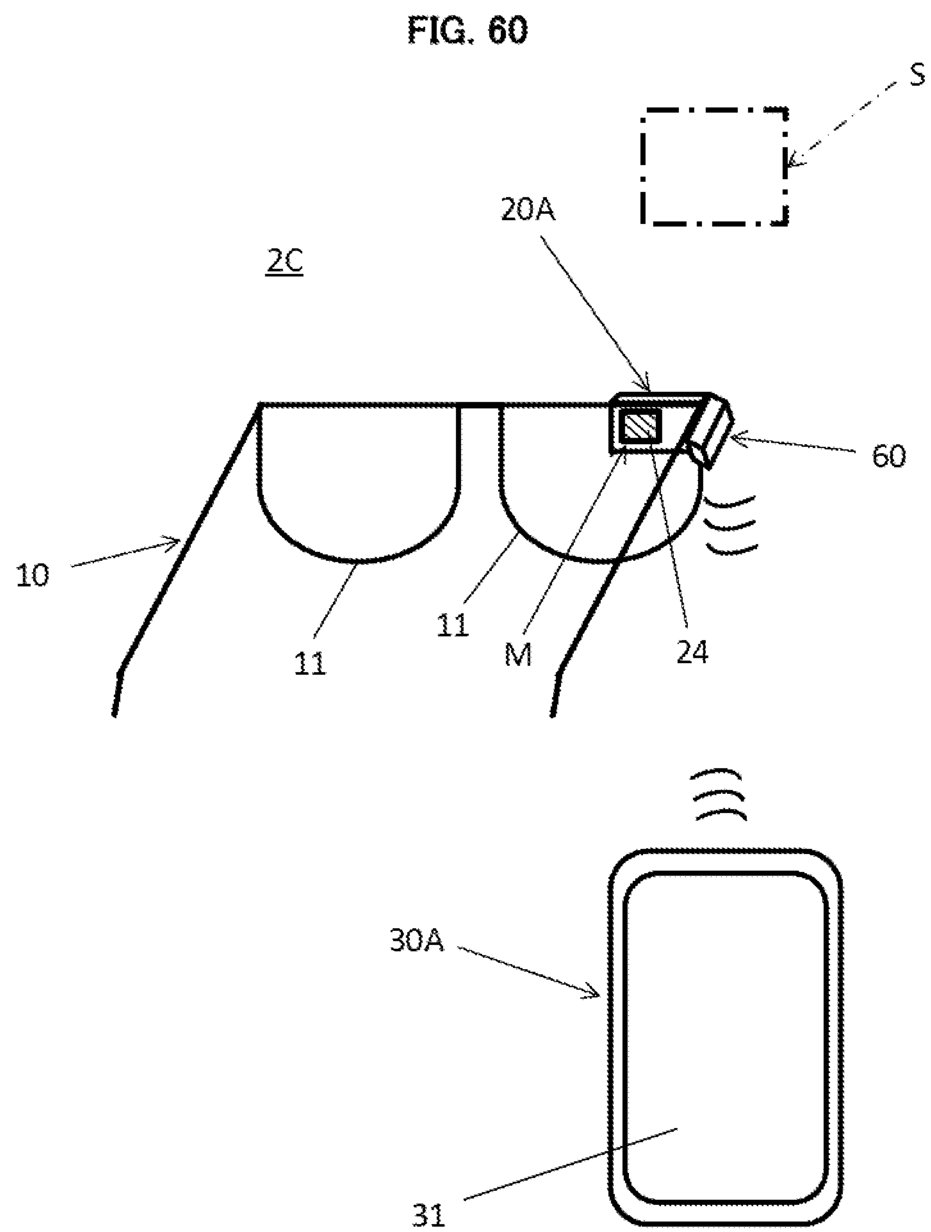
FIG. 60 is a schematic perspective view of the terminal device illustrated in FIG. 59.

Next, a terminal device according to a twenty-first embodiment of the present invention will be described. FIG. 59A is a schematic plan view of the terminal device according to the twenty-first embodiment of the present invention, and FIG. 59B is a schematic right side view of the terminal device. FIG. 60 is a schematic perspective view of the terminal device illustrated in FIG. 59. In the twenty-first embodiment, the apparatuses/units having the same functions as those of the third embodiment described above are designated by the same reference numerals, and detailed description thereof will be omitted.

As illustrated in FIGS. 59 and 60, the terminal device 2C according to the twenty-first embodiment includes the pair of glasses 10, a display apparatus 20A mounted on the pair of glasses 10, the terminal 30A being separate from the pair of glasses 10 and including the display unit 31, the communication unit 40, and the image capturing apparatus 60 for capturing an image in front of the user.

In the above-described embodiments, a case has been described in which the display apparatus includes a small projector, an optical system, and a hologram sheet. However, the display apparatus 20A used in the terminal device 2C according to the twenty-first embodiment projects an image onto a half mirror instead of a hologram sheet. In other words, the terminal device 2C according to the twenty-first embodiment differs from the terminal device 2A according to the third embodiment only in the configuration of the display apparatus. The other configurations of the terminal device 2C according to the twenty-first embodiment is exactly the same as those of the terminal device 2A according to the third embodiment.

As illustrated in FIGS. 59 and 60, the display apparatus 20A includes the small projector (not illustrated) having a liquid crystal panel (display device), an optical system (not illustrated) that reflects part of light (video (picture)), and a half mirror 24. The half mirror 24 is located in front of the face of the user and within the range of the field of view of the user. The half mirror 24 to be used may have a variety of sizes and shapes. The half mirror 24 of this example is embedded in a prism located in front of the lens part 11 of the pair of glasses 10. In this case, the optical system is composed of this prism alone or a combination of the prism, a lens, and the like. Further, the display apparatus 20A and the image capturing apparatus 60 may each be attachable to and detachable from the pair of glasses 10. Note that the half mirror 24 may be integrated with the prism located in front of the lens part 11 of the pair of glasses 10, or may be stuck to the prism located in front of the lens part 11 of the pair of glasses 10. Further, the half mirror 24 may be stuck to the lens part 11 of the pair of glasses 10, or may be embedded in or integrated with the lens part 11 of the pair of glasses 10.

An image or a video (picture) displayed on the liquid crystal panel of the small projector is projected onto the half mirror 24 via the optical system. As a result, a very small original screen is displayed on the half mirror 24. By wearing the pair of glasses 10 and using the terminal device 2C according to the twenty-first embodiment, the user can see a translucent visual confirmation screen S, which is an image of the very small original screen displayed on the half mirror 24, to be floating in midair, as illustrated in FIGS. 59 and 60. Although the image or video (picture) displayed on the liquid crystal panel of the small projector is projected onto the entire half mirror 24 in this example, the image or video (picture) may be projected onto a part of the half mirror 24.

The terminal device according to the twenty-first embodiment has the same functions and advantageous effects as the third embodiment.

Figure 61A:
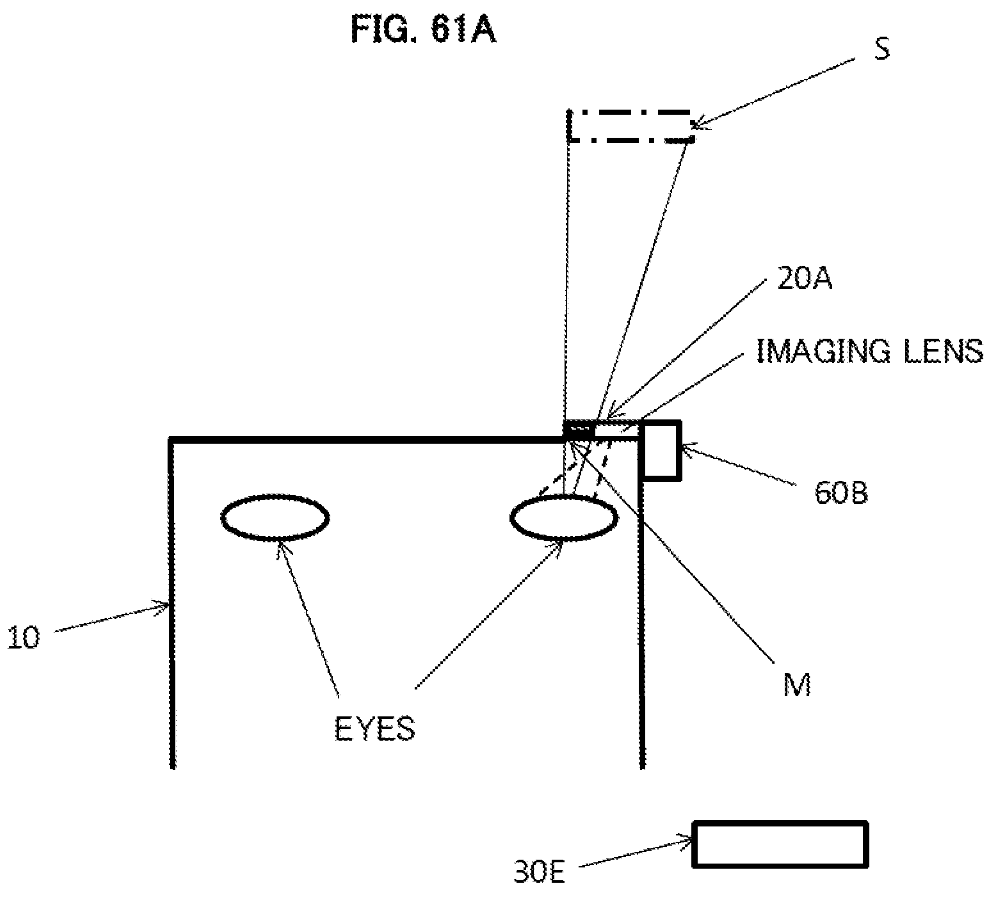
FIG. 61A is a schematic plan view of the terminal device according to the seventeenth embodiment in which the terminal device includes a display apparatus configured to project an image onto a half mirror and an imaging lens is attached in the vicinity of the half mirror.
Figure 61B:
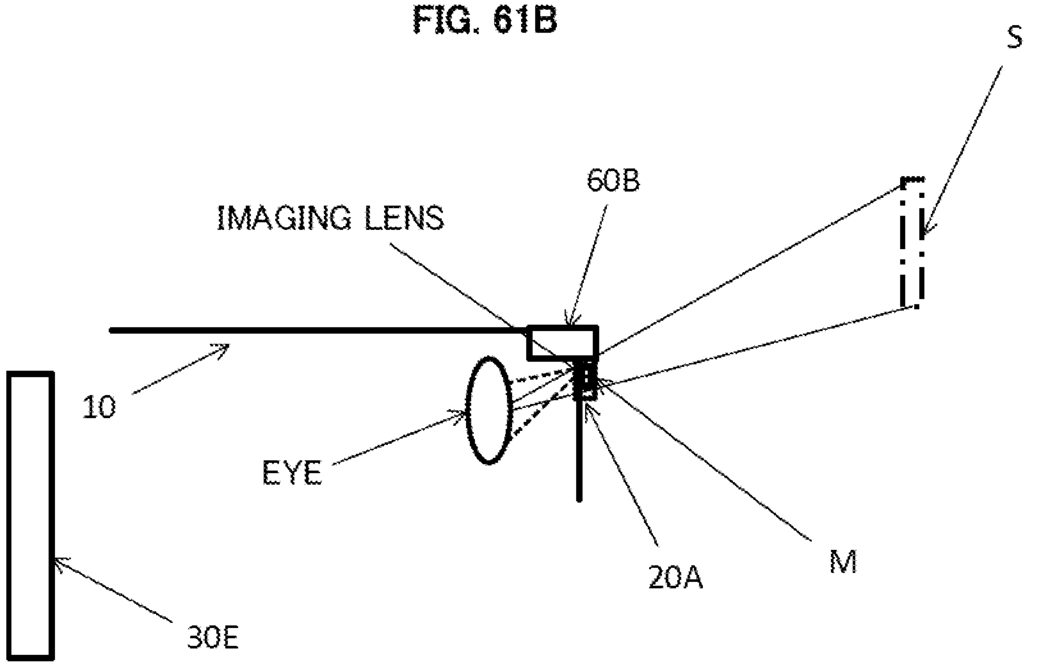
FIG. 61B is a schematic right side view of the terminal device.
Figure 62:
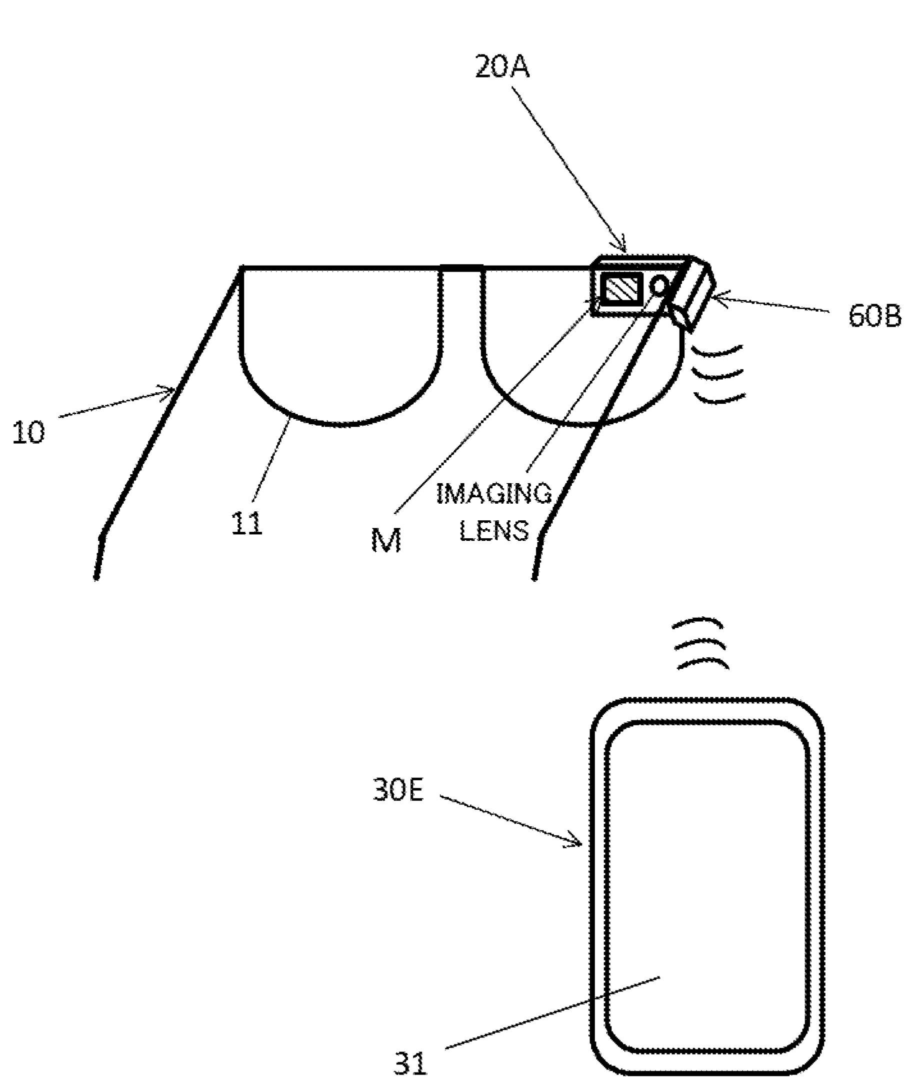
FIG. 62 is a schematic perspective view of the terminal device illustrated in FIG. 61.

Note that the display apparatus that projects an image onto the half mirror, which is described in the twenty-first embodiment, can be applied not only to the terminal device according to the third embodiment, but also to the terminal devices according to the other embodiments described above. In particular, in a case where the display apparatus 20A that projects an image onto the half mirror is applied to the terminal device according to any one of the seventeenth to twentieth embodiments, the imaging lens of the image capturing apparatus 60B may be attached in the vicinity of the half mirror 24 of the display apparatus 20A. For example, a case where such a configuration is applied to the terminal device according to the seventeenth embodiment will be described. FIG. 61A is a schematic plan view of the terminal device according to the seventeenth embodiment in which the terminal device includes a display apparatus configured to project an image onto a half mirror and an imaging lens is attached in the vicinity of the half mirror, and FIG. 61B is a schematic right side view of the terminal device. FIG. 62 is a schematic perspective view of the terminal device illustrated in FIG. 61. As illustrated in FIG. 61, attaching the imaging lens in the vicinity of the half mirror 24 makes it possible to minimize the misalignment between the direction of the optical axis of the imaging lens toward the eye of the user and the direction of the line of sight when the user looks at the original screen M. As a result, the operation position can be accurately identified in the original screen M by the operation position identification unit. Also in this case, the display apparatus 20A and the image capturing apparatus 60B may be attachable to and detachable from the pair of glasses 10.

In the above-described twenty-first embodiment, a case has been described in which the display apparatus and the image capturing apparatus are wirelessly connected to the terminal. However, the display apparatus and the image capturing apparatus may be connected to the terminal by wire using one or more cables.

Twenty-Second Embodiment

Figure 63:
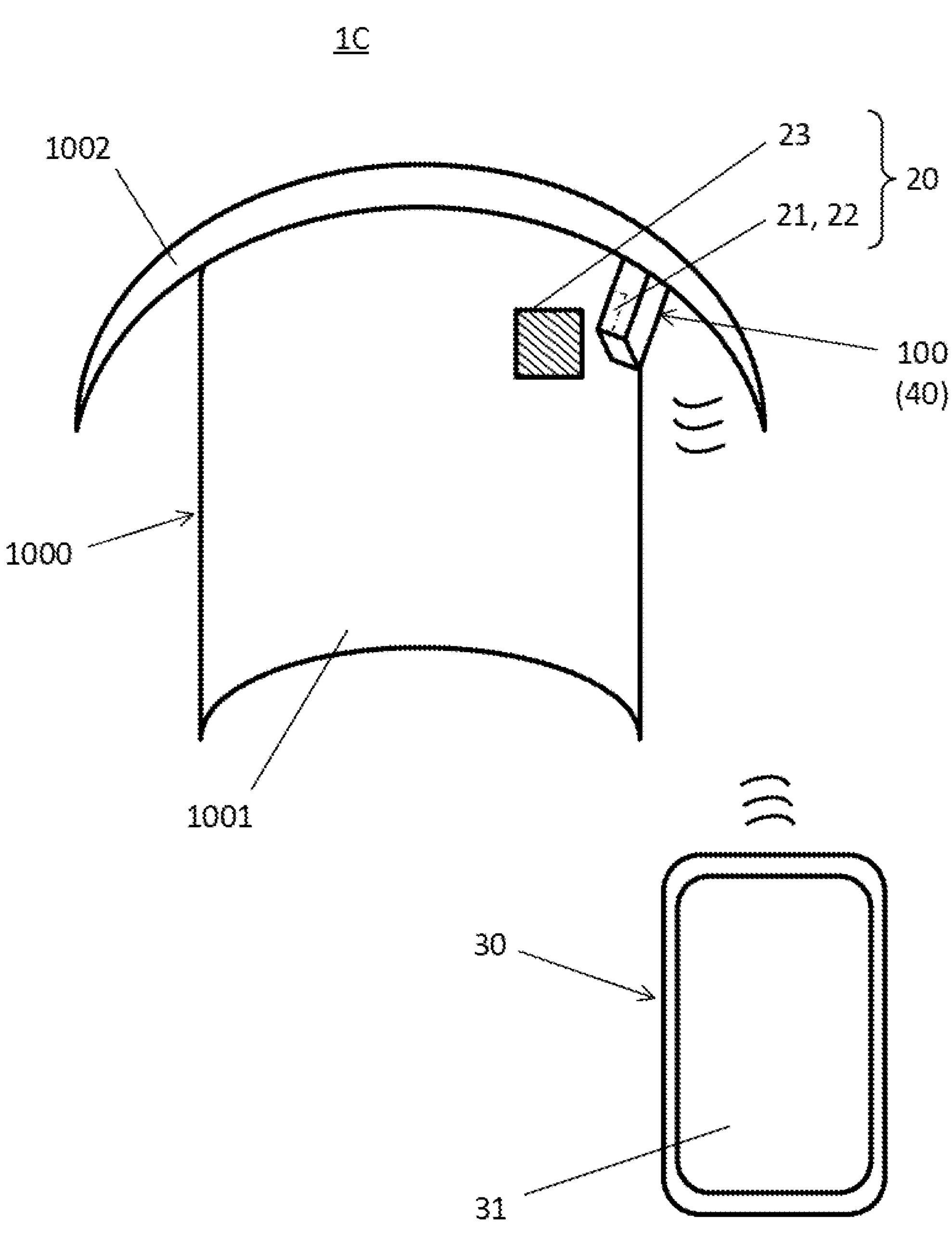
FIG. 63 is a schematic perspective view of a terminal device according to a twenty-second embodiment of the present invention.

Next, a terminal device according to a twenty-second embodiment of the present invention will be described. FIG. 63 is a schematic perspective view of the terminal device according to the twenty-second embodiment of the present invention. In the twenty-second embodiment, the apparatuses/units having the same functions as those of the first embodiment described above are designated by the same reference numerals, and detailed description thereof will be omitted.

As illustrated in FIG. 63, the terminal device 1C according to the twenty-second embodiment includes a face shield 1000 serving as a wearable object to be mounted on the head of the user, the display apparatus 20 mounted on the face shield 1000, the terminal 30 being separate from the face shield 1000 and including the display unit 31, and the communication unit 40.

In the above-described embodiments, a case has been described in which the pair of glasses is a wearable object to be mounted on the head of the user. However, in the terminal device 1C according to the twenty-second embodiment, the face shield is used as the wearable object. In other words, the terminal device 1C according to the twenty-second embodiment differs from the terminal device 1A according to the first embodiment only in that the face shield 1000 is used instead of the pair of glasses. The other configurations of the terminal device 1C according to the twenty-second embodiment is exactly the same as those of the terminal device 1A according to the first embodiment.

As illustrated in FIG. 63, the face shield 1000 includes a transparent shield part 1001 configured to cover part or all of the surface of the face of the user and a frame 1002 for fixing the shield part 1001. With this configuration, the hologram sheet 23 of the display apparatus 20 is, for example, stuck to a predetermined portion of the shield part 1001, or embedded in or integrated with the shield part 1001. In the example illustrated in FIG. 63, a small rectangular hologram sheet is used as the hologram sheet 23, and the hologram sheet 23 is stuck to an upper portion of the shield part 1001 on the slightly right side in a state where it is horizontally long.

Figure 64:
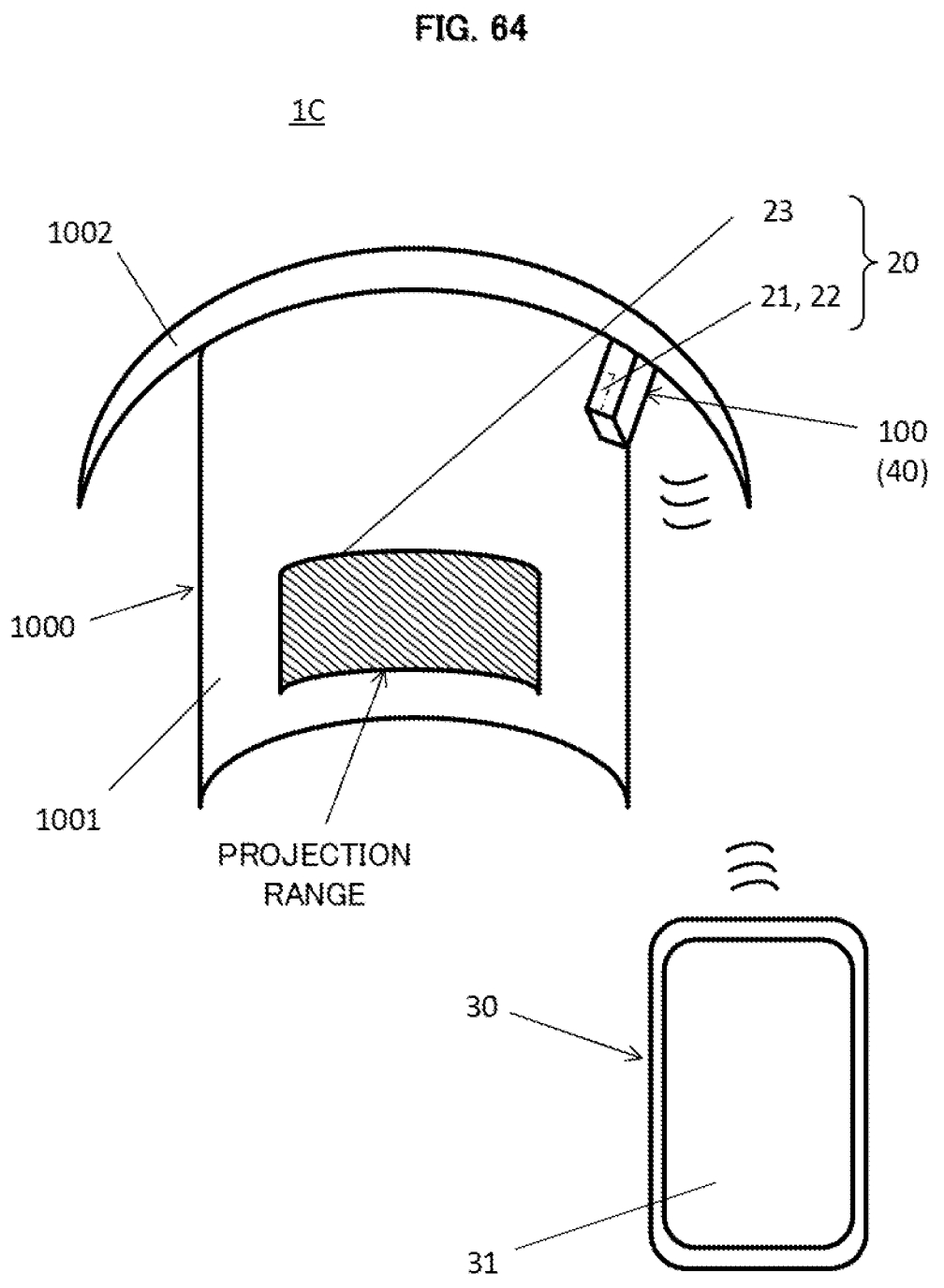
Figure 65:
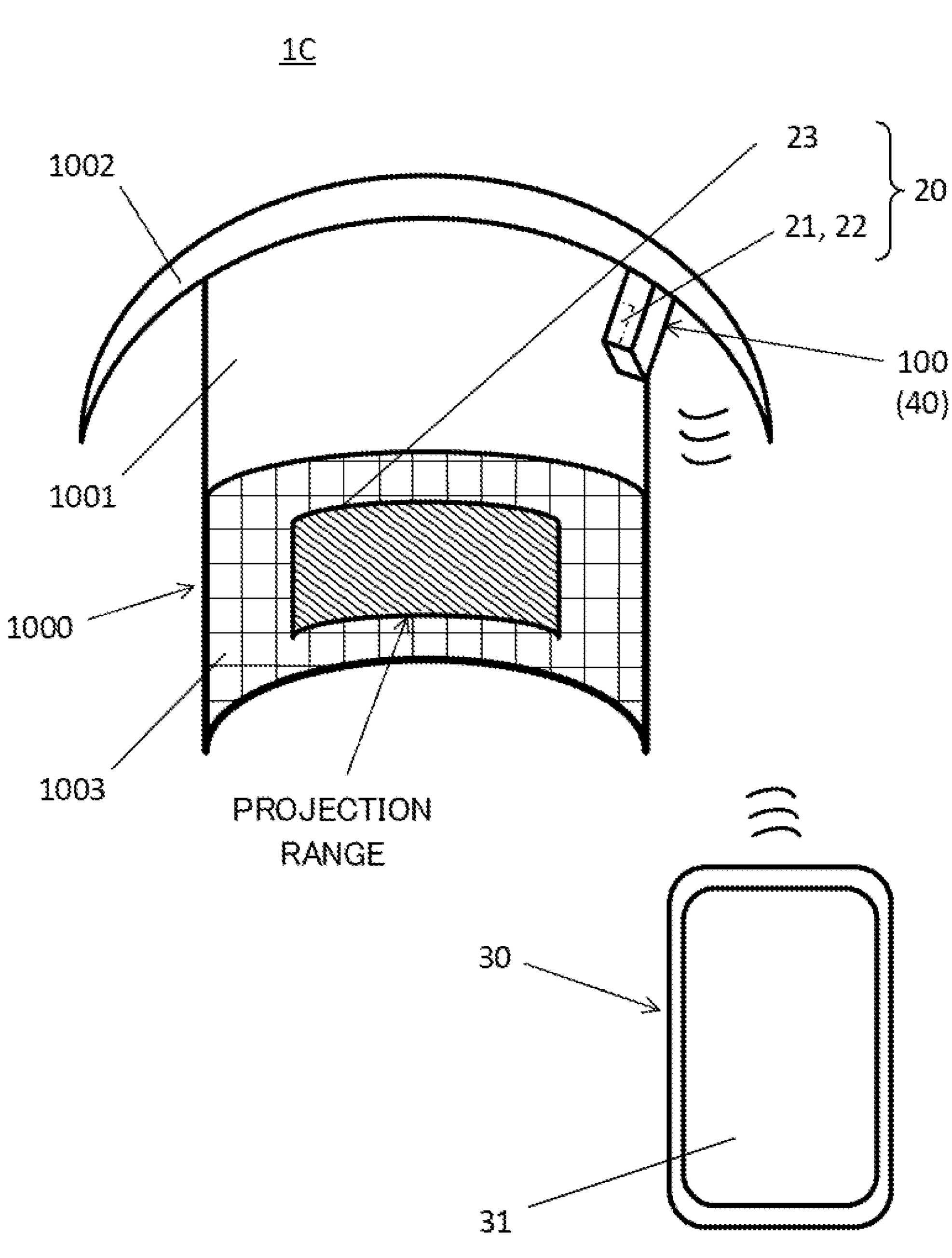
FIG. 65 illustrates the terminal device of FIG. 64 in which a portion of a shield part of a face shield has a translucent or non-transparent portion.

Incidentally, since the shield part 1001 of the face shield 1000 has a wider area than the lens part of the pair of glasses, if a large-sized hologram sheet is used as the hologram sheet 23, the image projection range can be easily expanded. FIG. 64 illustrates an example of the large-sized hologram sheet 23 attached to the terminal device according to the twenty-second embodiment. In the example illustrated in FIG. 64, a large rectangular hologram sheet is used as the hologram sheet 23, and the hologram sheet 23 is stuck to a lower portion of the shield part 1001 in a state where it is horizontally long. By projecting an image or a video (picture) displayed on the liquid crystal panel of the small projector 21 onto the entire hologram sheet 23, the user can see a large visual confirmation screen to be floating in midair. In this case, in order to prevent others from seeing the large projection screen projected onto the hologram sheet, it is desirable that a portion of the shield part 1001 including a place where the hologram sheet 23 is attached is made of a translucent or non-transparent material or a translucent or non-transparent film is stuck to the portion of the shield part 1001. As an example, FIG. 65 illustrates the terminal device of FIG. 64 in which a portion of the shield part 1001 of the face shield 1000 has a translucent or non-transparent portion. In FIG. 65, a translucent film 1003 is stuck to the lower half of the shield part 1001 of the face shield 1000.

The terminal device according to the twenty-second embodiment has the same functions and advantageous effects as the first embodiment.

In the above-described twenty-second embodiment, a case has been described in which the display apparatus is wirelessly connected to the terminal. However, the display apparatus may be connected to the terminal by wire using one or more cables.

Figure 66:
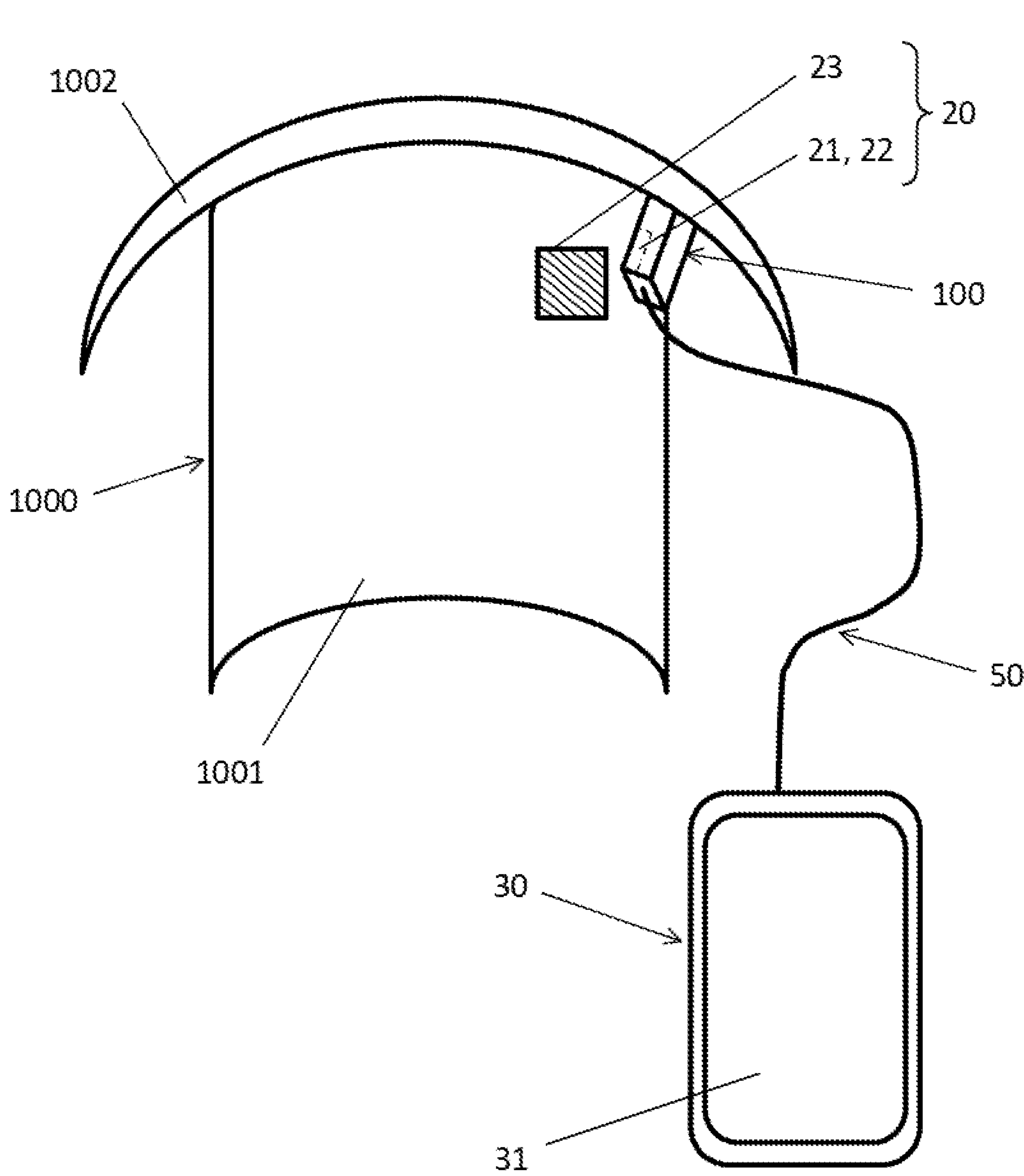
FIG. 66 is a schematic perspective view of the terminal device according to the second embodiment in which a face shield is used as a wearable object.
Figure 67:
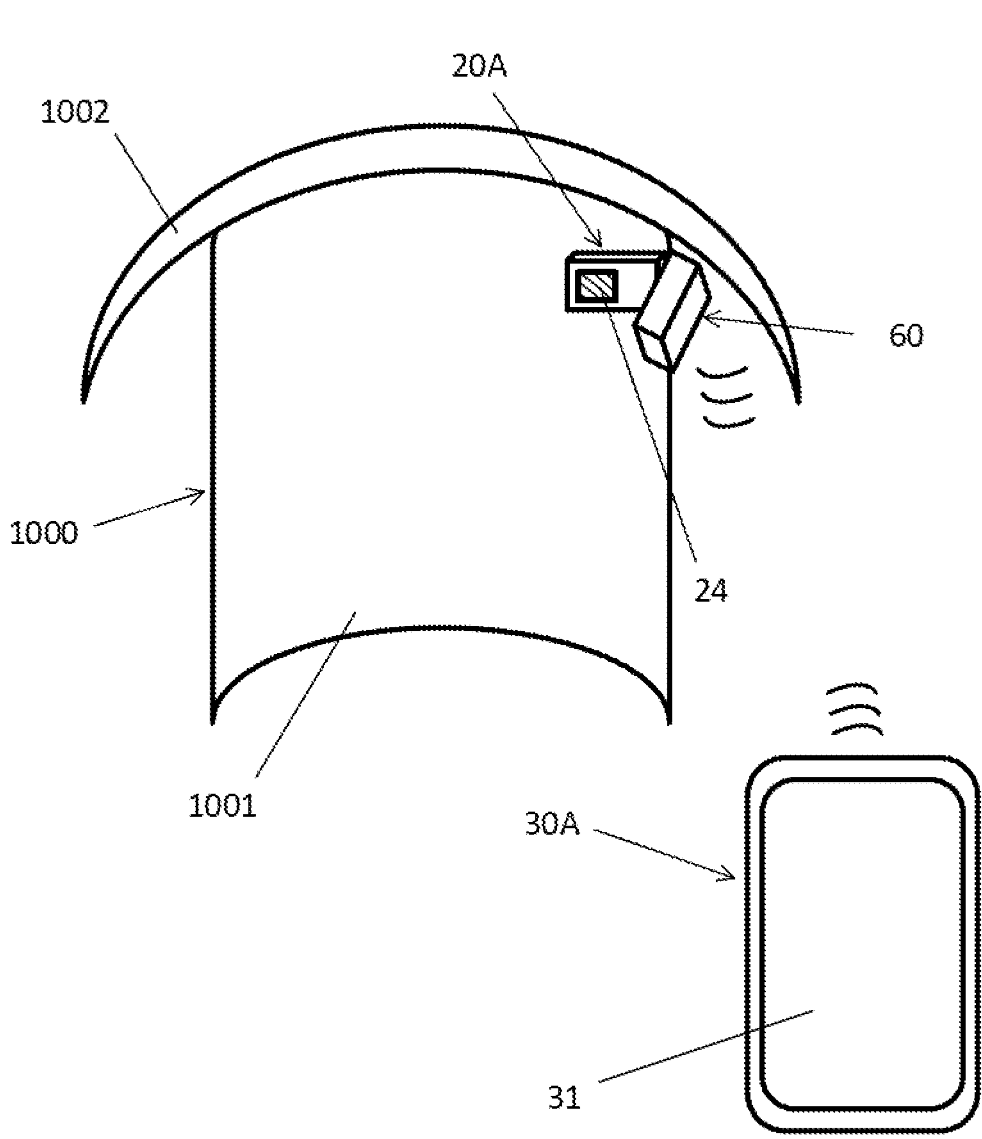
FIG. 67 is a schematic perspective view of the terminal device according to the twenty-first embodiment in which a face shield is used as a wearable object and a display apparatus and an image capturing apparatus are wirelessly connected to a terminal.
Figure 68:
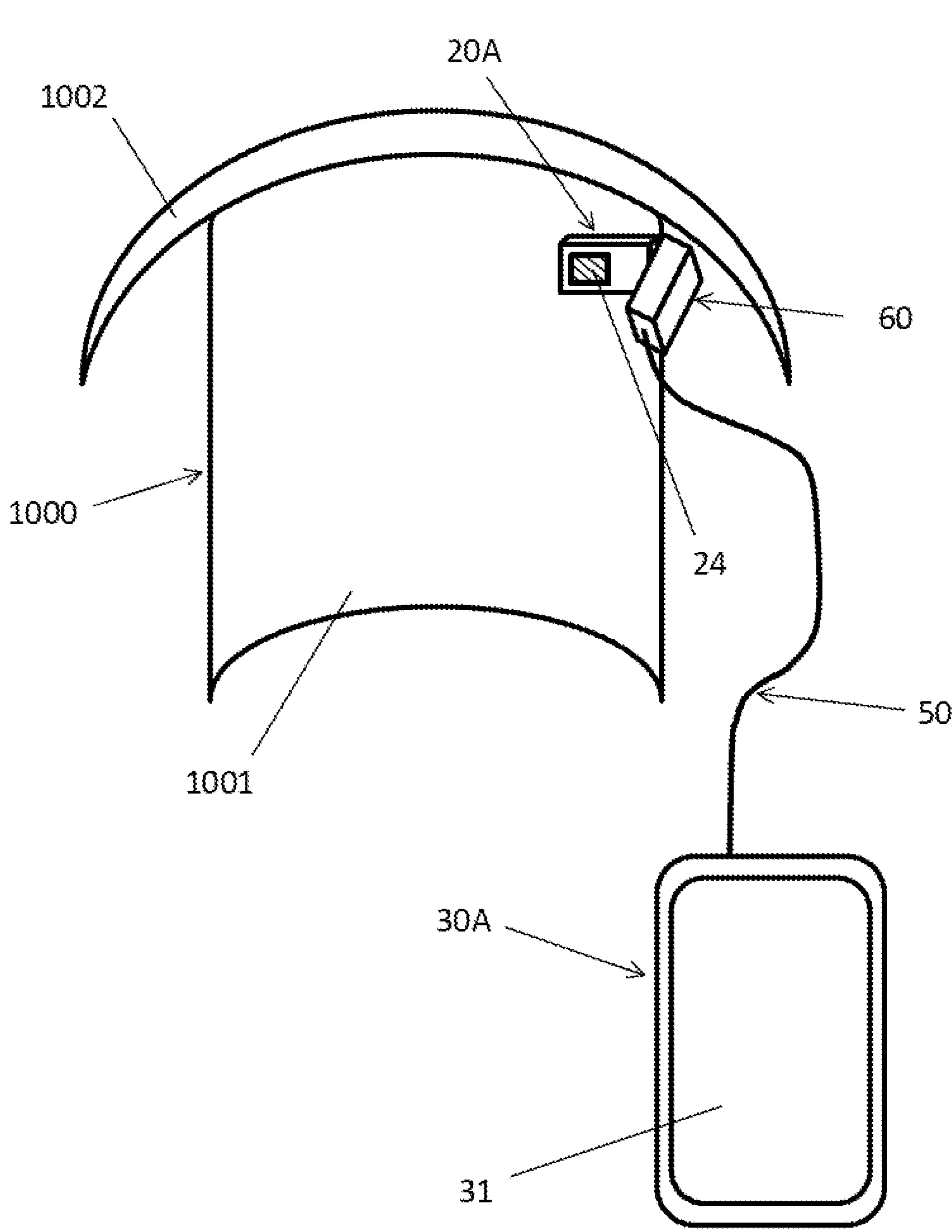
FIG. 68 is a schematic perspective view of the terminal device according to the twenty-first embodiment in which a face shield is used as a wearable object and a display apparatus and an image capturing apparatus are connected to a terminal by wire.

Further, for the terminal device according to not only the first embodiment but also the other embodiments described above, a face shield can be used instead of the pair of glasses. For example, FIG. 66 is a schematic perspective view of the terminal device according to the second embodiment in which the face shield 1000 is used as a wearable object. Further, FIG. 67 is a schematic perspective view of the terminal device according to the twenty-first embodiment in which the face shield 1000 is used as a wearable object and the display apparatus 20A and the image capturing apparatus 60 are wirelessly connected to the terminal 30A, and FIG. 68 is a schematic perspective view of the terminal device according to the twenty-first embodiment in which the face shield 1000 is used as a wearable object and the display apparatus 20A and the image capturing apparatus 60 are connected to the terminal 30A by wire. Here, in the terminal device illustrated in FIGS. 67 and 68, the display apparatus 20A and the image capturing apparatus 60 can be attachable to and detachable from the face shield 1000.

Other Embodiments

The present invention is not limited to each of the above-described embodiments, and various modifications can be made within the scope and spirit of the invention.

For example, the characteristic configuration in each of the above-described embodiments may be applied to other embodiments. In other words, the present invention also includes a terminal device having any combination of the characteristic configurations of each of the above-described embodiments.

In the third to twenty-second embodiments described above, a case has been described in which the user operates the visual confirmation screen with a finger of the user. However, for example, the user may perform an operation on the visual confirmation screen with an input instructing tool such as a stylus or a pen. In this case, when the image capturing apparatus captures an image of the original screen and the input instructing tool reflected on the eye of the user, the operation determination unit determines what content of the operation is performed with the input instructing tool among various types of operations, based on a series of image data of images thus captured, and when the image capturing apparatus captures the image of the original screen and the input instructing tool reflected on the eye of the user, the operation position identification unit identifies a position in the original screen where the operation is performed with the input instructing tool, based on a series of image data of images thus captured.

In the third to twenty-second embodiments described above, when the user performs a touch operation on the visual confirmation screen with a finger, the user may put a predetermined mark to the fingertip. As the mark, a simple figure such as a circle or a quadrangle, a symbol, or the like may be used. Examples of the method of putting the mark to the fingertip include a method of drawing the mark directly on the fingertip, as well as a method of sticking a sticker with the mark to the fingertip, and a method of wearing a sack or ring with the mark to the fingertip. Specifically, as illustrated in FIGS. 9A and 10, when a touch operation is performed with a finger on the front side of the visual confirmation screen, the mark may be put on the fingernail side. On the other hand, as illustrated in FIGS. 9B and 10, when a touch operation is performed with a finger not only on the front side but also on the back side of the visual confirmation screen, the mark may be put on both the fingernail side of the finger and the pad side (part with the fingerprint) of the fingertip or finger. Note that, when a touch operation is performed with a finger only on the back side of the visual confirmation screen, the mark may be put only on the pad side of the fingertip or finger. In this case, the image data extraction unit extracts image data including the image of the mark as the image data including the image of the finger. Then, the operation determination unit determines what content of the operation is performed with the finger, based on the movement of the mark, and the operation position identification unit identifies the position of the mark as the position where the operation is performed with the finger. Actually, in analyzing and processing image data, it is possible to recognize marks such as simple figures more easily and accurately than to recognize the finger itself, so that the accuracy of image recognition can be improved.

In the above-described embodiments, a case has been described in which the display apparatus includes a small projector (projection device) including a display device; an optical system; and a hologram sheet or half mirror serving as a projected unit onto which the original screen displayed on the display device of the projector is projected via the optical system. However, for example, a translucent screen, a transmissive screen, or a hologram optical element may be used instead of the hologram sheet or half mirror.

In the above-described embodiments, a case has been described in which the display apparatus includes a small projector (projection device) having a display device, an optical system such as a lens and a prism, and a projected unit onto which the original screen displayed on the display device of the projector is projected via the optical system. However, the optical system may include a light guide plate and/or a waveguide. Specifically, the optical system may include one, some, or all of a lens, a reflecting mirror, a prism, a light guide plate, a waveguide, and the like. Further, other optical systems may be used instead of the light guide plate and the waveguide.

In the above-described embodiments, a case has been described in which the small projector of the display apparatus has a liquid crystal panel, but the small projector may have a display device such as an organic EL (electro-luminescence) panel or an inorganic EL panel instead of the liquid crystal panel.

Further, in the above-described embodiments, a case has been described in which the display apparatus includes a small projector, an optical system, a hologram sheet, or the like, but the display apparatus may be composed only of a transmissive or transparent display device without including the small projector, the optical system, and the hologram sheet. The transmissive or transparent display device is located in front of the face of the user and within the range of the field of view of the user. The transmissive or transparent display device to be used may be, for example, a transmissive or transparent liquid crystal panel, a transmissive or transparent organic EL panel, or a transmissive or transparent inorganic EL panel. Even with this configuration, when the user looks at the original screen displayed on the transmissive or transparent display device, the user recognizes the visual confirmation screen corresponding to the original screen to be floating in midair. For a transmissive or transparent display device, in a case where it is difficult for the user to recognize the content of the screen, for example, due to the background of the screen of the display device, or in a case where the user wishes to prevent others from peeping into the screen, a cover may be attached to the outside of the display device. This makes it possible to make the screen of the display device easier to see and block the line of sight of other people. In addition, instead of the cover, an electronic curtain using an electrochromic material may be used.

Further, in the above-described embodiments, a case has been described in which the display apparatus includes a small projector, an optical system, a hologram sheet, or the like, but the display apparatus may be composed only of a non-transparent or non-transmissive display device without including the small projector, the optical system, and the hologram sheet. This type of display device is located in front of the face of the user and within the range of the field of view of the user. The non-transparent or non-transmissive display device to be used may be, for example, a normal liquid crystal panel, an organic EL panel, or an inorganic EL panel.

In the above-described embodiments, the display apparatus and the image capturing apparatus may be attachable to and detachable from a wearable object to be mounted on the head of the user.

Further, in the above-described embodiments, in a case where the display apparatus includes a small projector (projection device) having a display device, an optical system, and a projected unit (a hologram sheet, a half-mirror, etc.) onto which the original screen displayed on the display device of the projector is projected via the optical system, the projected unit may be attachable to and detachable from a wearable object to be mounted on the head of the user. FIG. 81 illustrates examples of a hologram sheet to be detachably stuck to the lens part 11 of the pair of glasses 10. As illustrated in FIG. 81, the user can displace the hologram sheet to the desired position of the lens part 11 of the pair of glasses 10 any number of times. As illustrated in FIG. 81, the hologram sheet to be used here may have a variety of sizes and shapes. In this example, the hologram sheet is stuck to one glass of the pair of glasses 10. However, the hologram sheet may be stuck to both glasses of the pair of glasses 10. FIG. 82 illustrates examples of a hologram sheet to be detachably stuck to the lens part 11 of the pair of glasses 10. In the example of FIG. 82, an attachment having substantially the same shape as the lens part 11 of the pair of glasses 10 is used to stick the hologram sheet to a partial surface or the entire surface of this attachment. The user can detachably attach the attachment to the pair of glasses 10. In other words, the hologram sheet is attachable to and detachable from the pair of glasses 10 by means of the attachment. In this example, the attachment is attached to one glass of the pair of glasses 10. However, the attachment may be attached to both glasses of the pair of glasses 10.

Furthermore, in the above-described embodiments, in a case where the display apparatus includes a small projector (projection device) having a display device, an optical system, and a projected unit (a hologram sheet, a half-mirror, etc.) onto which the original screen displayed on the display device of the projector is projected via the optical system, the small projector or both the small projector and the optical system may be attachable to and detachable from a wearable object to be mounted on the head of the user. In addition to these, the image capturing apparatus may also be attachable to and detachable from the wearable object. Note that, meanwhile, the projected unit may be attachable to and detachable from the wearable object.

In the above-described embodiments, a case has been described in which a single original screen is displayed on the display apparatus, but the present invention is not limited to this, and the display apparatus may display two original screens. In this case, the user sees two visual confirmation screens as if they were floating in midair. For example, in the case where the keyboard image in the character input screen is divided into two so that the keyboard image is composed of a right keyboard image and a left keyboard image, the user recognizes the right keyboard image and the left keyboard image as if they were floating in midair, so that character input can be performed with the fingers of both hands.

Figures 69A, 69B:
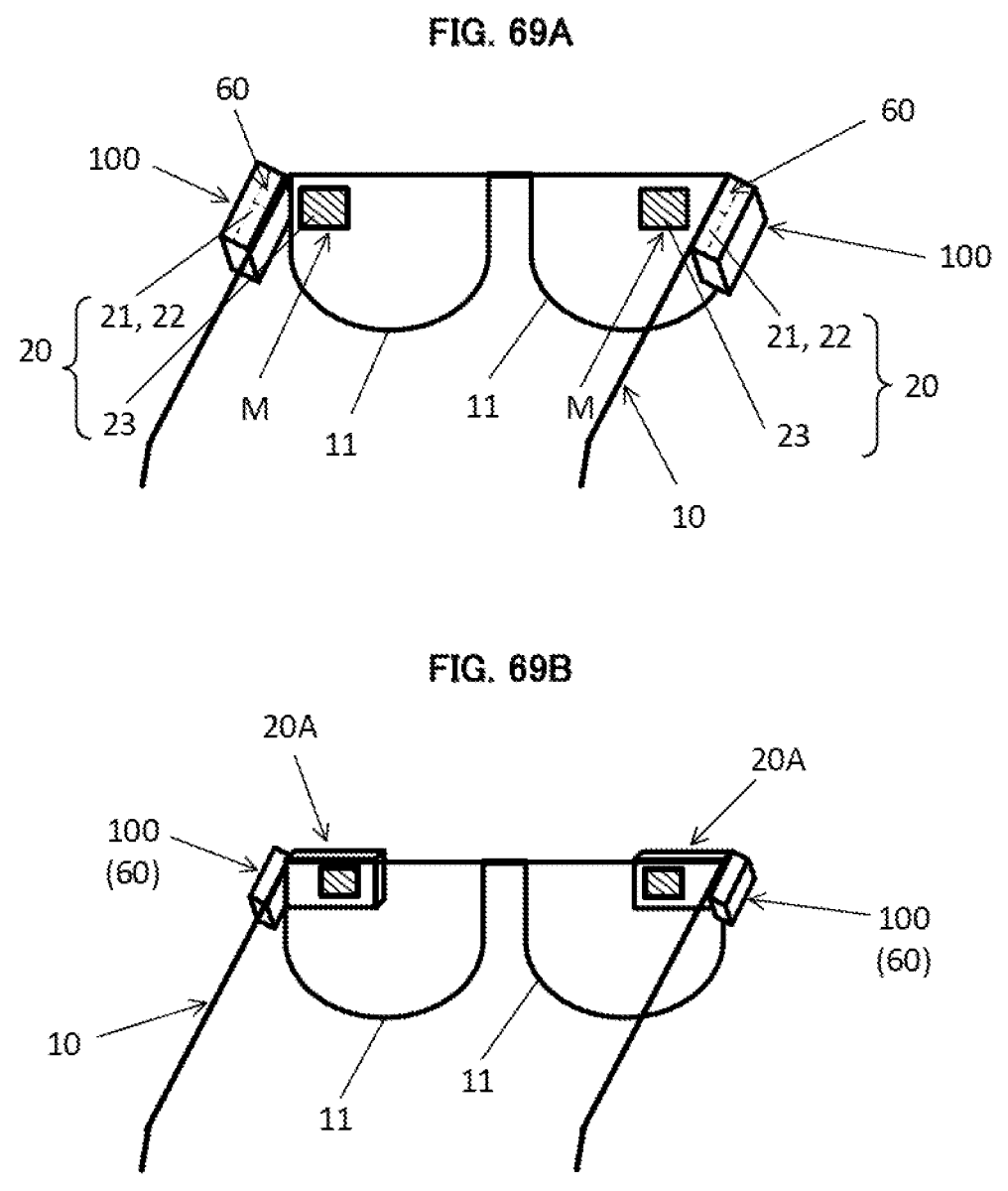

In the above-described embodiments, a case has been described in which the terminal device of the present invention includes a single display apparatus, but the terminal device the present invention may include two display apparatuses. FIG. 69A is a schematic perspective view of a terminal device including two display apparatuses of a type having a hologram sheet, and FIG. 69B is a schematic perspective view of a terminal device including two display apparatuses of a type having a half mirror. In FIG. 69A, the projector 21 and the optical system 22 of one display apparatus 20 are attached to the right temple of the pair of glasses 10, and the hologram sheet 23 of that display apparatus 20 is attached to the lens part 11 for the right eye. In addition, the projector 21 and the optical system 22 of the other display apparatus 20 are attached to the left temple of the pair of glasses 10, and the hologram sheet 23 of that display apparatus 20 is attached to the lens part 11 for the left eye. As used herein, each hologram sheet 23 has a small rectangular shape, and the two hologram sheets 23 are attached to an upper right portion and an upper left portion of the lens parts 11 in a state where they are horizontally long, respectively. Further, in FIG. 69B, the half mirror of one display apparatus **20*a* is embedded in a prism located in front of the right lens part 11 of the pair of glasses 10, and the half mirror of the other display apparatus 20*a* is embedded in a prism located in front of the left lens part 11 of the pair of glasses 10. In both of the terminal devices illustrated in FIGS. 69A and 69**B, the user recognizes the visual confirmation screen on the one display apparatus with the right eye and the visual confirmation screen on the other display apparatus with the left eye. Further, in the case where an image capturing apparatus is provided for each display apparatus, each image capturing apparatus captures an image of the corresponding eye.

Figure 70A:
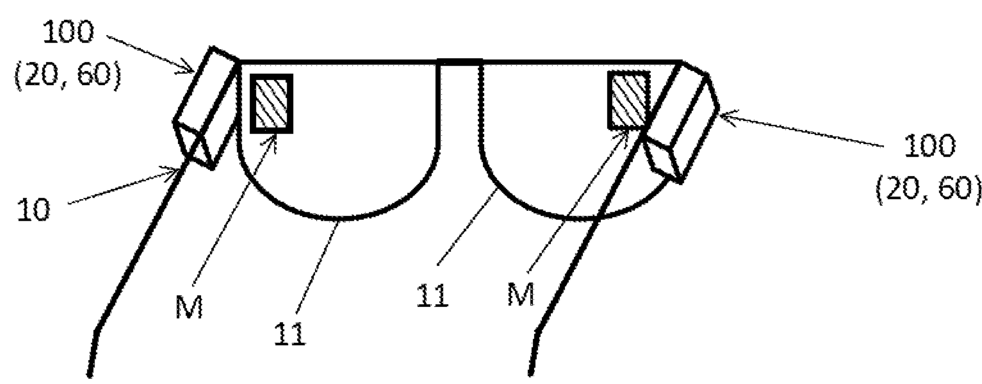
FIG. 70 illustrates examples of hologram sheets to be stuck to lens parts of a pair of glasses of a terminal device including two display apparatuses.
Figure 70B:
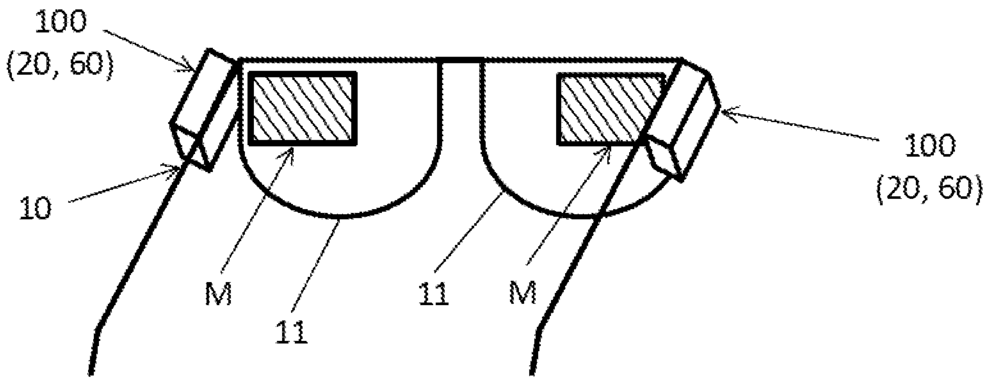
Figure 70C:
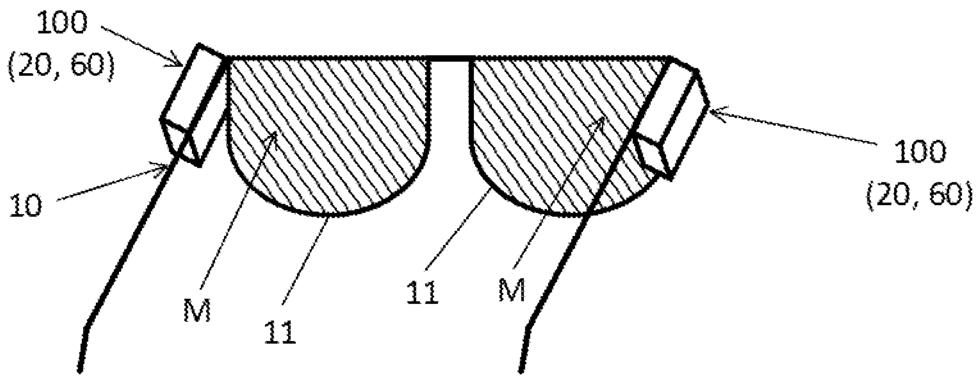

Further, in the case where the terminal device includes two display apparatuses, the hologram sheet for each display apparatus may be one of various types of sizes and shapes. FIG. 70 illustrates examples of hologram sheets to be stuck to the lens parts of the pair of glasses of a terminal device including two display apparatuses. In the example illustrated in FIG. 70A, small rectangular hologram sheets are used, and the two hologram sheets are stuck to an upper right portion of the right eye lens part and an upper left portion of the left eye lens part in a state where they are vertically long, respectively. In the example illustrated in FIG. 70B, large rectangular hologram sheets are used, and the two hologram sheets are stuck to an upper right portion of the right eye lens part and an upper left portion of the left eye lens part in a state where they are horizontally long, respectively. Further, in the example illustrated in FIG. 70C, two hologram sheets are attached to the entire surface of the right eye lens part and the entire surface of the left eye lens part, respectively.

In the fourth to twenty-first embodiments described above, a case will be described in which the image processing unit is provided in the image capturing apparatus. However, the image processing unit may be provided in the control unit of the terminal instead of the image capturing apparatus.

Figure 71:
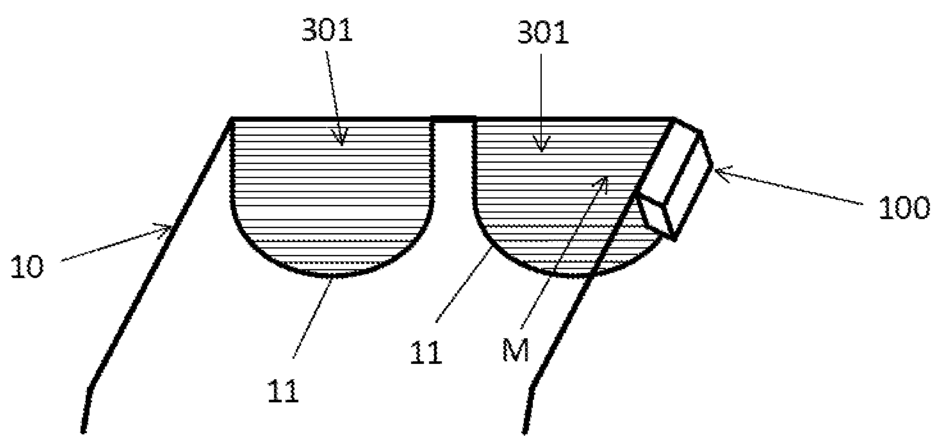
FIG. 71 illustrates a method of attaching a solar cell to a terminal device including a pair of glasses as a wearable object.
Figure 72:
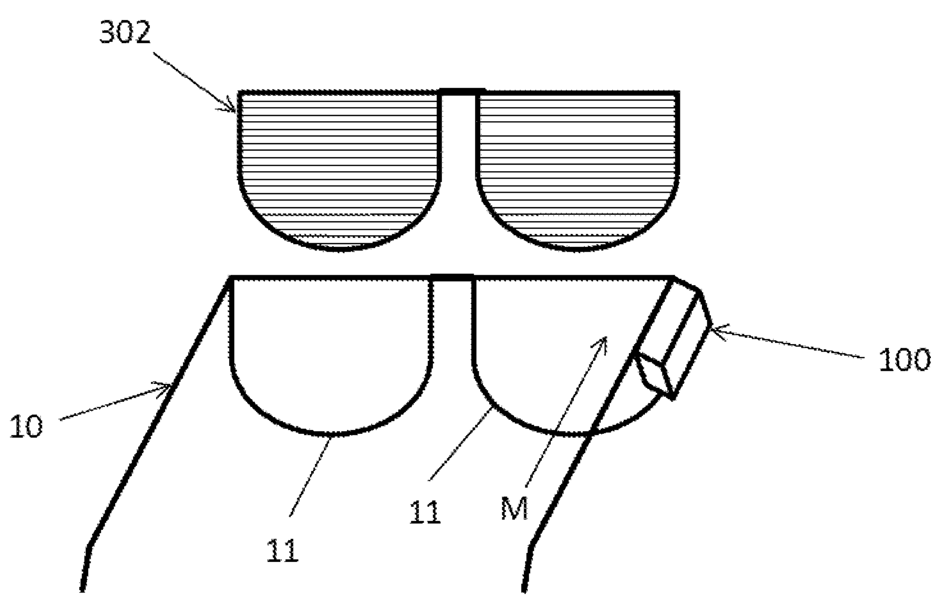
FIG. 72 illustrates a method of attaching a solar cell to a terminal device including a pair of glasses as a wearable object.

In the above-described embodiments, a case has been described in which electric power is supplied to the display apparatus and the like from the power supply unit such as a battery provided in the housing, or power is supplied from the terminal to the display apparatus and the like via one or more cables. However, a transmissive solar cell may be attached to the wearable object to be mounted on the head of the user, and power may be supplied from the solar cell to the display apparatus and the like. Various methods of attaching this solar cell to the wearable object can be used. FIGS. 71 to 73 illustrate methods of attaching a solar cell to the terminal device including a pair of glasses as a wearable object, and FIGS. 74 and 75 illustrate methods of attaching a solar cell to the terminal device including a face shield as a wearable object.

Figures 73A, 73B, 73C:
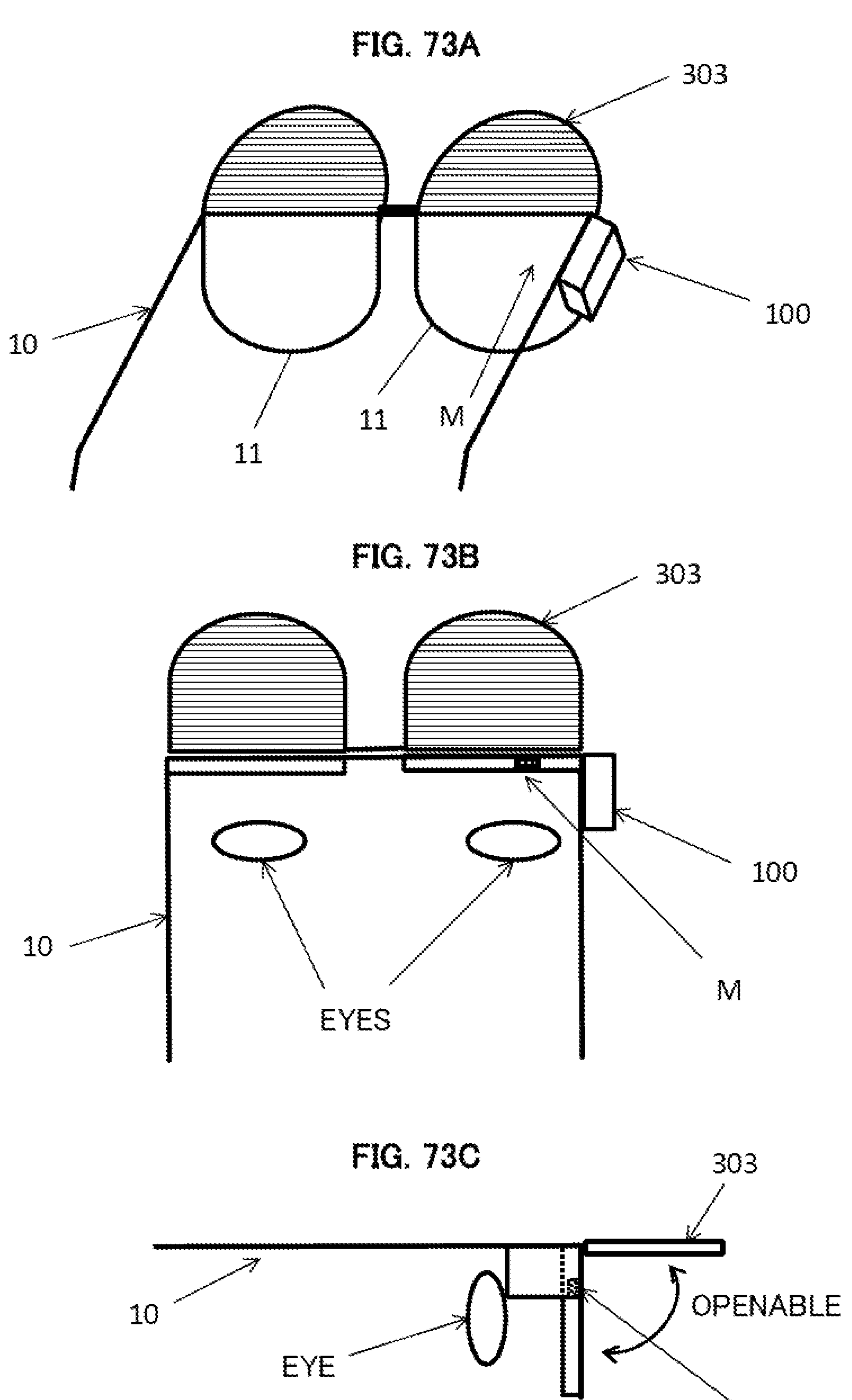
FIG. 73 illustrates a method of attaching a solar cell to a terminal device including a pair of glasses as a wearable object.

In the terminal device illustrated in FIG. 71, solar cells 301 are integrated with the lens part 11 of the pair of glasses 10. In the terminal device illustrated in FIG. 72, a solar cell 302 is formed in the same shape as the two lens parts 11 of the pair of glasses 10, and attached to the lens parts 11 of the pair of glasses 10 from the front side thereof. The solar cell 302 is attachable to and detachable from the lens parts 11. Further, also in the terminal device illustrated in FIG. 73, a solar cell 303 is formed in the same shape as the two lens parts 11 of the pair of glasses 10, and attached to the lens parts 11 of the pair of glasses 10 from the front side thereof. This solar cell 303 can be flipped up as illustrated in FIG. 73C. FIGS. 73A and 73B illustrate a state in which the solar cell 303 is flipped up. Note that the flip-up type solar cell 303 is fixedly attached to the pair of glasses 10, but may be attachable to and detachable from the pair of glasses 10.

Figure 74A:
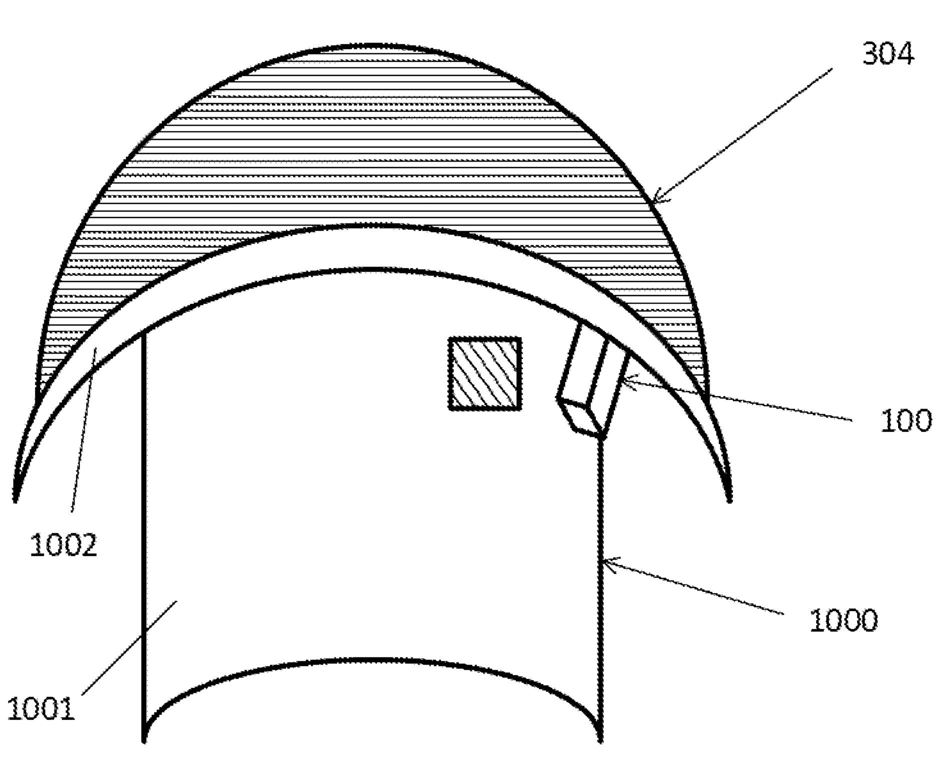
FIG. 74 illustrates a method of attaching a solar cell to a terminal device including a face shield as a wearable object.
Figure 74B:
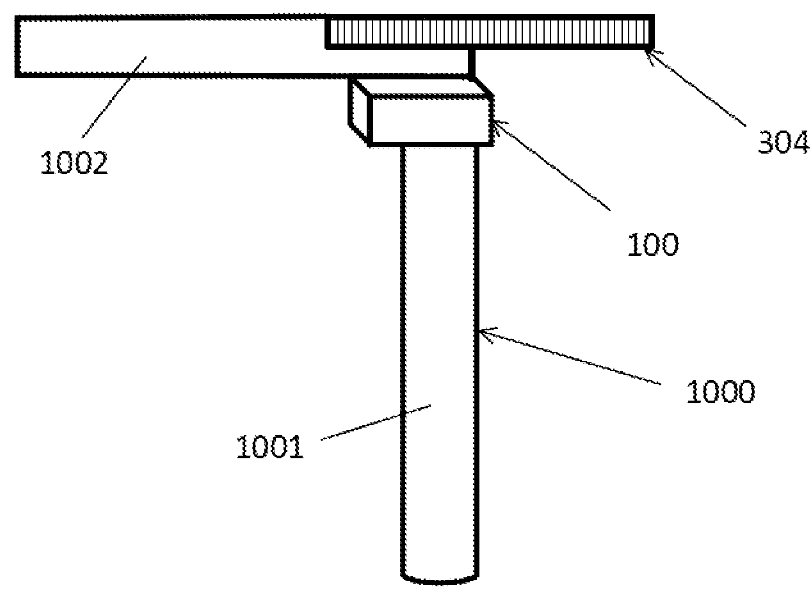
Figure 75:
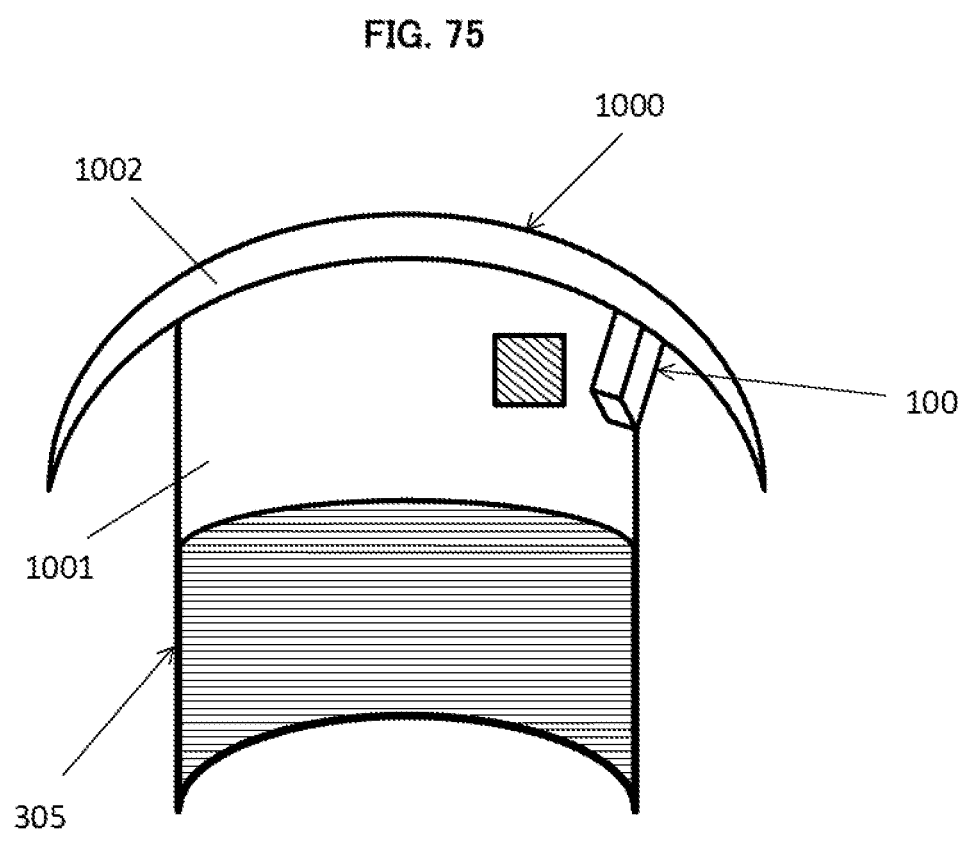

In the terminal device illustrated in FIG. 74, a solar cell 304 is formed in the shape of the brim of the face shield 1000 and attached to the frame 1002 of the face shield 1000. Here, FIG. 74A illustrates a diagram of the terminal device viewed obliquely from above, and FIG. 74B illustrates a diagram of the terminal device viewed from the side. Further, in the terminal device illustrated in FIG. 75, a solar cell 305 is attached to a portion of the shield part 1001 of the face shield 1000. Specifically, the solar cell 305 is formed to have approximately half the size of the shield part 1001 and is attached to a lower portion of the shield part 1001.

Note that, for such a solar cell being attached to the wearable object, it is necessary to provide a power source unit for storing electricity generated by the solar cell. In a case where the terminal and the display apparatus are wirelessly connected to each other, the power supply unit is provided in the housing or the wearable object. On the other hand, in a case where the terminal and the display apparatus are connected to each other by wire, the power supply unit is provided in both or one of the housing or the wearable object and the terminal. In particular, in a case where the power supply unit is provided only in the terminal, electricity is stored in the terminal during the generation of electric power so that electric power is supplied from the terminal to the display apparatus via wire.

Figure 76A:
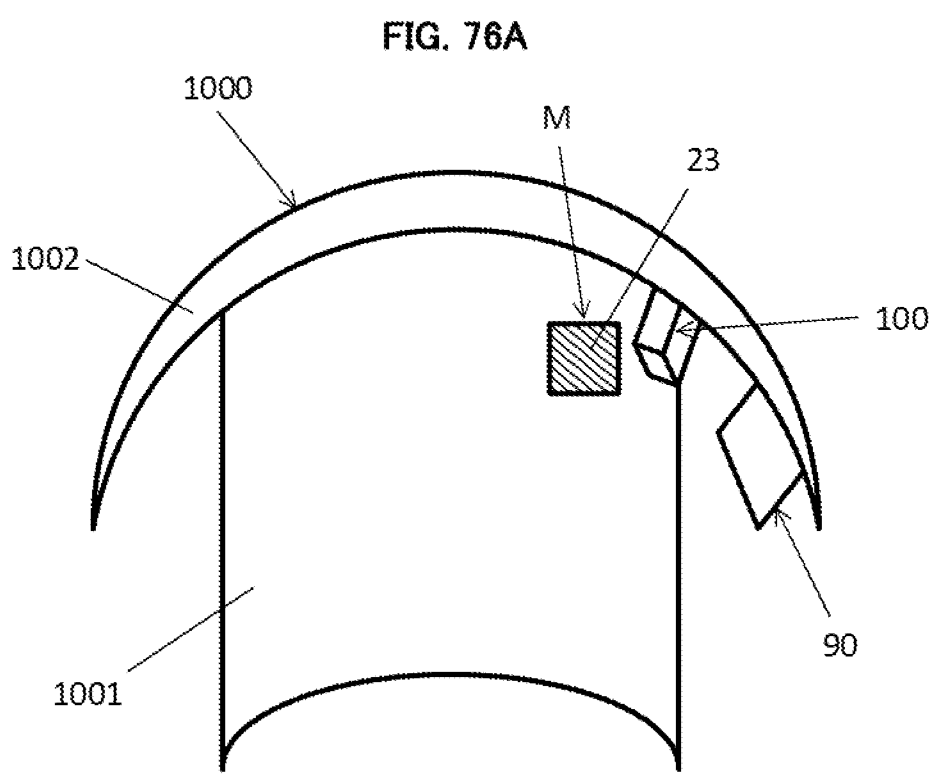
FIG. 76 illustrates a location where a touch pad unit is attached in a terminal device in which a face shield is used as a wearable object.
Figure 76B:
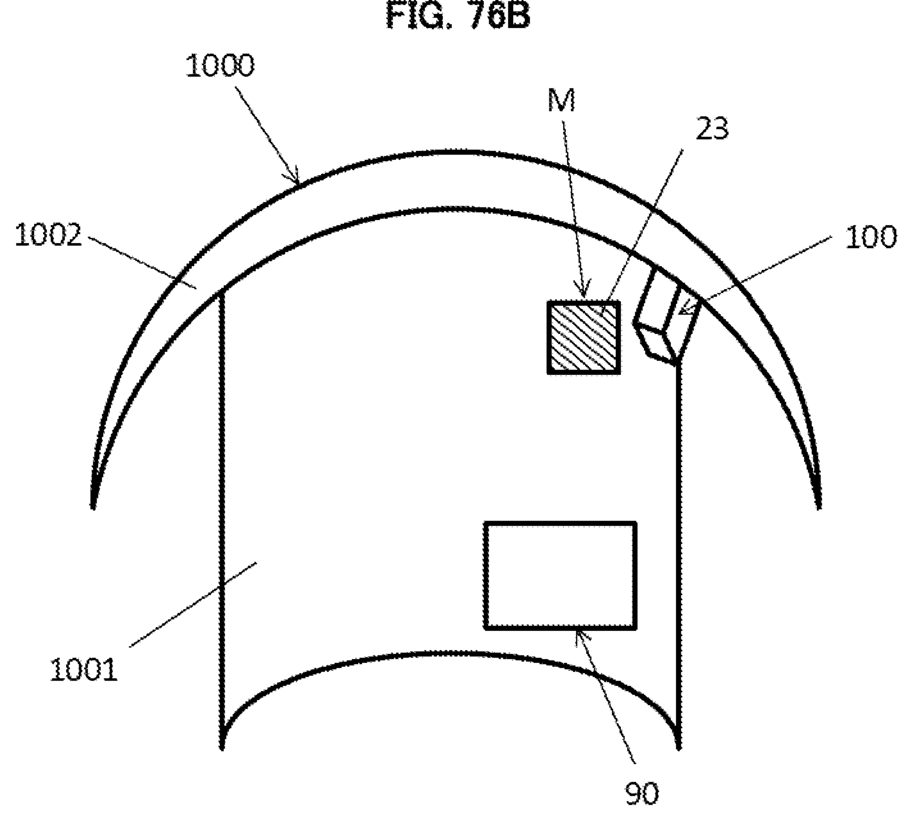

In the seventeenth to twentieth embodiments described above, a case has been described in which the terminal device includes the touch pad unit. However, the touch pad unit may be provided in the terminal device according to the other embodiments. For example, the touch pad unit can be provided in the terminal device using the face shield as a wearable object. FIG. 76 illustrates a location where the touch pad unit 90 is attached in the terminal device in which the face shield 1000 is used as a wearable object. The touch pad unit 90 can be attached to the frame 1002 on the right side as illustrated in FIG. 76A, or can be attached to the lower right side of the shield part 1001 as illustrated in FIG. 76B. Note that the touch pad unit 90 is fixedly attached to the corresponding portion, but may be attachable to and detachable from that portion. Further, in a case where the terminal device includes two display apparatuses, a touch pad unit may be divided into two pads in which one has a simple keyboard function and the other has a function of, for example, an operation panel, and the pads may be attached to, for example, the left and right sides of the frame 1002, respectively.

Figure 77:
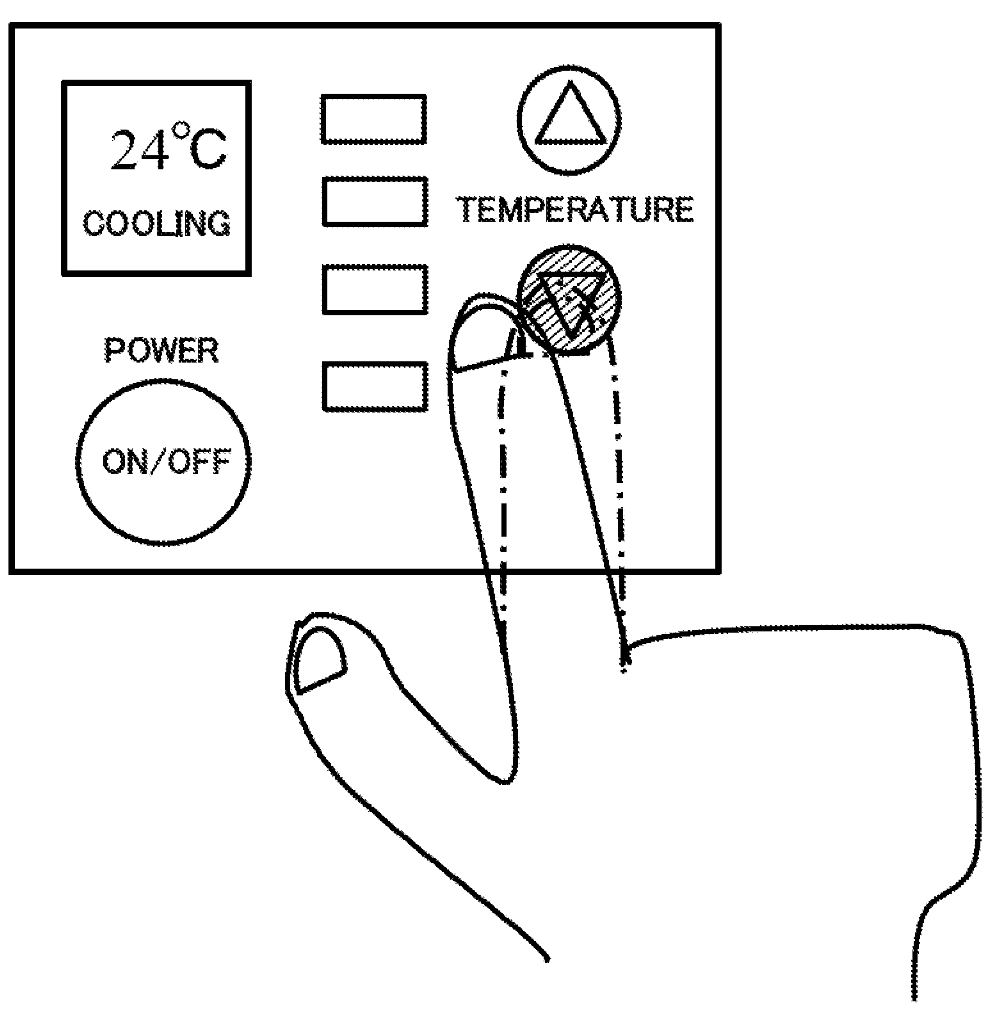
FIG. 77 is a diagram illustrating a state in which a remote control screen for an air conditioner is used as an original screen and the user performs an operation on a visual confirmation screen corresponding to the remote control screen.

Further, in the third to twenty-second embodiments described above, the storage unit of the terminal may store as original screens an operation screen for a mobile terminal (such as a mobile phone, a smartphone, a smartwatch, a tablet terminal, a digital audio player, or a laptop computer) other than that terminal, an operation screen for an information terminal (such as a personal computer) other than that terminal, a remote control screen for home appliances (such as a lighting, a TV set, an air conditioner, and a security system), and a control panel screen for an automobile electrical component (such as a car stereo system, a car navigation system, an in-vehicle AV equipment, or a car air conditioner). In this case, when the user operates the terminal to cause the display apparatus to display any one of the above-mentioned operation screens as the original screen and further performs an operation on the visual confirmation screen corresponding to the original screen with a finger, the control unit (remote control unit) of the terminal generates an instruction signal (command) indicating the content of that operation, and wirelessly transmits the generated instruction signal to the above-mentioned mobile terminal or the like via the communication unit. As a result, the above-mentioned mobile terminal or the like can be operated remotely. Accordingly, the terminal device of the present invention can also be used as a remote controller for a remotely controllable device such as an air conditioner. FIG. 77 is a diagram illustrating a state in which a screen (remote control screen) corresponding to the operation unit of the remote controller for the air conditioner is used as the original screen and the user performs an operation on the visual confirmation screen corresponding to the remote control screen. As illustrated in FIG. 77, when the user performs with a finger an operation on a button to issue an instruction to lower the set temperature through the visual confirmation screen, the control unit of the terminal generates a command to lower the set temperature, and transmits the command to the air conditioner via the communication unit through infrared communication, so that the user can easily lower the set temperature of the air conditioner. Further, FIG. 78 illustrates examples of the original screen of an operation screen for making a call with a mobile phone. When the user enters a desired telephone number on the visual confirmation screen corresponding to the original screen for entering the telephone number as illustrated in FIG. 78A or 78B, the control unit of the terminal generates a command to call the telephone number, and transmits the command to the mobile phone via the communication unit, so that the user can make a call without holding the mobile phone by hand.

In the above-described embodiments, a case has been described in which a mobile terminal such as a smartphone or a tablet terminal is used as the terminal. However, in the terminal device of the present invention, the device used as the terminal is not limited to a smartphone or a tablet terminal, and may be, for example, a smart watch, a digital audio player, a personal computer, a car navigation system, an in-vehicle AV device, or a dedicated terminal.

In the above-described embodiments, the terminal may be used as a touch pad unit for issuing an instruction to perform various operations (e.g., pointer operation, character input, etc.) on the screen of the display apparatus. In other words, the terminal may have a touch pad function. For example, in a case where a smartphone or tablet terminal is used as the terminal, the image of a touch pad can be displayed on the display unit of the terminal so that the screen itself of the display unit can be used as the touch pad unit. FIG. 79 illustrates a state where a screen of the terminal is used as a touch pad unit in a case where a smartphone is used as the terminal. With this configuration, the user performs an operation on the screen (touch pad unit) of the display unit 31 with a finger or an input instructing tool. Specifically, the terminal 30A includes a position detection unit configured to detect a touch position where a touch operation is performed on the screen of the display unit 31 and output touch position information indicating the detected position to the input control unit 346. Further, the storage unit 33 of the terminal 30A stores data on the image of the touch pad displayed on the display unit 31. When the original screen M is displayed on the display apparatus 20 and the image of the touch pad is displayed on the display unit 31, in response to the user performing a touch operation on the image of the touch pad, the input control unit 346 recognizes the content of the touch operation based on the touch position information transmitted from the position detection unit in response to the touch operation and data on the image of the touch pad stored in the storage unit 33, and controls the original screen M displayed on the display apparatus 20 according to the recognized content of the touch operation. Further, in a case where a personal computer is used as the terminal, the touch pad or keyboard attached to the personal computer can be used as the touch pad unit. The touch pad unit as used herein may have a mouse function, a simple keyboard function, or both a mouse function and a simple keyboard function. Further, the touch pad unit is not limited to such examples, and may have a numeric key panel, an operation panel, or the like.

Figure 80:
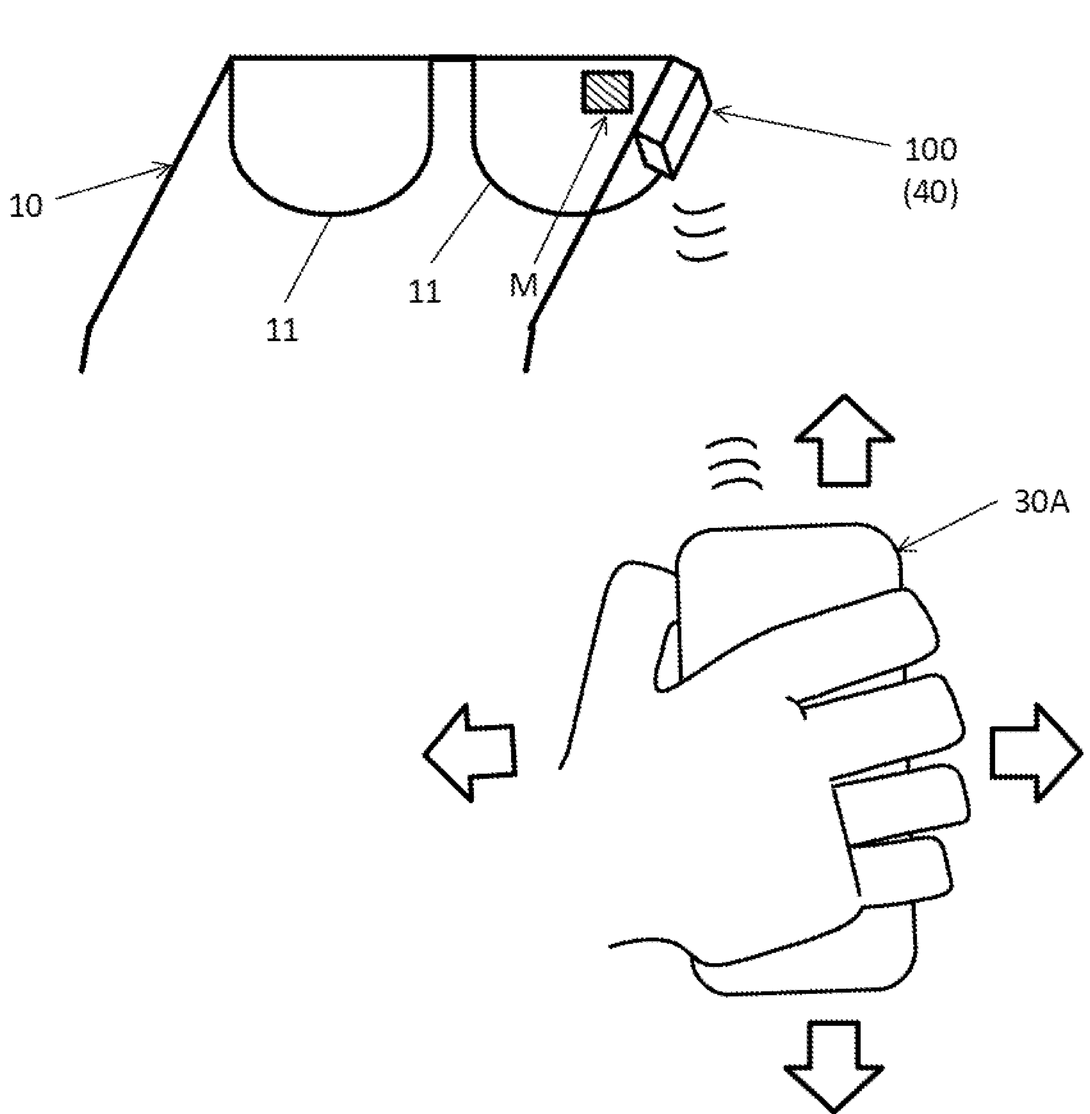
FIG. 80 illustrates a state where a terminal is used as a mouse to instruct the movement of a cursor in a case where a smartphone is used as the terminal.

In the above-described embodiments, the terminal may be used as a mouse for moving a cursor displayed on the screen of the display apparatus and selecting the target displayed on the screen. In other words, the terminal may have a mouse function. With this configuration, the terminal includes a movement information output unit configured to detect a movement direction of the terminal, measure a movement amount of the terminal, and output movement information indicating the detected movement direction and the measured movement amount to the input control unit. Further, the storage unit of the terminal stores data representing a correspondence between the movement information of the terminal and an operation related to a cursor displayed on the display apparatus. When the original screen is displayed on the display apparatus and the user moves the terminal, the input control unit recognizes the content of an operation related to the cursor based on the movement information of the movement transmitted from the movement information output unit and the data representing the correspondence stored in the storage unit, and controls the original screen displayed on the display apparatus according to the recognized content of the operation. For example, the data representing the above-mentioned correspondence includes correspondences in which, for example, moving the terminal in the right (left) direction of the screen of the display unit corresponds to moving the cursor in the right (left) direction; moving the terminal in the up (down) direction of the screen of the display unit corresponds to moving the cursor in the up (down) direction; slightly moving the terminal in the vertical direction of the screen of the display unit once corresponds to performing a tap operation; slightly moving the terminal in the vertical direction of the screen of the display unit twice corresponds to performing a double-tap operation; and greatly moving the terminal in the vertical direction of the screen of the display unit corresponds to performing a swipe operation. This allows the user to instruct the terminal that the cursor is to be moved in the right (left) direction by moving the terminal in the right (left) direction of the screen, and instruct the terminal that the cursor is to be moved in the up (down) direction by moving the terminal in the up (down) direction of the screen. FIG. 80 illustrates a state where the terminal is used as a mouse to instruct the movement of a cursor in a case where a smartphone is used as the terminal. Note that, in a case where the terminal has not only the mouse function but also the above-mentioned touch pad function, the user is allowed to instruct the terminal to move the cursor by using the mouse function and instruct the terminal to perform tap operation, double tap operation, swipe operation, drag operation, or the like by using the touch pad function.

In the terminal devices according to the above-described embodiments, a case has been described in which the pair of glasses or the face shield is used as a wearable object to be mounted on the head of the user. However, for example, a headset terminal, a head-mounted display (HMD) terminal, or a goggles-type terminal can also be used as a wearable object in the terminal device of the present invention.

INDUSTRIAL APPLICABILITY

As described above, in the terminal device of the present invention, since the wearable object to be mounted on the head of the user and the terminal that is equipped with the display unit are separate from each other, existing mobile terminals such as smartphones and tablet terminals, for example, can be used as the terminal. Such a use of an existing mobile terminal or the like as the terminal makes it possible to reduce the number of parts of the wearable object, resulting in a simplified wearable object. In addition, the use of a commercially available smartphone or the like as the terminal makes it possible to perform the operation using such a smartphone or the like that is familiar to the user, so that the operability can be improved. Therefore, the present invention can be applied to a terminal device having a wearable object to be mounted on a user's head, such as a pair of glasses and a face shield.

DESCRIPTION OF THE REFERENCE NUMERAL

1A, 1B, 1C, 2A, 2B, 2C, 3A, 3B, 4A, 4B, 5A, 5B, 6A, 6B, 7A, 7B, 8A, 8B, 9, 9A, 9B, 9C Terminal device
10 Pair of glasses
11 Lens part
1000 Face shield
1001 Shield part
1002 Frame
1003 Translucent film
20 Display apparatus
21 Small projector
22 Optical system
23 Hologram sheet
24 Half mirror
30, 30A, 30B, 30C, 30D, 30E, 30F, 30G, 30H Terminal
31 Display unit
32 Communication unit
33 Storage unit
34, 34A, 34B, 34C, 34D, 34E, 34F, 34G, 34H Control unit
341 Display control unit
342, 342B Image data extraction unit
343 Operation determination unit
344, 344C Position data generation unit
345, 345D Reference data generation unit
346, 346D, 346E Input control unit 345E
347C Alignment unit
348D Distance determination unit
349E Operation position identification unit
351 Iris and pupil image data generation unit
352 Image difference extraction unit
353 Image conversion unit
354 Eye presence/absence determination unit
355 Notification control unit
40 Communication unit
50 Cable
60, 60A, 60B Image capturing apparatus
61 Camera unit
62 Image processing unit
63, 63A Camera control unit
631 Autofocus control unit
70 Microphone unit
80 Speaker unit
90 Touch pad unit
100 Housing
200 Character input screen
201 Character input screen (original screen for setting reference data)
210 Keyboard image
220 Display area
221 Search screen
2211 Keyword input field
2212 Search result display field
301, 302, 303, 304, 305 Solar cell
M Original screen
S Visual confirmation screen
K Reference screen
T Operation screen

The invention claimed is:

1. A terminal device comprising:

a wearable object to be mounted on a head of a user;

a display apparatus provided in the wearable object to display a first screen;

a mobile terminal that is separate from the wearable object and is equipped with a display unit; and an image capturing apparatus provided in the wearable object to capture an image of a finger or a specific input instructing tool when the user performs an operation on a second screen with the finger or the input instructing tool, and to output image data of the captured image to the mobile terminal wirelessly or wired, wherein the mobile terminal is connected to the display apparatus wirelessly or wired, and has a function of controlling the display apparatus to display on the display apparatus as the first screen a screen displayed on the display unit of the mobile terminal, a function of displaying a setting screen on the display unit of the mobile terminal, the setting screen having a plurality of buttons that control display settings, wherein activating one of the buttons causes a part of the screen displayed on the display unit of the mobile terminal to be displayed as the first screen, and activating another of the buttons causes a screen with an enlarged character in the screen displayed on the display unit of the mobile terminal to be displayed as the first screen, and the mobile terminal has a function of controlling, for the setting made by the user through the setting screen displayed on the display unit of the mobile terminal, the display apparatus to display on the display apparatus the first screen according to the setting made by the user through the setting screen, and the mobile terminal includes:

a storage unit configured to store various types of data including data on the first screen;

an operation determination unit configured to, when the image capturing apparatus captures the image of the finger or the input instructing tool with which the user performs an operation on the second screen, determine what content of the operation is performed with the finger or the input instructing tool among the various types of operations, based on the image data of the captured image;

a position data generation unit configured to, when the image capturing apparatus captures the image of the finger or the input instructing tool with which the user performs an operation on the second screen, generate position data of the finger or the input instructing tool within an image capture range that is a range in which the image capturing apparatus is able to capture an image, based on the image data of the captured image;

a reference data generation unit configured to, when the user performs an operation at one or more predetermined positions on the second screen with the finger or the input instructing tool, generate data on the second screen for identifying a position and a size of the second screen and store the generated data as reference data in the storage unit, by using the position data of the finger or the input instructing tool generated by the position data generation unit based on the image data for which the operation determination unit determines that the operation performed at each of the predetermined positions is a predetermined operation; and an input control unit configured to, when the user performs an operation on the second screen with the finger or the input instructing tool, recognize a content of an input instruction corresponding to the operation performed with the finger or the input instructing tool, by identifying a range of the second screen within the image capture range and retrieving a position where the operation is performed within the identified range of the second screen with the finger or the input instructing tool, based on data on the content of the operation performed with the finger or the input instructing tool, obtained as determined by the operation determination unit, the position data of the finger or the input instructing tool generated by the position data generation unit, the reference data on the second screen stored in the storage unit, and the data on the first screen corresponding to the second screen stored in the storage unit; and control a screen to be displayed on the display unit and the first screen to be displayed on the display apparatus, according to the recognized content of the input instruction, wherein the first screen is a screen that is projected or displayed on the display apparatus, and the second screen is a virtual screen that appears to be floating in midair to the user wearing the wearable object when the display apparatus projects or displays the first screen.

2. The terminal device according to claim 1, wherein the mobile terminal has a function of controlling the image capturing apparatus to adjust the image capture range of the image capturing apparatus, and a function of controlling the image capturing apparatus to adjust a depth of field that is a range in a depth direction in which a subject is in focus.

3. The terminal device according to claim 1, wherein the setting screen related to screen display of the display apparatus is configured to select the setting of using as the first screen a part of a screen displayed on the display unit, and also a setting of using, as the first screen, a screen in which the screen displayed on the display unit is different and a setting of using as the first screen a screen in which a character and/or a chart are enlarged in the screen displayed on the display unit.

4. The terminal device according to claim 1, wherein the display apparatus includes: a projection device including a display device; and a hologram sheet or a half mirror, the hologram sheet or the half mirror is located in front of a face of the user and within a range of a field of view of the user, and the first screen is displayed on the hologram sheet or the half mirror by the projection device projecting an image onto the hologram sheet or the half mirror.

5. The terminal device according to claim 1, wherein the display apparatus includes: a projection device including a display device; an optical system; and a projected unit onto which the first screen displayed on the display device is projected via the optical system, and the projected unit is a translucent screen, a transmissive screen, a hologram sheet, a hologram film, a hologram optical element, or a half mirror.

6. The terminal device according to claim 1, wherein the display apparatus includes: a projection device including a display device; an optical system; and a projected unit onto which the first screen displayed on the display device is projected via the optical system, and the optical system includes one, some, or all of a lens, a reflecting mirror, a prism, a light guide plate, and a waveguide.

7. The terminal device according to claim 1, wherein the display apparatus is a transmissive or transparent display device, the display device is located in front of a face of the user and within a range of a field of view of the user, and the first screen is a screen that is displayed on the display device.

8. The terminal device according to claim 1, further comprising a communication unit configured to perform wireless communication between various apparatuses and units mounted on the wearable object and external devices, wherein the mobile terminal has a function of performing wireless communication with external devices, and the display apparatus is configured to perform wireless communication with the mobile terminal via the communication unit.

9. The terminal device according to claim 8, wherein the mobile terminal and the display apparatus each perform data communication after performing authentication based on identification information transmitted from another party to perform wireless communication.

10. The terminal device according to claim 1, wherein when the mobile terminal displays a screen displayed on the display unit as the first screen on the display apparatus, the mobile terminal is configured to maintain a display of the screen on the display unit as it is or turn off the display unit, according to a setting of a screen for the display unit made by the user.

11. The terminal device according to claim 1, wherein when the mobile terminal displays a screen displayed on the display unit as the first screen on the display apparatus, the mobile terminal is configured to display, in response to the user specifying a screen to be displayed on the display apparatus, the specified screen on the display apparatus as being separate from a screen currently displayed on the display unit.

12. The terminal device according to claim 1, wherein the mobile terminal has a function of acquiring position information of its own position, and a function of generating a screen for guiding the user from a current position to a destination set by the user based on map information stored in the storage unit and the position information, and displaying the generated screen on the display unit.

13. The terminal device according to claim 1, wherein the mobile terminal has a function of acquiring position information of its own position, and a function of searching for a shop around a current position based on map information stored in the storage unit and the position information, and displaying information about the searched and retrieved shop on the display unit.

14. The terminal device according to claim 1, wherein the display apparatus is attachable to and detachable from the wearable object.

15. The terminal device according to claim 1, wherein the mobile terminal includes a position detection unit configured to detect a touch position where a touch operation is performed on the screen of the display unit and output touch position information indicating the detected position to the input control unit, the storage unit stores data on an image of a touch pad to be displayed on the display unit, and the input control unit is configured to, when the first screen is displayed on the display apparatus and the image of the touch pad is displayed on the display unit, in response to the user performing a touch operation on the image of the touch pad, recognize a content of the touch operation based on the touch position information transmitted from the position detection unit in response to the touch operation and the data on the image of the touch pad stored in the storage unit, and control the first screen displayed on the display apparatus according to the recognized content of the touch operation.

16. The terminal device according to claim 1, wherein the mobile terminal includes a movement information output unit configured to detect a movement direction of the mobile terminal, measure a movement amount of the mobile terminal, and output movement information indicating the detected movement direction and the measured movement amount to the input control unit, the storage unit stores data representing a correspondence between the movement information of the mobile terminal and an operation related to a cursor displayed on the display apparatus, and the input control unit is configured to, when the first screen is displayed on the display apparatus and the user moves the mobile terminal, recognize a content of an operation related to the cursor based on the movement information of the moved mobile terminal transmitted from the movement information output unit and the data representing the correspondence stored in the storage unit, and control the first screen displayed on the display apparatus according to the recognized content of the operation.

17. The terminal device according to claim 1, wherein the first screen displayed on the display apparatus includes a screen corresponding to an operation unit for a remote controller for a remotely controllable device, and the mobile terminal further includes a remote control unit configured to cause the display apparatus to display the screen corresponding to the operation unit for the remote controller as the first screen, generate, when an operation is performed on the second screen corresponding to the first screen, an instruction signal indicating a content of the operation, and wirelessly transmit the generated instruction signal to the remotely controllable device.

18. The terminal device according to claim 1, wherein the image capturing apparatus is attachable to and detachable from the wearable object.

19. The terminal device according to claim 4, wherein a portion of the display apparatus is attachable to and detachable from the wearable object.

20. The terminal device according to claim 1, further comprising a touch pad unit that is an input device for the mobile terminal, wherein the touch pad unit is attachable to and detachable from the wearable object.

21. The terminal device according to claim 1, further comprising a sound output device configured to convert an electrical signal output from the mobile terminal into sound and transmit the sound to the user through an ear or by bone conduction, wherein the sound output device is provided in the wearable object.

22. The terminal device according to claim 1, further comprising a sound input device configured to convert a voice of the user into an electrical signal and output the electrical signal to the mobile terminal, wherein the sound input device is provided in the wearable object.

* * * * *